(12) United States Patent
Zhai et al.

(10) Patent No.: US 12,514,863 B2
(45) Date of Patent: Jan. 6, 2026

(54) PHARMACEUTICAL COMBINATION AND USE THEREOF

(71) Applicants: ASCENTAGE PHARMA (SUZHOU) CO., LTD., Suzhou (CN); ASCENTAGE PHARMA GROUP CORP LIMITED, Hong Kong (CN)

(72) Inventors: Yifan Zhai, Suzhou (CN); Dajun Yang, Suzhou (CN); Douglas Dong Fang, Suzhou (CN); Guangfeng Wang, Suzhou (CN); Jing Deng, Suzhou (CN); Qiuqiong Tang, Suzhou (CN); Ran Tao, Suzhou (CN)

(73) Assignees: Ascentage Pharma (Suzhou) Co., Ltd., Suzhou (CN); Ascentage Pharma Group Corp Limited, Hong Kong (CN)

( * ) Notice: Subject to any disclaimer, the term of this patent is extended or adjusted under 35 U.S.C. 154(b) by 30 days.

(21) Appl. No.: 17/287,071

(22) PCT Filed: Dec. 4, 2020

(86) PCT No.: PCT/CN2020/133893
§ 371 (c)(1),
(2) Date: Apr. 20, 2021

(87) PCT Pub. No.: WO2021/110136
PCT Pub. Date: Jun. 10, 2021

(65) Prior Publication Data
US 2022/0323465 A1   Oct. 13, 2022

(30) Foreign Application Priority Data

Dec. 4, 2019   (WO) ............... PCT/CN2019/123022
Sep. 10, 2020  (WO) ............... PCT/CN2020/114326
Nov. 24, 2020  (CN) ......................... 202011332321.3

(51) Int. Cl.
| | |
|---|---|
| *A61K 31/635* | (2006.01) |
| *A61K 31/138* | (2006.01) |
| *A61K 31/47* | (2006.01) |
| *A61K 31/496* | (2006.01) |
| *A61K 31/517* | (2006.01) |
| *A61K 31/519* | (2006.01) |
| *A61K 31/553* | (2006.01) |
| *A61K 45/06* | (2006.01) |
| *A61P 35/00* | (2006.01) |
| *A61P 35/02* | (2006.01) |

(52) U.S. Cl.
CPC .......... *A61K 31/635* (2013.01); *A61K 31/138* (2013.01); *A61K 31/47* (2013.01); *A61K 31/496* (2013.01); *A61K 31/517* (2013.01); *A61K 31/519* (2013.01); *A61K 31/553* (2013.01); *A61K 45/06* (2013.01); *A61P 35/00* (2018.01); *A61P 35/02* (2018.01)

(58) Field of Classification Search
CPC .... A61K 31/635; A61K 31/138; A61K 31/47; A61K 31/496; A61K 31/517; A61K 31/519; A61K 31/553; A61K 45/06; A61P 35/02; A61P 35/00
See application file for complete search history.

(56) References Cited

U.S. PATENT DOCUMENTS

| | | | | |
|---|---|---|---|---|
| 8,846,671 | B2 * | 9/2014 | Ding ................ | C07D 471/04 |
| | | | | 514/233.2 |
| 10,221,174 | B2 * | 3/2019 | Wang ................. | A61P 35/02 |
| 2016/0220573 | A1 | 8/2016 | Di Paolo et al. | |
| 2022/0143039 | A1 * | 5/2022 | Yang ................. | A61K 31/55 |

FOREIGN PATENT DOCUMENTS

| | | | |
|---|---|---|---|
| CN | 101885722 A | 11/2010 | |
| CN | 109311871 A | 2/2019 | |
| TW | 202019407 A | 6/2020 | |
| WO | WO 2014/031487 A1 | 2/2014 | |
| WO | WO 2014/113413 A1 | 7/2014 | |
| WO | WO-2018027097 A1 * | 2/2018 | ........... A61K 31/437 |
| WO | 2018165516 A1 | 9/2018 | |
| WO | WO 2020/024820 A1 | 2/2020 | |
| WO | WO 2020/024826 A1 | 2/2020 | |
| WO | WO 2020/024834 A1 | 2/2020 | |
| WO | WO 2020/024976 A1 | 2/2020 | |
| WO | WO 2020/103921 A1 | 5/2020 | |

OTHER PUBLICATIONS

Bostrom, B. C., et al. Blood, The Journal of the American Society of Hematology 101.10 (2003): 3809-3817. (Year: 2003).*
Taiwan Office Action dated Aug. 26, 2021 for Application No. 109142809.
Taiwan Search Report dated Aug. 26, 2021 for Application No. 109142809.
Ma, Jun, et al. "Inhibition of Bcl-2 synergistically enhances the antileukemic activity of midostaurin and gilteritinib in preclinical models of FLT3-mutated acute myeloid leukemia." Clinical Cancer Research 25.22 (2019): 6815-6826.
Suvarna, Vasanti, et al., "Current overview on the clinical update of Bcl-2 anti-apoptotic inhibitors for cancer therapy." European journal of pharmacology 862 (2019): 172655.
Jiang, Qian, et al. "An updated safety and efficacy results of phase 1 study of HQP1351, a novel 3rd generation of BCR-ABL tyrosine kinase inhibitor (TKI), in patients with TKI resistant chronic myeloid leukemia." Blood 134 (2019): 493.
Fang, Douglas D., et al. "MDM2 inhibitor APG-115 synergizes with PD-1 blockade through enhancing antitumor immunity in the tumor microenvironment." Journal for immunotherapy of cancer 7 (2019): 1-16.

(Continued)

*Primary Examiner* — Joseph K McKane
*Assistant Examiner* — Quincy McKoy
(74) *Attorney, Agent, or Firm* — Goodwin Procter LLP

(57) ABSTRACT

Described herein are methods of treating a cancer, for example, a hematologic malignancy or a solid tumor, in a patient in need thereof, comprising administering to the patient a Bcl-2 inhibitor in combination with a second anti-cancer agent.

6 Claims, 130 Drawing Sheets

(56) References Cited

OTHER PUBLICATIONS

Bogenberger, James, et al. "Combined venetoclax and alvocidib in acute myeloid leukemia." Oncotarget 8.63 (2017): 107206.

Ren, Xiaomei, et al., Identification of GZD824 as an Orally Bioavailable Inhibitor That Targets Phosphorylated and Nonphosphorylated Breakpoint Cluster Region—Abelson (Bcr-Abl) Kinase and Overcomes Clinically Acquired Mutation-Induced Resistance against Imatinib., Journal of Medicinal Chemistry, 09, Jan. 2013, vol. 56, pp. 879-894.

PCT/CN2020/133893 International Search Report and Written Opinion dated Mar. 21, 2021.

Zhang, Jingliao, et al. "The 66th ASH Annual Meeting Abstracts, Poster Abastracts 613.Acute Lymphoblastic Leukemias: Therapies Excluding Allogeneic Tranplantation, Safety and Efficacy of Olverembatinib (HQP1351) Combined with Lisaftoclax (APG-2575) in Children and Adolescents with Relapsed/Refractory Philadelphia Chromosome-Positive Acute Lymphoblastic Leukemia (R/R/Ph+ALL): First Report from a Phase 1 Study" Blood 144 (2024), pp. 1443-1444. https://doi.org/10.1182/blood-2024-207035.

Xiong, Yan, et al. "The 66th ASH Annual Meeting Abstracts, Online Publication Only, 604. Molecular Pharmacology and Drug Resistance: Myeloid Neoplasms: Olverembatinib (HQP1351) in Combination with Lisaftoclax Overcomes Venetoclax Resistance in Preclinical Model of Acute Myeloid Leukemia (AML)" Blood 144 (2024), pp. 5777-5778.

* cited by examiner

*: All groups compared with vehicle control.

PHARMACEUTICAL COMBINATION AND USE THEREOF

CROSS REFERENCE TO RELATED APPLICATIONS

This application is a national phase of International Patent Application No. PCT/CN2020/133893, filed Dec. 4, 2020, which claims priority to Chinese Patent Application No. 202011332321.3, filed Nov. 24, 2020, and to International Patent Application No. PCT/CN2020/114326, filed Sep. 10, 2020, and International Patent Application No. PCT/CN2019/123022, filed Dec. 4, 2019, all of which are incorporated by reference herein in their entirety.

BACKGROUND

Apoptosis, the process of programmed cell death, is an essential biological process for tissue homeostasis. In mammals, it has been shown to regulate early embryonic development. Later in life, cell death is a default mechanism by which potentially dangerous cells, e.g., cells carrying cancerous defects, are removed. Several apoptotic pathways are known. One of the most important apoptotic pathways involves the Bcl-2 family of proteins which are key regulators of the mitochondrial (also called "intrinsic") pathway of apoptosis. The structural homology domains BH1, BH2, BH3 and BH4 are characteristic of Bcl-2 family proteins. The Bcl-2 family of proteins can be further classified into three subfamilies depending on how many of the homology domains each protein contains and on its biological activity, i.e., whether it has pro- or anti-apoptotic function.

Down-regulated apoptosis (and more particularly the Bcl-2 family of proteins) may be involved in the onset of cancerous malignancy. The anti-apoptotic proteins, Bcl-2 and Bcl-xL, are over-expressed in many cancer cell types. The effect of this deregulation is the survival of altered cells which would otherwise have undergone apoptosis in normal conditions. The repetition of these defects associated with unregulated proliferation is thought to be the starting point of cancerous evolution. Additionally, BH3-only proteins can act as tumor suppressors when expressed in diseased animals.

The natural expression levels of anti-apoptotic Bcl-2 family proteins members vary in different cell types. For example, in young platelets, Bcl-xL protein is highly expressed and plays an important role in regulating cell death (life span) of platelets. Also, in certain cancer cell types, the cancer cell's survival is attributed to the dysregulation of the apoptotic pathway caused by the over-expression of one or more anti-apoptotic Bcl-2 protein family members. In view of the important role for Bcl-2 family of proteins in regulating apoptosis in both cancerous and normal, i.e., non-cancerous, cells, and the recognized inter-cell type variability of Bcl-2 family protein expression, it is advantageous to have a small molecule inhibitor that selectively targets and preferably binds to one type or a subset of anti-apoptotic Bcl-2 protein(s), for example, to an anti-apoptotic Bcl-2 family member that overexpressed in a certain cancer type. Such a selective compound also may confer certain advantages in the clinical setting, by providing, for example, the flexibility to select a dosing regimen, a reduced on-target toxic effect in normal cells, among others, e.g., lymphopenia has been observed in Bcl-2 deficient mice.

There is an ongoing need for compounds that selectively inhibit the activity of one type or a subset of Bcl-2 proteins for the treatment of hyperproliferative diseases such as cancer, including hematologic malignancies.

SUMMARY

The present disclosure provides, for example, methods of treating a hematologic malignancy in a patient in need thereof, comprising administering to the patient a compound of formula (V), as described herein, and administering a second compound represented by

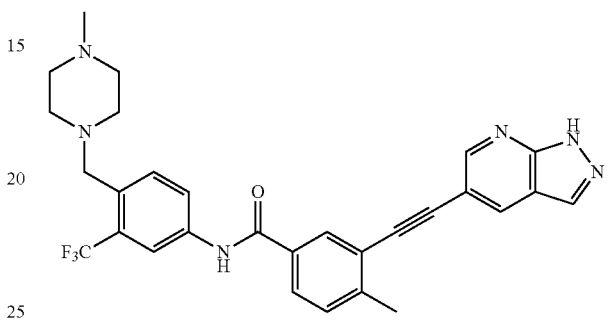

or pharmaceutically acceptable salt thereof;

where an effective amount of the first and second compound is administered to the patient.

In another aspect, described herein is a method of treating a hematologic malignancy in a patient in need thereof, comprising: administering to the patient a first compound of formula (V) or a pharmaceutically acceptable salt thereof; and administering to the patient a FLT3 inhibitor.

In another aspect, described herein is a method of treating a solid tumor cancer in a patient need thereof, comprising: administering to the patient a first compound of formula (V) or a pharmaceutically acceptable salt thereof; and administering to the patient a second compound selected from a CDK4/6 inhibitor and/or tamoxifen.

In another aspect, described herein is a method of treating a cancer selected from the group consisting of: diffuse large B-cell lymphoma, follicular B-cell lymphoma, or chronic lymphocytic leukemia in a patient need thereof, comprising: administering to the patient a first compound of formula (V) or a pharmaceutically acceptable salt thereof; and administering to the patient a PI3K inhibitor.

In another aspect, described herein is a method of treating a hematologic malignancy in a patient in need thereof comprising: administering to the patient a first compound of formula (V) or a pharmaceutically acceptable salt thereof; and administering to the patient a PI3K inhibitor.

In another aspect, described herein is a method of treating a hematologic malignancy or a solid tumor cancer in a patient in need thereof, comprising administering: a first compound of formula (V) or a pharmaceutically acceptable salt thereof; and a second compound represented by:

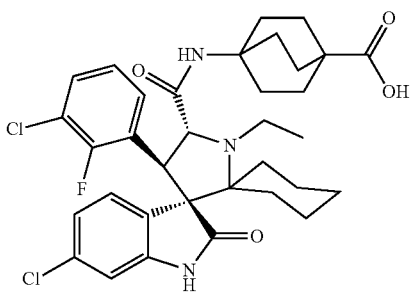 [SMILES: CCN1[C@@H](C(=O)NC23CCC(C(=O)O)(CC2)CC3)[C@H](c2cccc(Cl)c2F)[C@]2(C(=O)Nc3cc(Cl)ccc32)C12CCCCC2]

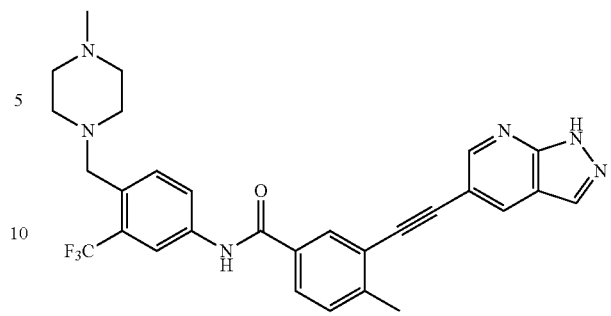

or pharmaceutically acceptable salt thereof;

where an effective amount of the first and second compound is administered to the patient.

In another aspect, described herein is a method of treating a cancer selected from the group consisting of: diffuse large B-cell lymphoma, follicular B-cell lymphoma, and chronic lymphocytic leukemia in a patient need thereof, comprising: administering to the patient a first compound of formula (V) or a pharmaceutically acceptable salt thereof; and administering to the patient each of rituximab, etoposide, ifosfamide and carboplatin.

In another aspect, described herein is a method of treating a hematologic malignancy in a patient in need thereof, comprising: administering to the patient a first compound of formula (V) or a pharmaceutically acceptable salt thereof; and administering to the patient a second compound selected from the group consisting of bortezomib, lenalidomide and pomalodomide.

In another aspect, described herein is a pharmaceutically acceptable composition comprising: a first compound of formula (V) or a pharmaceutically acceptable salt thereof; a second compound selected from the group consisting of:

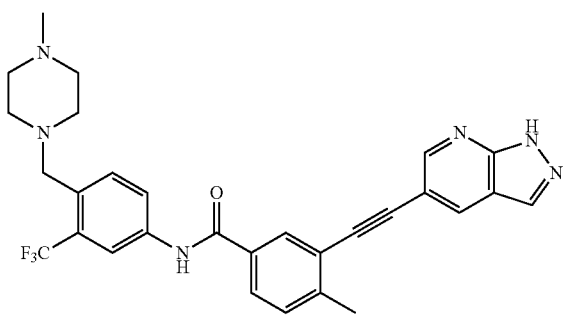 [SMILES: Cc1ccc(C(=O)Nc2ccc(CN3CCN(C)CC3)c(C(F)(F)F)c2)cc1C#Cc1cnc2[nH]ncc2c1]

or pharmaceutically acceptable salt thereof, a FLT3 inhibitor, a CDK4/6 inhibitor and a PI3K inhibitor; and a pharmaceutically acceptable excipient.

In another aspect, described herein is a method of treating a solid tumor cancer in a patient in need thereof, comprising administering: a first compound of formula (I), (II), or (III), as described herein; and administering a second compound represented by:

or pharmaceutically acceptable salt thereof;

where an effective amount of the first and second compound is administered to the patient.

In another aspect, described herein is a method of treating a solid tumor cancer in a patient in need thereof, comprising administering: a first compound selected from: a compound of formula (I), (II), or (III), a compound of formula (IV), as described herein, and a pharmaceutically acceptable salt thereof; and administering a CDK4/6 inhibitor or pharmaceutically acceptable salt thereof; where an effective amount of the first and second compound is administered to the patient.

In another aspect, described herein is a method of treating a solid tumor cancer in a patient in need thereof, comprising administering to the patient: a first compound selected from: a compound of formula (I), (II), or (III), a compound of formula (IV), and a pharmaceutically acceptable salt thereof; and administering tamoxifen to the patient.

In another aspect, described herein is a method of treating a hematologic malignancy in a patient in need thereof, comprising: a first compound selected from: a compound of formula (I), (II), or (III), a compound of formula (IV), and a pharmaceutically acceptable salt thereof; and administering a second compound selected from the group consisting of: bortezomib, lenalidomide, pomalodomide and dexamethasone.

In another aspect, described herein is a method of treating a hematologic malignancy or a solid tumor cancer in a patient in need thereof, comprising administering a first compound selected from: a compound of formula (I), (II), or (III), a compound of formula (IV), and a pharmaceutically acceptable salt thereof; and administering a second compound represented by:

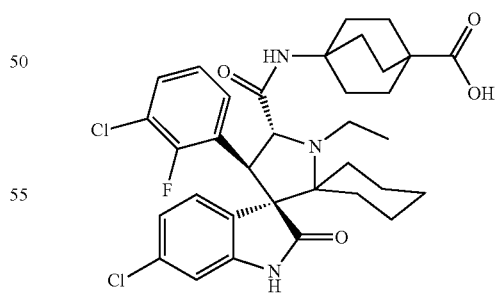

or pharmaceutically acceptable salt thereof; where an effective amount of the first and second compound is administered to the patient.

In another aspect, described herein is a method of treating a cancer selected from the group consisting of: diffuse large B-cell lymphoma, follicular B-cell lymphoma, and chronic lymphocytic leukemia in a patient in need thereof, comprising administering a first compound selected from: a compound of formula (I), (II), or (III), a compound of formula (IV), and a pharmaceutically acceptable salt thereof; and administering to the patient each of rituximab, etoposide, ifosfamide and carboplatin.

In another aspect, described herein is a method of treating a solid tumor cancer in a patient need thereof, comprising: administering to the patient a first compound of formula (V), and administering to the patient an MCL-1 inhibitor.

In another aspect, the disclosure provides a method of treating a solid tumor cancer in a patient need thereof, comprising: administering to the patient a first compound selected from: a compound of formula (I), (II), or (III), a compound of formula (IV), and a pharmaceutically acceptable salt thereof, and administering to the patient an MCL-1 inhibitor or a CDK9 inhibitor.

In another aspect, the disclosure provides a method of treating a solid tumor cancer in a patient need thereof, comprising: administering to the patient a first compound selected from: a compound of formula (I), (II), or (III), a compound of formula (IV), and a pharmaceutically acceptable salt thereof, and a second compound selected from a compound of formula (V) and anlotinib; where an effective amount of the first and second compound is administered to the patient.

In yet another aspect, the disclosure provides a method of treating a hematologic malignancy in a patient in need thereof, comprising administering to the patient a first compound selected from: a compound of formula (I), (II), or (III), a compound of formula (IV), and a pharmaceutically acceptable salt thereof, and a second compound represented by:

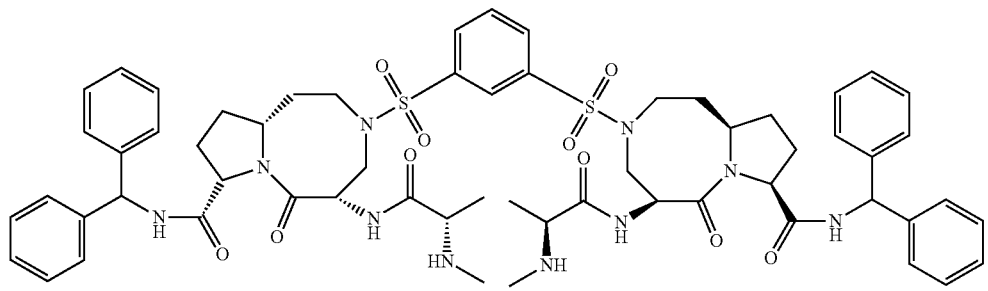

or pharmaceutically acceptable salt thereof;
where an effective amount of the first and second compound is administered to the patient.

In another aspect, the disclosure provides a method of treating a solid tumor cancer in a patient in need thereof, comprising administering: a first compound selected from a compound of formula (I), (II), or (III), a compound of formula (IV), and a pharmaceutically acceptable salt thereof, and a second compound represented by:

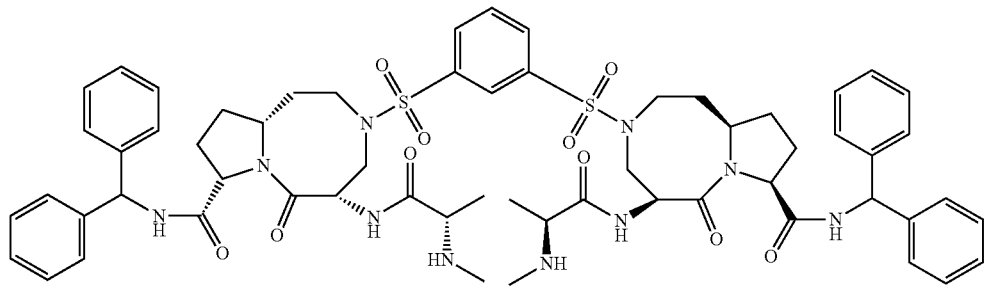

or pharmaceutically acceptable salt thereof;
where an effective amount of the first and second compound is administered to the patient.

In another aspect, the disclosure provides a method of treating a hematologic malignancy in a patient in need thereof, comprising administering: a first compound selected from a compound of formula (I), (II), or (III), a compound of formula (IV), and a pharmaceutically acceptable salt thereof, and a second compound which is a JAK2 inhibitor; where an effective amount of the first and second compound is administered to the patient.

In another aspect, the disclosure provides a method of treating a solid tumor cancer in a patient in need thereof, comprising administering: a first compound selected from a compound of formula (I), (II), or (III), a compound of formula (IV), and a pharmaceutically acceptable salt thereof, and a second compound which is an EGFR inhibitor; where an effective amount of the first and second compound is administered to the patient.

In another aspect, the disclosure provides a method of treating a hematologic malignancy in a patient need thereof, comprising: administering to the patient a first compound of formula (V), or a pharmaceutically acceptable salt thereof, and administering to the patient a second compound selected from cytarabine and a hypomethylating agent.

In another aspect, the disclosure provides a method of treating a solid tumor cancer in a patient need thereof, comprising: administering to the patient a first compound of formula (V), or a pharmaceutically acceptable salt thereof, and administering to the patient a second compound which is a HER2 inhibitor.

In another aspect, the disclosure provides a method of treating a solid tumor cancer in a patient need thereof, comprising: administering to the patient a first compound of formula (V), or a pharmaceutically acceptable salt thereof, and administering to the patient a second compound which is anti PD-1 antibody or anti PD-L1 antibody.

BRIEF DESCRIPTION OF THE DRAWINGS

FIG. 2 shows that on D19 of treatment, tumor weight from the combination treatment groups are significantly smaller than single agent groups.

FIG. 10 illustrates Compound A plus palbociclib achieved a synergistic antitumor effect. Additionally, FIG. 10 illustrates palbociclib plus fulvestrant as a standard of care showed good tumor repression. Its combination with Compound A enhanced antitumor activity.

FIG. 20 also illustrates Compound A plus Compound E enhanced cell viability inhibition in Z138 mantle cell lymphoma after 24 h treatment.

FIG. 22 illustrates Compound E at 100 mg/kg as a single agent showed significantly antitumor activity in a MCL Z138 xenograft. FIG. 22 also illustrates combination treatment of Compound E plus Compound A showed significantly antitumor effect in a MCL Z138 xenograft.

FIG. 31 illustrates Compound A+lenalidomide inhibit cell viability compared to lenalidomide single agent, and triple therapy showed significant decrease of viable cells compared to lenalidomide+dexamethanoe.

FIG. 33 illustrates Compound A+pomalodomide inhibit cell viability compared to pomalodomide single agent, and triple therapy showed significant decrease of viable cells compared to pomalodomide+dexamethanoe.

FIG. 88B depicts a graph which illustrates treatment of SKM-1 cells with compound A and azacitidine, and effect on level of Annexin positive cells after 24 h.

FIG. 89A depicts a graph which illustrates treatment of ST-02-0103 HER2+ Gastric cancer PDX xenografts with compound A and lapatinib, and effect on tumor volume.

FIG. 89B depicts a graph which illustrates treatment of ST-02-0103 HER2+ Gastric cancer PDX xenografts with compound A and lapatinib, and effect on body weight.

FIG. 90A depicts a graph which illustrates treatment of ST-02-0077 HER2+ Gastric cancer PDX with compound A and lapatinib, and effect on tumor volume.

FIG. 90B depicts a graph which illustrates treatment of ST-02-0077 HER2+ Gastric cancer PDX with compound A and lapatinib, and effect on body weight.

FIG. 91A depicts a graph which illustrates treatment of breast cancer xenograft cells with compound A, fulvestrant, and alpelisib, and effect on tumor volume.

FIG. 91B depicts a graph which illustrates treatment of breast cancer xenograft cells with compound A, fulvestrant, and alpelisib, and effect on body weight.

FIG. 92A depicts a graph which illustrates treatment of MC38 cells with compound A and anti-PD-1 antibody, and effect on tumor volume.

FIG. 92B depicts a graph which illustrates treatment of MC38 cells with compound A and anti-PD-1 antibody, and effect on body weight.

FIG. 93A depicts a graph which illustrates treatment of MH22A cells with compound A, lenvatinib, and anti-PD-1 antibody, and effect on tumor volume.

FIG. 93B depicts a graph which illustrates treatment of MH22A cells with compound A, lenvatinib, and anti-PD-1 antibody, and effect on tumor volume and number of palpable tumors.

FIG. 93C depicts a graph which illustrates treatment of MH22A cells with compound A, lenvatinb, and anti-PD-1 antibody, and effect on body weight.

Figure 94A:
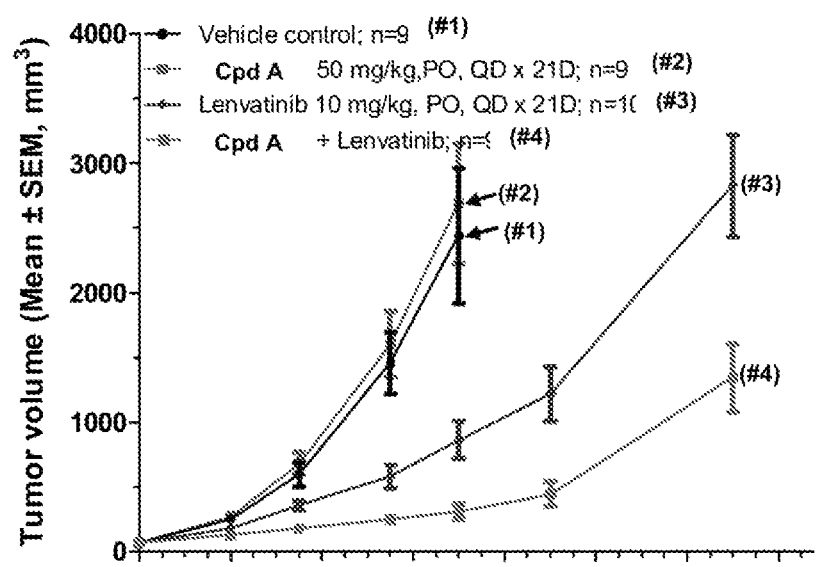
Figure 94B:
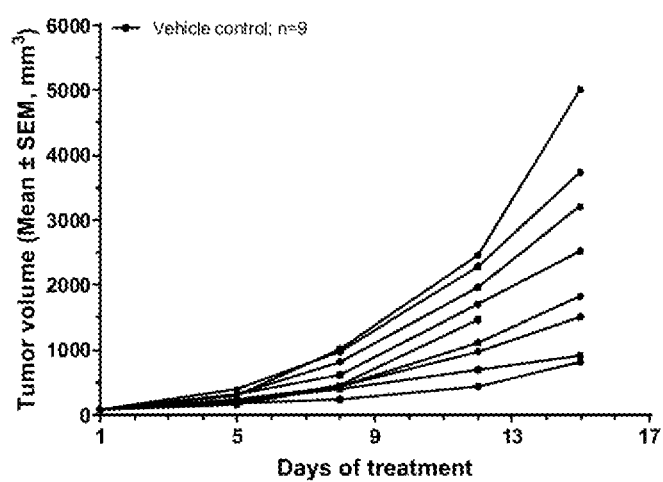
Figure 94C:
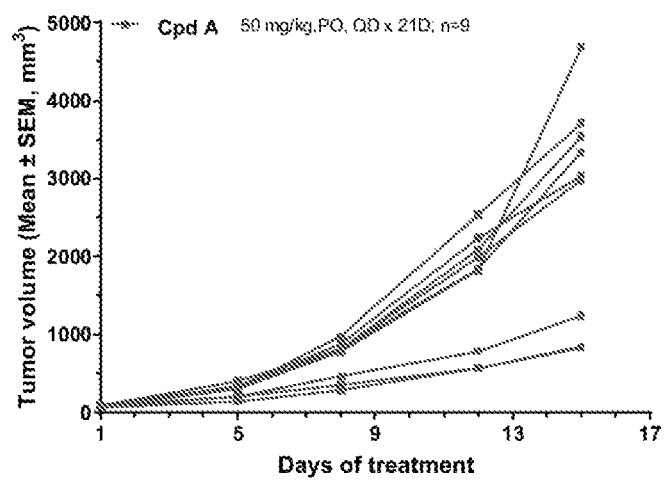
Figure 94D:
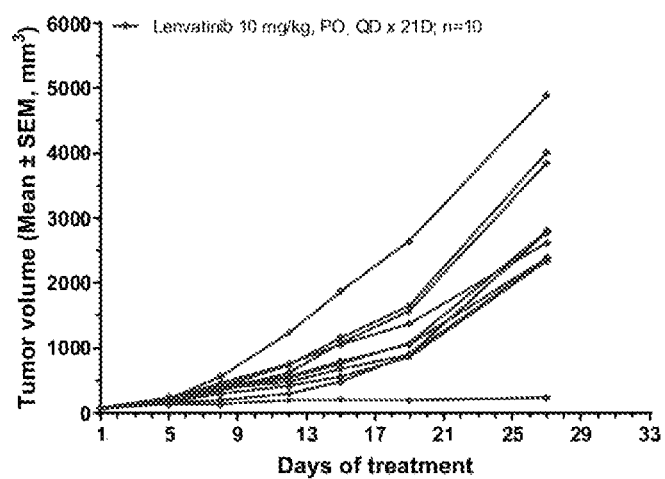
Figure 94E:
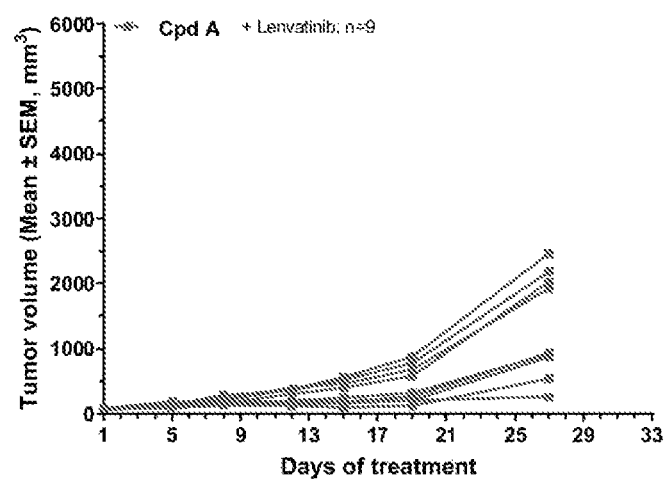
Figure 95A:
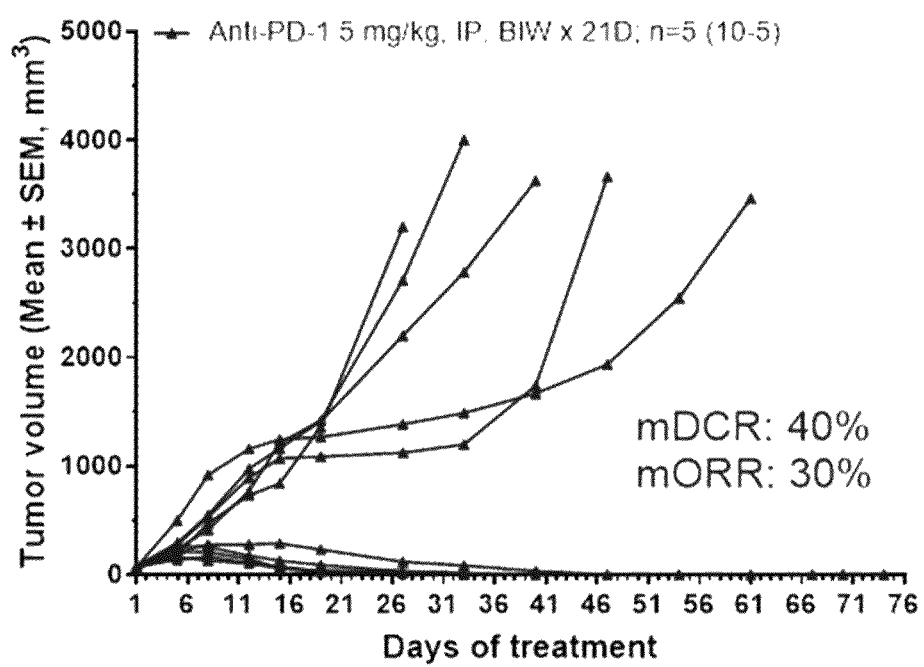
Figure 95B:
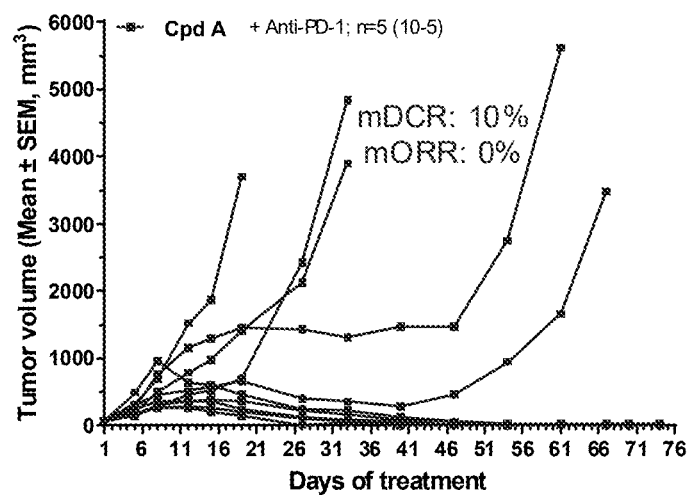
Figure 95C:
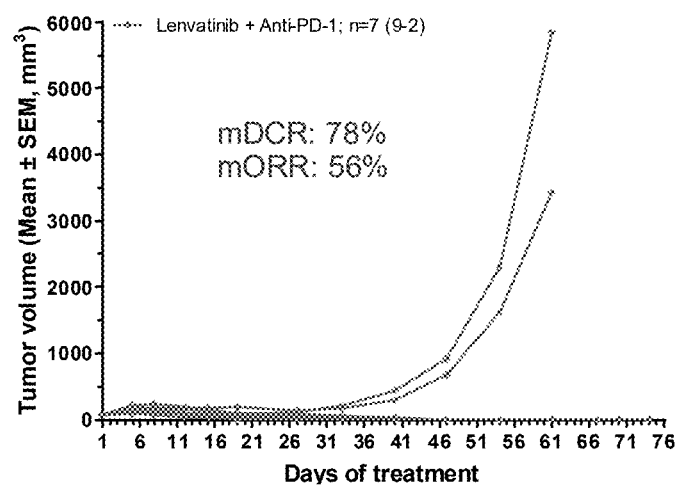
Figure 95D:
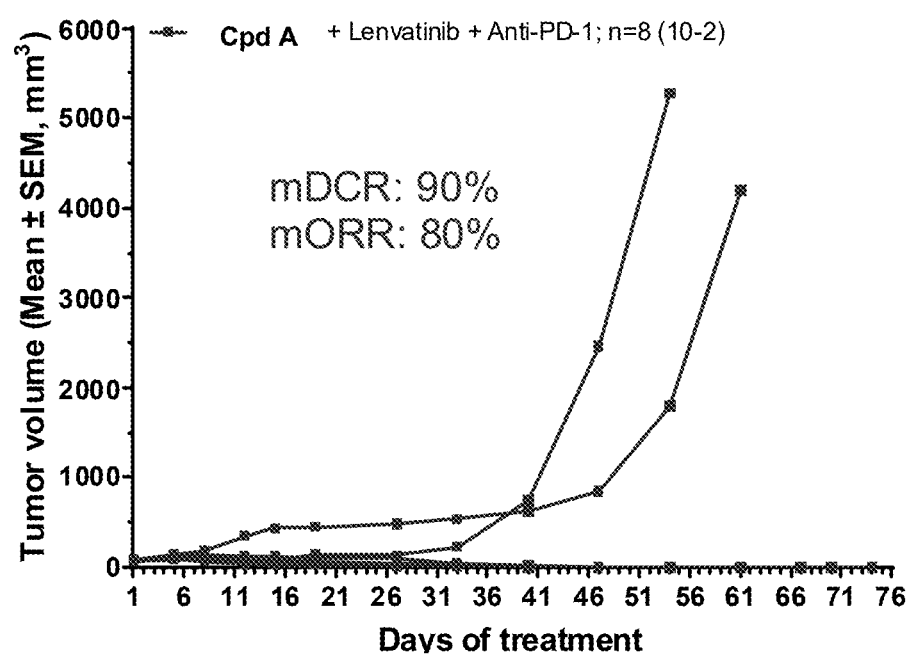
Figure 95E:
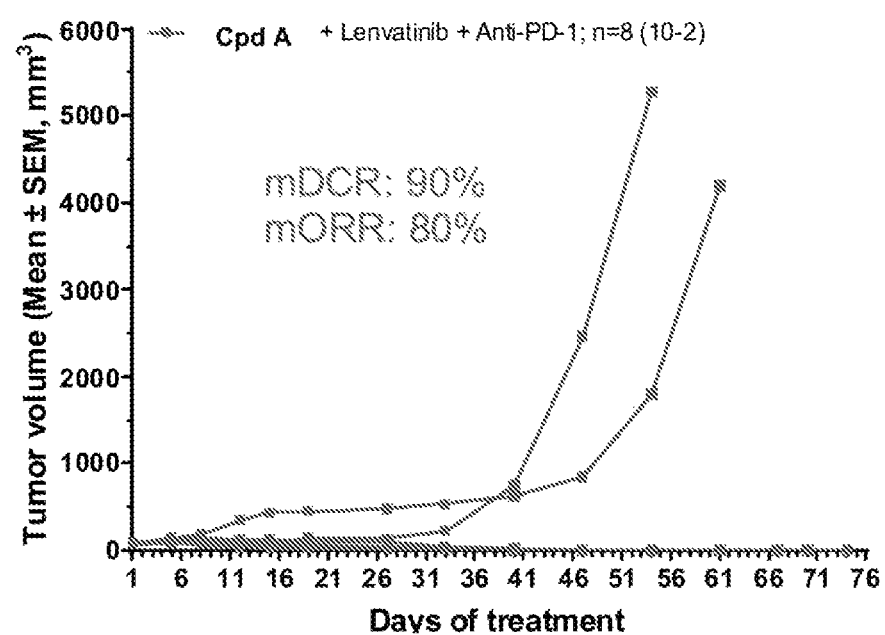

FIG. 94A depicts a graph which illustrates treatment of MH22A cells with compound A, and lenvatinib, and effect on tumor volume FIGS. 94B-94E depict graphs which illustrate individual tumor growth curves for treatment of MH22A cells with vehicle, compound A, lenvatinib, and compound A+lenvatinib respectively, as measured by tumor volume.

FIGS. 95A-95D depict graphs which illustrate individual tumor growth curves for treatment of MH22A cells with anti-PD-1 antibody, anti-PD-1 antibody+compound A, anti-PD-1 antibody+lenvatinib, and anti-PD-1 antibody+compound A+lenvatinib respectively, as measured by tumor volume.

Figure 96:
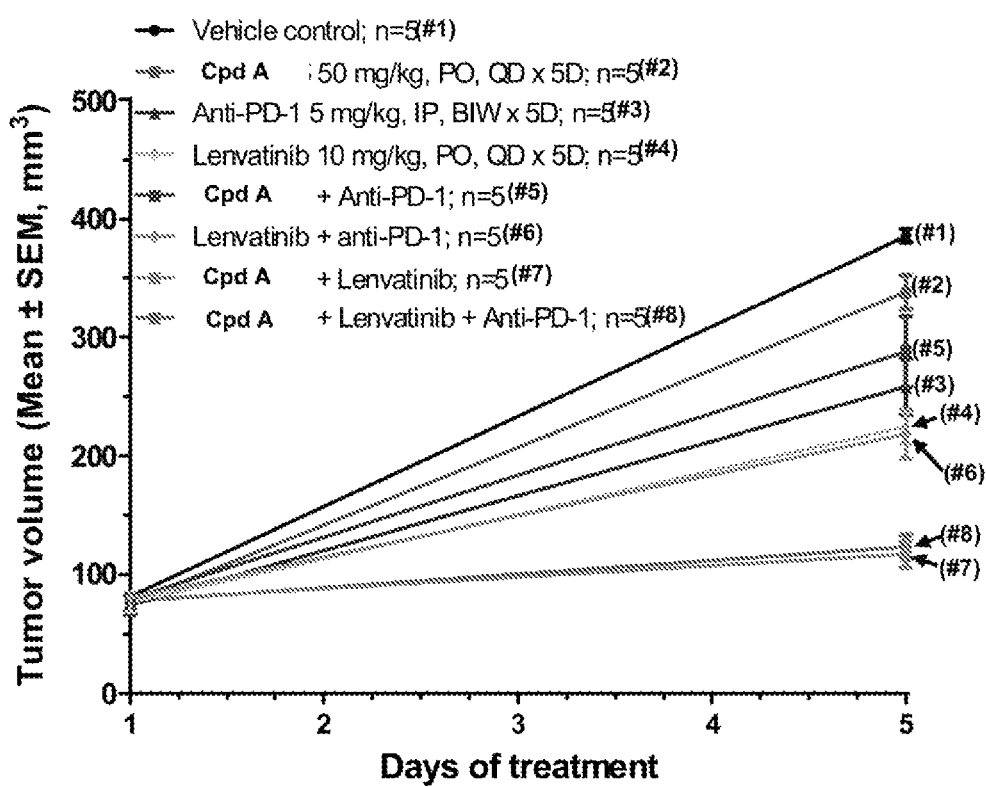

FIG. 96 depicts a graph which illustrates treatment of MH22A cells with anti-PD-1 antibody, compound A, and lenvatinib, and effect on tumor volume.

Figure 97:
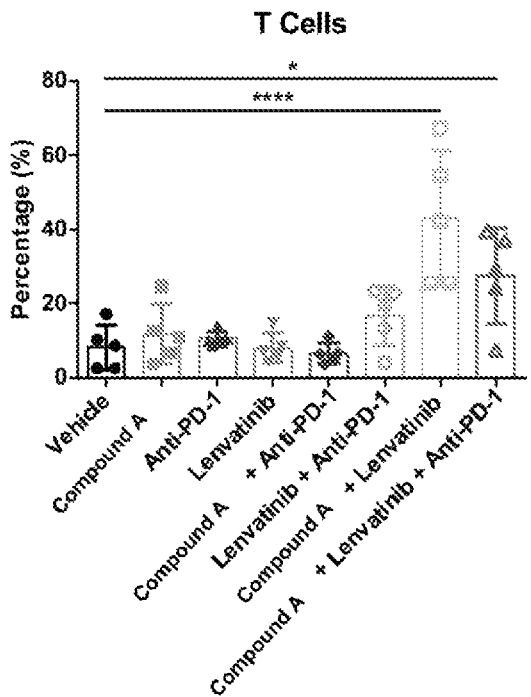

FIG. 97 depicts a graph which illustrates treatment of MH22A cells with anti-PD-1 antibody, compound A, and lenvatinib, and effect on T cell level.

Figure 98A:
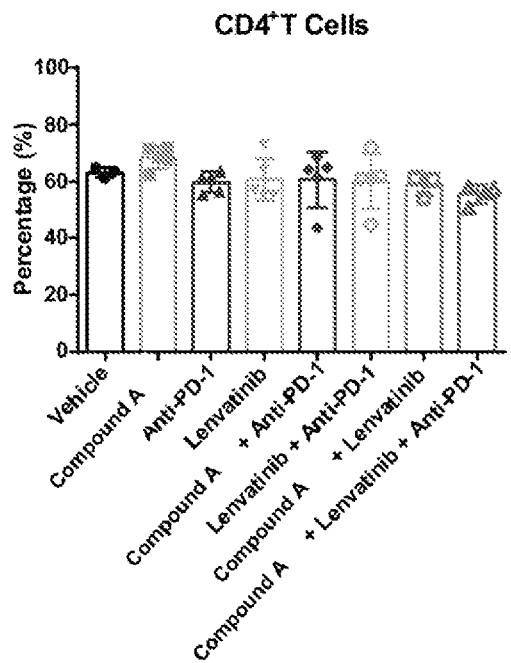
Figure 98B:
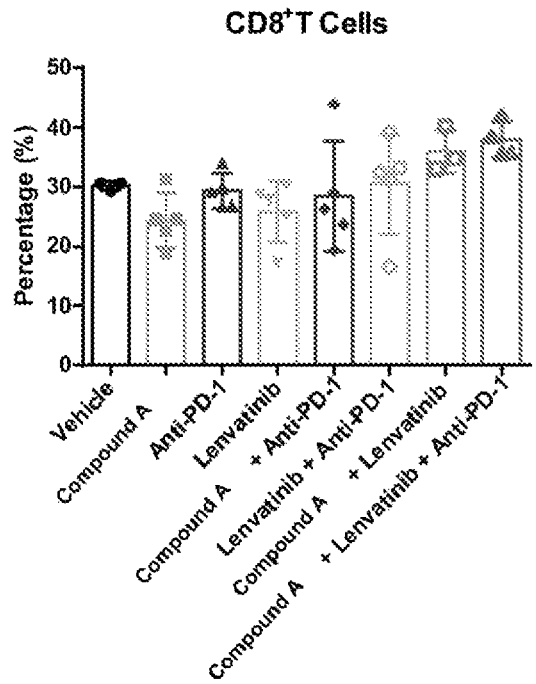
Figure 98C:
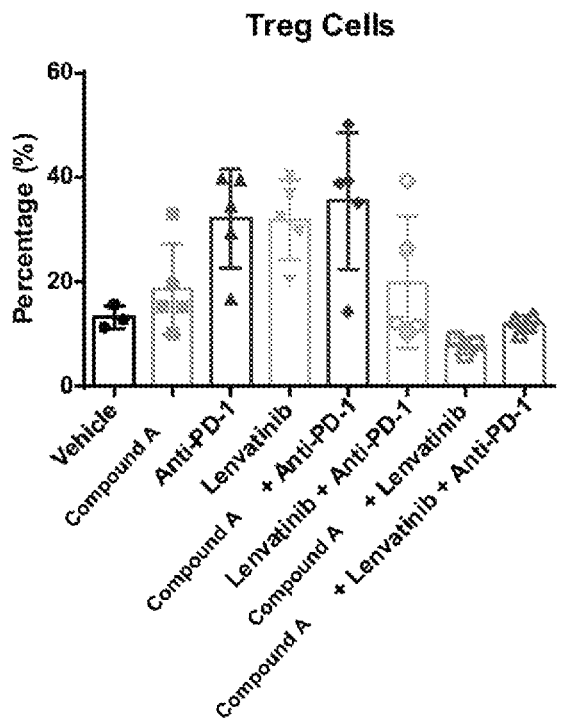

FIGS. 98A-98C depict graphs which illustrate effect on levels of CD4+T cells, CD8+T cells, and Treg cells, respectively, upon treatment of MH22A cells with anti-PD-1 antibody, compound A, and lenvatinib.

FIG. 9A depicts a graph which illustrates treatment of MH22A cells with anti-PD-1 antibody, compound A, and lenvatinib, and effect on NK cell level.

Figure 99A:
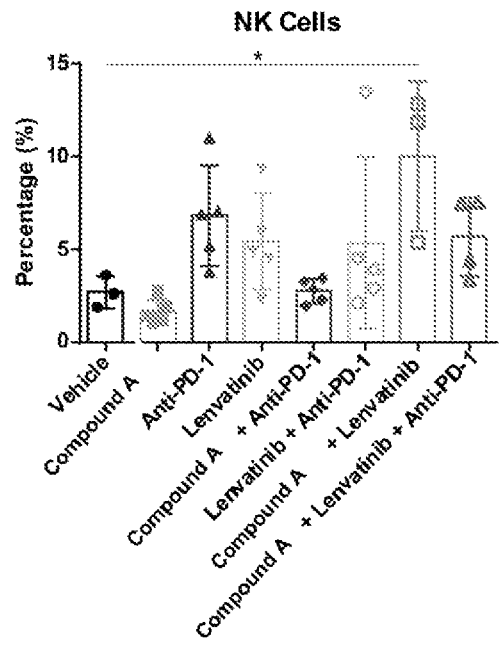
Figure 99B:
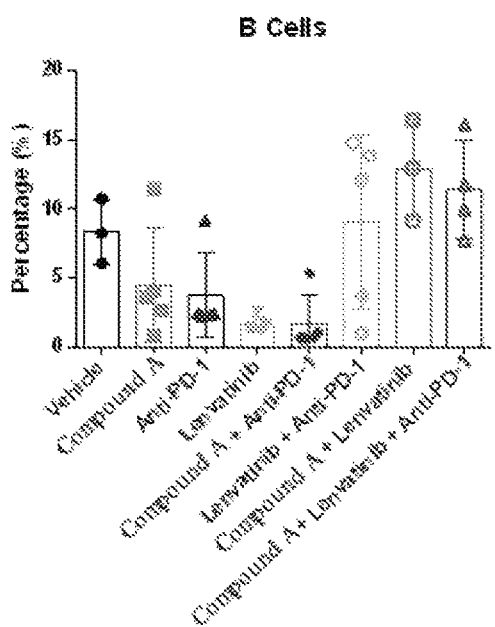

FIG. 99B depicts a graph which illustrates treatment of MH22A cells with anti-PD-1 antibody, compound A, and lenvatinib, and effect on B cell level.

Figure 100A:
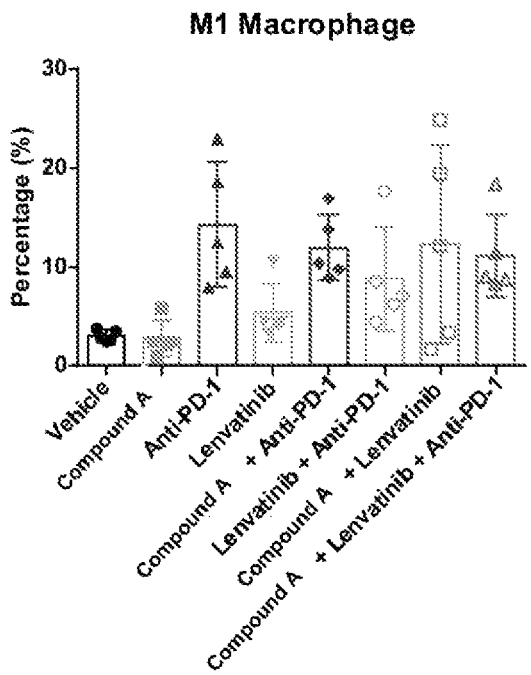

FIG. 100A depicts a graph which illustrates treatment of MH22A cells with anti-PD-1 antibody, compound A, and lenvatinib, and effect on M1 macrophage level.

Figure 100B:
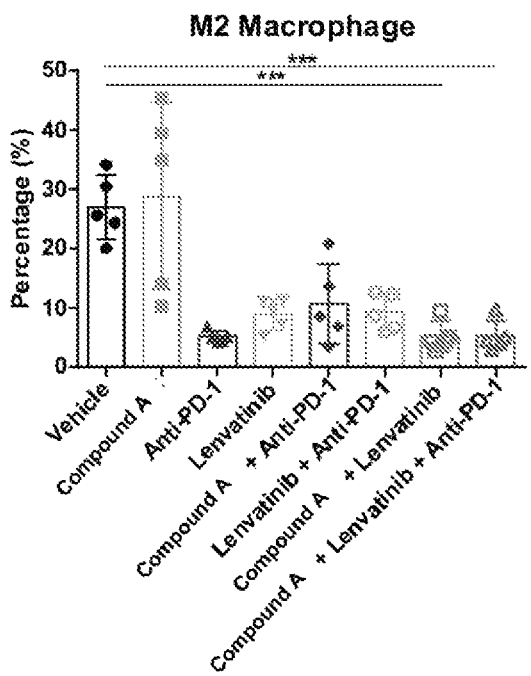

FIG. 100B depicts a graph which illustrates treatment of MH22A cells with anti-PD-1 antibody, compound A, and lenvatinib, and effect on M2 macrophage level.

Figure 101:
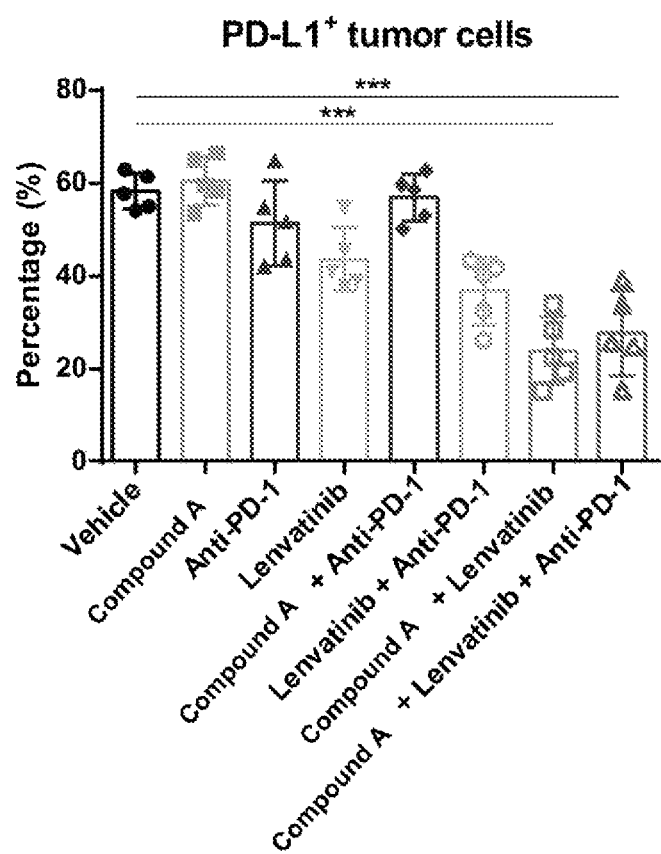

FIG. 101 depicts a graph which illustrates treatment of MH22A cells with anti-PD-1 antibody, compound A, and lenvatinib, and effect on PD-L1+ cell level.

Figure 102A:
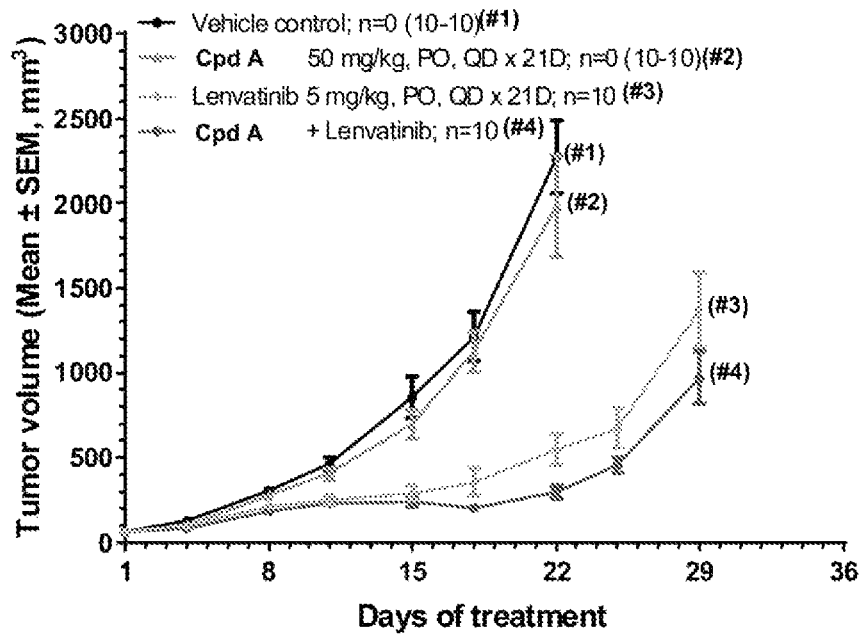

FIG. 102A depicts a graph which illustrates treatment of MC38 cells with compound A and lenvatinib, and effect on tumor volume.

Figure 102B:
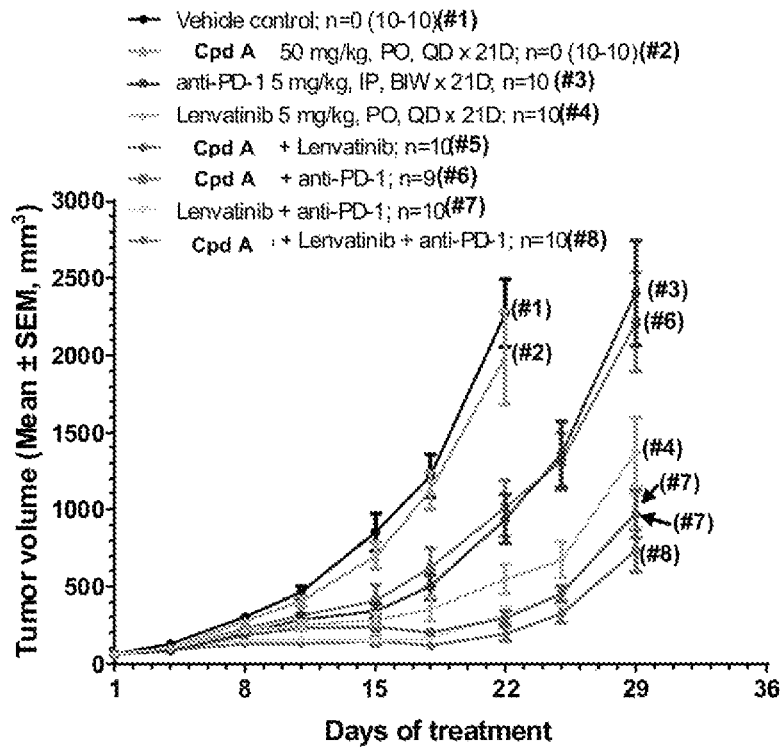

FIG. 102B depicts a graph which illustrates treatment of MC38 cells with anti-PD-L1 antibody, compound A, and lenvatinib, and effect on tumor volume.

Figure 102C:
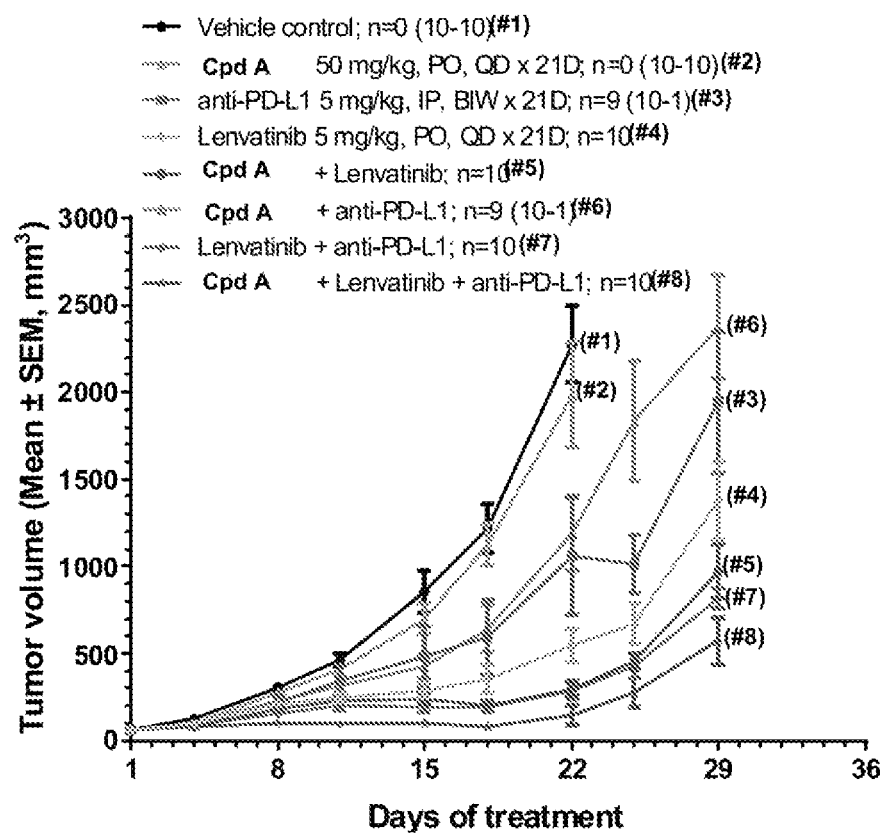

FIG. 102C depicts a graph which illustrates treatment of MC38 cells with anti-PD-1 antibody, compound A, and lenvatinib, and effect on tumor volume.

Figure 103A:
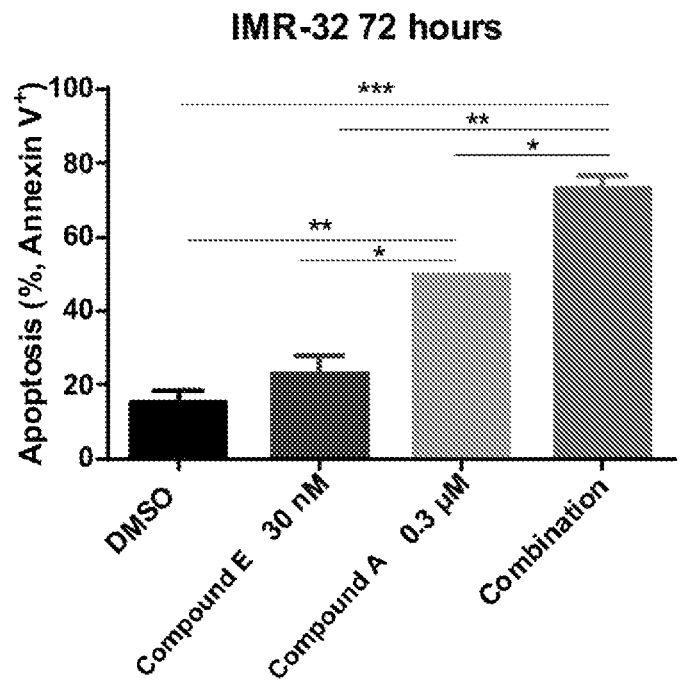

FIG. 103A depicts a graph which illustrates treatment of IMR-32 cells with compound A and compound E, and effect on level of Annexin positive cells.

Figure 103B:
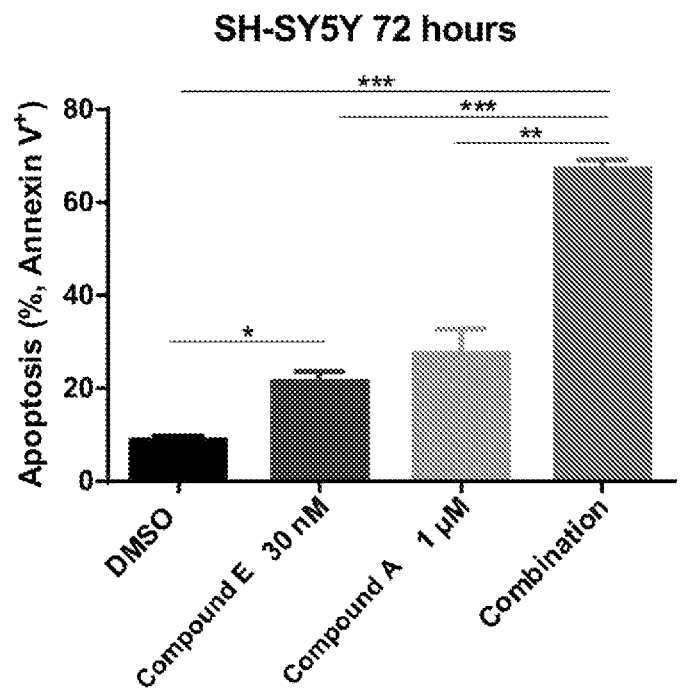

FIG. 103B depicts a graph which illustrates treatment of SH-SY5Y cells with compound A and compound E, and effect on level of Annexin positive cells.

Figure 104A:
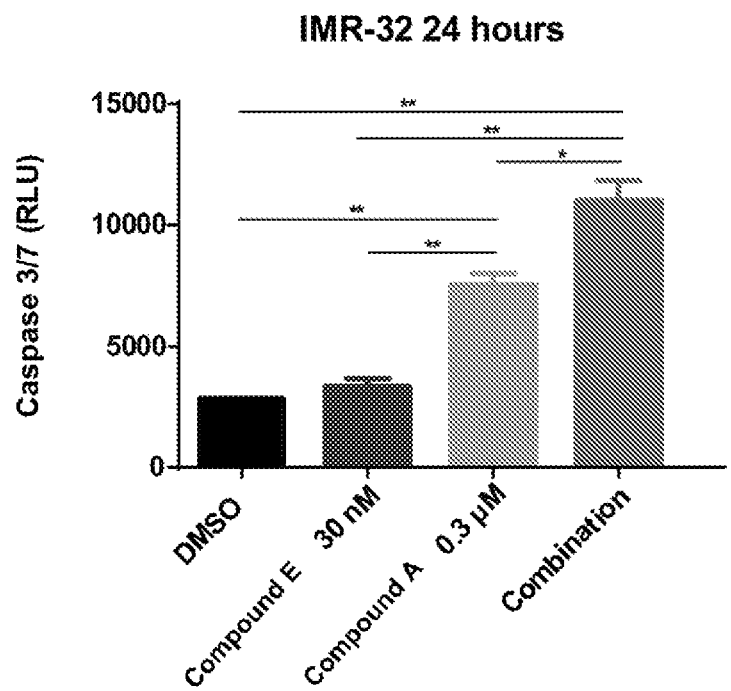

FIG. 104A depicts a graph which illustrates treatment of IMR-32 cells with compound A and compound E, and effect on level of caspase 3/7.

Figure 104B:
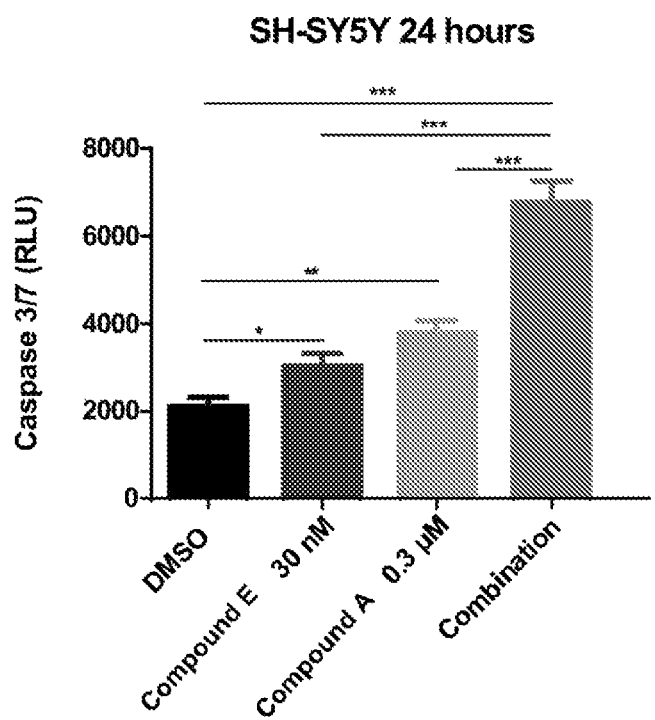

FIG. 104B depicts a graph which illustrates treatment of SH-SY5Y cells with compound A and compound E, and effect on level of caspase 3/7.

Figure 105A:
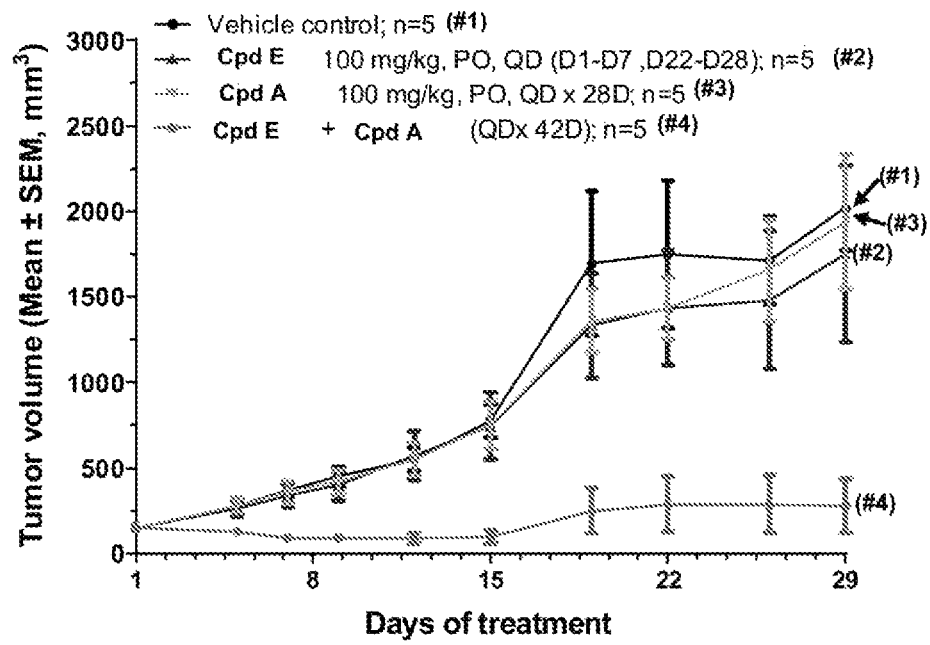

FIG. 105A depicts a graph which illustrates treatment of LD1-0030-361609 PDX with compound A and compound E, and effect on tumor volume.

Figure 105B:
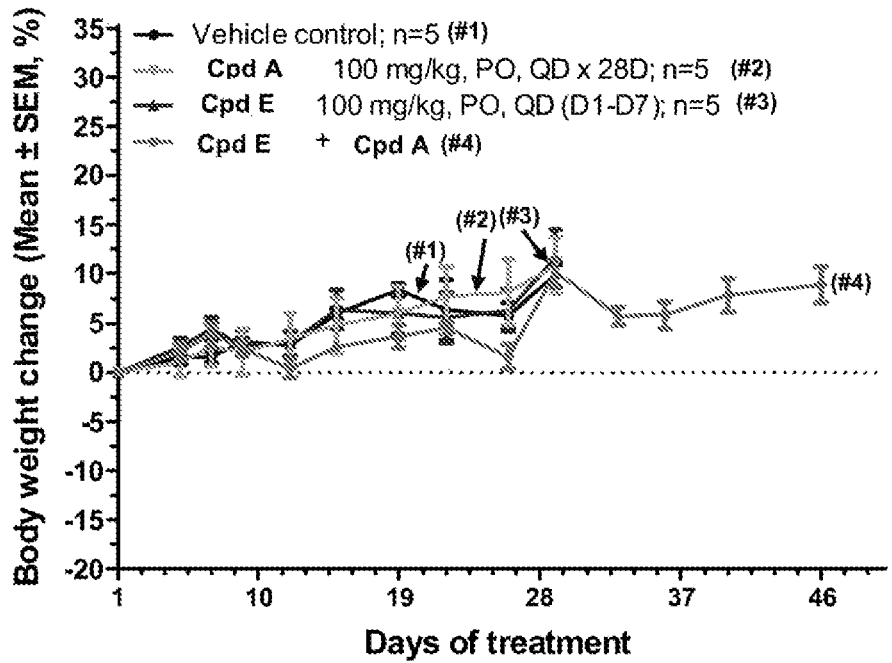

FIG. 105B depicts a graph which illustrates treatment of LD1-0030-361609 PDX with compound A and compound E, and effect on body weight.

Figure 106A:
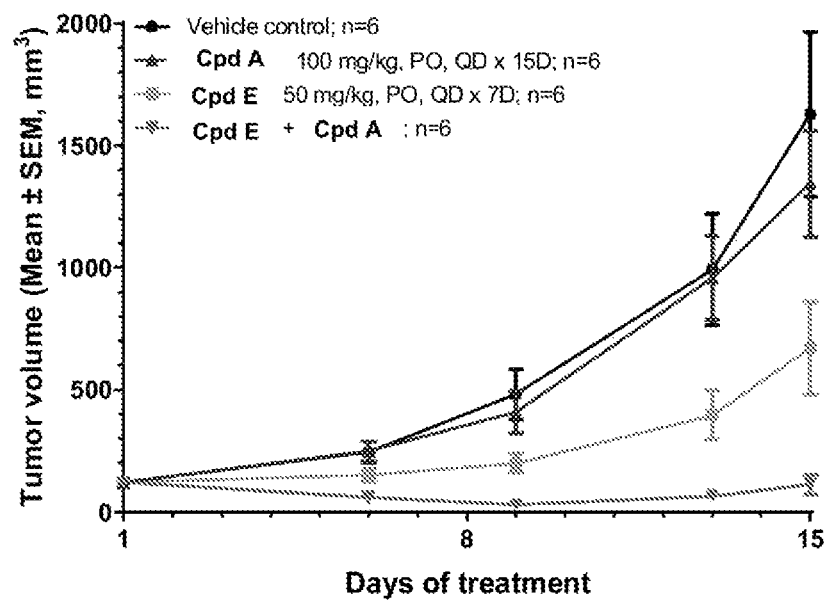

FIG. 106A depicts a graph which illustrates treatment of SH-SY5Y xenografts with compound A and compound E, and effect on tumor volume.

Figure 106B:
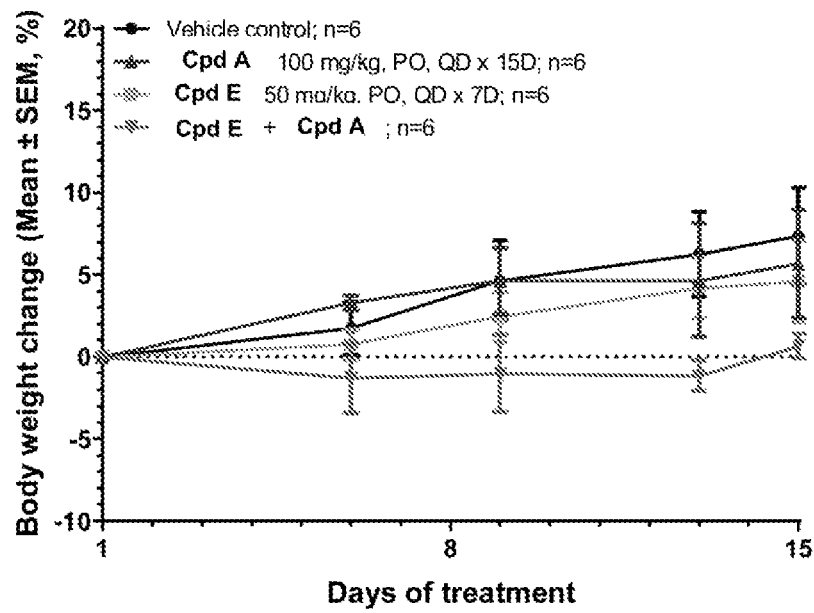

FIG. 106B depicts a graph which illustrates treatment of SH-SY5Y xenografts with compound A and compound E, and effect on body weight.

Figure 107:
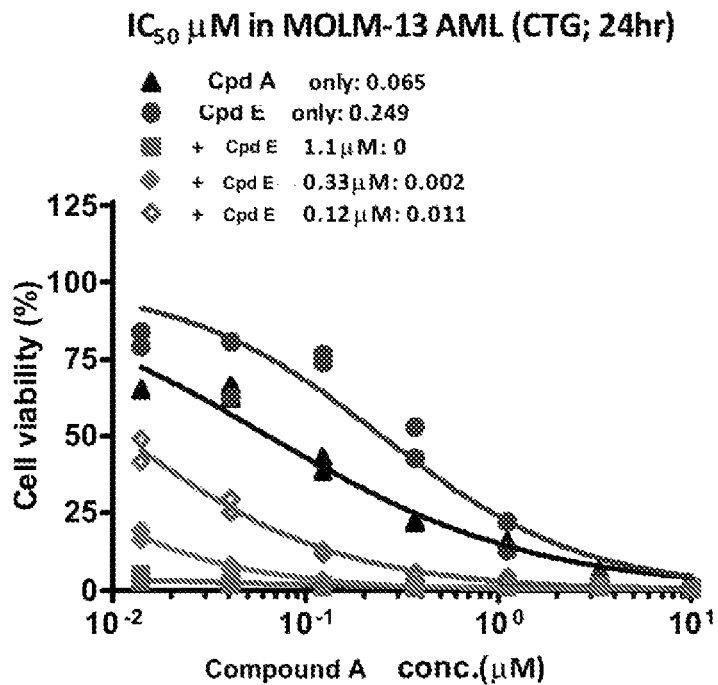

FIG. 107 depicts a graph which illustrates treatment of MOLM-13 cells with compound A and compound E and effect on cell viability.

Figure 108:
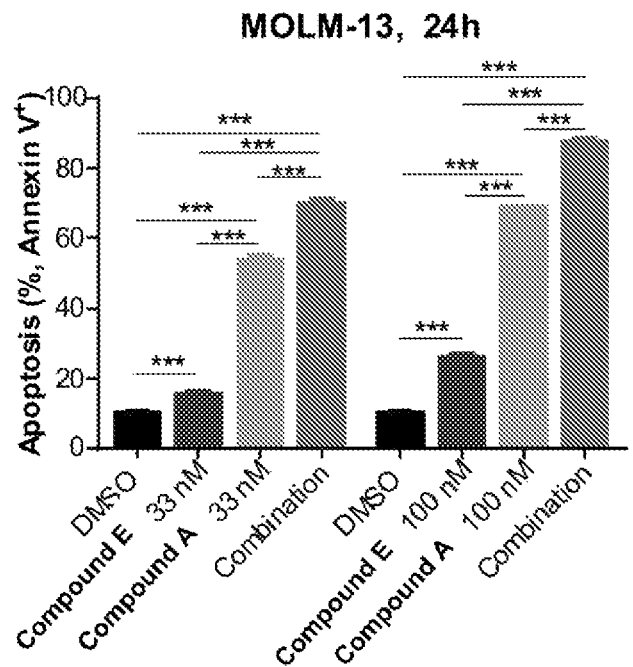

FIG. 108 depicts a graph which illustrates treatment of MOLM-13 cells with compound A and compound E and effect on level of Annexin positive cells.

Figure 109:
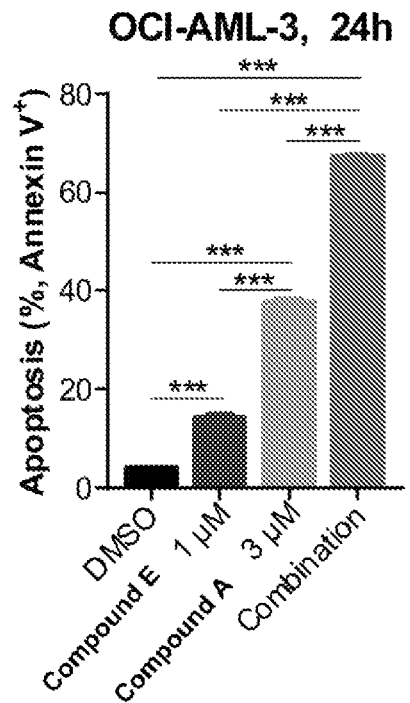

FIG. 109 depicts a graph which illustrates treatment of OCI-AML-3 cells with compound A and compound E, and effect on level of Annexin positive cells.

Figure 110:
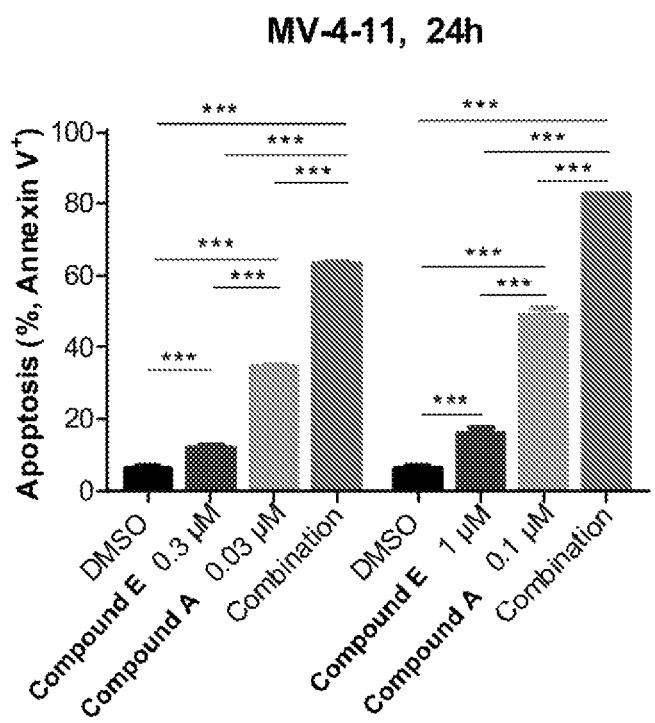

FIG. 110 depicts a graph which illustrates treatment of MV-4-11 cells with compound A and compound E, and effect on level of Annexin positive cells.

Figure 111:
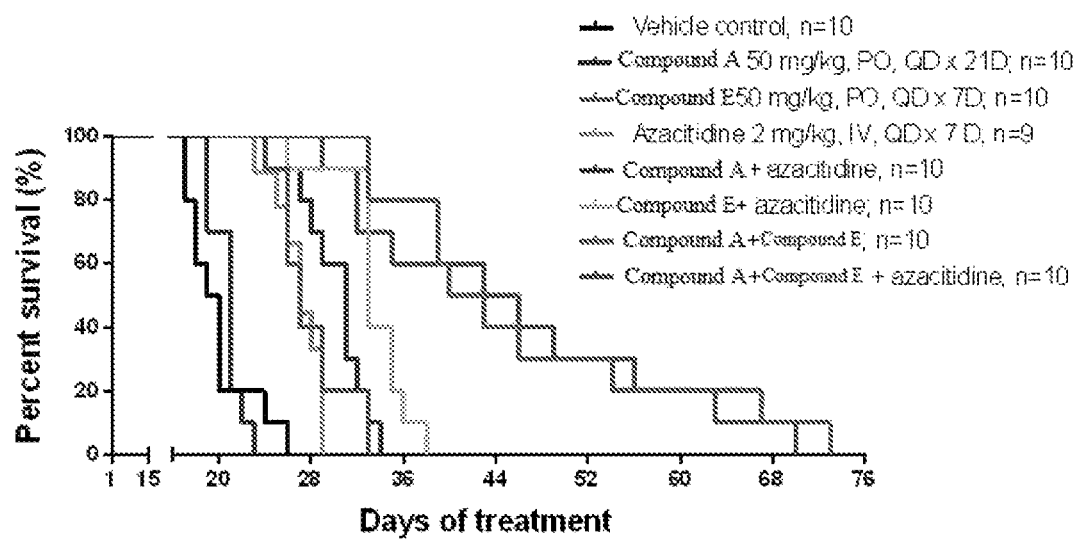

FIG. 111 illustrates that a single agent of compound A, compound E and azacitidine showed moderate anti-tumor activity, and the combined treatment significantly improved the tumor inhibition rate.

Figure 112:
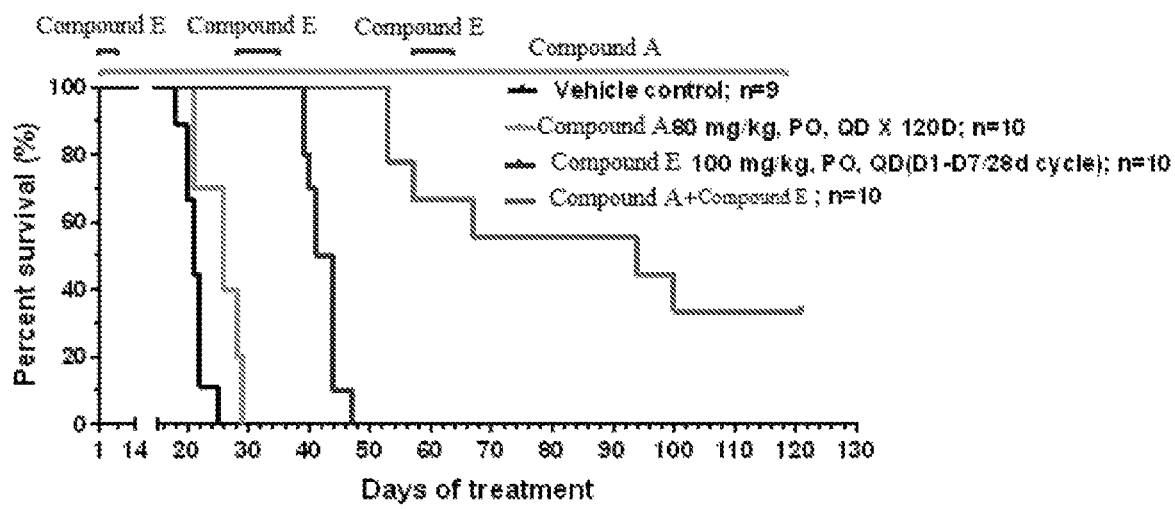

FIG. 112 illustrates that a single agent of Compound A showed moderate anti-tumor activity. Combination therapy (compound A+compound E) can significantly enhance tumor suppression.

Figure 113:
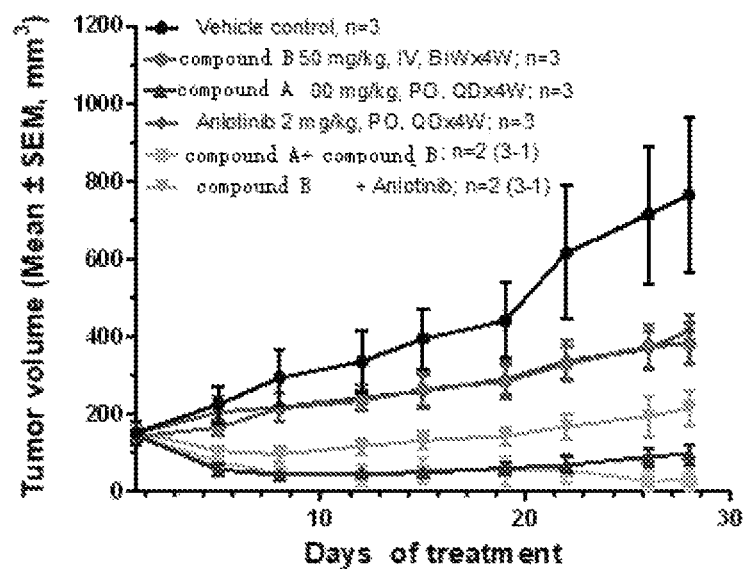

FIG. 113 illustrates that Compound A as a single agent shows anti-tumor activity, and Compound B as a single agent shows less anti-tumor activity. The combined treatment of compound B plus compound A or Anlotinib achieved a synergistic anti-tumor effect.

Figure 114:
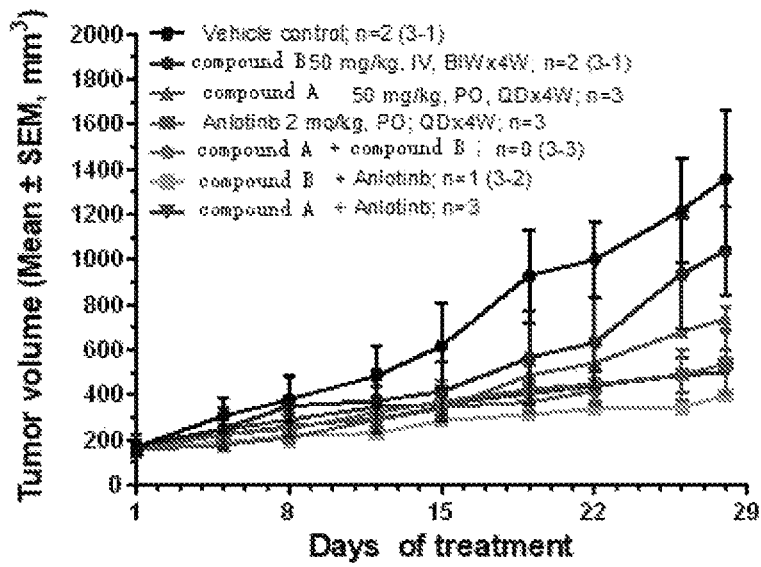

FIG. 114 illustrates that the single agent of Compound B and Compound A showed less anti-tumor activity, and the single agent of Anlotinib showed anti-tumor activity. Compound B plus compound A or anlotinib and compound A plus anlotinib combined treatment to achieve enhanced anti-tumor effect.

Figure 115:
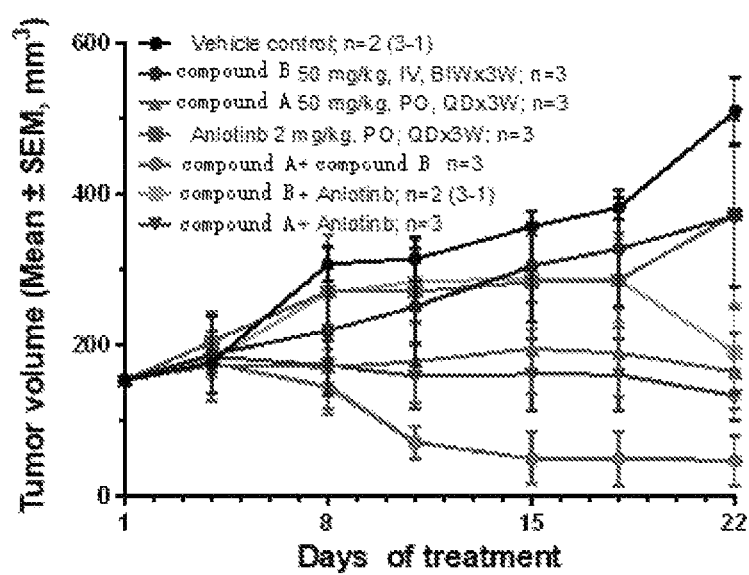

FIG. 115 illustrates that the single agent of Compound A showed anti-tumor activity, and the single agent of Compound B and Anlotinib showed less anti-tumor activity. The combined treatment of compound B plus compound A or Anlotinib achieved a synergistic anti-tumor effect. The combination therapy of compound A and anlotinib enhanced the anti-tumor effect.

DETAILED DESCRIPTION

As described herein, the compound N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide has the structure:

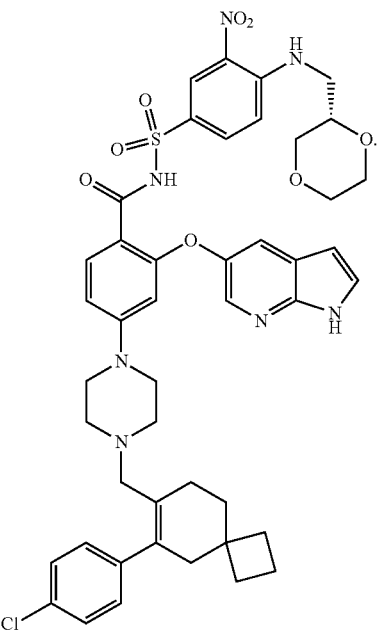 [SMILES: O=C(NS(=O)(=O)c1ccc(NC[C@H]2COCCO2)c([N+](=O)[O-])c1)c1ccc(N2CCN(CC3=C(c4ccc(Cl)cc4)CC4(CCC4)CC3)CC2)cc1Oc1cnc2[nH]ccc2c1]

"Compound A" as described herein refers to (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide, and is also referred to herein as Cpd A. Compound A has the structure:

17
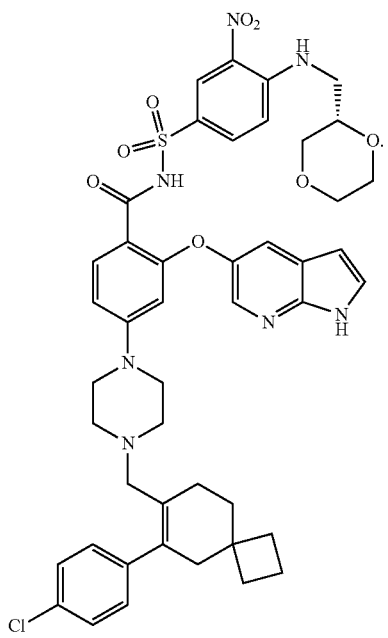 [SMILES: O=C(NS(=O)(=O)c1ccc(NC[C@H]2COCCO2)c([N+](=O)[O-])c1)c1ccc(N2CCN(CC3=C(c4ccc(Cl)cc4)CC4(CCC4)CC3)CC2)cc1Oc1cnc2[nH]ccc2c1]
18
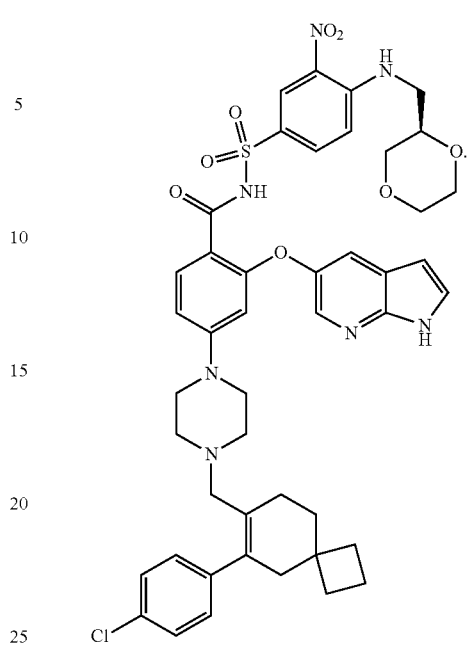
As described herein, the compound (R)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide has the structure:
"Compound B" as described herein has the structure:
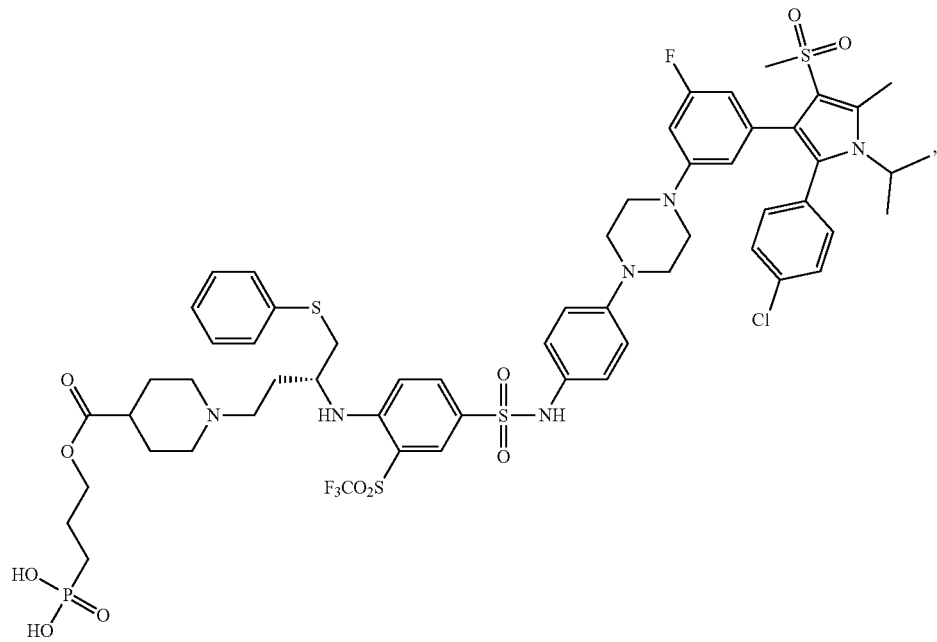
and is also referred to herein as Cpd B.

"Compound C" as described herein has the structure:
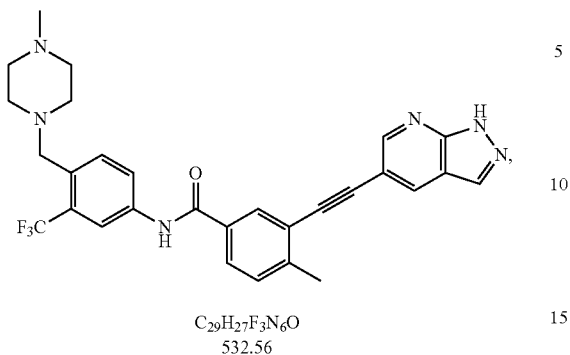
C₂₉H₂₇F₃N₆O
532.56
and is also referred to herein as Cpd C.
"Compound D" as described herein has the structure:
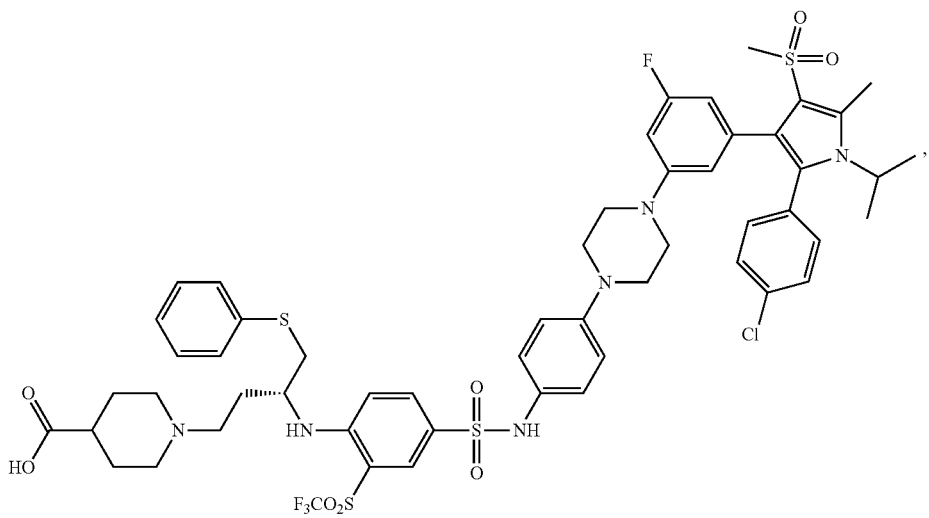
and is also referred to herein as Cpd D.
"Compound E" as described herein has the structure:
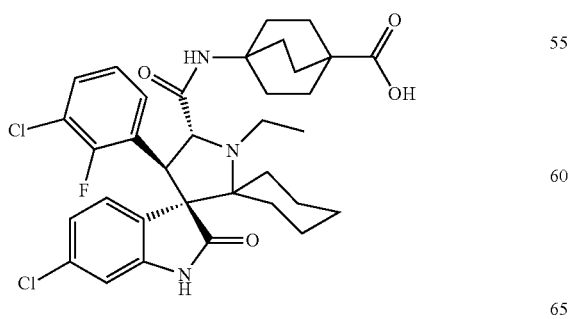
and is also referred to herein as Cpd E.

"Compound F" as described herein has the structure:

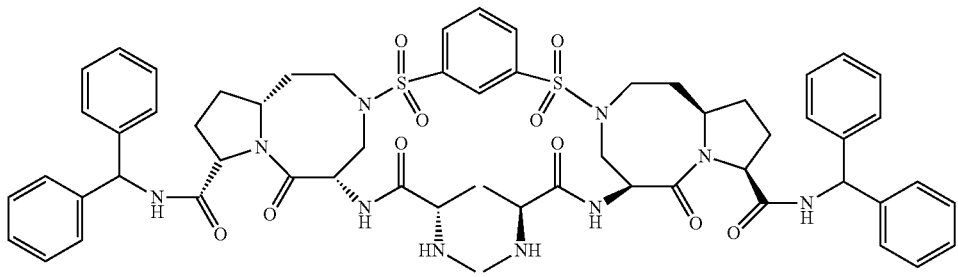

and is also referred to herein as Cpd F.

"Compound G" as described herein has the structure:

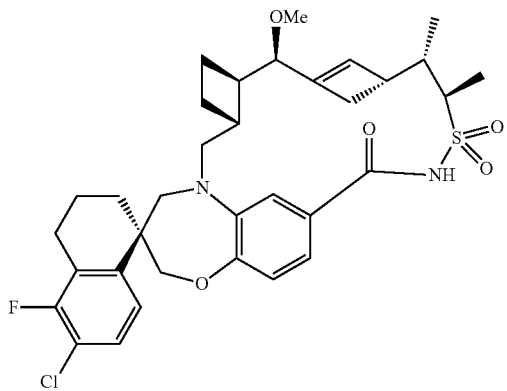 [SMILES: CO[C@H]1C2=C[C@@H](C2)[C@H](C)[C@@H](C)S(=O)(=O)NC(=O)c2ccc3c(c2)N(C[C@@H]2CC[C@H]21)C[C@@]1(CCCc2c1ccc(Cl)c2F)CO3]

and is also referred to herein as Cpd G.

Methods of Use

In one aspect, the present disclosure provides a method of treating a hematologic malignancy in a patient in need thereof, comprising administering a compound of formula (V):

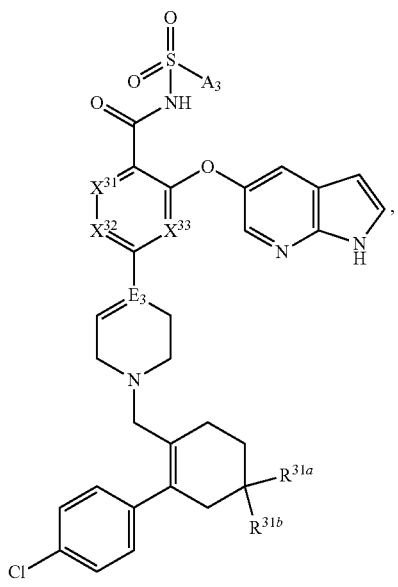

formula (V)

or a pharmaceutically acceptable salt or solvate thereof, wherein:

$A_3$ is selected from the group consisting of:

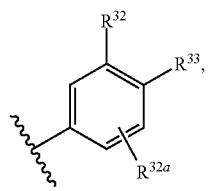

A-1

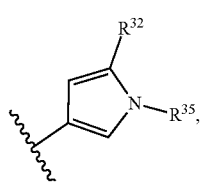

A-2

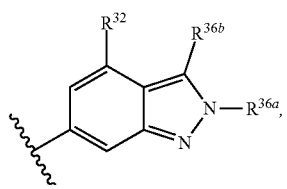

A-3

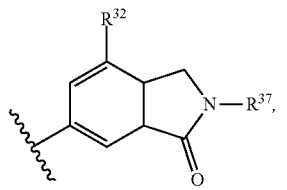

A-4

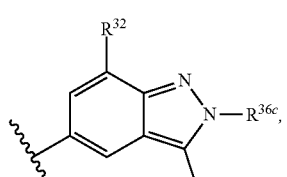

A-5

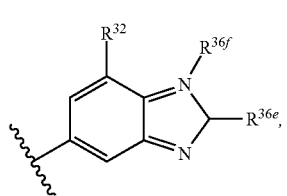

A-6

-continued

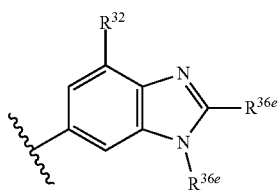
A-7

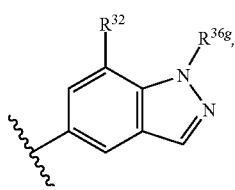
A-8

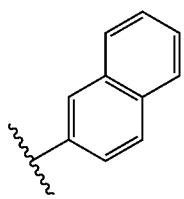 and
A-9

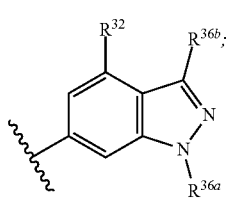
A-10

E$_3$ is a carbon atom and === is a double bond; or
E$_3$ is a —C(H)— and === is a single bond; or
E$_3$ is a nitrogen atom and === is a single bond;
X$^{31}$, X$^{32}$, and X$^{33}$ are each independently selected from the group consisting of —CR$^{38}$= and —N=;
R$^{31a}$ and R$^{31b}$ taken together with the carbon atom to which they are attached form a 3-, 4-, or 5-membered optionally substituted cycloalkyl; or
R$^{31a}$ and R$^{31b}$ taken together with the carbon atom to which they are attached form a 4- or 5-membered optionally substituted heterocyclo;
R$^{32}$ is selected from the group consisting of —NO$_2$, —SO$_2$CH$_3$, and —SO$_2$CF$_3$;
R$^{32a}$ is selected from the group consisting of hydrogen and halogen;
R$^{33}$ is selected from the group consisting of hydrogen, —CN, —C≡CH, and —N(R$^{34a}$)(R$^{34b}$);
R$^{34a}$ is selected from the group consisting of optionally substituted C$_{1-6}$ alkyl, optionally substituted C$_{3-6}$ cycloalkyl, heterocyclo, heteroalkyl, (cycloalkyl)alkyl, and (heterocyclo)alkyl;
R$^{34b}$ is selected from the group consisting of hydrogen and C$_{1-4}$ alkyl;
R$^{35}$ is selected from the group consisting of is selected from the group consisting of optionally substituted C$_{1-6}$ alkyl, heterocyclo, heteroalkyl, (cycloalkyl)alkyl, and (heterocyclo)alkyl;
R$^{36a}$, R$^{36c}$, R$^{36e}$, R$^{36f}$, and R$^{36g}$ are each independently selected from the group consisting of hydrogen, optionally substituted C$_{1-6}$ alkyl, optionally substituted C$_{3-6}$ cycloalkyl, optionally substituted aryl, optionally substituted heteroaryl, heterocyclo, heteroalkyl, (cycloalkyl)alkyl, and (heterocyclo)alkyl;

R$^{36b}$ and R$^{36d}$ are each independently selected from the group consisting of hydrogen, C$_{1-4}$ alkyl, and halogen;
R$^{37}$ is selected from the group consisting of optionally substituted C$_{1-6}$ alkyl, heterocyclo, heteroalkyl, (cycloalkyl)alkyl, and (heterocyclo)alkyl; and
R$^{38}$ is selected from the group consisting of hydrogen and halogen; and administering a second compound represented by

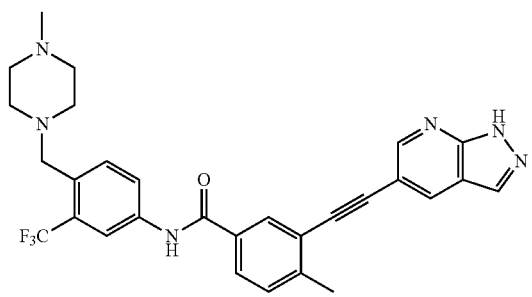 [SMILES: Cc1ccc(C(=O)Nc2ccc(CN3CCN(C)CC3)c(C(F)(F)F)c2)cc1C#Cc1cnc2[nH]ncc2c1]

or pharmaceutically acceptable salt thereof;
where an effective amount of the first and second compound is administered to the patient.
In some embodiments, the compound of formula (V) is selected from the group consisting of:

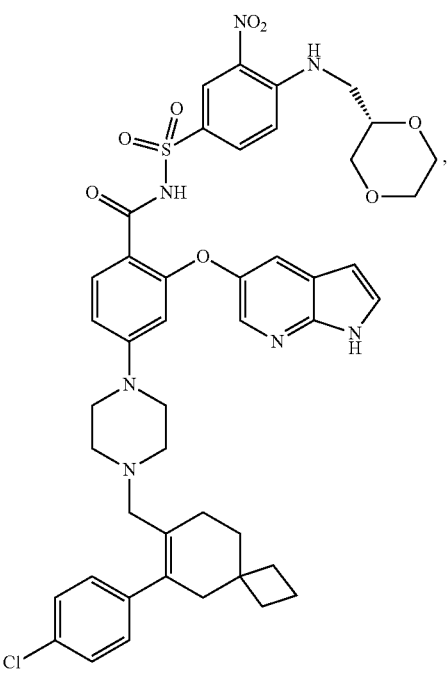 [SMILES: O=C(NS(=O)(=O)c1cc(F)c(NC[C@H]2COCCO2)c([N+](=O)[O-])c1)c1ccc(N2CCN(CC3=C(c4ccc(Cl)cc4)CC4(CCC4)CC3)CC2)cc1Oc1cnc2[nH]ccc2c1]

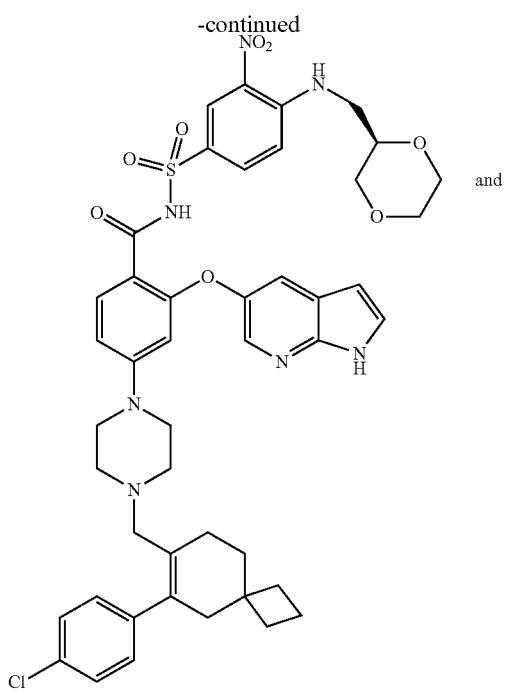

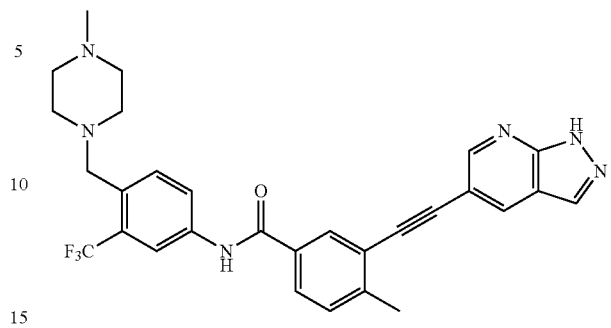

a second compound represented by:

or pharmaceutically acceptable salt thereof;
where an effective amount of the first and second compound is administered to the patient.

In another aspect, the present disclosure provides a method of treating a hematologic malignancy in a patient in need thereof, comprising:
administering to the patient a first compound of formula (V) or a pharmaceutically acceptable salt thereof; and
administering to the patient a FLT3 inhibitor.

In some embodiments, the present disclosure provides a method of treating a hematologic malignancy in a patient in need thereof, comprising:
administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and
administering to the patient a FLT3 inhibitor.

In some embodiments, the FLT3 inhibitor is midostaurin or gilteritinib.

In some embodiments, the hematologic malignancy is selected from the group consisting of chronic lymphocytic leukemia, acute myeloid leukemia, multiple myeloma, lymphoplasmacytic lymphoma, and non-Hodgkin's lymphoma. In some embodiments, the hematologic malignancy is acute myeloid leukemia.

In another aspect, the present disclosure provides a method of treating a solid tumor cancer in a patient need thereof, comprising:
administering to the patient a first compound of formula (V) or a pharmaceutically acceptable salt thereof; and
administering to the patient a second compound selected from a CDK4/6 inhibitor and tamoxifen.

In some embodiments, the present disclosure provides a method of treating a solid tumor cancer in a patient need thereof, comprising:
administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and
administering to the patient a second compound selected from a CDK4/6 inhibitor and/or tamoxifen.

In some embodiments, the second compound is a CDK4/6 inhibitor. In some embodiments, the CDK4/6 inhibitor is palbociclib. In some embodiments, the second compound is palbociclib. In some embodiments, the second compound is tamoxifen.

In some embodiments, the method further comprises administering fulvestrant or an aromatase inhibitor to the In some embodiments, the method comprises administering:
a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and patient. In some embodiments, the aromatase inhibitor is selected from the group consisting of lestrozole, anastrozole, and exemestane.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is breast cancer. In some embodiments, the breast cancer is tamoxifen-resistant breast cancer. In some embodiments, the breast cancer is estrogen resistant positive (ER+) breast cancer. In some embodiments, the breast cancer is hormone receptor positive breast cancer, human growth factor receptor 2 (HER2) negative advanced breast cancer or metastatic breast cancer.

In some embodiments, an effective amount of the first and second compound is administered to the patient.

In another aspect, the present disclosure provides a method of treating a cancer selected from the group consisting of: diffuse large B-cell lymphoma, follicular B-cell lymphoma, or chronic lymphocytic leukemia in a patient need thereof, comprising:
administering to the patient a first compound of formula (V) or a pharmaceutically acceptable salt thereof; and administering to the patient a PI3K inhibitor.

In some embodiments, the present disclosure provides a method of treating a cancer selected from the group consisting of: diffuse large B-cell lymphoma, follicular B-cell lymphoma, or chronic lymphocytic leukemia in a patient need thereof, comprising:
administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and
administering to the patient a PI3K inhibitor.

In some embodiments, the PI3K inhibitor is duvelisib, alpelisib, or idelalisib.

In some embodiments the method further includes administering fulvestrant to the patient.

In some embodiments, the cancer is refractory or treatment resistant cancer.

In another aspect, the present disclosure provides a method of treating a hematologic malignancy in a patient in need thereof comprising:
administering to the patient a first compound of formula (V) or a pharmaceutically acceptable salt thereof; and administering to the patient a PI3K inhibitor.

In some embodiments the method further includes administering fulvestrant to the patient.

In some embodiments, the present disclosure provides a method of treating a hematologic malignancy in a patient in need thereof comprising:
administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and administering to the patient a PI3K inhibitor.

In some embodiments, the hematological malignancy is selected from the group consisting of chronic lymphocytic leukemia, acute myeloid leukemia, multiple myeloma, lymphoplasmacytic lymphoma, and non-Hodgkin's lymphoma.

In another aspect, the present disclosure provides a method of treating a hematologic malignancy or a solid tumor cancer in a patient in need thereof, comprising administering:
a first compound of formula (V) or a pharmaceutically acceptable salt thereof; and
a second compound represented by:

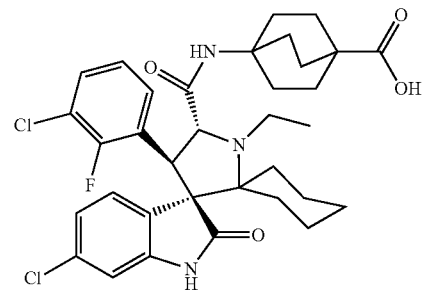 [SMILES: CCN1[C@@H](C(=O)NC23CCC(C(=O)O)(CC2)CC3)[C@H](c2cccc(Cl)c2F)[C@]2(C(=O)Nc3cc(Cl)ccc32)C12CCCCC2]

or pharmaceutically acceptable salt thereof;
where an effective amount of the first and second compound is administered to the patient.

In some embodiments, the present disclosure provides a method of treating a hematologic malignancy or a solid tumor cancer in a patient in need thereof, comprising administering:
a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and
a second compound represented by:

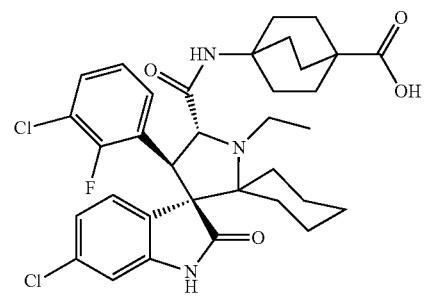 [SMILES: CCN1[C@@H](C(=O)NC23CCC(C(=O)O)(CC2)CC3)[C@H](c2cccc(Cl)c2F)[C@]2(C(=O)Nc3cc(Cl)ccc32)C12CCCCC2]

or pharmaceutically acceptable salt thereof;
where an effective amount of the first and second compound is administered to the patient.

In some embodiments, the hematological malignancy is selected from the group consisting of chronic lymphocytic leukemia, acute myeloid leukemia, multiple myeloma, lymphoplasmacytic lymphoma, and non-Hodgkin's lymphoma. In some embodiments, the hematological malignancy is mantle cell lymphoma, diffuse large B-cell lymphoma, follicular B-cell lymphoma, or chronic lymphocytic leukemia. In some embodiments, the mantle cell lymphoma is ibrutinib resistant. In some embodiments, the hematological malignancy is acute myeloid leukemia.

In some embodiments, the solid tumor is selected from the group consisting of: breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is breast cancer. In some embodiments, the breast cancer is tamoxifen-resistant breast cancer. In some embodiments, the solid tumor cancer is neuroblastoma.

In another aspect, the present disclosure provides a method of treating a cancer selected from the group consisting of: diffuse large B-cell lymphoma, follicular B-cell lymphoma, and chronic lymphocytic leukemia in a patient need thereof, comprising:
administering to the patient a first compound of formula (V) or a pharmaceutically acceptable salt thereof; and
administering to the patient each of rituximab, etoposide, ifosfamide and carboplatin.

In some embodiments, the present disclosure provides a method of treating a cancer selected from the group consisting of: diffuse large B-cell lymphoma, follicular B-cell lymphoma, or chronic lymphocytic leukemia in a patient need thereof, comprising:
administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and
administering to the patient each of rituximab, etoposide, ifosfamide and carboplatin.

In some embodiments, the diffuse large B-cell lymphoma is rituximab resistant.

In another aspect, the present disclosure provides a method of treating a hematologic malignancy in a patient in need thereof, comprising:
administering to the patient a first compound of formula (V) or a pharmaceutically acceptable salt thereof; and
administering to the patient a second compound selected from the group consisting of bortezomib, lenalidomide and pomalodomide.

In some embodiments, the present disclosure provides a method of treating a hematologic malignancy in a patient in need thereof, comprising:
administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and
administering to the patient a second compound selected from the group consisting of bortezomib, lenalidomide and pomalodomide.

In some embodiments, the method further comprises administering dexamethasone to the patient.

In some embodiments, the hematologic malignancy is selected from the group consisting of chronic lymphocytic leukemia, acute myeloid leukemia, multiple myeloma, lymphoplasmacytic lymphoma, and non-Hodgkin's lymphoma. In some embodiments, the hematologic malignancy is multiple myeloma.

In some embodiments, the method comprises administering a daily dose of 400 mg, 600 mg or 800 mg of the first compound.

In another aspect, the present disclosure provides a pharmaceutically acceptable composition comprising: a first compound of formula (V) or a pharmaceutically acceptable salt thereof;
a second compound selected from the group consisting of:

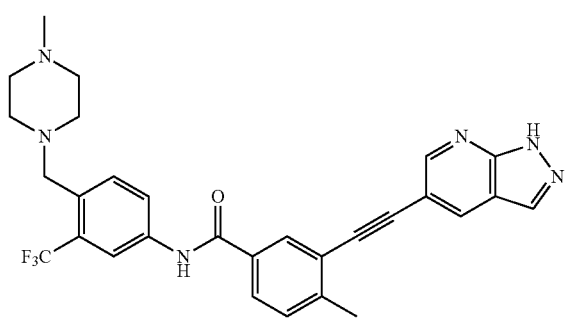 [SMILES: Cc1ccc(C(=O)Nc2ccc(CN3CCN(C)CC3)c(C(F)(F)F)c2)cc1C#Cc1cnc2[nH]ncc2c1]

or pharmaceutically acceptable salt thereof, a FLT3 inhibitor, a CDK4/6 inhibitor and a PI3K inhibitor; and
a pharmaceutically acceptable excipient.

In some embodiments, the present disclosure provides a pharmaceutically acceptable composition comprising: a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof;
a second compound selected from the group consisting of:

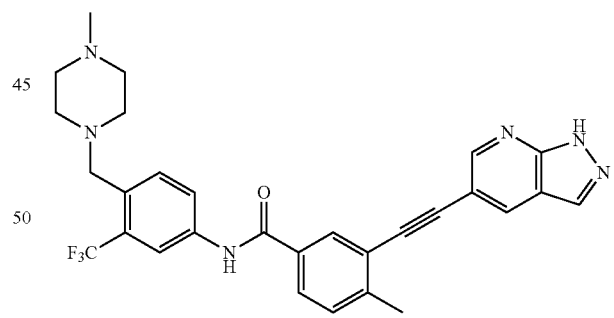

or pharmaceutically acceptable salt thereof, a FLT3 inhibitor, aCDK4/6 inhibitor and a PI3K inhibitor; and
a pharmaceutically acceptable excipient.

In another aspect, the present disclosure provides a method of treating a solid tumor cancer in a patient in need thereof, comprising administering:

a first compound of formula (I), (II), or (III):
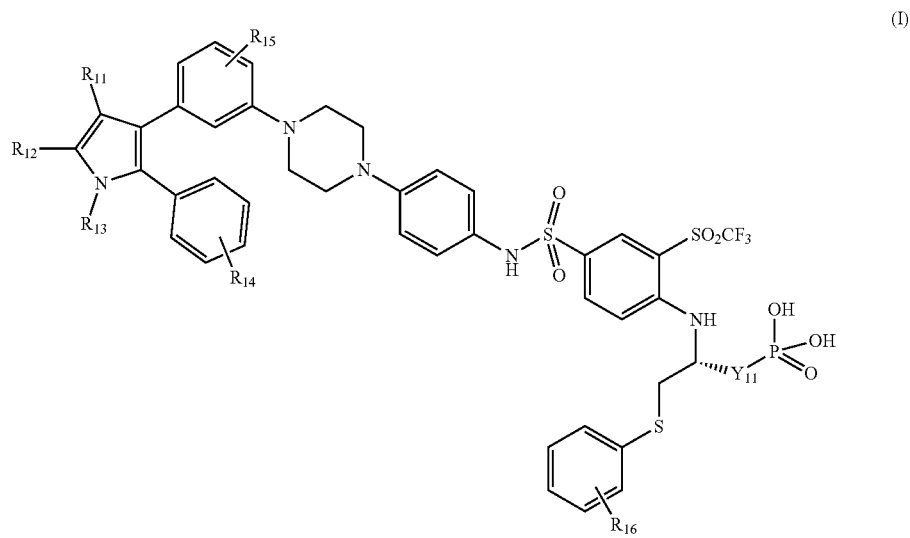
(I)
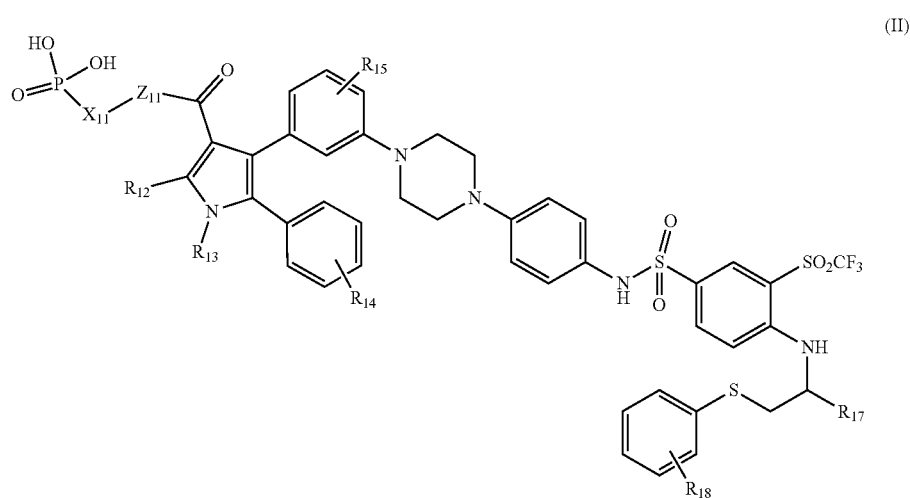
(II)
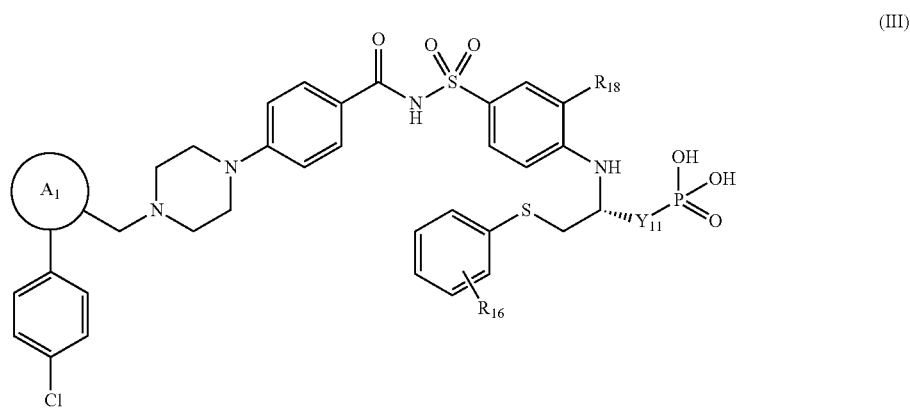
(III)

wherein the $A_1$ ring is

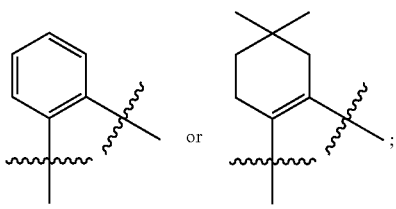

$X_{11}$, substituted or unsubstituted, is selected from the group consisting of alkylene, alkenylene, cycloalkylene, cycloalkenylene, and heterocycloalkylene;

$Y_{11}$ is selected from the group consisting of $(CH_2)_n$—N$(R_{11a})$ and;

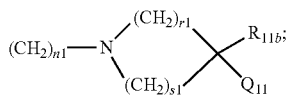

$Q_{11}$ is selected from the group consisting of O, O(CH$_2$)$_{1-3}$, NR$_{11c}$, NR$_{11c}$(C$_{1-3}$alkylene), OC(=O)(C$_{1-3}$alkylene), C(=O)O, C(=O)O(C$_{1-3}$alkylene), NHC(=O)(C$_{1-3}$alkylene), C(=O)NH, and C(=O)NH(C$_{1-3}$alkylene);

$Z_{11}$ is O or NR$_{11c}$ $R_{11}$ and $R_{12}$, independently, are selected from the group consisting of H, CN, NO$_2$, halo, alkyl, cycloalkyl, alkenyl, cycloalkenyl, alkynyl, aryl, heteroaryl, heterocycloalkyl, OR$_1$', SR$_1$', NR$_1$'R$_1$''', COR$_1$', CO$_2$R$_1$', OCOR$_1$', CONR$_1$'R$_1$'', CONR$_1$'SO$_2$R$_1$''', NR$_1$''COR$_1$'', NR$_1$'CONR$_1$''R$_1$'''; NR$_1$'C=SNR$_1$''R$_1$''', NR$_1$'SO$_2$R$_1$'', SO$_2$R$_1$', and SO$_2$NR$_1$'R$_1$'';

$R_{13}$ is selected from a group consisting of H, alkyl, cycloalkyl, alkenyl, cycloalkenyl, alkynyl, aryl, heteroaryl, heterocycloalkyl, OR$_1$', NR$_1$'R$_1$'', OCOR$_1$', CO$_2$R$_1$', COR$_1$', CONR$_1$'R$_1$'', CONR$_1$'SO$_2$R$_1$''', C$_{1-3}$alkyleneCH(OH)CH$_2$OH, SO$_2$R$_1$', and SO$_2$NR$_1$'R$_1$'';

$R_1$', $R_1$'', and $R_1$''', independently, are H, alkyl, cycloalkyl, alkenyl, cycloalkenyl, alkynyl, aryl, heteroaryl, C$_{1-3}$alkyleneheterocycloalkyl, or heterocycloalkyl;

$R_1$' and $R_1$'', or $R_1$'' and $R_1$''', can be taken together with the atom to which they are bound to form a 3 to 7 membered ring;

$R_{14}$ is hydrogen, halo, C$_{1-3}$alkyl, CF$_3$, or CN;

$R_{15}$ is hydrogen, halo, C$_{1-3}$alkyl, substituted C$_{1-3}$alkyl, hydroxyalkyl, alkoxy, or substituted alkoxy;

$R_{16}$ is selected from the group consisting of H, CN, NO$_2$, halo, alkyl, cycloalkyl, alkenyl, cycloalkenyl, alkynyl, aryl, heteroaryl, heterocycloalkyl, OR$_1$', SR$_1$', NR$_1$'R$_1$'', CO$_2$R$_1$', OCOR$_1$', CONR$_1$'R$_1$'', CONR$_1$''SO$_2$R$_1$''', NR$_1$'COR$_1$'', NR$_1$'CONR$_1$''R$_1$''', NR$_1$'C=SNR$_1$''R$_1$''', NR$_1$'SO$_2$R$_1$'', SO$_2$R$_1$', and SO$_2$NR$_1$'R$_1$'';

$R_{17}$, substituted or unsubstituted, is selected form the group consisting of hydrogen, alkyl, alkenyl, (CH$_2$)$_{0-3}$cycloalkyl, (CH$_2$)$_{0-3}$cycloalkenyl, (CH$_2$)$_{0-3}$heterocycloalkyl, (CH$_2$)$_{0-3}$aryl, and (CH$_2$)$_{0-3}$heteroaryl;

$R_{18}$ is selected form the group consisting of hydrogen, halo, NO$_2$, CN, CF$_3$SO$_2$, and CF$_3$;

$R_{11a}$ is selected from the group consisting of hydrogen, alkyl, heteroalkyl, alkenyl, hydroxyalkyl, alkoxy, substituted alkoxy, cycloalkyl, cycloalkenyl, and heterocycloalkyl;

$R_{11b}$ is hydrogen or alkyl;

$R_{11c}$ is selected from the group consisting of hydrogen, alkyl, substituted alkyl, hydroxyalkyl, alkoxy, and substituted alkoxy; and $n_1$, $r_1$, and $s_1$, independently, are 1, 2, 3, 4, 5, or 6;

or a pharmaceutically acceptable salt of (I), (II), or (III); and administering a second compound represented by:

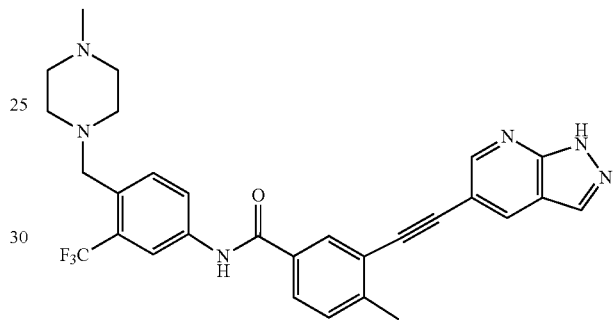

or pharmaceutically acceptable salt thereof;

where an effective amount of the first and second compound is administered to the patient.

In some embodiments, Y11 is

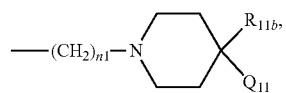

n is an integer of 1-3, $R_{11b}$ is hydrogen or C$_{1-3}$ alkyl, Q is O, O(CH$_2$)$_{1-3}$, C(=O)O(CH$_2$)$_{1-3}$, OC(=O)(CH$_2$)$_{1-3}$ or C(=O)O(C$_3$H$_7$)$_{1-3}$.

In some embodiments, the compound of formula (I), (II) or (III) is selected from the group consisting of:

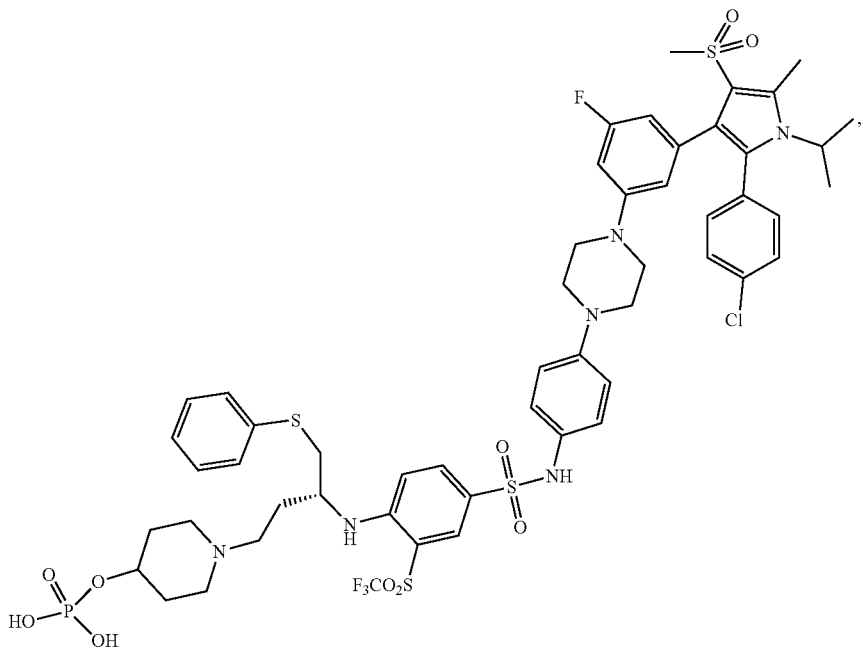
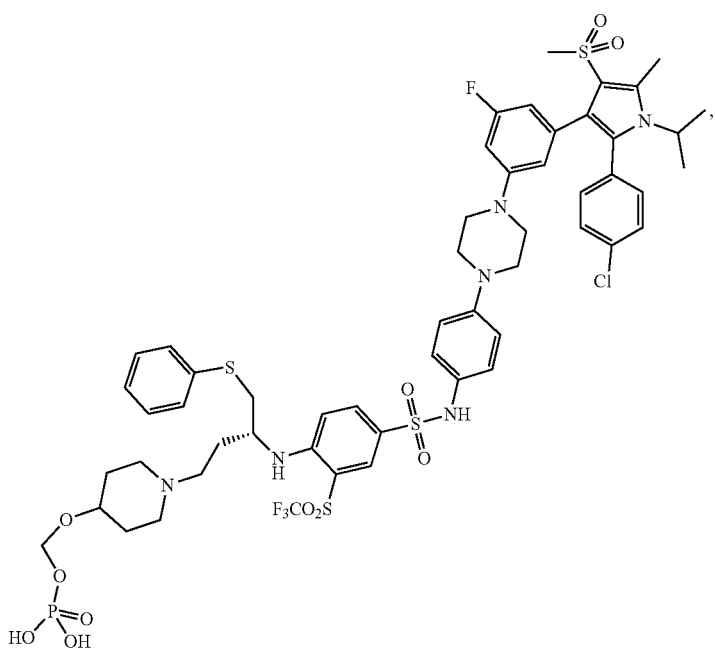

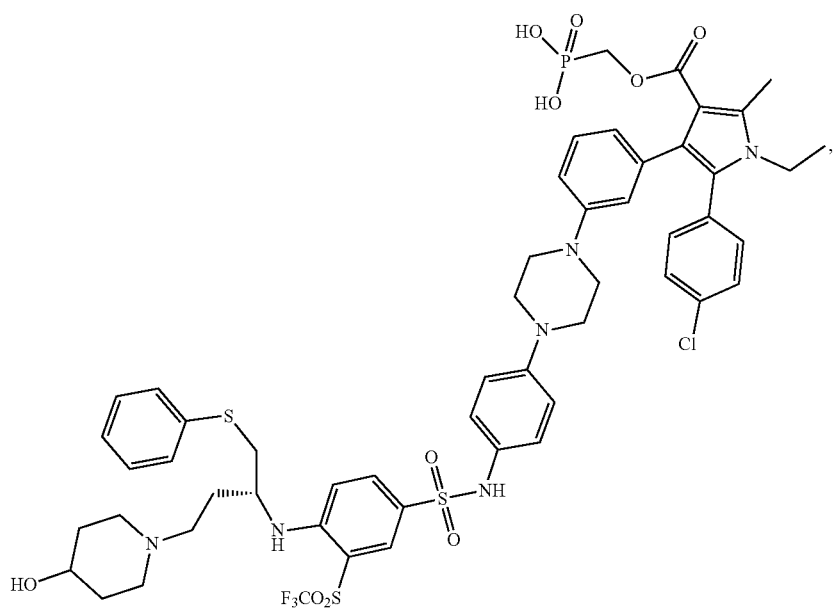
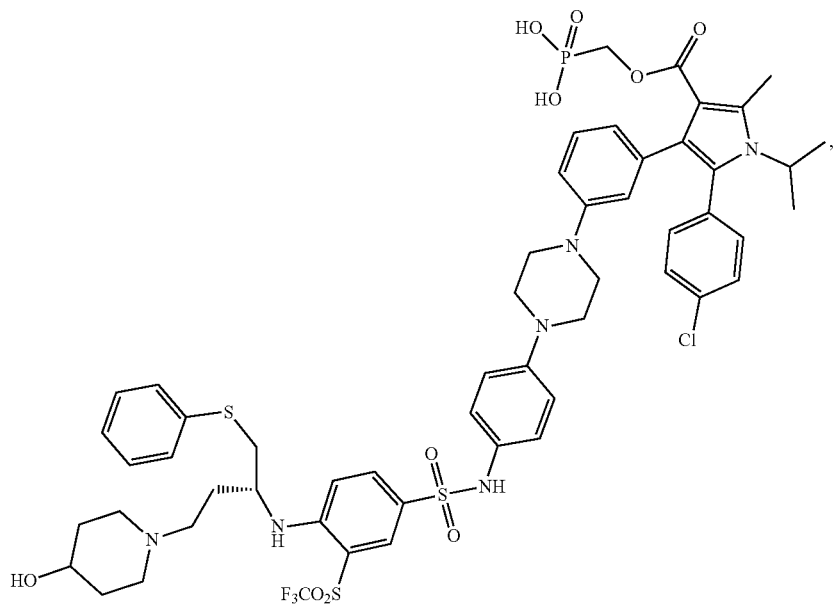

-continued
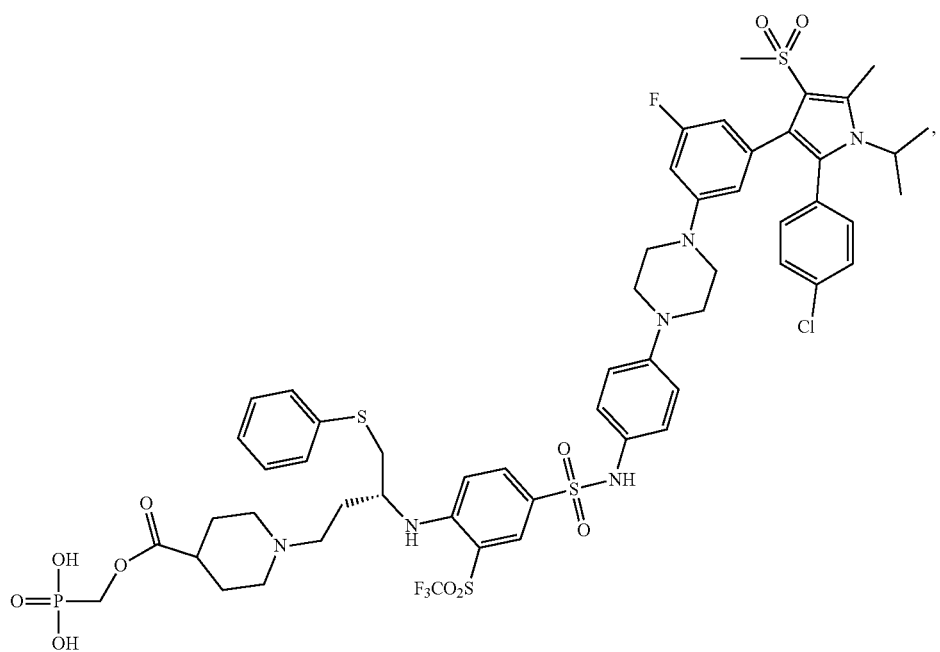
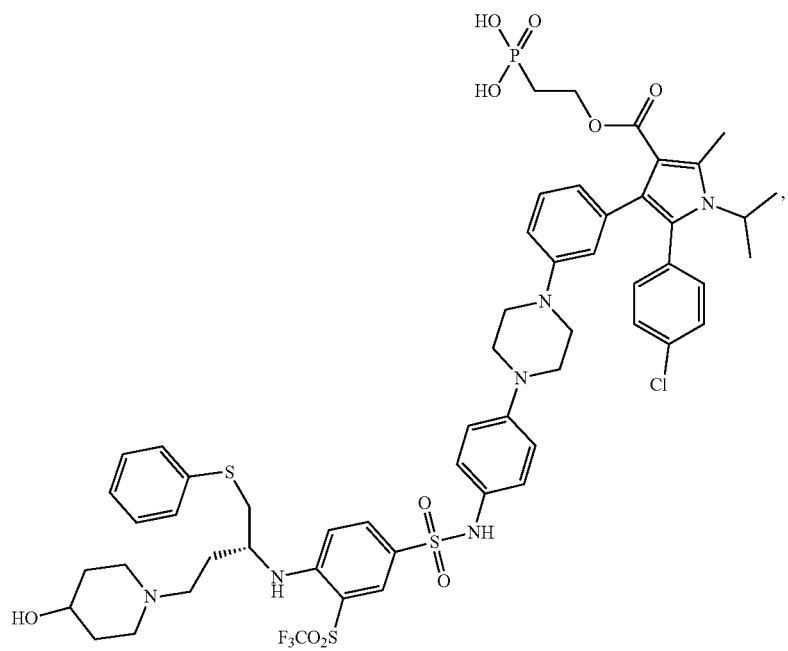

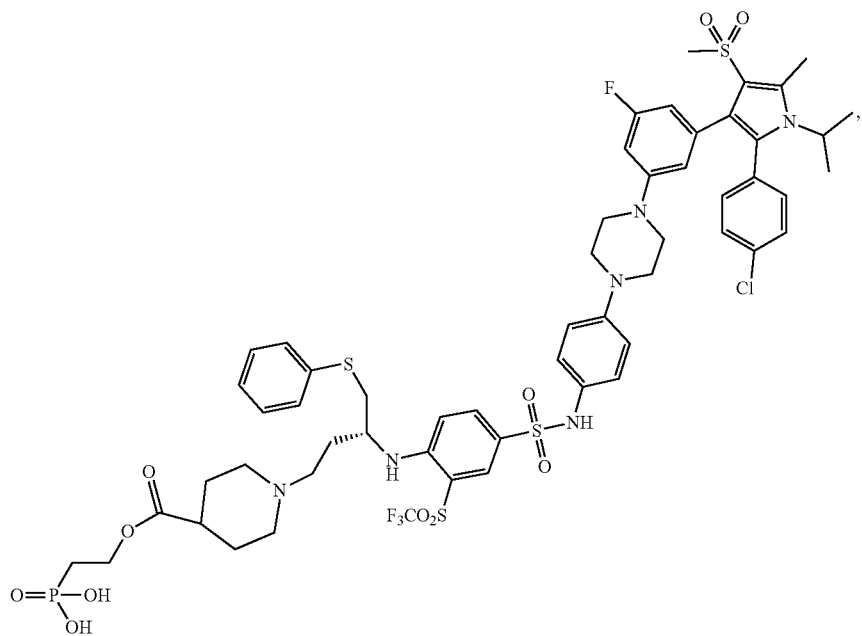
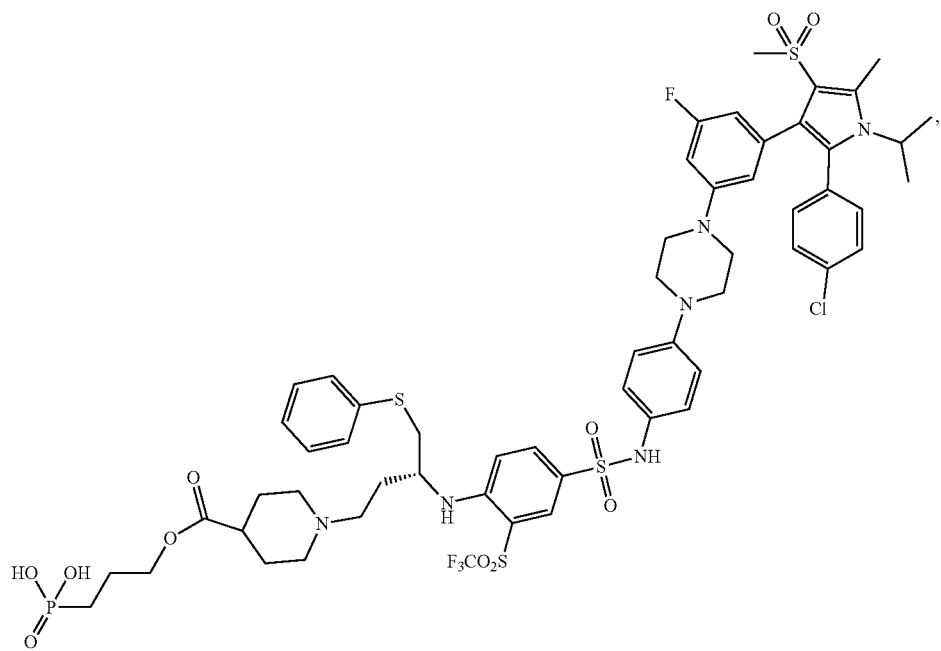

-continued
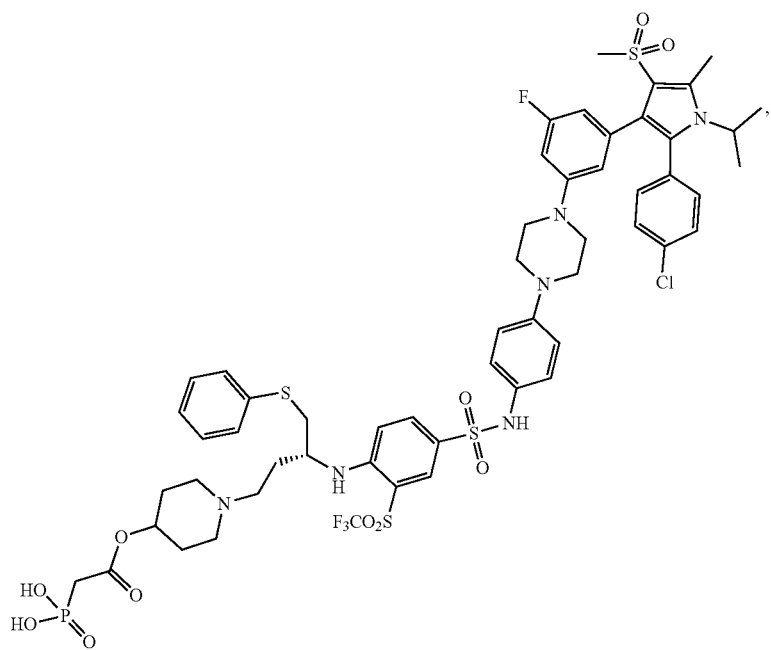
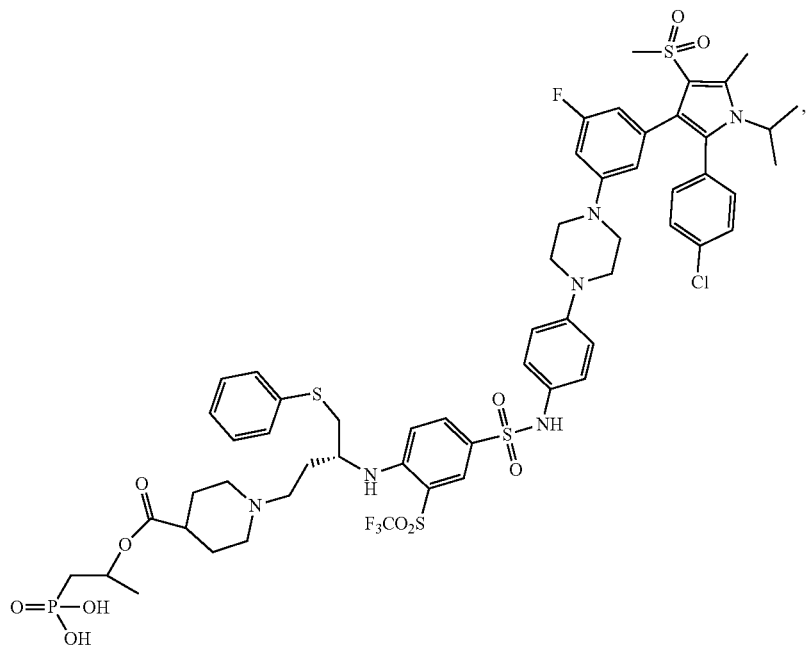

-continued
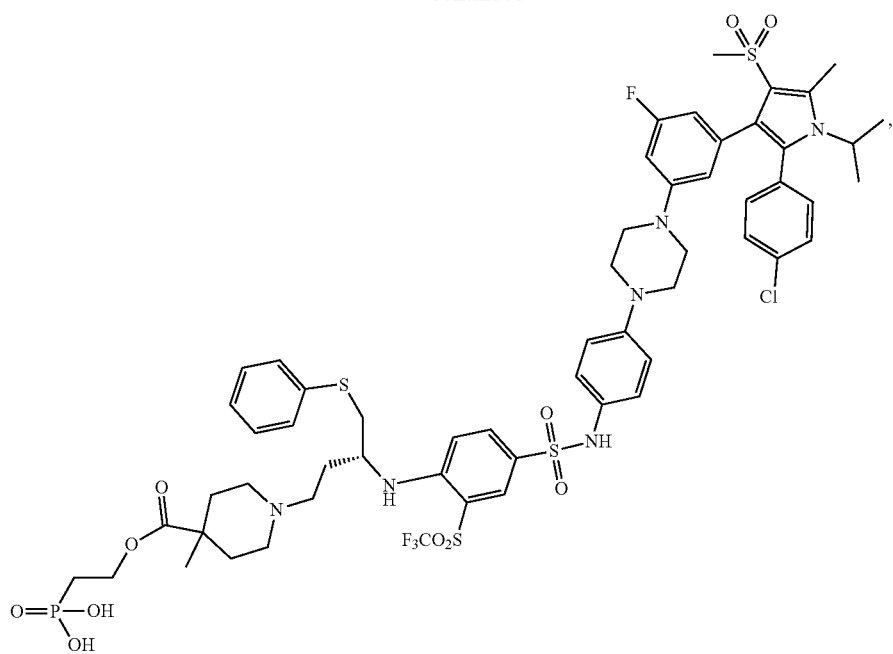
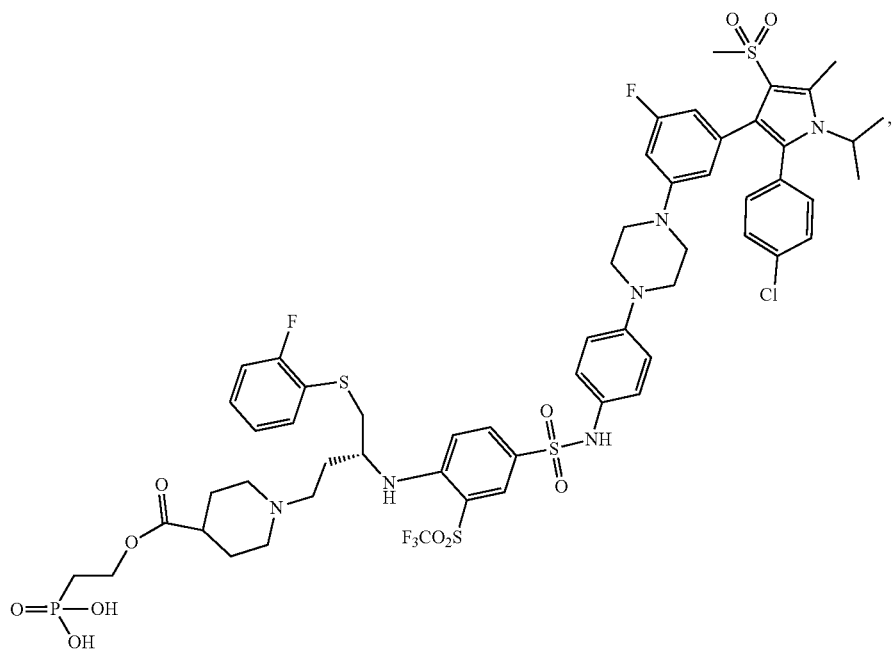

-continued
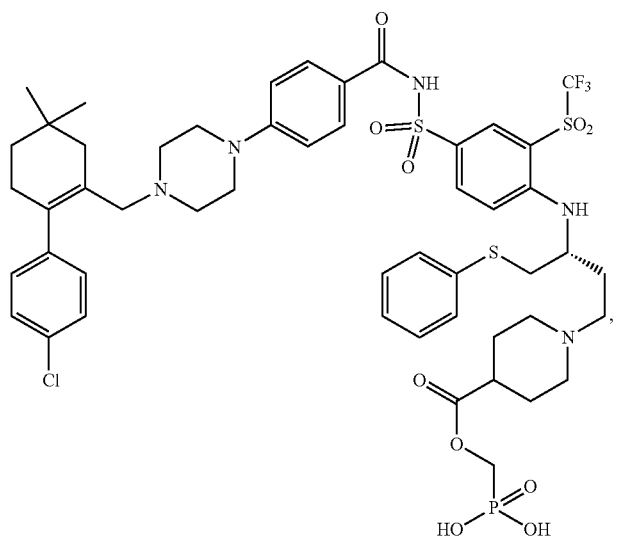
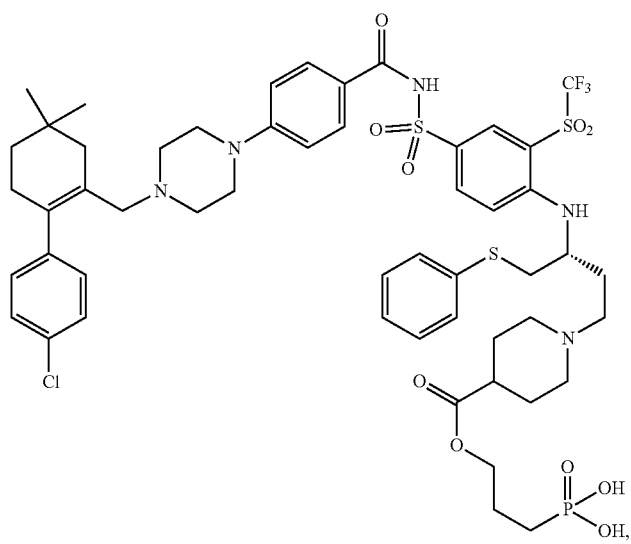
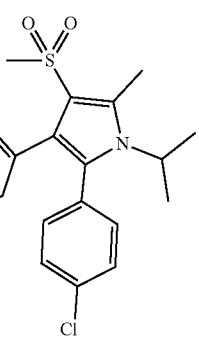
and
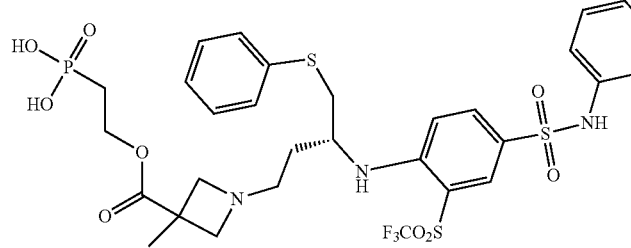

-continued
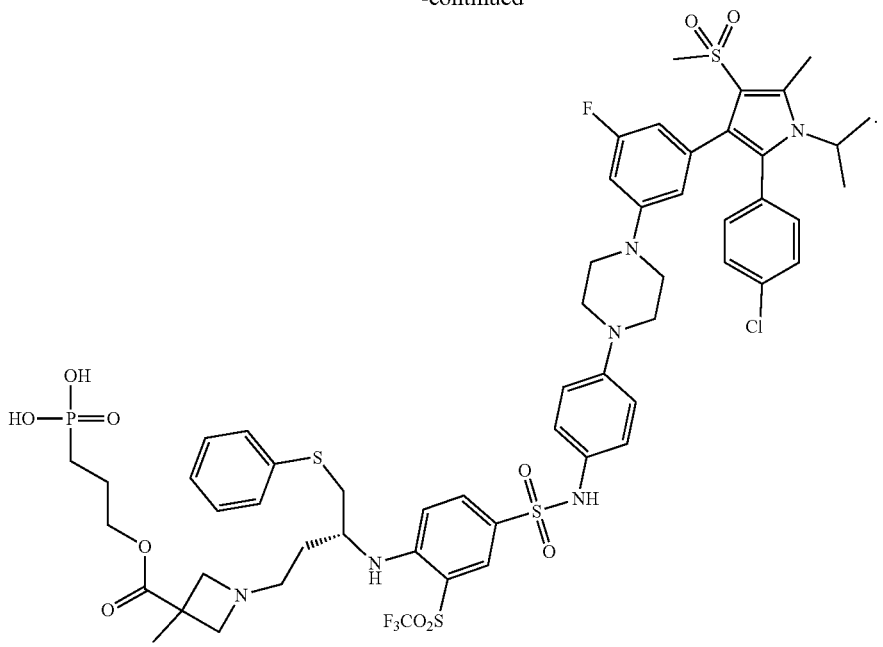
In some embodiments, the present disclosure provides a method of treating a solid tumor cancer in a patient in need thereof, comprising administering:
a first compound represented by
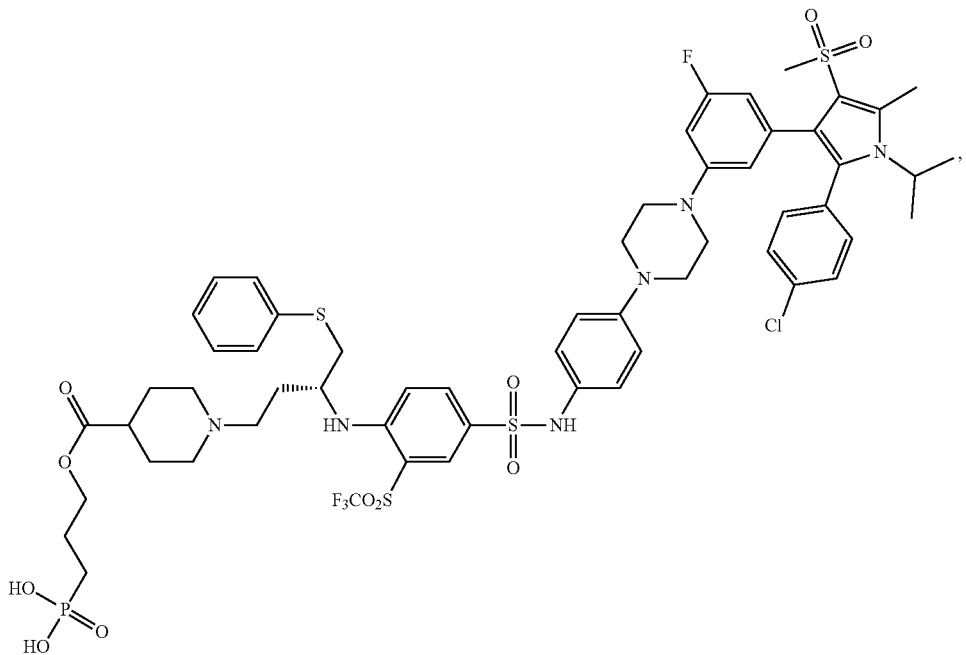
or a pharmaceutically acceptable salt; and administering a second compound represented by:

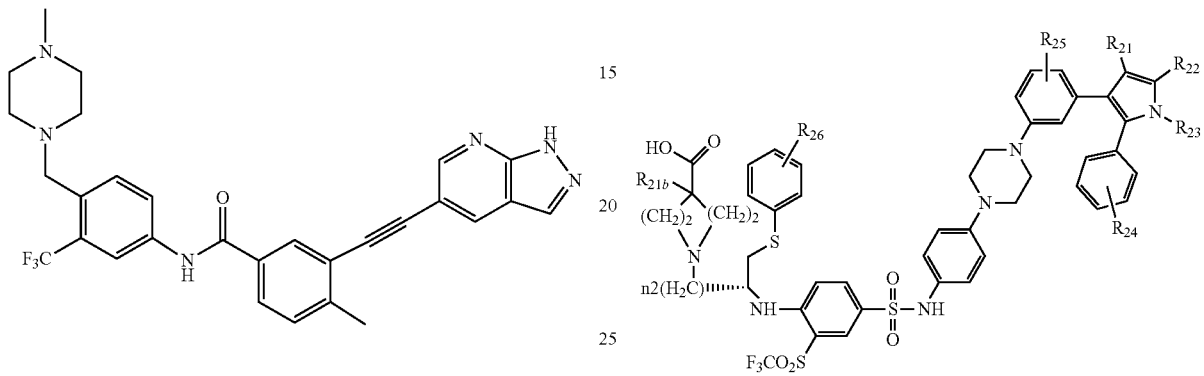

or pharmaceutically acceptable salt thereof;
where an effective amount of the first and second compound is administered to the patient.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is selected from the group consisting of breast cancer, ovarian cancer, prostate cancer, non-small cell lung cancer, head and neck cancer, neuroblastoma, brain cancer and squamous cell carcinoma cancer. In some embodiments, the solid tumor cancer is lung adenocarcinoma or lung squamous cell carcinoma cancer. In some embodiments, the solid tumor cancer is a refractory cancer.

In some embodiments, an effective amount of the first and second compound is administered to the patient.

In another aspect, the present disclosure provides a method of treating a solid tumor cancer in a patient in need thereof, comprising administering:

a first compound selected from:
a compound of formula (I), (II), or (III), a compound of formula (IV), wherein for formula IV,
$R_{21}$ is $SO_2R_2'$,
$R_{22}$ is alkyl, preferably C1-C4 alkyl, more preferably methyl, propyl, or isopropyl,
$R_{23}$ is alkyl, preferably C1-C4 alkyl, more preferably methyl, propyl, or isopropyl,
$R_{24}$ is halogen, preferably fluoride, chloride,
$R_{25}$ is halogen, preferably fluoride, chloride,
$R_{26}$ is selected from H, halogen, alkyl, preferably fluoride, chloride, C1-C4 alkyl, more preferably methyl, propyl, isopropyl
$R_{21b}$ is H or alkyl, preferably C1-C4 alkyl, more preferably methyl, propyl, or isopropyl,
$n_2$, $r_2$ and $s_2$ are independently 1, 2, 3, 4, 5 or 6, more preferably, $r_2$ and $s_2$ are both 2 and $n_2$ is 3, 4 or 5, more preferably, all of $n_2$, $r_2$ and $s_2$ are 2, and
$R_2'$ is alkyl, preferably C1-C4 alkyl, more preferably methyl, propyl, or isopropyl;
and a pharmaceutically acceptable salt thereof; and
administering a CDK4/6 inhibitor or pharmaceutically acceptable salt thereof;
where an effective amount of the first and second compound is administered to the patient.

In some embodiments, the compound of formula (IV) is selected from the group consisting of:

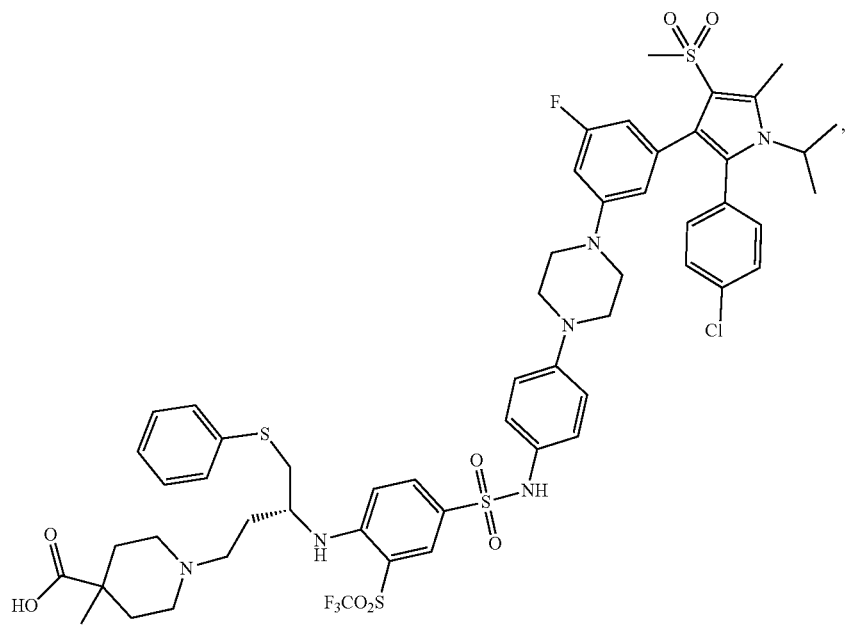
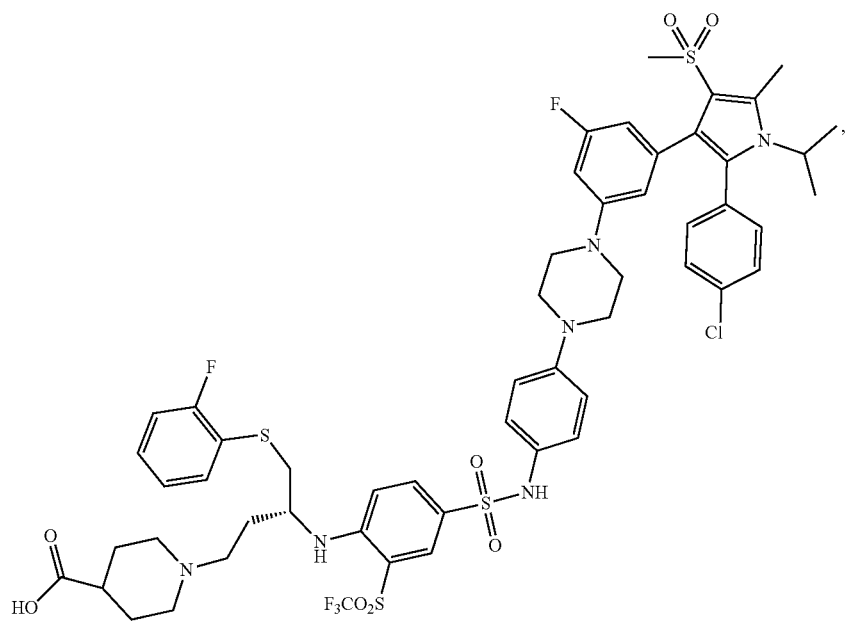

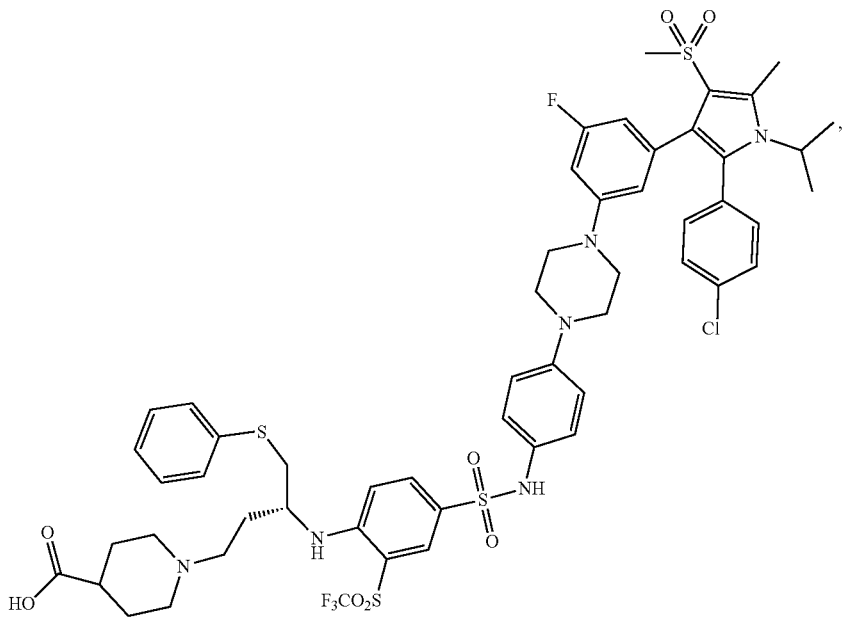
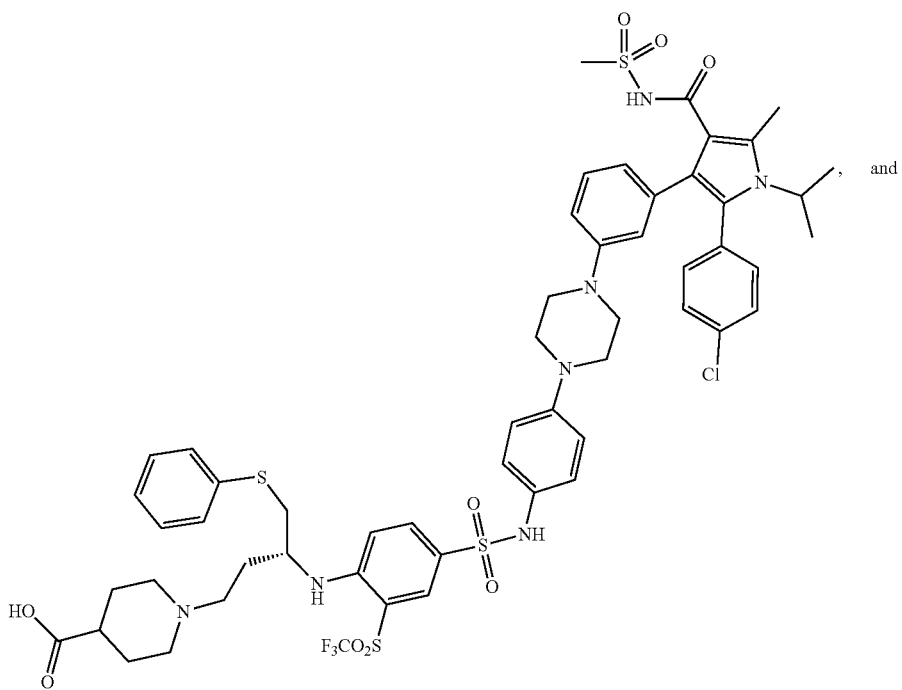

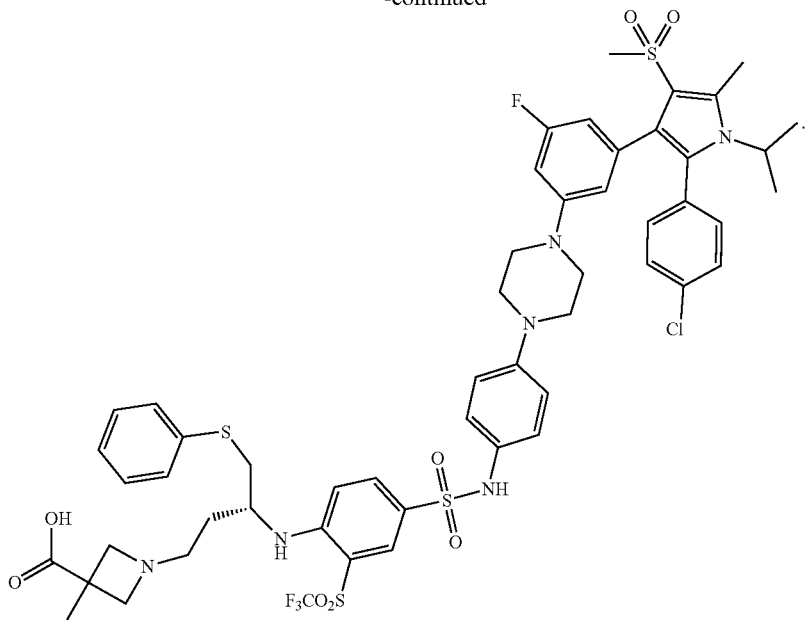
In some embodiments, the present disclosure provides a method of treating a solid tumor cancer in a patient in need thereof, comprising administering:
a first compound selected from:
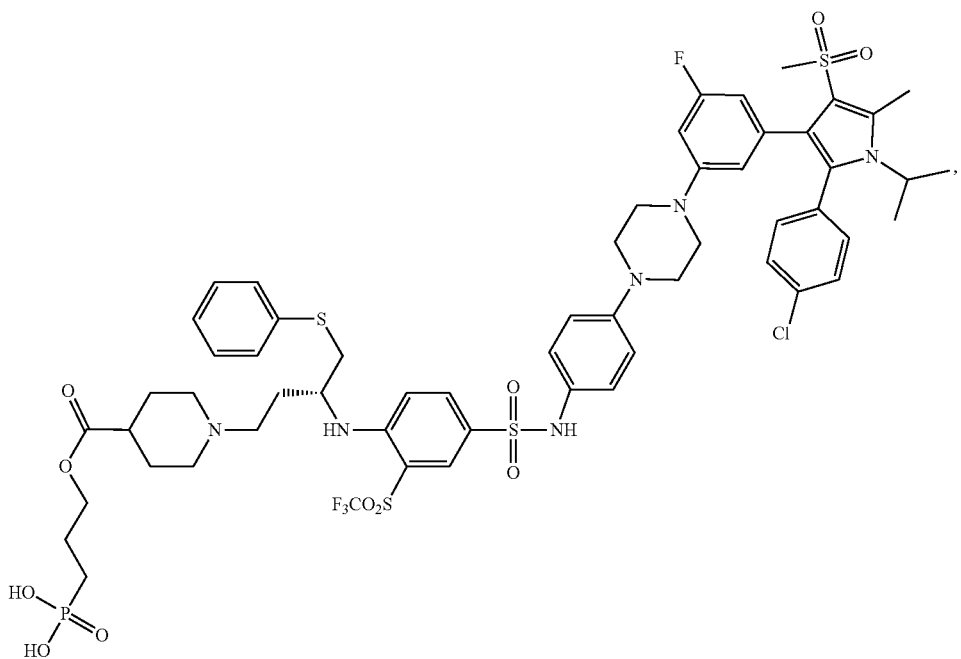

-continued

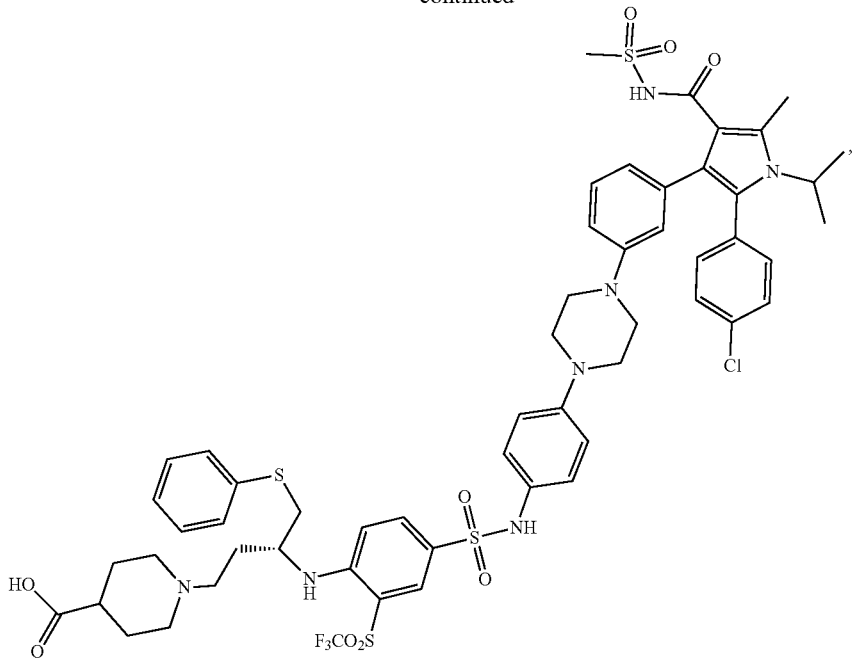

and
a pharmaceutically acceptable salt thereof; and
administering a CDK4/6 inhibitor or pharmaceutically acceptable salt thereof;
where an effective amount of the first and second compound is administered to the patient.

In some embodiments, the first compound is compound B. In some embodiments, the first compound is compound D.

In some embodiments, the CDK4/6 inhibitor is palbociclib.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the cancer is refractory or treatment resistant cancer. In some embodiments, the solid tumor cancer is breast cancer. In some embodiments, the breast cancer is tamoxifen-resistant breast cancer.

In another aspect, the present disclosure provides a method of treating a solid tumor cancer in a patient in need thereof, comprising administering to the patient:
a first compound selected from:
a compound of formula (I), (II), or (III), a compound of formula (IV),
and a pharmaceutically acceptable salt thereof; and
administering tamoxifen to the patient.

In some embodiments, the present disclosure provides a method of treating a solid tumor cancer in a patient in need thereof, comprising administering to the patient:

a first compound selected from:

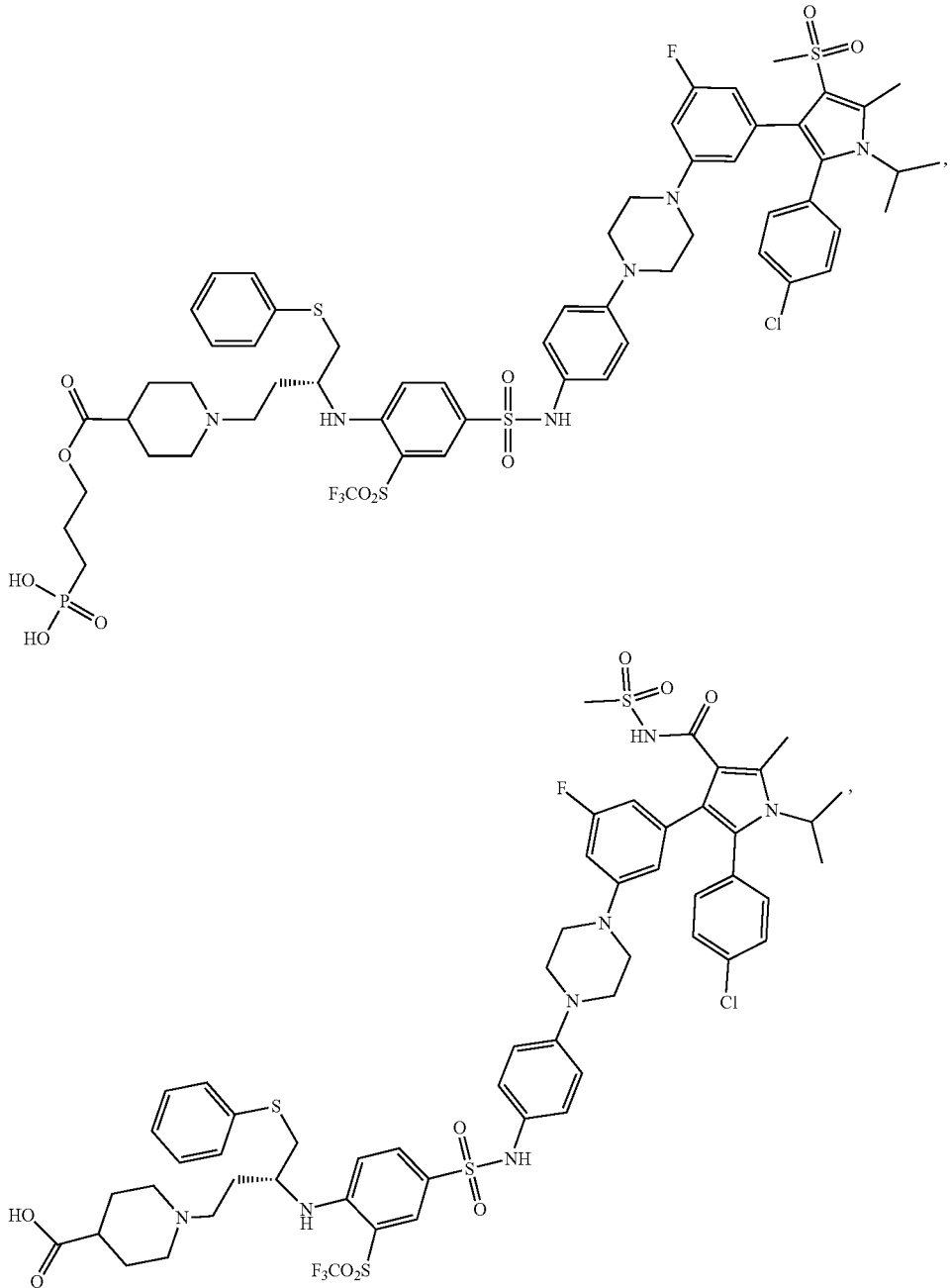

and
a pharmaceutically acceptable salt thereof, and administering tamoxifen to the patient.

In some embodiments, the first compound is compound B. In some embodiments, the first compound is compound D.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is refractory or treatment resistant cancer. In some embodiments, the solid tumor cancer is breast cancer. In some embodiments, the breast cancer is tamoxifen-resistant breast cancer. In some embodiments, the breast cancer is estrogen resistant positive (ER+) breast cancer. In some embodiments, the breast cancer is hormone receptor positive breast cancer, human growth factor receptor 2 (HER2) negative advanced breast cancer or metastatic breast cancer.

In another aspect, the present disclosure provides a method of treating a hematologic malignancy in a patient in need thereof, comprising:
a first compound selected from:
a compound of formula (I), (II), or (III), a compound of formula (IV),
and a pharmaceutically acceptable salt thereof; and
administering a second compound selected from the group consisting of: bortezomib, lenalidomide, pomalodomide and dexamethasone.

In some embodiments, the present disclosure provides a method of treating a hematologic malignancy in a patient in need thereof, comprising:
a first compound selected from:

and
a pharmaceutically acceptable salt thereof, and
administering a second compound selected from the group consisting of: bortezomib, lenalidomide, pomalodomide and dexamethasone.

In some embodiments, the first compound is compound B.
In some embodiments, the first compound is compound D.

In some embodiments, the hematologic malignancy is selected from the group consisting of chronic lymphocytic leukemia, acute myeloid leukemia, multiple myeloma, lymphoplasmacytic lymphoma, and non-Hodgkin's lymphoma. In some embodiments, the hematologic malignancy is multiple myeloma.

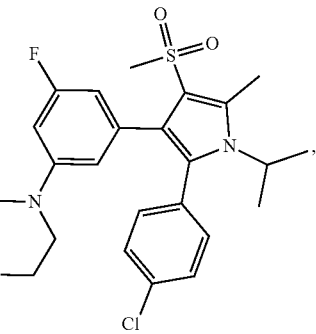

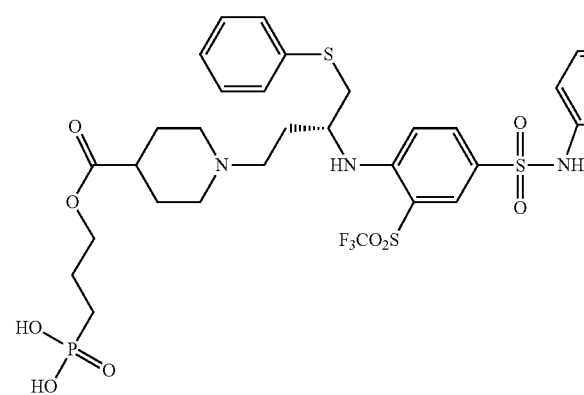

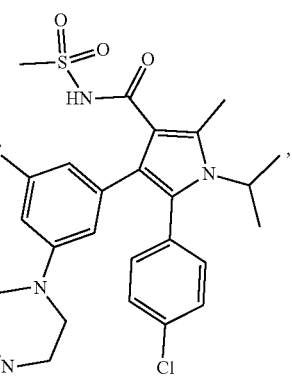

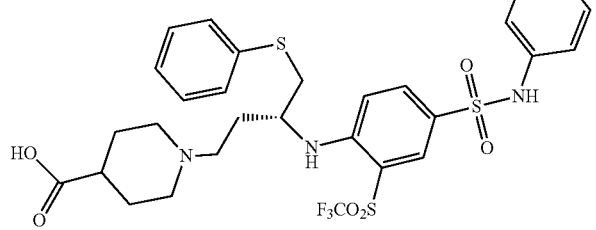

In another aspect, the present disclosure provides a method of treating a hematologic malignancy or a solid tumor cancer in a patient in need thereof, comprising administering
a first compound selected from:
a compound of formula (I), (II), or (III), a compound of formula (IV),
and a pharmaceutically acceptable salt thereof; and administering a second compound represented by:

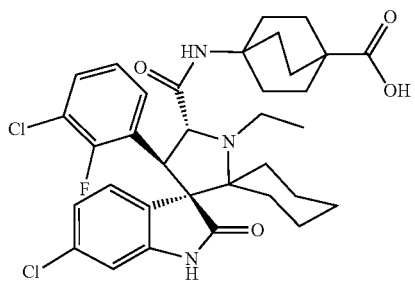 [SMILES: CCN1[C@@H](C(=O)NC23CCC(C(=O)O)(CC2)CC3)[C@H](c2cccc(Cl)c2F)[C@]2(C(=O)Nc3cc(Cl)ccc32)C12CCCCC2]

or pharmaceutically acceptable salt thereof;
where an effective amount of the first and second compound is administered to the patient.

In some embodiments, the present disclosure provides a method of treating a hematologic malignancy or a solid tumor cancer in a patient in need thereof, comprising administering
a first compound selected from:

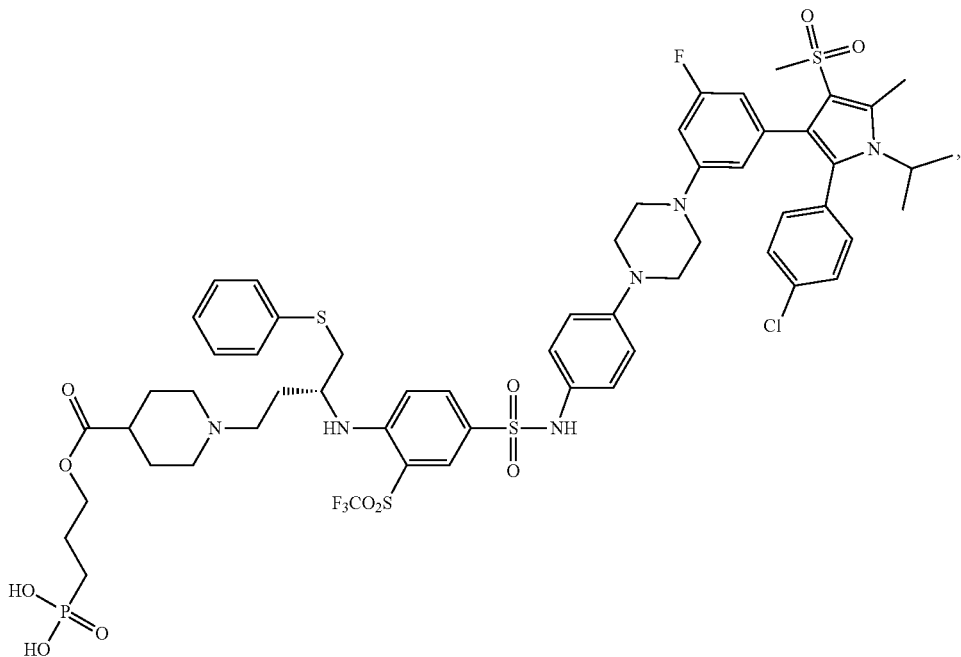

-continued

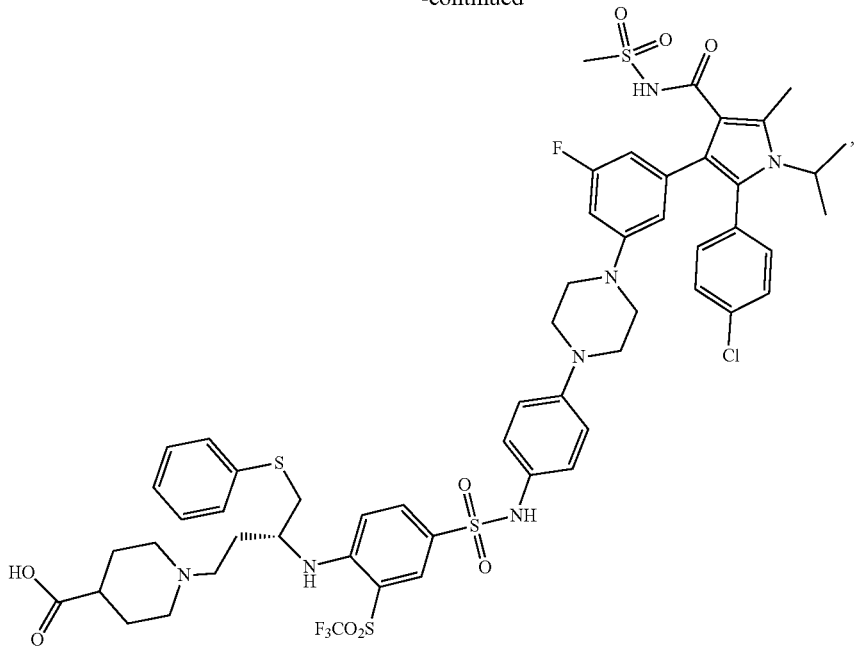

and
a pharmaceutically acceptable salt thereof, and
administering a second compound represented by:

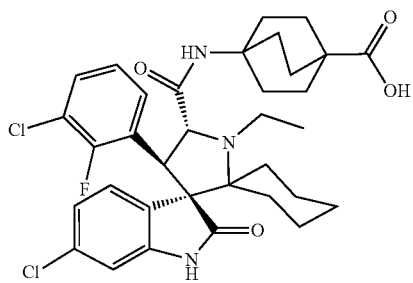 [SMILES: CCN1[C@@H](C(=O)NC23CCC(C(=O)O)(CC2)CC3)[C@H](c2cccc(Cl)c2F)[C@]2(C(=O)Nc3cc(Cl)ccc32)C12CCCCC2]

or pharmaceutically acceptable salt thereof;
where an effective amount of the first and second compound is administered to the patient.

In some embodiments, the first compound is compound B. In some embodiments, the first compound is compound D.

In some embodiments, the hematological malignancy is selected from the group consisting of chronic lymphocytic leukemia, acute myeloid leukemia, multiple myeloma, lymphoplasmacytic lymphoma, and non-Hodgkin's lymphoma. In some embodiments, the hematological malignancy is mantle cell lymphoma, diffuse large B-cell lymphoma, follicular B-cell lymphoma, or chronic lymphocytic leukemia. In some embodiments, the hematological malignancy is mantle cell lymphoma.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is neuroblastoma.

In another aspect, the present disclosure provides a method of treating a cancer selected from the group consisting of: diffuse large B-cell lymphoma, follicular B-cell lymphoma, and chronic lymphocytic leukemia in a patient in need thereof, comprising administering a first compound selected from:

a compound of formula (I), (II), or (III), a compound of formula (IV), and a pharmaceutically acceptable salt thereof; and administering to the patient each of rituximab, etoposide, ifosfamide and carboplatin.

In some embodiments, the present disclosure provides a method of treating a cancer selected from the group consisting of: diffuse large B-cell lymphoma, follicular B-cell lymphoma, and chronic lymphocytic leukemia in a patient in need thereof, comprising administering a first compound selected from:

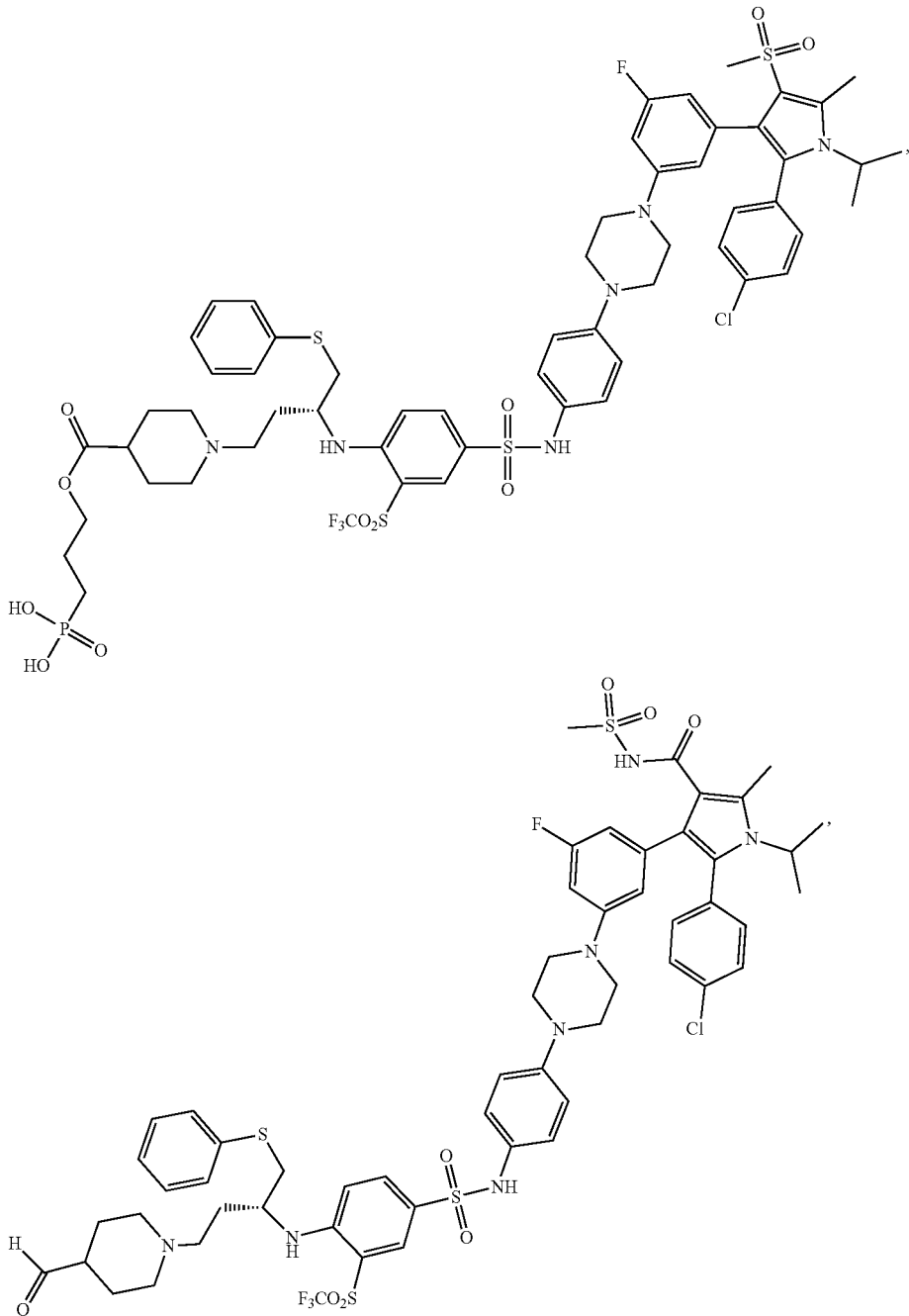

and a pharmaceutically acceptable salt thereof to the patient, and administering to the patient each of rituximab, etoposide, ifosfamide and carboplatin.

In some embodiments, the first compound is compound B. In some embodiments, the first compound is compound D.

In another aspect, the disclosure provides a method of treating a solid tumor cancer in a patient need thereof, comprising: administering to the patient a first compound of formula (V), and administering to the patient an MCL-1 inhibitor.

In some embodiments, the disclosure provides a method of treating a solid tumor cancer in a patient need thereof, comprising: administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and administering to the patient an MCL-1 inhibitor.

In some embodiments, the MCL-1 inhibitor is

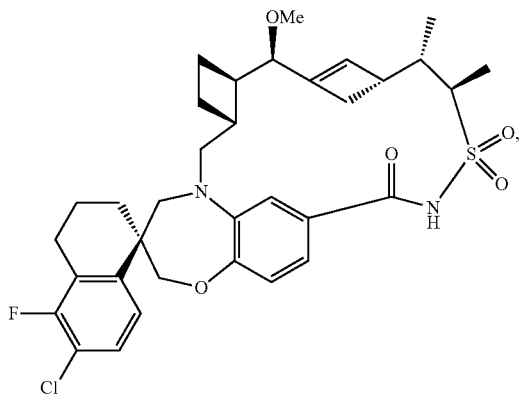 [SMILES: CO[C@H]1C2=C[C@@H](C2)[C@H](C)[C@@H](C)S(=O)(=O)NC(=O)c2ccc3c(c2)N(C[C@@H]2CC[C@H]21)C[C@@]1(CCCc2c1ccc(Cl)c2F)CO3]

or a pharmaceutically acceptable salt thereof.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer.

In another aspect, the disclosure provides a method of treating a solid tumor cancer in a patient need thereof, comprising: administering to the patient a first compound selected from: a compound of formula (I), (II), or (III), a compound of formula (IV), and a pharmaceutically acceptable salt thereof, and administering to the patient an MCL-1 inhibitor or a CDK9 inhibitor.

In some embodiments, the disclosure provides a method of treating a solid tumor cancer in a patient need thereof, comprising: administering to the patient a first compound selected from

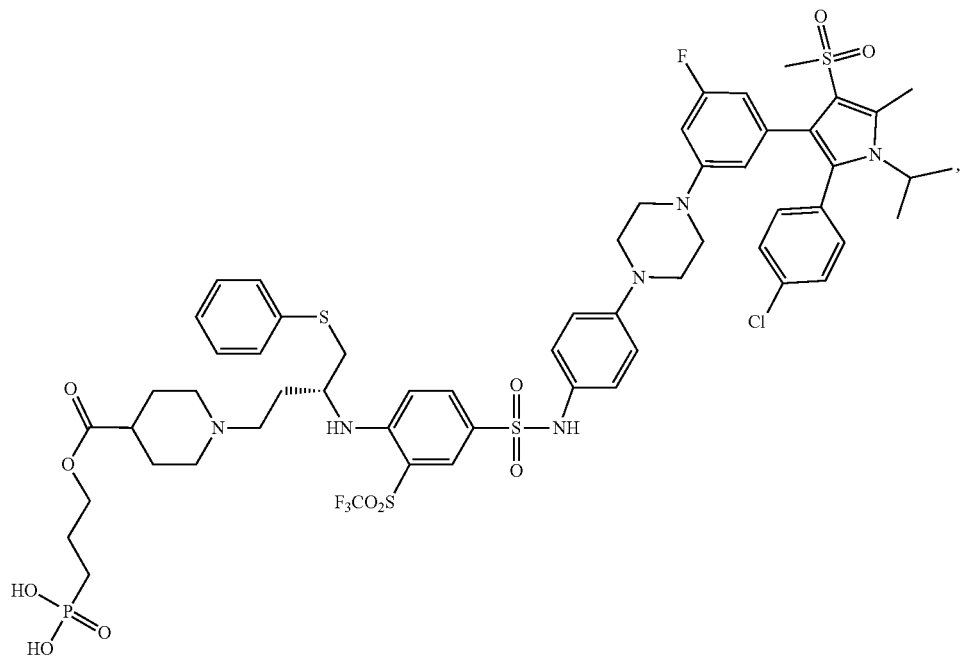

-continued

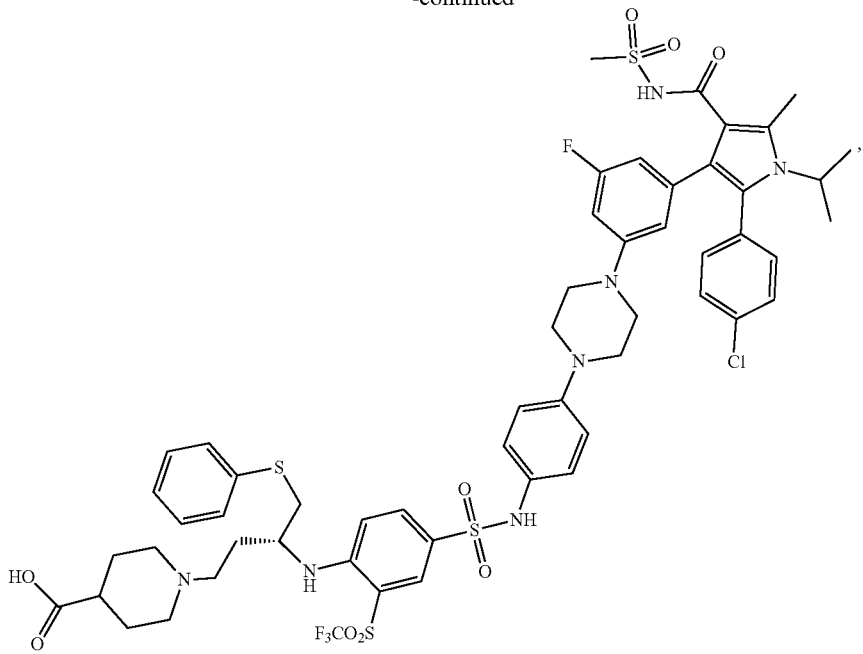

and a pharmaceutically acceptable salt thereof;
and administering to the patient an MCL-1 inhibitor or a CDK9 inhibitor.

In some embodiments, the MCL-1 inhibitor is

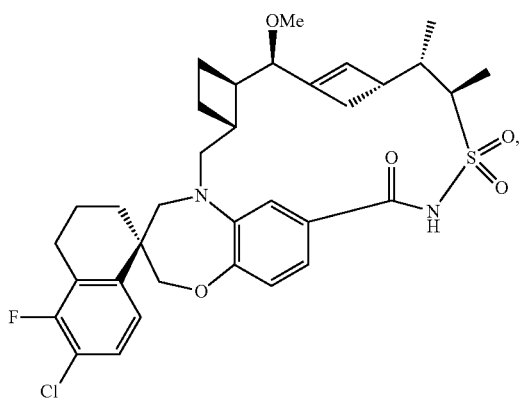 [SMILES: CO[C@H]1C2=C[C@@H](C2)[C@H](C)[C@@H](C)S(=O)(=O)NC(=O)c2ccc3c(c2)N(C[C@@H]2CC[C@H]21)C[C@@]1(CCCc2c1ccc(Cl)c2F)CO3]

alvocidib, or AZD5991, or a pharmaceutically acceptable salt thereof.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer.

In yet another aspect, the disclosure provides a method of treating a solid tumor cancer in a patient need thereof, comprising: administering to the patient a first compound selected from: a compound of formula (I), (II), or (III), a compound of formula (IV), and a pharmaceutically acceptable salt thereof, and a second compound selected from a compound of formula (V) and anlotinib; where an effective amount of the first and second compound is administered to the patient.

In some embodiments the disclosure provides a method of treating a solid tumor cancer in a patient in need thereof, comprising administering: a first compound selected from

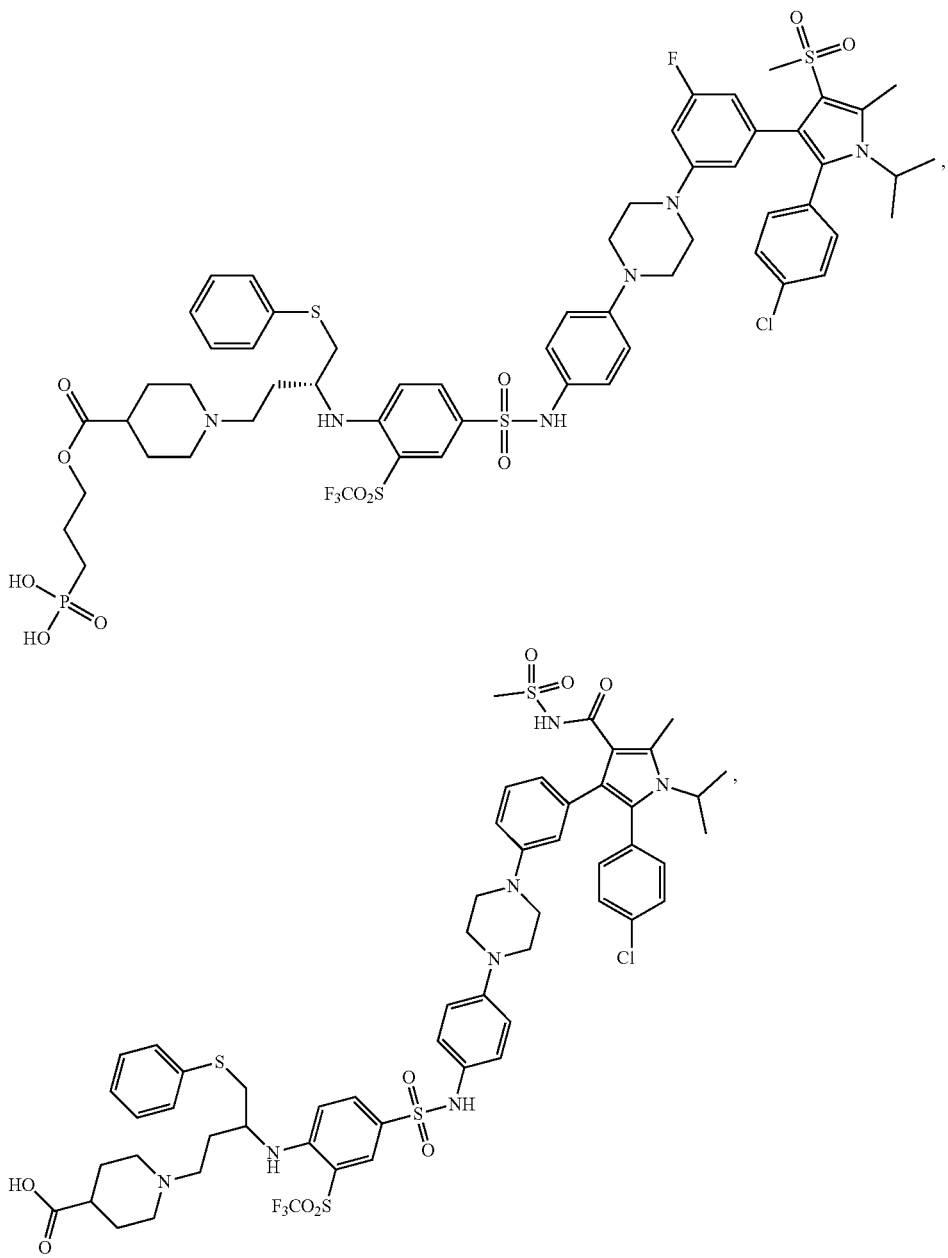

and a pharmaceutically acceptable salt thereof; and a second compound selected from
(S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or pharmaceutically acceptable salt thereof, and anlotinib; where an effective amount of the first and second compound is administered to the patient.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, small cell lung cancer, head and neck cancer, neuroblastoma, and squamous cell carcinoma cancer. In some embodiments, the solid tumor cancer is small cell lung cancer.

In another aspect, the disclosure provides a method of treating a hematologic malignancy in a patient in need thereof, comprising administering to the patient a first compound selected from: a compound of formula (I), (II), or (III), a compound of formula (IV), and a pharmaceutically acceptable salt thereof, and a second compound represented by:

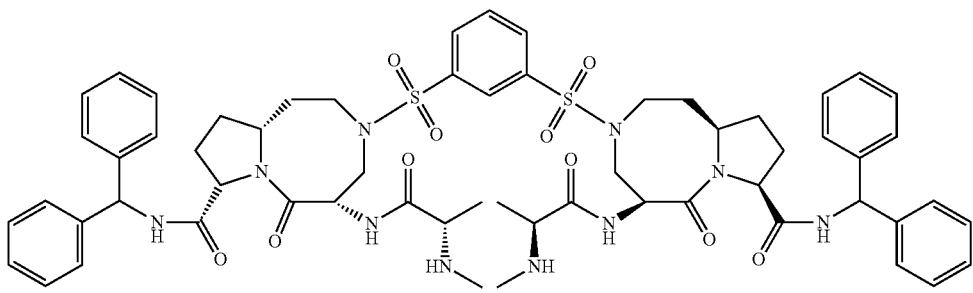
or pharmaceutically acceptable salt thereof;
where an effective amount of the first and second compound is administered to the patient.
In some embodiments, the disclosure provides a method of treating a hematologic malignancy in a patient in need thereof, comprising administering: a first compound selected from
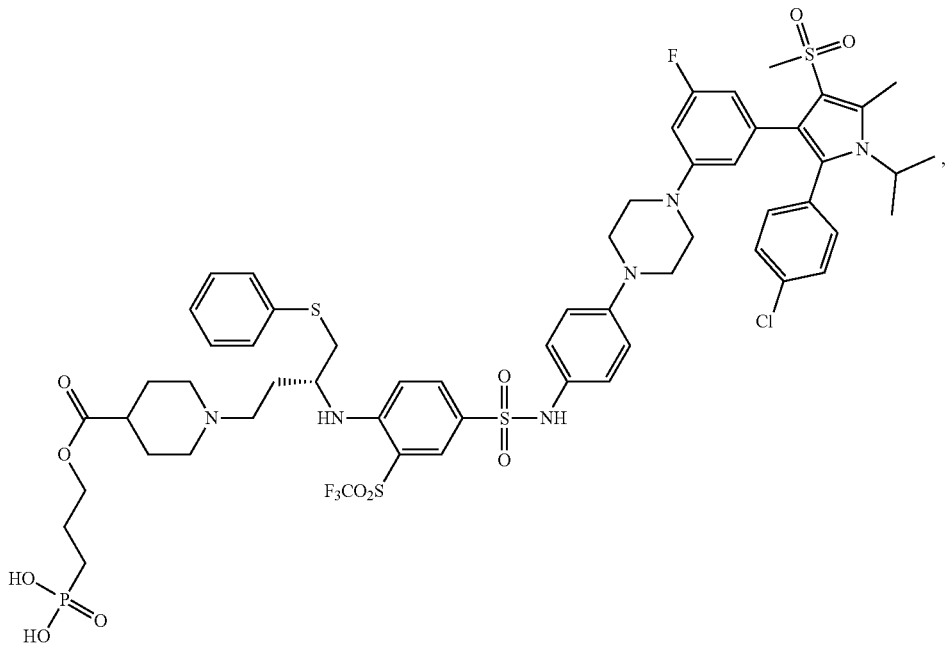

-continued

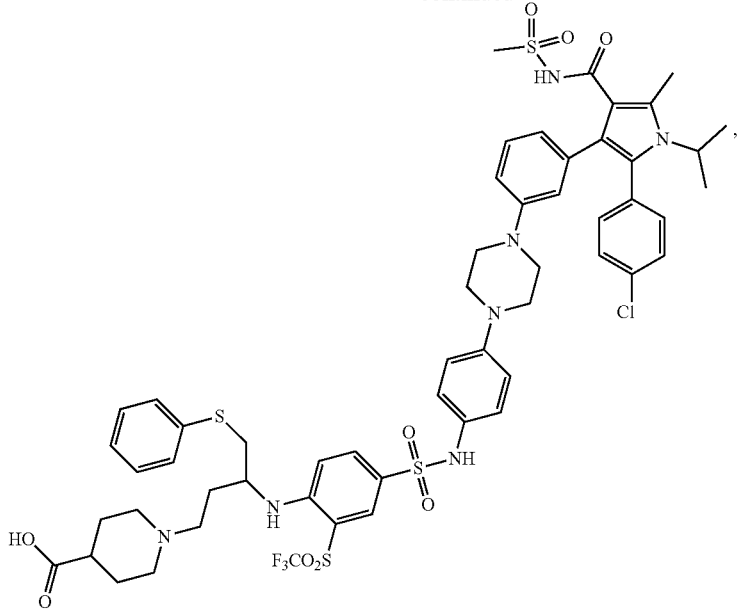

and
a pharmaceutically acceptable salt thereof; and a second compound represented by:

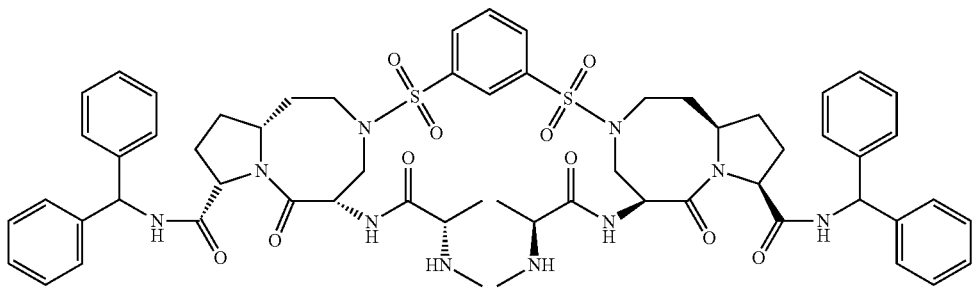

or pharmaceutically acceptable salt thereof;
where an effective amount of the first and second compound is administered to the patient.

In some embodiments, the hematologic malignancy is selected from the group consisting of chronic lymphocytic leukemia, acute myeloid leukemia, multiple myeloma, lymphoplasmacytic lymphoma, and non-Hodgkin's lymphoma.

In another aspect, the disclosure provides a method of treating a solid tumor cancer in a patient in need thereof, comprising administering: a first compound selected from a compound of formula (I), (II), or (III), a compound of formula (IV), and a pharmaceutically acceptable salt thereof, and a second compound represented by:

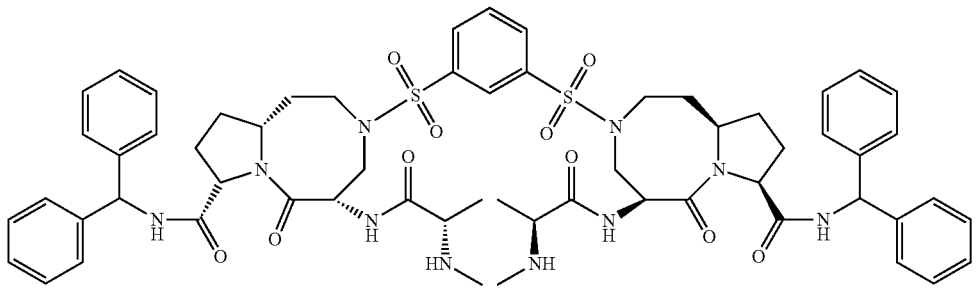

or pharmaceutically acceptable salt thereof;

where an effective amount of the first and second compound is administered to the patient.
In some embodiments, the disclosure provides a method of treating a solid tumor cancer in a patient in need thereof, comprising administering: a first compound selected from:
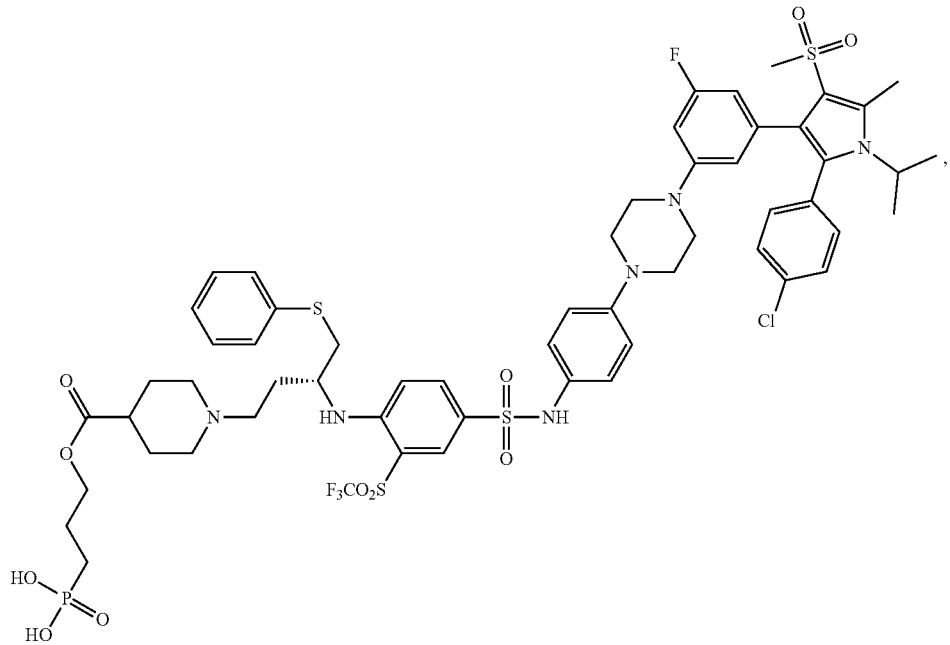
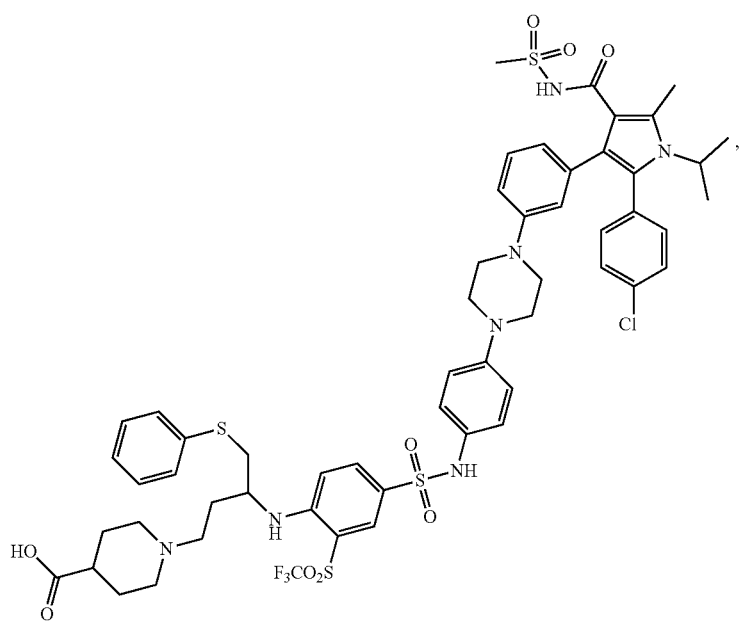
and
a pharmaceutically acceptable salt thereof; and a second compound represented by:

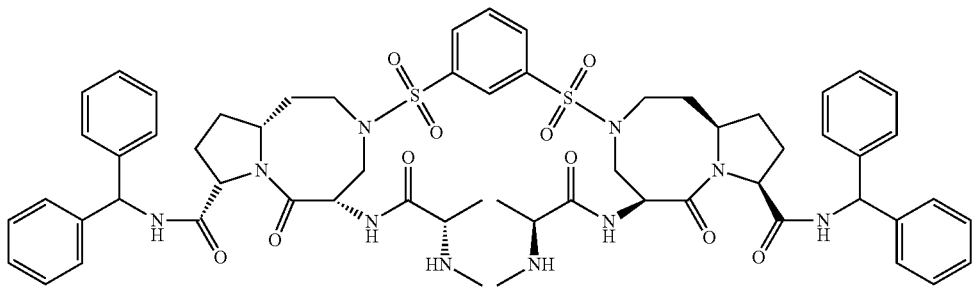

or pharmaceutically acceptable salt thereof;
where an effective amount of the first and second compound is administered to the patient.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is non-small cell lung cancer.

In another aspect, the disclosure provides a method of treating a hematologic malignancy in a patient in need thereof, comprising administering: a first compound selected from a compound of formula (I), (II), or (III), a compound of formula (IV), and a pharmaceutically acceptable salt thereof, and a second compound which is a JAK2 inhibitor; where an effective amount of the first and second compound is administered to the patient.

In some embodiments, the disclosure provides a method of treating a hematologic malignancy in a patient in need thereof, comprising administering: a first compound selected from

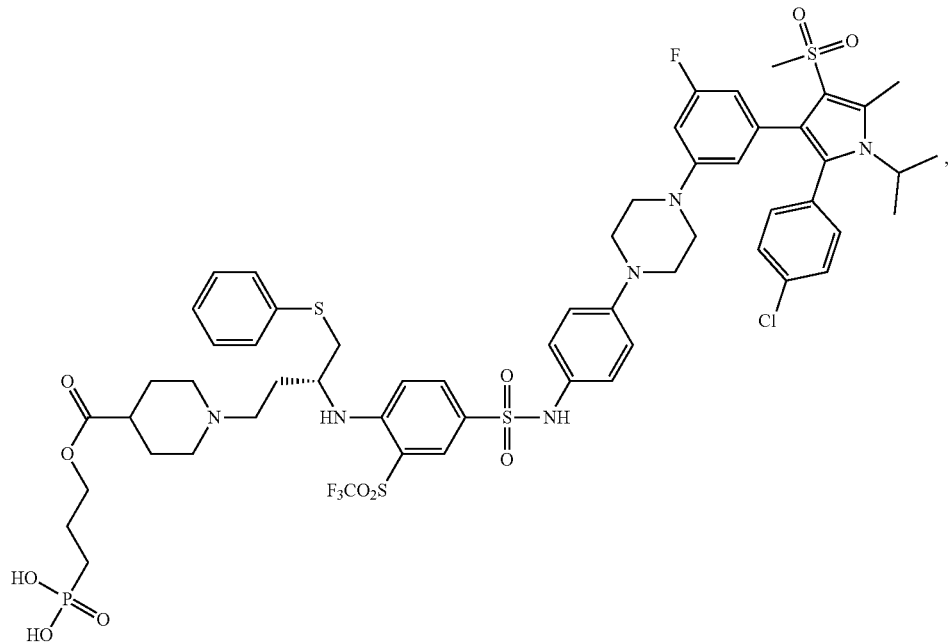

-continued

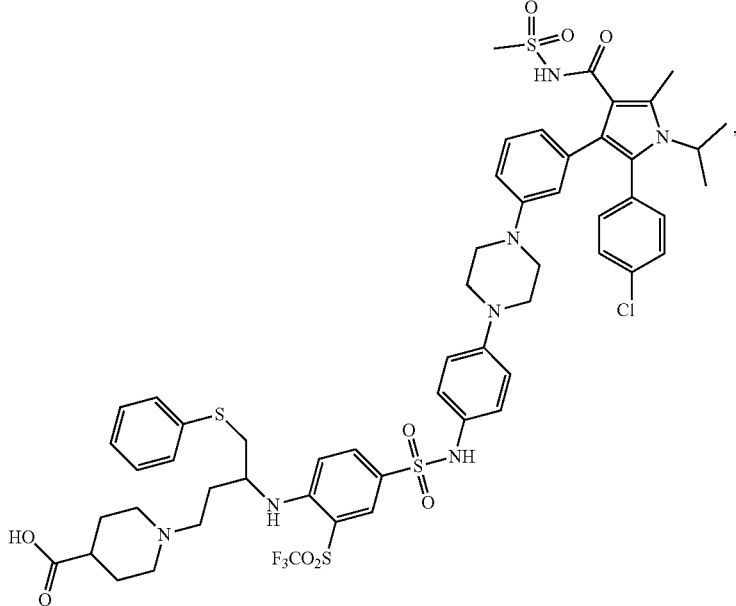

and a pharmaceutically acceptable salt thereof; and a second compound which is a JAK2 inhibitor;

where an effective amount of the first and second compound is administered to the patient.

In some embodiments, the JAK2 inhibitor is ruxolitinib.

In some embodiments, the hematologic malignancy is selected from the group consisting of chronic lymphocytic leukemia, acute myeloid leukemia, multiple myeloma, lymphoplasmacytic lymphoma, and non-Hodgkin's lymphoma. In some embodiments, the hematologic malignancy is JAK2 positive.

In another aspect, the disclosure provides a method of treating a solid tumor cancer in a patient in need thereof, comprising administering: a first compound selected from a compound of formula (I), (II), or (III), a compound of formula (IV), and a pharmaceutically acceptable salt thereof, and a second compound which is an EGFR inhibitor; where an effective amount of the first and second compound is administered to the patient.

In some embodiments, the disclosure provides a method of treating a solid tumor cancer in a patient in need thereof, comprising administering: a first compound selected from

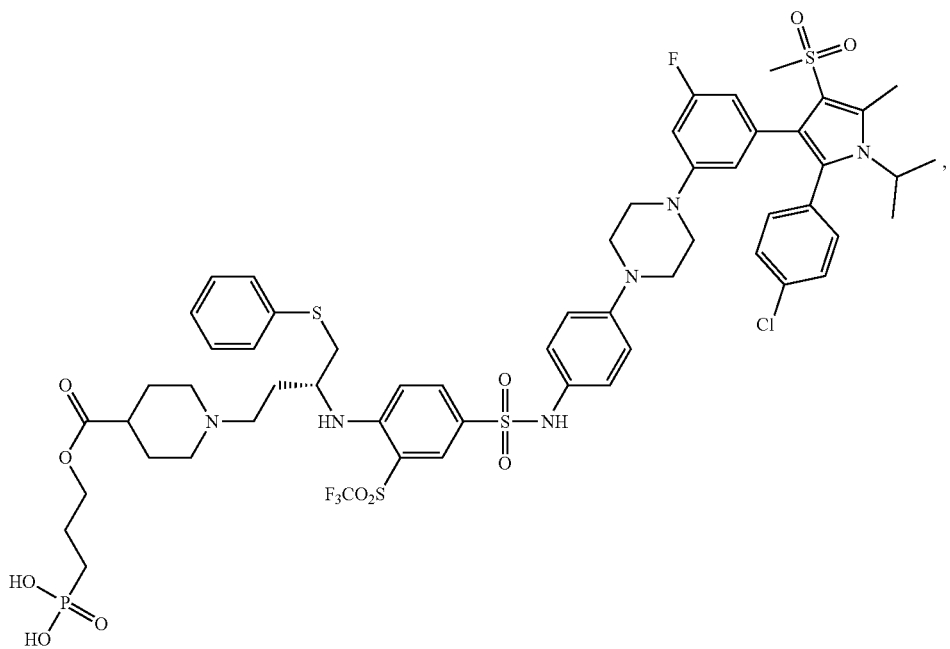

-continued

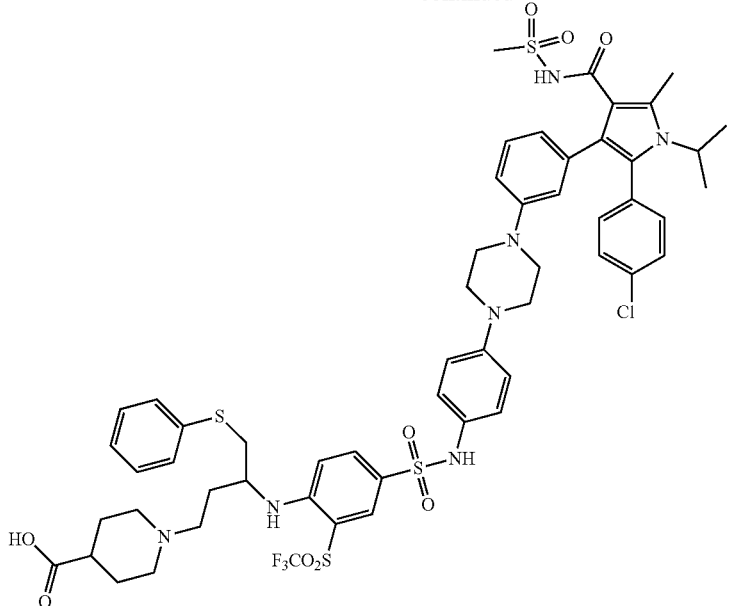

and
a pharmaceutically acceptable salt thereof; and a second compound which is an EGFR inhibitor;
where an effective amount of the first and second compound is administered to the patient.

In some embodiments, the EGFR inhibitor is AZD9291.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is non-small cell lung cancer.

In another aspect, the disclosure provides a method of treating a hematologic malignancy in a patient need thereof, comprising: administering to the patient a first compound of formula (V), or a pharmaceutically acceptable salt thereof, and administering to the patient a second compound selected from cytarabine and a hypomethylating agent.

In some embodiments, the disclosure provides a method of treating a hematologic malignancy in a patient need thereof, comprising: administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and administering to the patient a second compound selected from cytarabine and a hypomethylating agent.

In some embodiments, the hypomethylating agent is selected from azacytidine and decitabine.

In some embodiments, the hematologic malignancy is selected from the group consisting of chronic lymphocytic leukemia, acute myeloid leukemia, multiple myeloma, lymphoplasmacytic lymphoma, and non-Hodgkin's lymphoma. In some embodiments, the hematologic malignancy is acute myeloid leukemia.

In another aspect, the disclosure provides a method of treating a solid tumor cancer in a patient need thereof, comprising: administering to the patient a first compound of formula (V), or a pharmaceutically acceptable salt thereof, and administering to the patient a second compound which is a HER2 inhibitor.

In some embodiments, the disclosure provides a method of treating a solid tumor cancer in a patient need thereof, comprising: administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and administering to the patient a second compound which is a HER2 inhibitor.

In some embodiments, the HER2 inhibitor is lapatinib.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastric cancer, gastrointestinal carcinoid tumors, gastrointestinal stromal tumor (GIST), gestational trophoblastic disease, ovarian cancer, prostate cancer, non-small cell lung cancer, head and neck cancer, neuroblastoma, and squamous cell carcinoma cancer. In some embodiments, the solid tumor cancer is gastric cancer.

In yet another aspect, the disclosure provides a method of treating a solid tumor cancer in a patient need thereof, comprising: administering to the patient a first compound of formula (V), or a pharmaceutically acceptable salt thereof, and administering to the patient a second compound which is anti PD-1 antibody or anti PD-L1 antibody.

In some embodiments, the disclosure provides a method of treating a solid tumor cancer in a patient need thereof, comprising: administering to the patient a first compound represented by (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; and administering to the patient a second compound which is anti PD-1 antibody or anti PDL1 antibody.

In some embodiments, the second compound is anti PD-1 antibody.

In some embodiments, the method further comprises administration of a VEGF inhibitor. In some embodiments, the VEGF inhibitor is lenvatinib.

In some embodiments, the solid tumor cancer is selected from the group consisting of breast cancer, breast cancer in men, adrenal cortical cancer, advanced cancer, anal cancer, bile duct cancer, bladder cancer, bone cancer, bone metastasis, brain/CNS tumors in adults, brain/CNS tumors in children, cancer in children, cancer of unknown primary, cervical cancer, colon/rectum cancer, endometrial cancer, esophagus cancer, Ewing family of tumors, eye cancer, gallbladder cancer, gastric cancer, gastrointestinal carcinoid tumors, gastrointestinal stromal tumor (GIST), liver cancer, gestational trophoblastic disease, ovarian cancer, prostate cancer, non-small cell lung cancer, head and neck cancer, neuroblastoma, and squamous cell carcinoma cancer.

In some embodiments, the solid tumor cancer is colon cancer. In some embodiments, the solid tumor cancer is liver cancer.

In some embodiments wherein the first compound is a compound of formula (I), (II), (III), or (IV), the method comprises administering a dose weekly, twice weekly or daily of 40 mg, 80 mg, 160 mg, 240 mg or 240-500 mg of the first compound.

Dosing Regimen

In some embodiments, the method comprises administering a dose weekly, twice weekly or daily of 40 mg, 80 mg, 160 mg, 240 mg or 240-500 mg of the first compound.

In some embodiments, administering the first compound is by a daily step-wise dosing regimen. In some embodiments, administering the daily step-wise dosing regimen comprises: administering a first dose of 20 mg of the compound to the patient for one day; administering a second dose of 50 mg of the compound to the patient for one day, on the day after the first dose, and administering a third dose of 100 mg of the compound for one day, on the day after the second dose. In some embodiments, the method further comprises administering a fourth dose of 200 mg of the compound daily for 1 to 5 days or more. In some embodiments, the fourth dose is administered for one day. In some embodiments, the daily step-wise regimen further comprises administering a fifth dose of 400 mg after the fourth dose is administered. In some embodiments, the method further comprises administering a dose of 400 mg to 800 mg of the compound daily, after the third or fourth dose. In some embodiments, the method further comprises administering a daily dose of 400 mg, 600 mg or 800 mg of the compound for 1 week or more, or 1 month or more, after administering the daily step-wise dosing regimen. IN some embodiments, the compound is N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide. In some embodiments, the compound is (R)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide. In some embodiments, the (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide.

Also contemplated herein is a method of treating a hematologic malignancy or solid tumor cancer in a patient in need thereof, comprising: administering a daily step-wise dosing regimen of a compound N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt thereof; wherein administering the daily step-wise dosing regimen comprises administering a first dose of 20 mg to 100 mg of the compound to the patient for one day; administering a second dose of 50 mg to 200 mg of the compound to the patient for one day, on the day after the first dose. In some embodiments, the daily step-wise dosing regimen further comprises administering a third dose of 100 to 400 mg of the compound to the patient for one day, on the day after the second dose. In some embodiments, the daily step-wise dosing regimen further comprises administering a fourth dose of 200 mg to 800 mg of the compound for one to seven days after the third dose. In some embodiments, the method further comprises administering to the patient, after the daily step-wise dosing regimen, about 400 mg to 800 mg of the compound daily for 1 week or more. In some embodiments, the patient, during or after administration of the daily step-wise dosing regimen, has a reduced risk of tumor lysis syndrome. In some embodiments, the hematologic malignancy is selected from the group consisting of chronic lymphocytic leukemia, acute myeloid leukemia, multiple myeloma, lymphoplasmacytic lymphoma, and non-Hodgkin's lymphoma. In some embodiments, the patient has primary refractory acute myeloid leukemia. In some embodiments, the patient has relapsed after a previous hematologic malignancy therapy. In some embodiments, the patient has received at least one prior therapy for the hematologic malignancy. In some embodiments, the method further comprises administering rituximab to the patient before, during or after the daily step-wise dosing regimen. In some embodiments, the method further comprises administering azacytidine, decitabine or low-dose cytarabine to the patient before, during or after the daily step-wise dosing regimen. In some embodiments, the method further comprises administering a second anti-cancer agent to the patient before, during or after the daily step-wise dosing regimen. In some embodiments, the compound is (R)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide. In some embodiments, the (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide.

In another embodiment, described herein is a method of treating a hematologic malignancy or solid tumor cancer in a patient in need thereof, wherein the patient is also being administered a CYP2C8 (and/or another drug that may cause a drug/drug interaction, such as a CYP3A4 inhibitor, or a food such as grapefruit juice) comprising administering an effective amount of a compound N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide or a pharmaceutically acceptable salt to the patient, wherein the effective amount for the patient taking the CYP2C8 inhibitor is about 60% or less, about 50% or less, about 40% or less, or about 20% or less, than an effective amount for a patient who is not being administered a CYP2C8 inhibitor (or, in certain embodiments other drugs or foods such as grapefruit juice, or a CYP3A4 inhibitor). In some embodiments, the effective amount for the patient taking the CYP2C8 inhibitor is about 20 mg to about 100 mg daily of the compound. In some embodiments, the effective amount for the patient taking the CYP2C8 inhibitor is about 10 mg, 20 mg, 30 mg, 40 mg, 50 mg, 100 mg or 200 mg per day. In some embodiments, the method comprises administering the effective amount for the patient taking the CYP2C8 inhibitor after administering the compound by an initial daily or weekly step-wise dosing regimen. In some embodiments, the CYP2C8 inhibitor is a strong CYP2C8 inhibitor. In some embodiments, the CYP2C8 inhibitor is selected from the group consisting of gemfibrozil, trimethoprim, thiazolidediones, montelukast, and quercetin. In some embodiments, the compound is (R)—N-((4-(((1,4-dioxan-2-yl)methyl) amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide. In some embodiments, the (S)—N-((4-(((1,4-dioxan-2-yl)methyl) amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide. In some embodiments, the method further comprises administering a second anti-cancer agent to the patient before, during or after the administering of a CYP2C8 (and/or another drug that may cause a drug/drug interaction, such as a CYP3A4 inhibitor, or a food such as grapefruit juice).

DEFINITIONS

For convenience, certain terms used in the specification, examples, and appended claims are collected here.

The phrase "combination therapy," as used herein, refers to co-administering Bcl-2 inhibitor and at least one other anti-cancer agent, for example, where the other anti-cancer agent is an FTL3 inhibitor or a CDK4/6 inhibitor, as part of a specific treatment regimen intended to provide the beneficial effect from the co-action of these therapeutic agents. The beneficial effect of the combination includes, but is not limited to, pharmacokinetic or pharmacodynamic co-action resulting from the combination of therapeutic agents. Administration of these therapeutic agents in combination typically is carried out over a defined time period (usually weeks, months or years depending upon the combination selected). Combination therapy is intended to embrace administration of multiple therapeutic agents in a sequential manner, that is, wherein each therapeutic agent is administered at a different time, as well as administration of these therapeutic agents, or at least two of the therapeutic agents, in a substantially simultaneous manner. Substantially simultaneous administration can be accomplished, for example, by administering to the subject a single tablet or capsule having a fixed ratio of each therapeutic agent or in multiple, single capsules for each of the therapeutic agents. Sequential or substantially simultaneous administration of each therapeutic agent can be effected by any appropriate route including, but not limited to, oral routes, intravenous routes, intramuscular routes, and direct absorption through mucous membrane tissues. The therapeutic agents can be administered by the same route or by different routes. For example, a first therapeutic agent of the combination selected may be administered by intravenous injection while the other therapeutic agents of the combination may be administered orally. Alternatively, for example, all therapeutic agents may be administered orally or all therapeutic agents may be administered by intravenous injection.

Combination therapy also can embrace the administration of the therapeutic agents as described above in further combination with other biologically active ingredients and non-drug therapies. Where the combination therapy further comprises a non-drug treatment, the non-drug treatment may be conducted at any suitable time so long as a beneficial effect from the co-action of the combination of the therapeutic agents and non-drug treatment is achieved. For example, in appropriate cases, the beneficial effect is still achieved when the non-drug treatment is temporally removed from the administration of the therapeutic agents, perhaps by days or even weeks.

The components of the combination may be administered to a patient simultaneously or sequentially. It will be appreciated that the components may be present in the same pharmaceutically acceptable carrier and, therefore, are administered simultaneously. Alternatively, the active ingredients may be present in separate pharmaceutical carriers, such as, conventional oral dosage forms, that can be administered either simultaneously or sequentially.

It is contemplated that the combination of active ingredients will not only provide a greater degree of goal attainment, but it will also permit the goals to be achieved at lower dosages of the individual active ingredients thereby reducing the incidence and/or severity of dose-related adverse events associated with the individual active ingredients. It is contemplated that, for example, inhibition of cell growth of cancer cells by using, for example, a Bcl2 inhibitor in combination with an FTL3 inhibitor be superior to use of either agent alone. In some cases, use of a combination provides effects that are synergistic, i.e. more than the effect expected from simple addition of the effects of the individual drugs.

For example, the compositions can be used to reduce the growth of cancer cells to meet a clinical end-point but with fewer or reduced adverse events than (i) when the Bcl2 inhibitor is administered alone in a monotherapy at a dosage sufficient to achieve or substantially achieve (for example, within 10%) the clinical end-point or (ii) when the Bcl2 inhibitor is administered together with another anti-cancer agent, where the Bcl2 inhibitor and the other anti-cancer agent are administered at dosages sufficient to achieve or substantially achieve the clinical end-point An "effective amount" includes the amount of the subject compound that will elicit the biological or medical response of a tissue, system, animal or human that is being sought by the researcher, veterinarian, medical doctor or other clinician. A compound described herein, e.g., Compound A, is administered in effective amounts to treat a condition, e.g., a hematologic malignancy. Alternatively, an effective amount of a compound is the quantity required to achieve a desired therapeutic and/or prophylactic effect, such as an amount which results in the prevention of or a decrease in the symptoms associated with the condition.

"Individual," "patient," or "subject" are used interchangeably herein and include any animal, including mammals, including mice, rats, other rodents, rabbits, dogs, cats, swine, cattle, sheep, horses, or primates, and humans. The compounds described herein can be administered to a mammal, such as a human, but can also be administered to other mammals such as an animal in need of veterinary treatment, e.g., domestic animals (e.g., dogs, cats, and the like), farm animals (e.g., cows, sheep, pigs, horses, and the like) and laboratory animals (e.g., rats, mice, guinea pigs, and the like). The mammal treated in the methods described herein is desirably a mammal in which treatment of a disorder described herein is desired, such as a human.

The term "pharmaceutically acceptable salt(s)" as used herein refers to salts of acidic or basic groups that may be present in compounds used in the compositions. Compounds included in the present compositions that are basic in nature are capable of forming a wide variety of salts with various inorganic and organic acids. The acids that may be used to prepare pharmaceutically acceptable acid addition salts of such basic compounds are those that form non-toxic acid addition salts, i.e., salts containing pharmacologically acceptable anions, including, but not limited to, malate, oxalate, chloride, bromide, iodide, nitrate, sulfate, bisulfate, phosphate, acid phosphate, isonicotinate, acetate, lactate, salicylate, citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate and pamoate (i.e., 1,1'-methylene-bis-(2-hydroxy-3-naphthoate)) salts.

As used herein, "treating" includes any effect, e.g., lessening, reducing, modulating, or eliminating, that results in the improvement of the condition, disease, disorder and the like.

A compound described herein, e.g., Compound A or pharmaceutically acceptable salt thereof, can be formulated as a pharmaceutical composition using a pharmaceutically acceptable carrier and administered by a variety of routes. In some embodiments, such compositions are for oral administration. In some embodiments, such compositions are for parenteral (by injection) administration. In some embodiments, such compositions are for transdermal administration. In some embodiments, such compositions are for intravenous (IV) administration. In some embodiments, such compositions are for intramuscular (IM) administration. Such pharmaceutical compositions and processes for preparing them are well known in the art. See, e.g., REMINGTON: THE SCIENCE AND PRACTICE OF PHARMACY (A. Gennaro, et al., eds., 19$^{th}$ ed., Mack Publishing Co., 1995).

EXAMPLES

The compounds described herein can be prepared in a number of ways based on the teachings contained herein and synthetic procedures known in the art. It is to be understood that all proposed reaction conditions, including choice of solvent, reaction atmosphere, reaction temperature, duration of the experiment and workup procedures, can be chosen to be the conditions standard for that reaction, unless otherwise indicated. It is understood by one skilled in the art of organic synthesis that the functionality present on various portions of the molecule should be compatible with the reagents and reactions proposed. Substituents not compatible with the reaction conditions will be apparent to one skilled in the art, and alternate methods are therefore indicated. The starting materials for the examples are either commercially available or are readily prepared by standard methods from known materials.

N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide, (R)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1-yl)benzamide, and Compound A can be synthesized in accordance with the synthetic methods described in WO 2018/027097, which is incorporated herein by reference.

| ABBREVIATIONS AND SPECIALIST TERMS | |
|---|---|
| Mean ± SD | Mean ± standard deviation |
| Mean ± SEM | Mean ± Standard error mean |
| MDSC | Myeloid-derived suppressor cell |
| mg/kg | Milligram per kilogram |
| MSD | Meso Scale Discovery |
| n | Number |
| PK | Pharmacokinetic/Pharmacokinetics |
| PO or p.o. | Oral administration |
| i.p. | Intraperitoneal injection |
| i.v. | Intravenous injection |
| PBS | Phosphate buffer saline |
| PR | Partial (tumor) regression (i.e., tumor volumes become smaller compared to before treatment) |
| PD-1 | programmed death 1 |
| PD-L1 | programmed death-ligand 1 |
| qd | Once a day or once per day |
| q2d | Once every two days |
| QOD | Every other day |
| QW | Once a week |
| BIW | Twice weekly |
| BID | Twice a day |
| Response rate | % of responsive animals in each treatment group, including CR, PR and SD |
| RTV | Relative Tumor Volume (RTV = $V_t/V_1$; $V_1$ and $V_t$ are the average tumor volumes on the first day of treatment (day 1) and the average tumor volumes on a certain time point (day T) |
| SD | Stable disease |
| SEM | Standard error of mean |
| SPF | Specific-pathogen-free |
| SPSS | Statistical Product and Service Solutions |
| Synergy score/ratio | Synergy score = ((A/C) × (B/C))/(AB/C); A = response to treatment A; B = response to treatment B; C = response to vehicle control; AB = combination of treatment A and B. |
| T/C (%) | T/C (%) = ($T_{RTV}/C_{RTV}$) × 100%; $T_{RTV}$ is RTV of the treatment group and $C_{RTV}$ is RTV of the control group. |
| TIL | Tumor infiltrating lymphocyte |
| TV | Tumor volume |
| W, WK or wk | Week |

Examples

TABLE 1

| Materials/Reagents | | | |
|---|---|---|---|
| Model | Indication | Source | Culture Conditions |
| MV-4-11 | AML | Cobio | IMDM + 10% FBS (Gibco) + P/S 1% |
| ML-2 | AML | Cobio | RPMI 1640 medium; fetal bovine serum, 10%; P/S, 1% |

TABLE 1-continued

Materials/Reagents

| Model | Indication | Source | Culture Conditions |
|---|---|---|---|
| MOLM-13 Luc | AML | WUXI | WUXI app outsourcing project |
| MOLT-4 | ALL | CCTCC | The base medium for this cell line is ATCC-formulated RPMI-1640 Medium, ATCC 30-2001. To make the complete growth medium, add the following components to the base medium: fetal bovine serum (ATCC 30-2020) to a final concentration of 10%. |
| NCI-H1993 | NSCLC | Cobio | RPMI 1640 medium, add 4.5 g/L glucose, 10 mM HEPES, and 1.0 mM sodium pyruvate; fetal bovine serum, 10%; P/S, 1% |
| NCI-H2170 | NSCLC | Cobio | RPMI 1640 medium; fetal bovine serum, 10%; P/S, 1% |
| NCI-H69 | SCLC | Cobio | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; P/S 1% |
| NCI-H1688 | SCLC | SIBCB | RPMI 1640 medium; fetal bovine serum, 10%; P/S, 1% |
| NCI-H446 | SCLC | SIBCB | RPMI 1640 medium with 300 mg/L(2 mM)L-glutamine adjusted to contain 2.0 g/L sodium bicarbonate, 90%; fetal bovine serum, 10%; 1 P/S |
| MCF-7 | ER+ Breast cancer | Cobio | Minimum essential medium (Eagle) with 292 mg/L(2 mM) L-glutamine and Earle's BSS adjusted to contain 2.2 g/L sodium bicarbonate, 0.1 mM non-essential amino acids, and 1.0 mM sodium pyruvate, 90%; fetal bovine serum, 10%; P/S 1% |
| NCI-H526 | SCLC | Cobio | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; P/S 1% |
| Z138 | MCL | ATCC | Iscove's modified Dulbecco's medium with 4 mM L-glutamine adjusted to contain 1.5 g/L sodium bicarbonate, 90%; horse serum, 10% |
| MDA-MB-468 | Breast cancer | Cobio | RPMI 1640 medium with 300 mg/L(2 mM)L-glutamine adjusted to contain 2.0 g/L sodium bicarbonate, 90%; fetal bovine serum, 10%; P/S 1% |
| 2LMP | Breast cancer | Cobio | RPMI 1640 medium with 300 mg/L(2 mM)L-glutamine adjusted to contain 2.0 g/L sodium bicarbonate, 90%; fetal bovine serum, 10%; P/S 1% |
| KMS26 | MM | Cobio | RPMI 1640 medium with 300 mg/L(2 mM)L-glutamine adjusted to contain 2.0 g/L sodium bicarbonate, 90%; fetal bovine serum, 10%; 1 P/S |
| NCI-H929 | MM | Cobio | RPMI 1640 medium with 300 mg/L(2 mM)L-glutamine adjusted to contain 2.0 g/L sodium bicarbonate, 90%; fetal bovine serum, 10%; P/S 1%; 0.05 mM β-mercaptoethanol |
| RS4; 11 | ALL | Cobio | RPMI 1640 medium with 300 mg/L(2 mM)L-glutamine adjusted to contain 2.0 g/L sodium bicarbonate, 90%; fetal bovine serum, 10%; 1 P/S |
| RS4; 11$^{R-ABT-199}$ | ALL | Induced by Ascentage Pharma | RPMI 1640 medium with 300 mg/L(2 mM)L-glutamine adjusted to contain 2.0 g/L sodium bicarbonate, 90%; fetal bovine serum, 10%; 1 P/S; verapamil 5 μg/ml; ABT-199 1.01 μM |
| NCI-H146 | SCLC | Cobio | RPMI 1640 medium with 300 mg/L(2 mM)L-glutamine adjusted to contain 2.0 g/L sodium bicarbonate, 90%; fetal bovine serum, 10%; 1 P/S |
| DMS114 | SCLC | Cobio | Waymouth's MB 752/1 medium, 90%; fetal bovine serum, 10%; P/S 1%. |
| A549 | NSCLC | Cobio | RPMI 1640 medium with 300 mg/L(2 mM)L-glutamine adjusted to contain 2.0 g/L sodium bicarbonate, 90%; fetal bovine serum, 10%; 1 P/S |
| NCI-H1975 | NSCLC | ATCC | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate; fetal bovine serum, 10%; P/S 1% |
| NCI-H1650 | NSCLC | ATCC | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; 1 P/S |

TABLE 1-continued

Materials/Reagents

| Model | Indication | Source | Culture Conditions |
|---|---|---|---|
| CL-MM-001 | MM | Cureline | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; 1 P/S; 3 ng/ml IL-6 |
| CL-MM-002 | MM | Cureline | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; 1 P/S; 3 ng/ml IL-6 |
| CL-MM-003 | MM | Cureline | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; 1 P/S; 3 ng/ml IL-6 |
| CL-MM-004 | MM | Cureline | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; 1 P/S; 3 ng/ml IL-6 |
| CL-MM-005 | MM | Cureline | RPMI 1640 medium with 300 mg/L(2 mM)L-glutamine adjusted to contain 1.5 g/L sodium bicarbonate, 4.5 g/L glucose, 10 mM HEPES, and 1.0 mM sodium pyruvate, 90%; fetal bovine serum, 10%; 1 P/S; 3 ng/ml IL-6 |
| LD2-6026-200614 (PDX) | CD20-Resistant DLBCL | LIDE, outsourcing project | |

Example 1: Study Methods

WST Experiment

Cell plating: Anti-proliferative effects were detected by a CCK-8 (Cell Counting Kit-8) assay based on water soluble tetrazolium salt (WST). The cells were seeded in 96-well plates, and only 95 µL of complete medium was added to each negative control group. 95 µL of complete medium cell suspension was added to each well to be tested, and the cell density was $(5-10) \times 10^4$/hole.

Dosing (protection from light): In 96-well culture plates, according to the sensitivity of different cells to different drugs, the highest concentration was selected as 10 µM, and 9 concentrations were obtained by serial dilution in a ratio of 1:3. 5 µL of compound was added to each well and 2-3 replicate wells were made for per concentration. After the compound was added, 96-well plates were incubated in a 5% C02 incubator at 37° C. After 72 hours of action by using 9 different concentrations of the drug with 3 fixed doses of Compound 5, the combination effect of Compound 5 and the drug was tested.

Reading: At the end of the culture, the old solution was removed from the well to be tested, and 100 µl/well CCK-8 test solution (containing 10% CCK-8, 5% FBS in the corresponding medium) was added. The plates were continuously incubated at 37° C. for 2-4 hours in a $CO_2$ incubator.

The OD values were measured using a microplate reader (SpectraMax Plus 384, Molecular Devices, LLC., US) under A450 nm. Using the average OD value of 3 replicate wells, the percentage of cell viability was calculated by the following formula:

(O.D. of test well−O.D. of blank control well)/(O.D. of cell control well−O.D. of blank control well)×100%.

For combination experiments, cell viability was calculated by normalization of the mean OD values of 3 replicate wells of single drug control. The comparison of the IC50 values obtained from the curves of combined drugs of administration and single drug of administration shows that the two compounds achieved synergistic effect (the curve of the combined drugs of administration shifted to the left).

Cell Viability Assays

Cell viability was determined using CellTiter-Glo® luminescent cell viability assay (Promega) or WST assay (Cell counting Kit-8, Shanghai life iLab, China) by following manufacturer's instruction. Cell viability was calculated as cell viability=(mean RLU sample−mean RLU blank)/(RLU cell control−RLU blank)×100. $IC_{50}$ value was calculated using GraphPad Prism. Combination index (CI) value was calculated by CalcuSyn software (BIOSOFT, UK). CI<0.9 indicate a synergistic combination effect. CI<0.1 scored as 5+ indicates very strong synergistic combination effect, CI between 0.1 and 0.3 scored as 4+ indicates strong synergistic combination effect, CI between 0.3 and 0.7 scored as 3+ indicates medium synergistic combination effect.

Caspase-Glo® 3/7 Assay

Activation of caspase 3/7 during apoptosis included by the treatment with drugs or their combinations was quantitatively assessed by the Caspase-Glo® 3/7 Assay kit (Promega). The procedures of cell seeding and drug dilutions were the same to the above section 3.1. Cells in 96-well plate were treated with drugs or their combination as indicated for 72 hours and then equilibrated to room temperature for 30 minutes. Thirty µL of Caspase-Glo® 3/7 reagent that requires protection from light was added to each well, thoroughly mixed to produce cell lysis. The 96-well plate was kept at room temperature for another 30 minutes to stabilize the luminescent signal. Luminescence signals were detected using a Biotek synergy H1 microplate reader. Caspase 3/7 activation curves were plotted using Graphpad Prism 6.0 software 4.

Flow Cytometry Analysis-Apoptosis Measurement

Apoptosis was detected using an Annexin V-PI (propidium iodide) staining kit. Briefly, cells were harvested 24-72 hours after the treatment and washed with PBS. Cells were then stained with Annexin-V and PI, analyzed by an Attune N×T flow cytometer following manufacturer's instruction. Apoptosis data were obtained by analyzing 20,000 cells from each experimental condition. Apoptotic primary AML cells were detected by Annexin V-PI staining in CD45+CD33+ cell population. The data were analyzed by the FlowJo software.

Evaluation Method for In Vivo Pharmacodynamic Experiment

A subcutaneous xenograft tumor model of human tumor immunodeficient mice was established by cell inoculation: tumor cells in logarithmic growth phase were collected, counted, resuspended in 1×PBS, and the cell suspension concentration was adjusted to $2.5-5 \times 10^7$/mL. The tumor cells were inoculated subcutaneously in the right side of immunodeficient mice with a 1 mL syringe (4 gauge needle), $5-10 \times 10^6$/0.2 mL/mouse. All animal experiments were strictly in accordance with the specifications for the use and management of experimental animals in GenePharma Co., Ltd. and Suzhou Ascentage Pharma Co., Ltd. The calculation of relevant parameters refers to the Chinese NMPA "Guidelines for Non-Clinical Research Techniques of Cytotoxic Anti-tumor Drugs".

Animal body weight and tumor size were measured twice weekly during the experiment. The state of the animal and the presence or absence of death were observed every day. The growth of tumor and the effects of treatment on normal behavior of animals were monitored routinely, specifically involving experimental animal activity, feeding and drinking, weight gain or loss, eyes, clothing hair and other abnormalities. The deaths and clinical symptoms observed during the experiment were recorded in the raw data. All operations for administration and measurement of mouse body weight and tumor volume were performed in a clean bench. According to the requirements of the experimental protocol, after the end of the last administration, plasma and tumor tissues were collected, weighed and photographed. The plasma and tumor samples were frozen at −80° C. for ready-to-use.

Tumor volume (TV) is calculated as: TV=a×b²/2, wherein a and b represent the length and width of the tumor to be measured, respectively.

The relative tumor volume (RTV) is calculated as: $RTV = V_t/V_1$, wherein $V_1$ is the tumor volume at the start of grouping and administration, and $V_t$ is the tumor volume measured on the t day after administration.

The evaluation index of anti-tumor activity is the relative tumor proliferation rate T/C (%), and the calculation formula thereof is: relative tumor proliferation rate T/C (%)=($T_{RTV}$/$C_{RTV}$)×100%, $T_{RTV}$ is the RTV of treatment group, $C_{RTV}$ is the RTV of solvent control group.

Tumor regression rate (%) is calculated as: the number of tumor-bearing mice which exhibit SD (stable disease), PR (partial regression) and CR (complete regression) after treatment/the total number of the mice in this group×100%.

Change of body weight (%)=(measured body weight−body weight at the start of grouping)/body weight at the start of grouping×100%.

Evaluation criteria for therapeutic efficiency: According to the Chinese NMPA "Guidelines for Non-Clinical Research Techniques of Cytotoxic Anti-tumor Drugs" (November 2006), when T/C (%) value is ≤40% and statistical analysis shows p<0.05, efficiency is confirmed. A dose of drug is considered to be severely toxic if the body weight of mouse is reduced by more than 20% or the number of drug-related deaths exceeds 20%.

According to the description by Clarke R., Issues in experimental design and endpoint analysis in the study of experimental cytotoxic agents in vivo in breast cancer and other models [J]. *Breast Cancer Research & Treatment*, 1997, 46(2-3): 255-278, synergy analysis was evaluated using the following formula: synergy factor=((A/C)×(B/C))/(AB/C); A=RTV value of drug A alone group; B=RTV value of drug B alone group; C=RTV value of the solvent control group, and AB=RTV value of the A and B combination group. Synergistic factor >1 indicates that synergy is achieved; synergy factor=1 indicates that additive effect is achieved; and synergy factor <1 indicates that antagonistic effect is achieved.

Use of mRECIST (Gao et al., 2015) measured tumor responses included stable disease (SD), partial tumor regression (PR), and complete regression (CR), determined by comparing tumor volume change at day t to its baseline: tumor volume change (%)=($V_t$−V1/V1). The BestResponse was the minimum value of tumor volume change (%) for t≥10. For each time t, the average of tumor volume changes from t=1 to t was also calculated. BestAvgResponse was defined as the minimum value of this average for t≥10. The criteria for response (mRECIST) were adapted from RECIST criteria (Gao et al., 2015; Therasse et al., 2000) and defined as follows: mCR, BestResponse <−95% and BestAvg Response <−40%; mPR, BestResponse <−50% and BestAvgResponse <−20%; mSD, BestResponse <35% and BestAvgResponse <30%; mPD, not otherwise categorized. SD, PR, and CR were considered responders and used to calculate response rate (%). Body weight of animals were monitored simultaneously. The change in body weight was calculated based on the animal weight of the first day of dosing (day 1). Tumor volume and changes in body weight (%) were represented as the mean±standard error of the mean (SEM).

Figure 1:
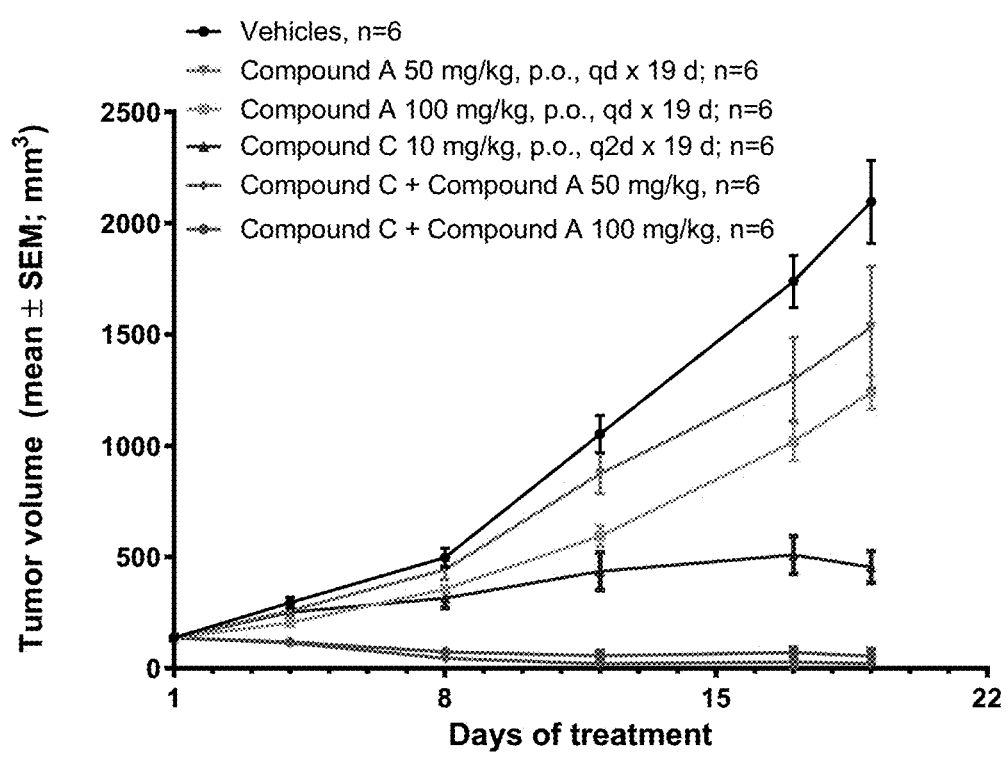
FIG. 1 depicts a line graph of tumor size over time illustrating that a combination of Compound A and Compound C achieved synergistic antitumor effect in s.c. MV-4-11 AML xenografts.

Example 2: Combination of Compound A and Compound C Achieved Synergistic Antitumor Effect in s.c. MV-4-11 AML Xenograft As shown in FIG. 1, single agents showed moderate antitumor activity. Combination treatment significantly enhances tumor repression.

Figure 2:
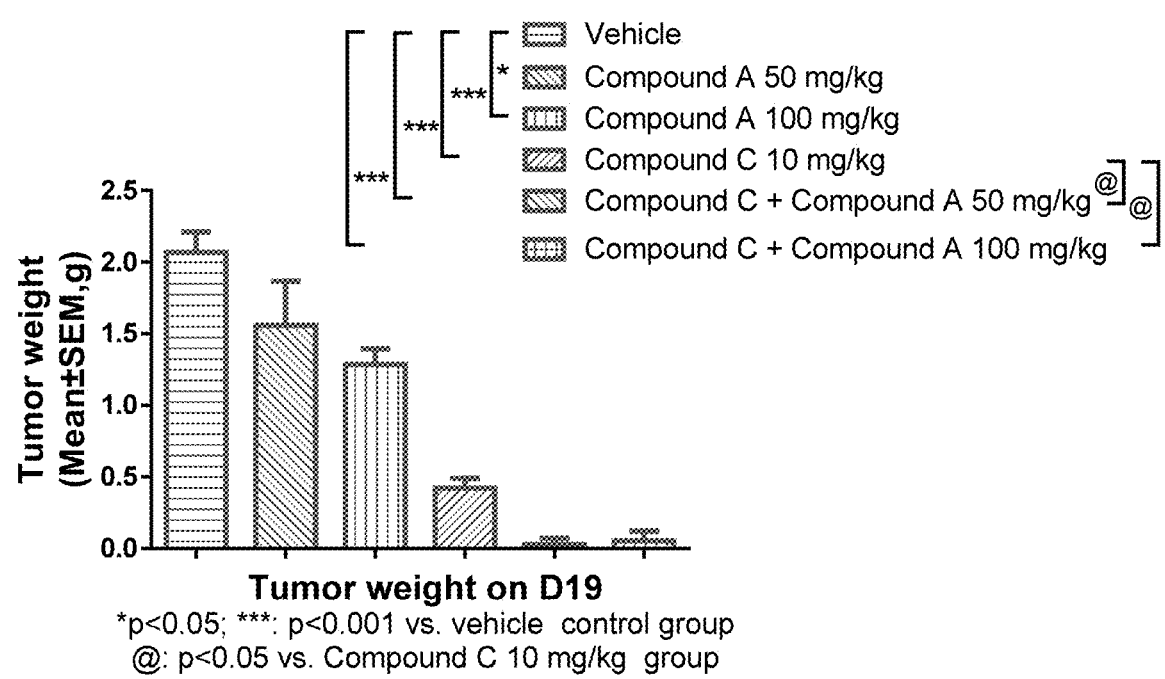
FIG. 2 depicts a bar graph illustrating that a combination of Compound A and Compound C achieved synergistic antitumor effect in s.c. MV-4-11 AML xenografts.

As shown in FIG. 2, on D19 of treatment, tumor weights from the combination treatment groups are significantly smaller than single agent groups.

TABLE 2

| Treatment | RTV@D 19 | T/C(%)@D 19 | Synergy @ D 19 | mRECIST_best | mRECIST_last |
|---|---|---|---|---|---|
| Vehicles | 15.6 ± 1.8 | — | — | 6/6 PD | 6/6 PD |
| Compound A 50 mg/kg | 10.8 ± 1.2 | 69.6 | — | 6/6 PD | 6/6 PD |
| Compound A 100 mg/kg | 9.2 ± 0.8 | 59.0 | — | 6/6 PD | 6/6 PD |

TABLE 2-continued

| Treatment | RTV@D 19 | T/C(%)@D 19 | Synergy @ D 19 | mRECIST_best | mRECIST_last |
|---|---|---|---|---|---|
| Compound C 10 mg/kg | 3.4 ± 0.6** | 22.0 | — | 6/6 PD | 6/6 PD |
| Compound C + Compound A 50 mg/kg | 0.1 ± 0.1**\*##@ | 0.9 | 17.6 | 4/6 CR, 2/6 PR | 4/6 CR, 1/6 PR, 1/6 SD |
| Compound C + Compound A 100 mg/kg | 0.4 ± 0.3**\*$$$@ | 2.8 | 4.0 | 3/6 CR, 1/6 PR, 2/6 SD | 3/6 CR, 1/6 PR, 1/6 SD, 1/6 PD |

*: $p < 0.05$,
**$p < 0.01$,
***: $p < 0.001$ vs. vehicle control group;
$p < 0.01$ vs. Compound A 50 mg/kg group;
$$$$p < 0.001$ vs. Compound A 100 mg/kg group;
@$p < 0.05$ vs. Compound C 10 mg/kg group;
Ratio > 1, Synergistic;
Ratio = 1, Additive;
Ratio < 1, Antagonistic Combination treatment achieved T/C of 0.9 in 50 mg/kg Compound A+Compound C group; T/C of 2.8 in 100 mg/kg Compound A+Compound C group on D19 of treatment (Table 2).

The synergy score was 17.6 and 4.0 respectively, indicating strong synergistic effects (Table 2)

Animals from 50 mg/kg Compound A+Compound C group achieved 2/6 PR, 4/6 CR, ORR=100% (Table 2). Animals from 100 mg/kg Compound A+Compound C group achieved 1/6 PR, 3/6 CR, ORR=66.7% (Table 2)

Statistics: *P<0.05, P<0.01, *P<0.001 vs. vehicle control group; ##P<0.01 vs. Compound A 50 mg/kg group; $$$P<0.001 vs. Compound A 100 mg/kg group; @P<0.05 vs. Compound C 10 mg/kg group; Ratio>1, Synergistic; Ratio=1, Additive; Ratio<1, Antagonistic Conclusion:

Combination of Compound A and Compound C achieved synergistic antitumor effect in s.c. MV-4-11 AML xenograft. ORR increased from 0% to 100% (Compound C+Compound A-50 mg/kg) or 67.7% (Compound C+Compound A-100 mg/kg).

Example 3: Combination of Compound A and Compound C Extend Survival of MV-4-11 AML Xenograft

TABLE 3

| | Vehicle | Compound A@50 mpk | Compound A@100 mpk | Compound C@10 mpk | Compound C 10 mpk + Compound A 50 mpk | Compound C 10 mpk + Compound A 100 mpk |
|---|---|---|---|---|---|---|
| Median survival time (day) | 32 | 36 | 36 | 45 | 45 | 49 |
| Survival prolongation | — | 4 | 4 | 13 | 13 | 17 |

Figure 3A:
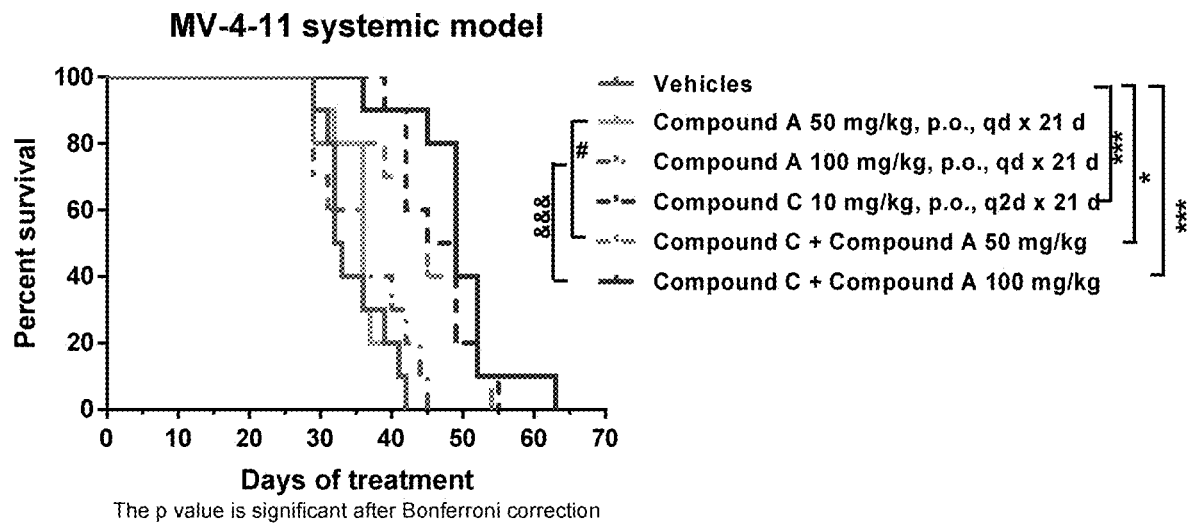
FIG. 3A depicts a line graph of percent survival over days of treatment illustrating that a combination of Compound C and Compound A at 100 mg/kg achieved longest survival time, followed by a combination of Compound C and Compound A at 50 mg/kg, and Compound C as a single agent in MV-4-11 AML xenograft.
Figure 3B:
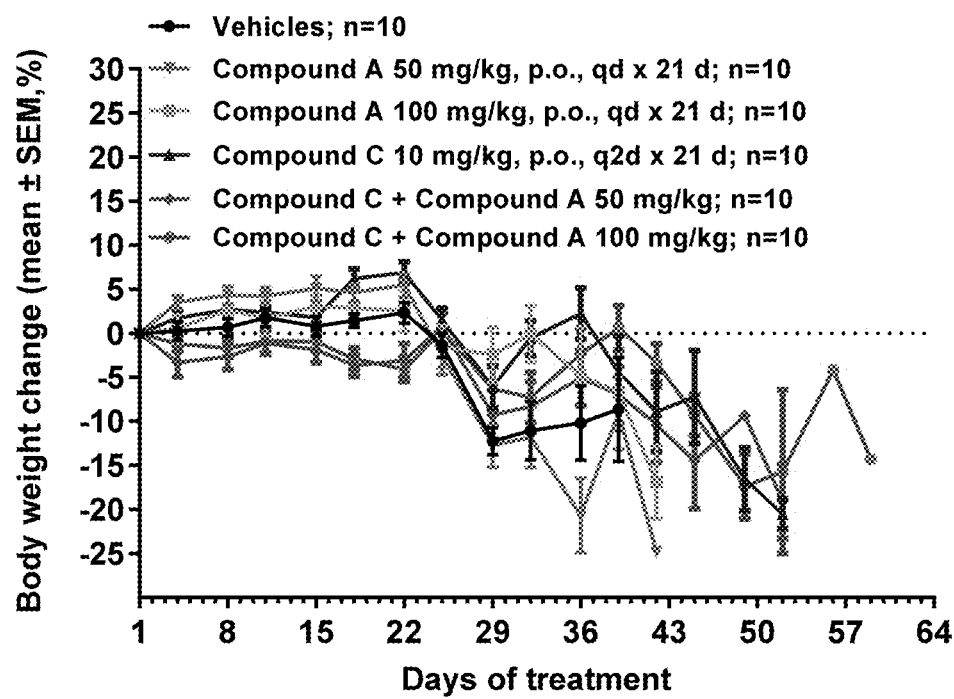
FIG. 3B depicts a line graph of body weight change over days of treatment in a MV-4-11 AML xenograft model.

As shown in FIG. 3, Compound C+Compound A 100 mg/kg achieved longest survival time, followed by Compound C+Compound A 50 mg/kg and Compound C.

As described in table 3: Compound A at 50 mg/kg and 100 mg/kg can extend survival for 4 days. Compound C at 10 mg/kg can extend survival for 13 days. Compound C plus Compound A 100 mg/kg can extend survival for 17 days, better than any single agent groups.

Statistical significance: *P<0.05, ***P<0.001 VS vehicle group. #P<0.05 VS Compound A 50 mg/kg group; &&&P<0.001 VS Compound A 100 mg/kg group.

Conclusion:

Combination of Compound A and Compound C extend survival of MV-4-11 AML xenograft for 17 days, compared to vehicle group.

Example 4: Combination of Compound A Plus Compound C Extend Survival of MOLM-3 AML Xenograft

TABLE 4

| | Vehicle | Compound C 10 mg/kg | Compound A 100 mg/kg | Compound C + Compound A |
|---|---|---|---|---|
| Median survival time (day) | 18.0 | 27.5 | 22.0 | 29.0 |
| Survival prolongation | — | 9.5 | 4.0 | 11.0 |

Figure 4A:
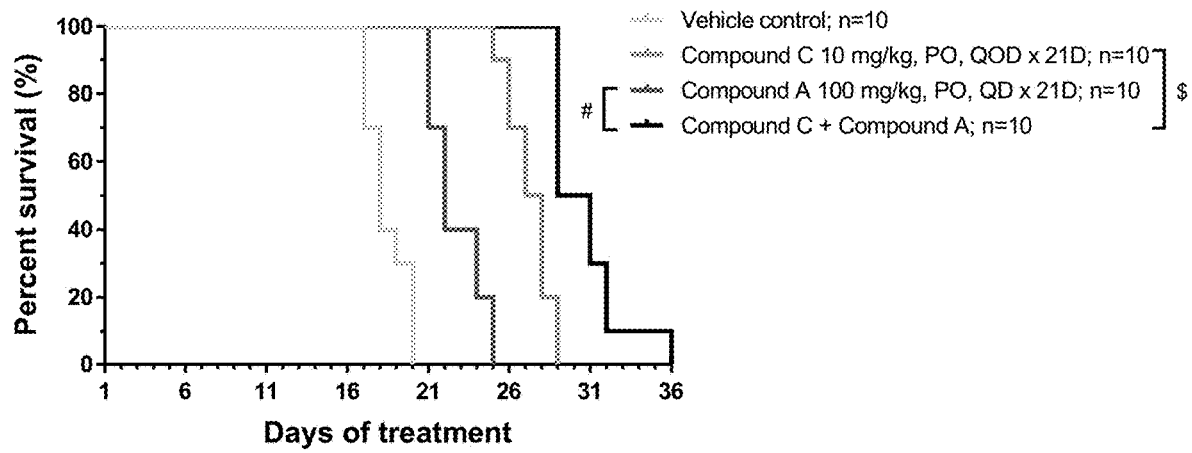
FIG. 4A depicts a line graph of percent survival over days of treatment illustrating that a combination of Compound C and Compound A achieved longest survival time in a MOLM-3 AML xenograft model.
Figure 4B:
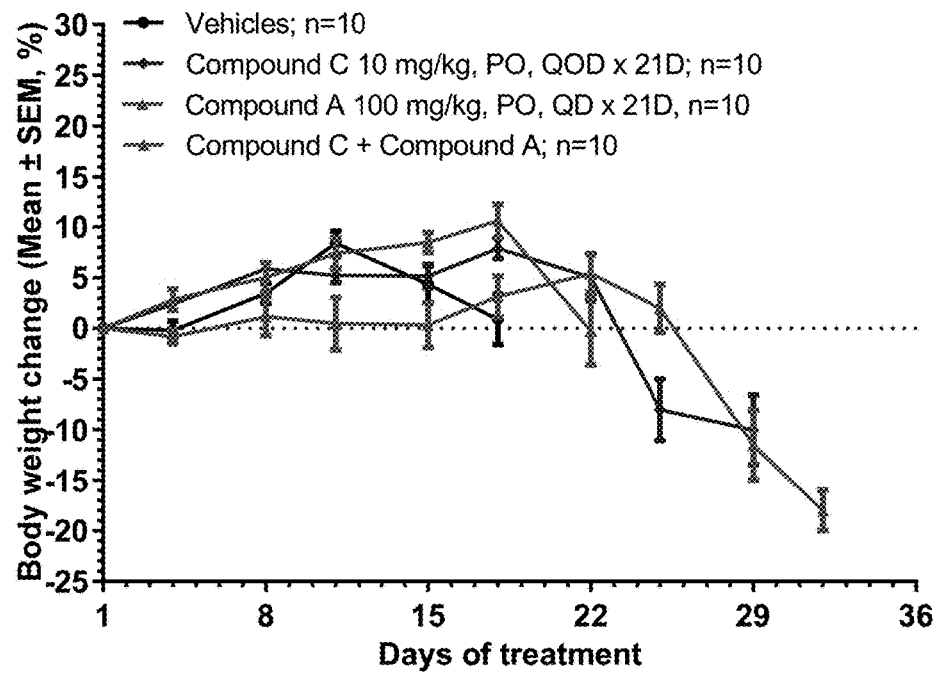
FIG. 4B depicts a line graph of body weight change over days of treatment in a MOLM-3 AML xenograft model.

As shown in FIG. 4, Compound C+Compound A achieved longest survival time. As shown in Table 4, Compound A at 100 mg/kg can extend median survival for 4 days. Compound C at 10 mg/kg can extend median survival for 9.5 days. Compound C plus Compound A can extend median survival for 11 days, better than any single agent group.

Statistical significance: *P<0.05 VS vehicle group. #P<0.5 VS Compound A; &P<0.05 VS Compound C group.

Conclusion:

Combination of Compound A plus Compound C extend survival of MOLM-3 AML xenograft for 11 days, compared to vehicle group.

Figure 5A:
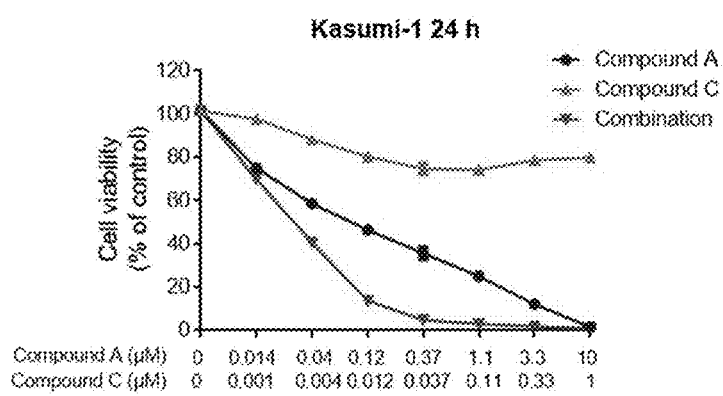
FIG. 5A and FIG. 5B each depict a line graph of illustrating that a combination of Compound A plus Compound C enhanced cell viability inhibition in Kasumi-1 AML cells after 24 h combination treatment.
Figure 5B:
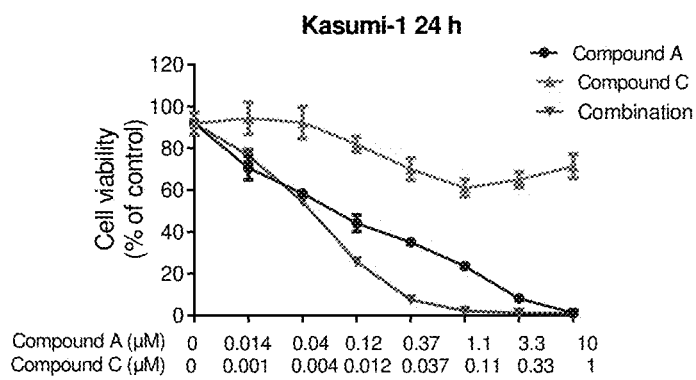

Example 5: Compound A Plus Compound C Enhanced Cell Viability Inhibition in Kasumi-1 AML Cells Method used was the cell viability CTG assay. As shown in FIG. 5, Compound A plus Compound C enhanced cell viability inhibition in Kasumi-1 AML cells after 24 h combination treatment.

Figure 6:
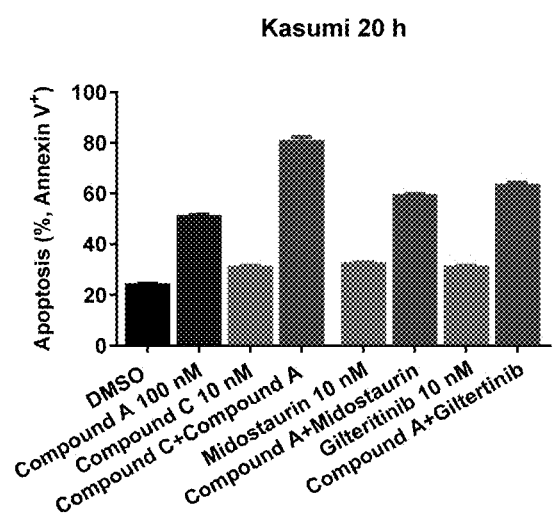
FIG. 6 depicts a bar graph illustrating a combination of Compound A plus Compound C enhanced apoptosis induction in Kasumi-1 AML cells after 20 h combination treatment.
Figure 7:
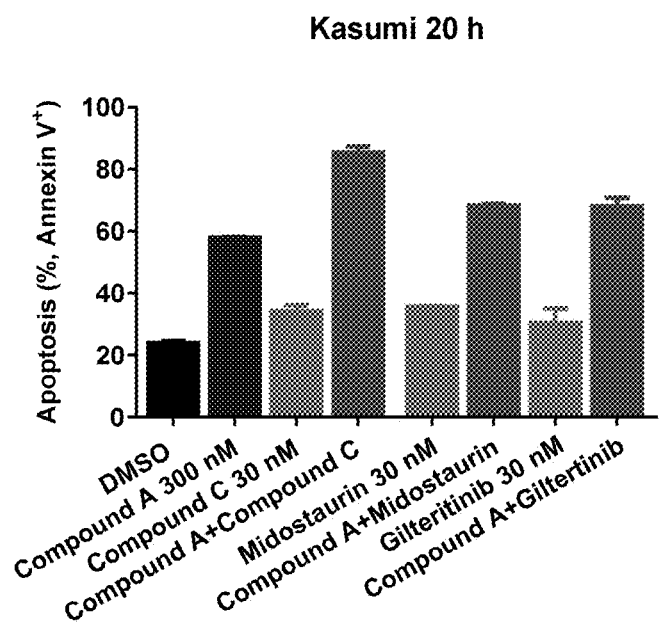
FIG. 7 depicts a bar graph illustrating a combination of Compound A plus Compound C enhanced apoptosis induction in Kasumi-1 AML cells after 20 h combination treatment.

Example 6: Compound C Synergizes with Compound A to Induce Apoptosis in Kasumi-1$^{KIT\text{-}NK822K\ mutant}$ t(8;21) Cell Line Method used was Flow cytometry, staining with Annexin V. Compound A plus Compound C enhanced apoptosis induction in Kasumi-1 AML cells after 20 h combination treatment Combination treatments of Compound A+Compound C results more apoptotic cells in Kasumi cells (FIG. 6 and FIG. 7). Similar combination effect was also observed when Compound A combined with FLT3 inhibitors midostaurin or gilteritinib.

Conclusion:

Compound A plus Compound C enhanced apoptosis induction in Kasumi-1 AML cells after 20 h combination treatment.

Example 7: Combination of Compound A and Palbociclib Achieved Synergistic Antitumor Effect in s.c. ER+ MCF-7 Breast Cancer Xenograft

TABLE 5

| Treatment | RTV@ D 22 | T/ C(%)@D 22 | Synergy @D 22 | RTV@D 36 | T/ C(%)@D 36 | Synergy @D 36 | mRECIST | Response @D 36 |
|---|---|---|---|---|---|---|---|---|
| Vehicle control | 3.6 ± 0.6 | — | — | 6.5 ± 1.3 | — | — | 1/6 SD, 5/6 PD | 6/6 PD |
| Compound A 100 mg/kg | 2.0 ± 0.4 | 56.2 | — | 3.3 ± 1.8 | 50.2 | — | 3/6 SD, 3/6 PD | 1/6 SD, 5/6 PD |
| Palbociclib 50 mg/kg | 1.4 ± 0.4 | 39.3 | — | 2.9 ± 0.8 | 44.2 | — | 1/6 PR, 4/6 SD, 1/6 PD | 2/6 SD, 4/6 PD |
| Compound A + Palbociclib | 0.8 ± 0.2* | 22.7 | 0.98 | 1.9 ± 0.7* | 28.5 | 0.78 | 4/6 PR, 2/6 SD | 1/6 PR, 3/6 SD, 2/6 PD |

Figure 8:
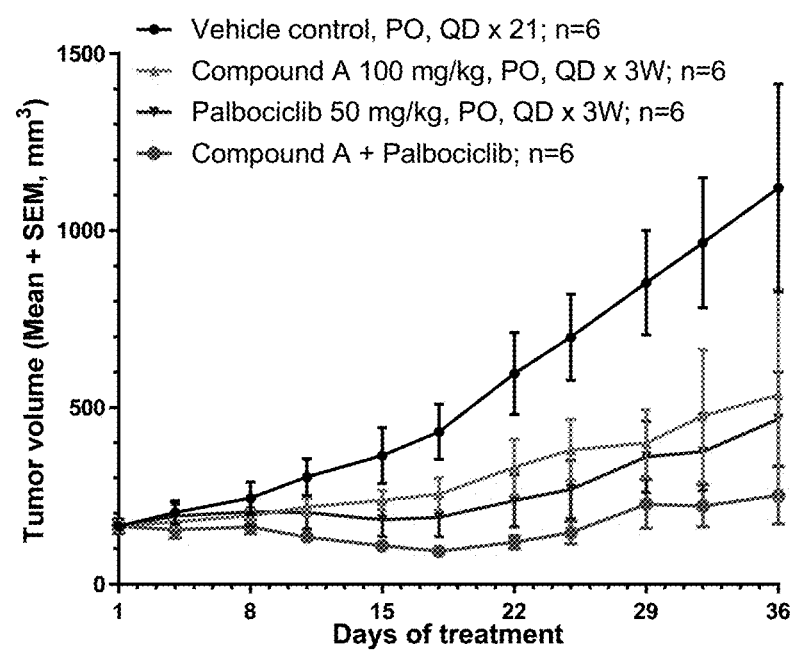
FIG. 8 depicts a graph illustrating single agents showed moderate antitumor activity and combination treatment significantly enhance tumor repression in s.c. ER+ MCF-7 breast cancer xenograft.
Figure 9:
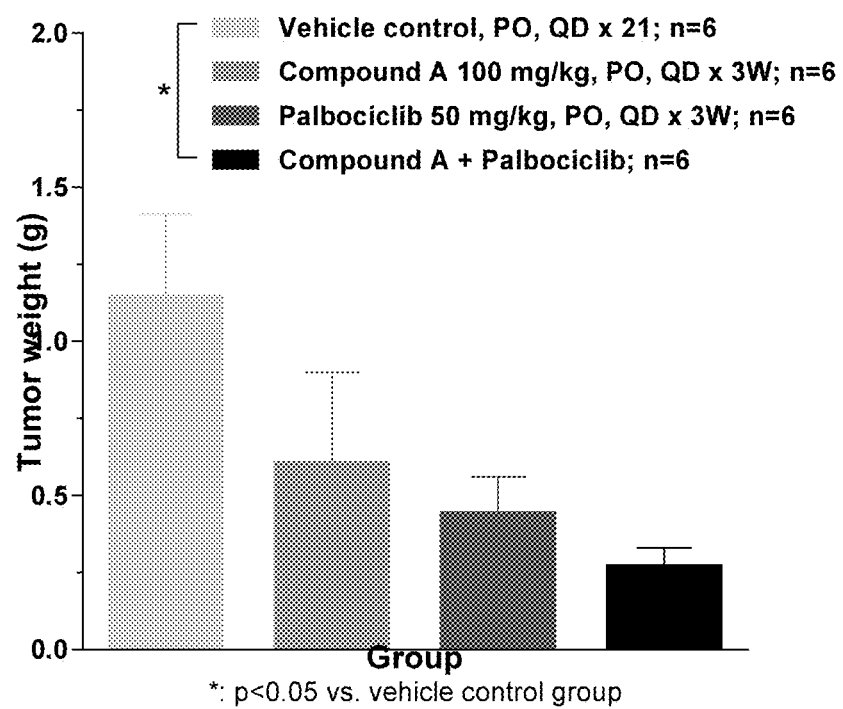
FIG. 9 depicts a bar graph illustrating combination treatment achieved lowest tumor weight at the end of treatment in s.c. ER+ MCF-7 breast cancer xenograft.

*p < 0.05 vs. vehicle control group;
Ratio > 1, Synergistic;
Ratio = 1, Additive;
Ratio < 1, Antagonistic As shown in FIG. 8 single agents showed moderate antitumor activity. Combination treatment significantly enhanced tumor repression. As shown in FIG. 9, combination treatment achieved lowest tumor weight at the end of treatment.

As shown in Table 5, T/C (%) value of the combination group was 22.7 on Day 22, compared to 56.2 or 39.3 from single agent groups. Animals from the combination group achieved 4/6 PR, ORR=66.7%

*P<0.05 vs. vehicle control group

Conclusion:

Combination of Compound A and Palbociclib achieved synergistic antitumor effect in s.c. ER+ MCF-7 breast cancer xenograft, achieved ORR 66.7% compared to 0% in other groups.

Example 8: Compound A Synergistically Enhances Palbociclib (CDK4/6i) Plus Fulvestrant Antitumor Activity in ER+ Breast Cancer of MCF-7 Xenograft

TABLE 6

Figure 10:
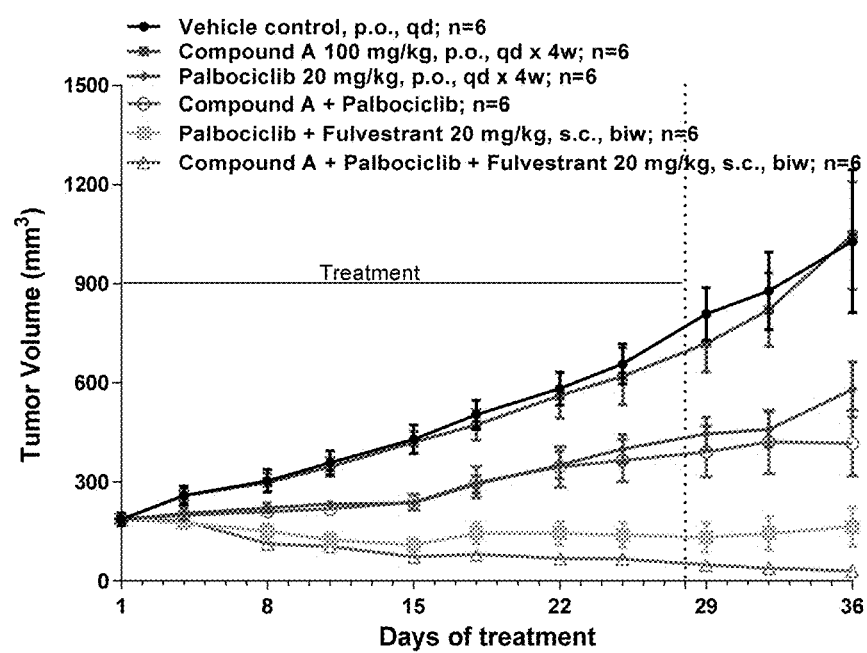
FIG. 10 depicts a line graph of tumor volume over days of treatment illustrating palbociclib single agent showed moderate antitumor activity in s.c. ER+ MCF-7 breast cancer xenograft. Additionally.

| Treatment | RTV@D 36 | T/C(%)@D 36 | Syngery@D 36 | Response rate@D 36 | mRECIST |
|---|---|---|---|---|---|
| Vehicle | 5.9 ± 1.3 | — | — | 6/6 PD | 6/6 PD |
| Compound A 100 mg/kg | 5.8 ± 0.9 | 97.3 | — | 6/6 PD | 1/6 SD, 5/6 PD |
| Palbociclib 20 mg/kg | 3.4 ± 0.7 | 57.1 | — | 1/6 SD, 5/6 PD | 4/6 SD, 2/6 PD |
| Compound A + Palbociclib | 2.2 ± 0.4 | 36.4 | 1.53 | 1/6 SD, 5/6 PD | 4/6 SD, 2/6 PD |
| Palbociclib + Fulvestrant 20 mg/kg | 0.9 ± 0.3 | 15.5 | — | 1/6 CR, 1/6 PR, 2/6 SD, 2/6 PD | 1/6 CR, 2/6 PR, 3/6 SD |
| Compound A + Palbociclib + Fulvestrant | 0.2 ± 0.1# | 3.0 | 5.06 | 1/4 CR, 3/4 PR | 1/4 CR, 3/4 PR | p < 0.05 vs Compound A;
Ratio > 1, Synergistic;
Ratio = 1, Additive;
Ratio < 1, Antagonistic As shown in FIG. 10, palbociclib single agent showed moderate antitumor activity. Compound A plus Palbociclib achieved a synergistic antitumor effect. Palbociclib plus Fulvestrant as a standard of care showed good tumor repression. Its combination with Compound A enhanced antitumor activity.

As shown in Table 6, Compound A plus palbociclib achieved a T/C (%) value of 36.4; the synergy score was 1.53. Palbociclib plus fulvestrant achieved a T/C (%) value of 15.5, 1/6 CR, 1/6 PR, ORR=33.3%. Compound A enhanced Palbociclib plus Fulvestrant antitumor effect, with a T/C (%) value of 3.0, achieved 1/4 CR, 3/4 PR, ORR=100%; the synergy score was 5.06, indicating strong synergistic effects.
: p<0.05 vs. Compound A group
Conclusion:

Compound A can synergistically enhance Palbociclib+/−Fulvestrant antitumor effect in s.c. ER+ MCF-7 breast cancer xenograft, with improved ORR from 0 or 33.3% to 100%.

Example 9: Compound A Synergistically Enhances Palbociclib (CDK4/6i) Antitumor Activity in s.c. ER+ BR5496 Breast PDX (Tamoxifen-Resistant, Crownbio Outsource)

TABLE 7

| Group | RTV @ D 50 | T/C (%) @ D 50 | Synergy ratio @ D 50 | mRECIST |
|---|---|---|---|---|
| Vehicle | 4.40 ± 0.15 | — | — | 4/4 PD |
| Compound A | 1.28 ± 0.34** | 29.17 | — | 4/4 SD |
| Palbociclib | 3.43 ± 0.68 | 78.01 | — | 4/4PD |
| Compound A + Palbociclib | 0.09 ± 0.03***# | 2.07 | 11.00 | 1/3 CR, 2/3 PR |

**P < 0.01,
***P < 0.001, vs. vehicle control group;
P < 0.05, vs. palbocicib group;
Synergy: Ratio > 1, synergistic; Ratio = 1, additive; Ratio < 1, antagonistic.

Figure 11:
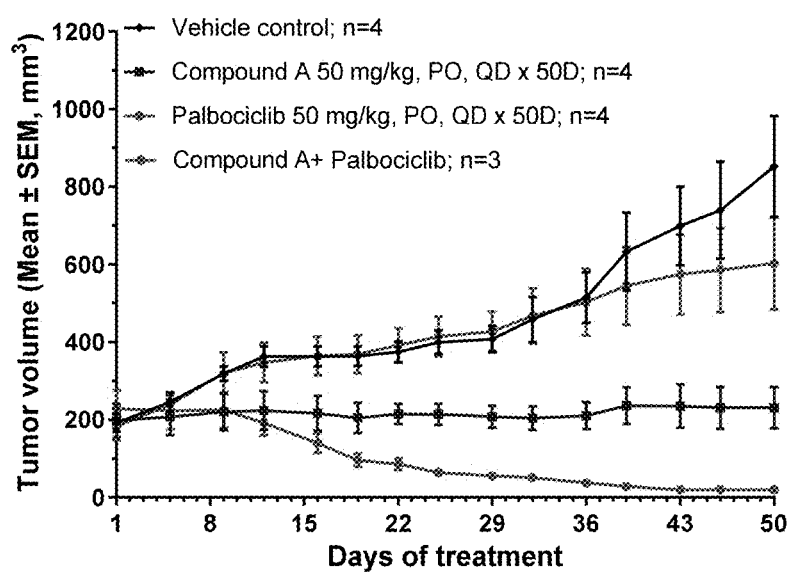
FIG. 11 depicts a line graph of tumor volume curves illustrating palbociclib single agent showed moderate antitumor activity whereas Compound A showed good antitumor activity in a s.c. ER+ BR5496 breast cancer patient-derived xenograft (PDX) model.

As shown in the tumor volume curves (FIG. 11), Palbociclib single agent showed moderate antitumor activity whereas Compound A showed good antitumor activity.
T/C % value for palbociclib or Compound A single agents on D50 is 78.01 and 29.17 respectively (Table 7).

Compound A plus Palbociclib achieved a significantly synergetic antitumor effect, with a T/C (%) value of 2.07, achieved 1/3 CR, 2/3 PR, ORR=100%, the synergy score was 11, indicating strong synergistic effects.
P<0.01, *P<0.001 vs. vehicle control group; #P<0.05 vs. palbociclib group (Table).
Conclusion:

Combination treatment with Compound A and Palbociclib achieved a significantly synergetic antitumor effect in s.c. ER+ BR5496 breast cancer PDX, with 100% ORR compared to 0% in single agent groups. The combination can overcome tamoxifen-resistance.

As shown in Table 8, Compound A plus palbociclib results a T/C (%) value of 63.52, the synergy score was 1.31. Palbociclib plus fulvestrant results a T/C (%) value of 28.48. Compound A plus Palbociclib and Fulvestrant achieved T/C (%) value of 13.71; the synergy score was 5.06, indicating strong synergistic effects.
P<0.01, *P<0.001, vs. vehicle group; ##P<0.01, vs. Compound A group; Synergy: Ratio>1, synergistic; Ratio=1, additive; Ratio<1, antagonistic.
Conclusion:

Compound A can synergistically enhance Palbociclib+/−Fulvestrant antitumor effect in s.c. ER+ tamoxifen resistant MCF-7 breast cancer xenograft. The combination can overcome tamoxifen-resistance.

Palbociclib (IBRANCE) is a prescription medicine used to treat hormone receptor (HR)-positive, human epidermal growth factor receptor 2 (HER2)-negative breast cancer that has spread to other parts of the body (metastatic) in combination with:

an aromatase inhibitor as the first hormonal based therapy in women who have gone through menopause, or

Example 10: Compound A Enhances Antitumor Activity of Palbociclib Plus Fulvestrant in ER+ Tamoxifen Resistant MCF-7 Breast Cancer Xenograft

TABLE 8

| Group | RTV @ D 25 | T/C (%) @ D 25 | Synergy ratio @ D 25 |
|---|---|---|---|
| Vehicle | 5.79 ± 0.87 | — | — |
| Compound A | 5.75 ± 1.37 | 99.37 | — |
| Palbociclib | 4.86 ± 0.71 | 83.86 | — |
| Compound A + Palbociclib | 3.68 ± 0.81 | 63.52 | 1.31 |
| Palbociclib + Fulvestrant | 1.65 ± 0.40** | 28.48 | — |
| Compound A + Palbociclib + Fulvestrant | 0.79 ± 0.09***## | 13.71 | 2.06 |

**P < 0.01,
***P < 0.001, vs. vehicle group;
P < 0.01, vs. Compound A group;
Synergy:
Ratio > 1, synergistic;
Ratio = 1, additive;
Ratio < 1, antagonistic.

Figure 12:
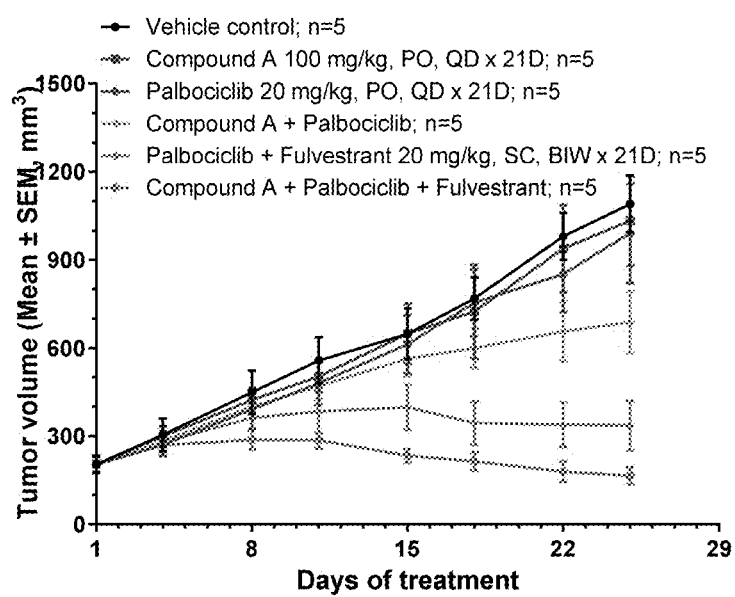
FIG. 12 depicts a line graph of tumor volumes over time illustrating Compound A as a single agent showed no antitumor activity, Compound A plus Palbociclib achieved a synergistic antitumor effect, Palbociclib plus Fulvestrant showed tumor repression, and Compound A enhanced Palbociclib plus Fulvestrant antitumor effect in a s.c. ER+ tamoxifen resistant MCF-7 breast cancer xenograft.

As shown in FIG. 12, single agent showed no antitumor activity. Compound A plus Palbociclib achieved a synergistic antitumor effect. Palbociclib plus Fulvestrant showed tumor repression. Compound A enhanced antitumor effect of Palbociclib plus Fulvestrant.

fulvestrant in women with disease progression following hormonal therapy.

Example 11: Compound A Synergistically Enhances Tamoxifen in s.c. ER+ PIK3CA$^{E545K}$ MCF-7 Breast Cancer Xenograft

TABLE 9

| Treatment | RTV@ D 22 | T/C(%)@D 22 | Synergy @D 22 | RTV@D 36 | T/C(%)@D 36 | Synergy @D 36 | mRECIST_best | mRECIST_last |
|---|---|---|---|---|---|---|---|---|
| Vehicle control | 3.6 ± 0.6 | — | — | 6.5 ± 1.3 | — | — | 6/6 PD | 6/6 PD |
| Compound A 100 mg/kg | 2.0 ± 0.4 | 56.2 | — | 3.3 ± 1.8 | 50.2 | — | 3/6 SD, 3/6 PD | 1/6 SD, 5/6 PD |
| Tamoxifen 3 or 1 mg/kg | 0.7 ± 0.3* | 20.4 | — | 1.4 ± 0.8* | 22.0 | — | 4/6 PR, 2/6 SD | 4/6 PR, 2/6 PD |
| Compound A + Tamoxifen | 0.2 ± 0.0* | 4.0 | 2.83 | 0.1 ± 0.0* | 1.9 | 5.83 | 2/6 CR, 4/6 PR | 2/6 CR, 4/6 PR |

Figure 13:
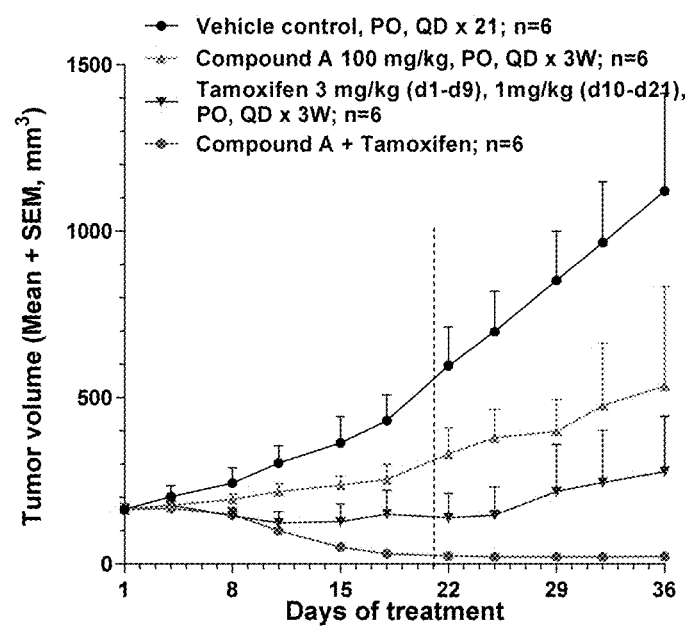
FIG. 13 depicts a line graph of tumor volume over days of treatment illustrating Compound A as a single agent showed moderate antitumor activity in a s.c. ER+ MCF-7 breast cancer xenograft. Combination treatment significantly enhance tumor repression in a s.c. ER+ MCF-7 breast cancer xenograft.
Figure 14:
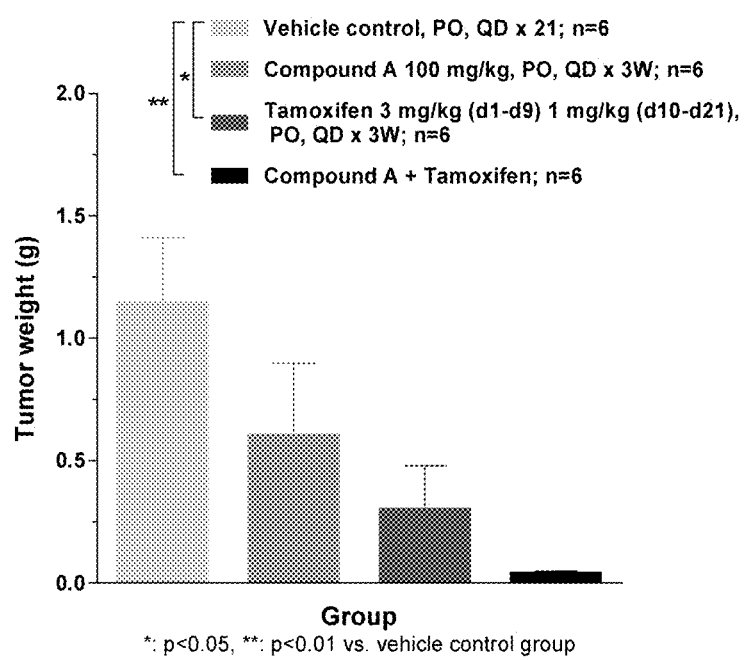
FIG. 14 depicts a bar graph illustrating tumor weight from the combination group is the lowest in a s.c. ER+ MCF-7 breast cancer xenograft.

*p < 0.05,
**: p < 0.01 vs. vehicle control group;
Ratio > 1, Synergistic;
Ratio = 1, Additive;
Ratio < 1, Antagonistic As shown in FIG. 13, single agent showed moderate antitumor activity. Combination treatment significantly enhanced tumor repression As shown in FIG. 14, tumor weight from the combination group is the lowest.

As shown in Table 9, combination treatment achieved a T/C (%) value of 1.9 on D36, the synergy score was 5.83, indicating strong synergistic effects.

Animals from combination group achieved 2/6 CR, 4/6 PR, ORR=100%

*: p<0.05 vs. vehicle control group

Conclusion:

Compound A can enhance Palbociclib antitumor effect in s.c. ER+ MCF-7 breast cancer xenograft. Combination treatment achieved ORR of 100% compared to Tamoxifen-single agent 66.7%.

Example 12: In Vitro Anti-Proliferative Activity of Combination Treatment with Compound a and PI3Ki Idelalisib or Duvelisib in OCI-LY8: Synergy

TABLE 10

| Combination Index Values | | |
|---|---|---|
| $ED_{50}$ | $ED_{75}$ | $ED_{90}$ |
| 0.339 | 0.212 | 0.133 |

Method used is cell viability WST assay.

Figure 15A:
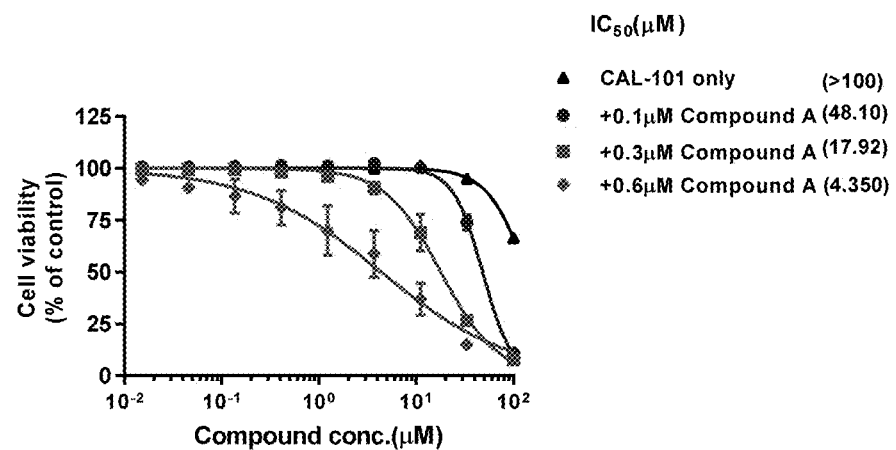
FIG. 15A and FIG. 15B depict a graphs of cell viability versus compound concentration illustrating combination treatments result lower number of live cells. Compound A plus CAL-101 (PI3Ki) enhanced cell viability inhibition in OCI-LY8 cells after 72 h combination treatment.
Figure 15B:
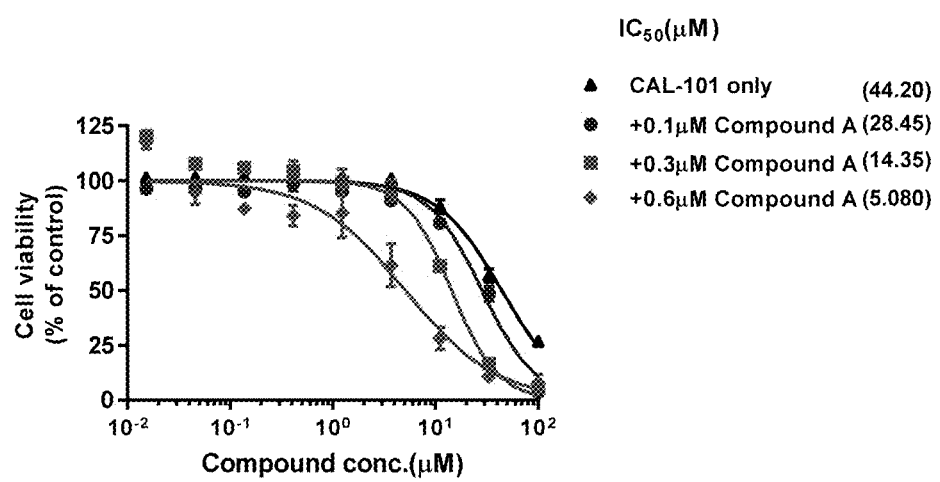

As shown in FIG. 15 and Table 10, Compound A plus CAL-101 (PI3Ki) enhanced cell viability inhibition in OCI-LY8 cells after 72 h combination treatment. Combination treatments result in lower number of live cells.

Example 13: In Vitro Anti-Proliferative Activity of Combination Treatment with Compound a and PI3Ki Idelalisib (CAL-101) in OCI-LY10: Synergy

TABLE 11A

| Combination Index Values | | |
|---|---|---|
| $ED_{50}$ | $ED_{75}$ | $ED_{90}$ |
| 0.518 | 0.427 | 0.356 |

Method used is cell viability WST assay.

Figure 16:
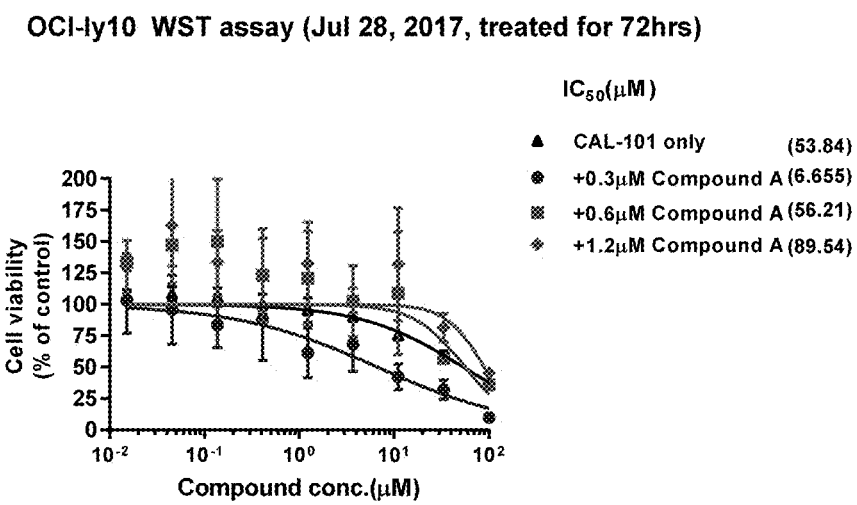
FIG. 16 depicts a graph of cell viability versus compound concentration illustrating combination treatments result lower number of live cells. Compound A plus CAL-101 (PI3Ki) enhanced cell viability inhibition in OCI-LY10 cells after 72 h combination treatment.
Figure 17:
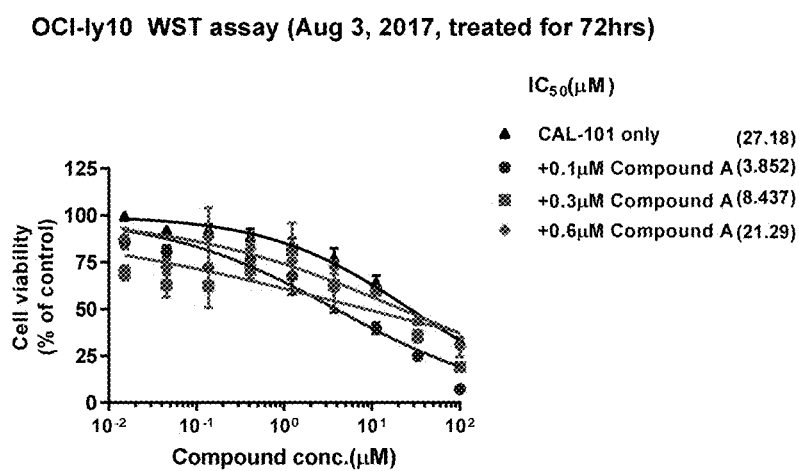
FIG. 17 depicts a graph of cell viability versus compound concentration illustrating combination treatments result lower number of live cells. Compound A plus CAL-101 (PI3Ki) enhanced cell viability inhibition in OCI-LY10 cells after 72 h combination treatment.

As shown in FIGS. 16 and 17 and Table 11A, Combination treatments results lower number of live cells.

Compound A plus CAL-101 (PI3Ki) enhanced cell viability inhibition in OCI-LY10 cells after 72 h combination treatment.

Example 14: In Vitro Anti-Proliferative Activity of Combination Treatment with Compound A and PI3Ki Idelalisib (CAL-101) in DOHH-2: Synergy Method used is cell viability WST assay (described previously).

Figure 18A:
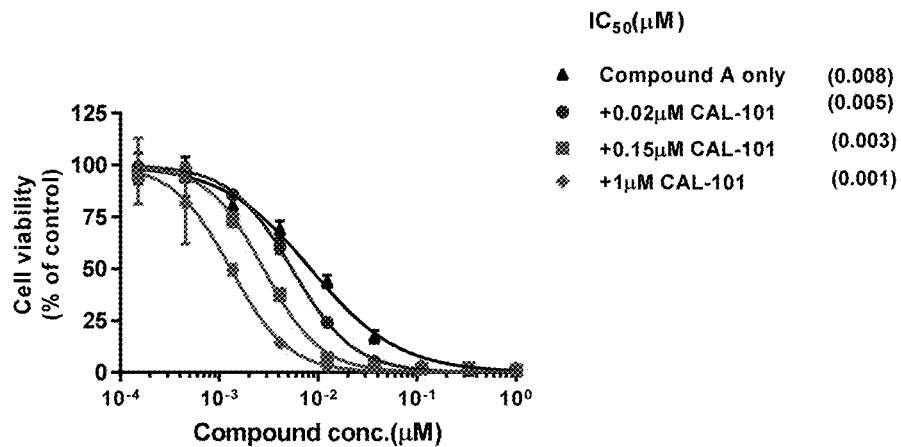
FIGS. 18A and 18B depict graphs of cell viability versus compound concentration illustrating combination treatments result lower number of live cells. Compound A plus CAL-101 (PI3Ki) enhanced cell viability inhibition in DOHH-2 cells after 72 h combination treatment.
Figure 18B:
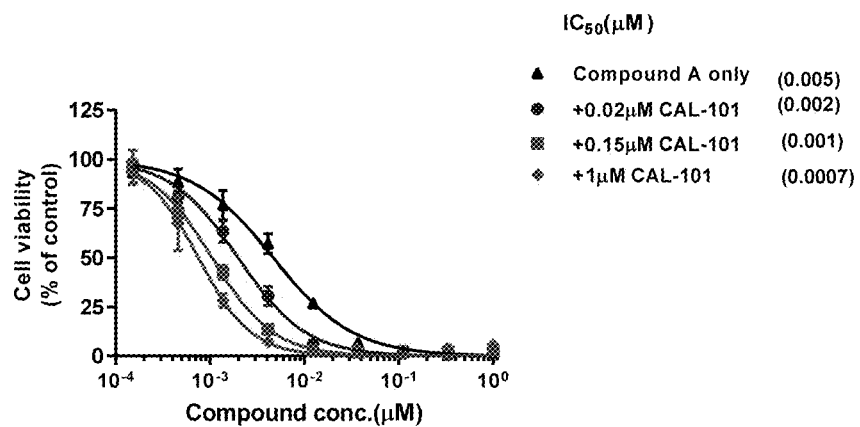

As shown in FIG. 18, Compound A plus CAL-101 (PI3Ki) enhanced cell viability inhibition in DOHH-2 cells after 72 h combination treatment.

Example 15: Enhanced Antitumor Activity of Compound A Plus Idelalisib (CAL101) in Unstaged Subcutaneous FL DOHH2 Xenograft Models

TABLE 12

| Treatment | RTV@D 21 | T/C(%) @211 | Synergy @D 21 |
|---|---|---|---|
| Vehicles | 14.1 ± 0.63 | — | — |
| Compound A 50 mg/kg, qd, po | 7.1 ± 0.56*** | 50.5 | — |
| idelalisib 15 mg/kg, bid, po | 10.7 ± 0.95* | 75.8 | — |
| Compound A + idelalisib | 5.69 ± 0.43***## | 40.1 | 0.95 |

Figure 19:
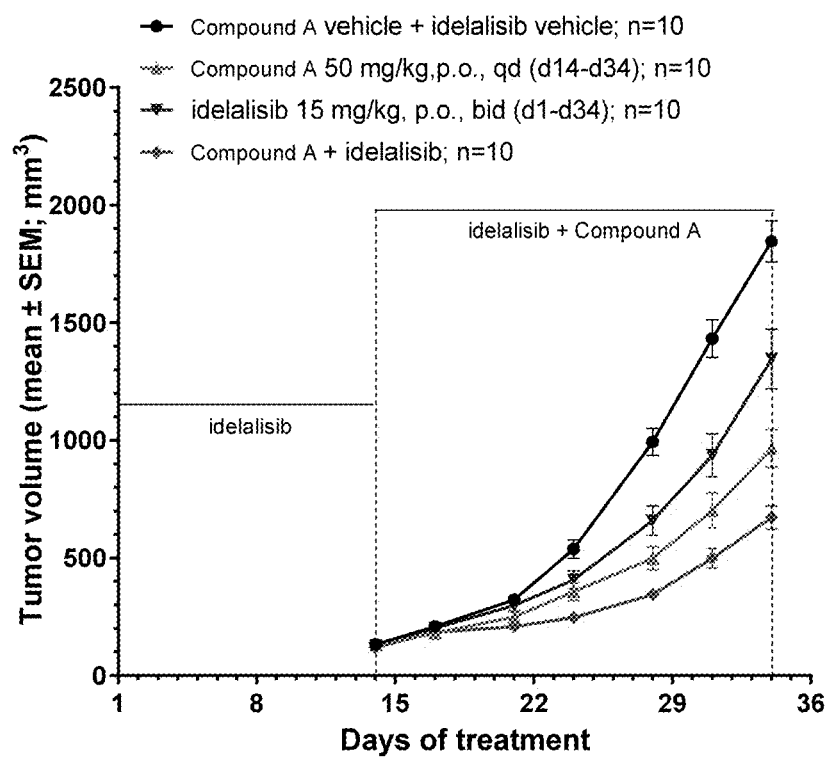
FIG. 19 depicts a graph illustrating Compound A as a single agent showed moderate antitumor activity and combination treatment enhanced tumor repression

*p < 0.05,
***p < 0.001 vs. vehicle control group;.
p < 0.01 vs. idelalisib group;
Ratio > 1, Synergistic;
Ratio = 1, Additive;
Ratio < 1, Antagonistic As shown in FIG. 19, single agent showed moderate antitumor activity. Combination treatment enhanced tumor repression As shown in Table 12, combination treatment achieved a T/C (%) value of 40.1.

*: p<0.05, ***: p<0.001 vs. vehicle control group; ##: p<0.01 vs. idelalisib group Conclusion:

Compound A can enhance idelalisib antitumor effect in DLBCL DOHH2 xenograft.

Example 16: Compound E Synergizes with Compound A to Induce Cell Growth Inhibition in Ibrutinib Primary Resistant Z138 Mantle Cell Lymphoma Cell Line In Vitro Methods used include cell viability CTG assay and apoptosis induction assay.

Figure 20:
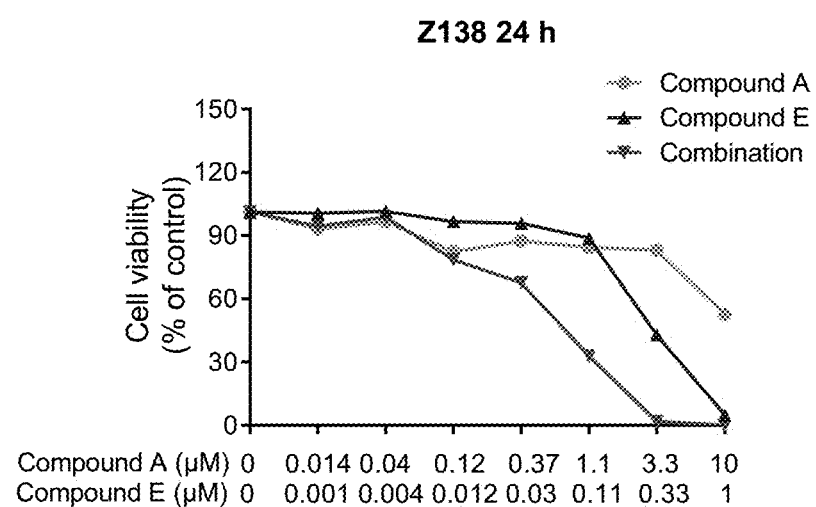
FIG. 20 depicts a graph illustrating combination treatment results lower percentage of live cells.

As shown in FIG. 20, combination treatment results lower percentage of live cells. Compound A plus Compound E enhanced cell viability inhibition in Z138 mantle cell lymphoma after 24 h treatment.

Figure 21:
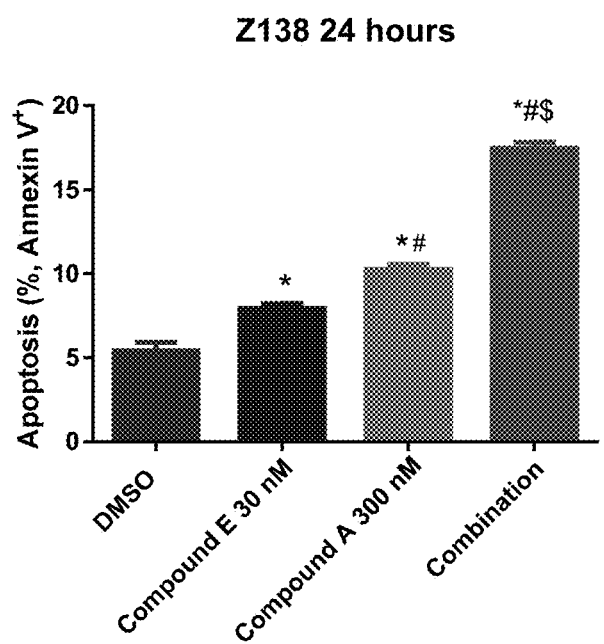
FIG. 21 depicts a graph illustrating combination treatment results higher level of apoptosis, measured by Annexin V+, indicating the combination enhance apoptosis induction in Z138 mantle cell lymphoma.

As shown in FIG. 21, combination treatment results higher level of apoptosis, measured by Annexin V+, indicating the combination enhance apoptosis induction.

Example 17: Compound E Plus Compound A Achieved Synergetic Antitumor Effect in MCL Z138 Xenograft

TABLE 13

| Treatment | RTV @ D 21 | T/C(%) @ D 21 | Synergy ratio @ D 21 | mRECIST | Response @ D 21 |
|---|---|---|---|---|---|
| Vehicle control | 15.15 ± 2.03 | — | — | 6/6 PD | 6/6 PD |
| Compound E 50 mpk | 7.05 ± 2.45 | 46.55 | — | 1/6 PR, 1/6 SD, 4/6 PD | 1/6 SD, 5/6 PD |
| Compound E 100 mpk | 0.82 ± 0.45** | 5.43 | — | 6/6 PR | 4/6 PR, 1/6 SD, 1/6 PD |
| Compound A | 10.38 ± 1.53 | 68.55 | — | 6/6 PD | 6/6 PD |
| Compound A + Compound E 50 mpk | 0.05 ± 0.03**# | 0.36 | 89.35 | 4/6 CR, 2/6 PR | 4/6 CR, 2/6 PR |
| Compound A + Compound E 100 mpk | 0.14 ± 0.05**# | 0.94 | 3.95 | 2/6 CR, 4/6 PR | 2/6 CR, 4/6 PR |

**P < 0.01, vs. vehicle control;
P < 0.05, vs. Compound A group;
Synergy: Ratio > 1, synergistic; Ratio = 1, additive; Ratio < 1, antagonistic.

Figure 22:
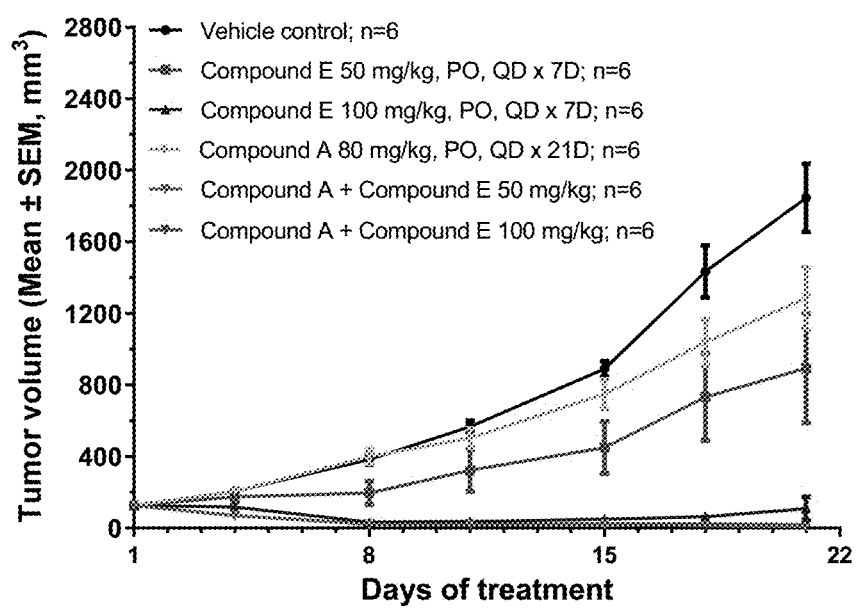
FIG. 22 depicts a graph illustrating Compound E at 50 mg/kg and Compound A as a single agent showed moderate antitumor activity in a MCL Z138 xenograft. Additionally

As shown in FIG. 22, Compound E 50 mg/kg and Compound A single agent showed moderate antitumor activity. Compound E 100 mg/kg single agent showed significantly antitumor activity. Combination treatment of plus Compound A showed significantly antitumor effect.

As indicated in Table 13, Compound E single agent results a T/C (%) value of 5.43. Combination treatment of Compound E 50 mg/kg plus Compound A results a T/C (%) value of 0.36, the synergy score was 89.35, indicating strong synergistic effects, 4/6 CR, 2/6 PR, ORR=100% was achieved.

Combination treatment of Compound E 100 mg/kg plus Compound A results a T/C (%) value of 0.94; the synergy score was 3.95, indicating strong synergistic effects, 2/6 CR, 4/6 PR, ORR=100% was achieved.
**P<0.01, vs. vehicle control; #P<0.05, vs. Compound A group; Synergy: Ratio>1, synergistic; Ratio=1, additive; Ratio<1, antagonistic.
Conclusion:
Compound A plus Compound E can achieve synergetic antitumor effect in MCL Z138 xenograft, achieved 100% ORR.

Example 18: Compound E Plus Compound A Achieved Synergetic Antitumor Effect in TP53 WT Breast Cancer MCF-7 Xenograft

TABLE 14

| Treatment | RTV @ D 16 | T/C (%) @ D 16 | Synergy ratio @ D 16 | mRECIST | Response @ D 16 |
|---|---|---|---|---|---|
| Vehicles | 2.19 ± 0.09 | — | — | 6/6 PD | 6/6 PD |
| Compound E | 1.79 ± 0.11* | 81.65 | — | 1/6 SD, 5/6 PD | 6/6 PD |
| Compound A | 1.63 ± 0.12** | 74.34 | — | 3/6 SD, 1/6 PD | 1/6 SD, 5/6 PD |
| Compound E + Compound A | 0.94 | 34.50 | 1.76 | 5/6 SD, 1/6 PD | 1/6 SD |

*P < 0.05,
**P < 0.01 vs. vehicle group;
Ratio > 1, Synergistic; Ratio = 1, Additive; Ratio < 1, Antagonistic.

Figure 23:
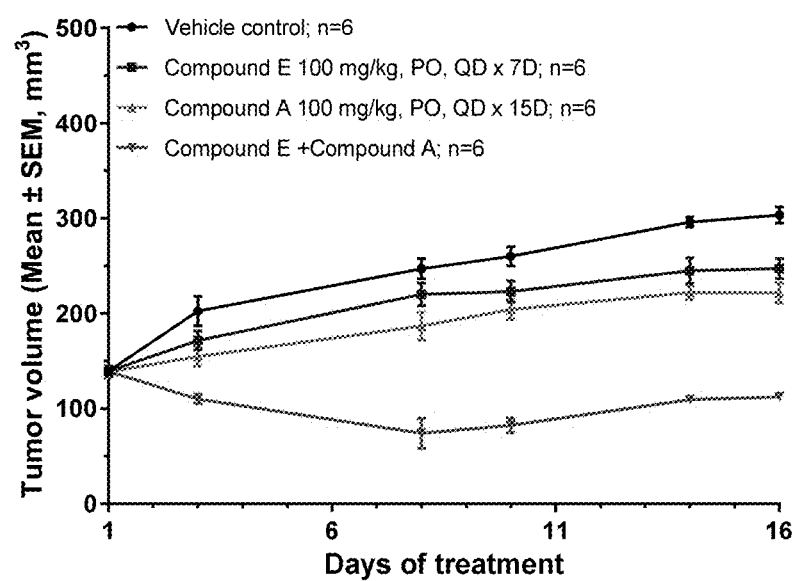
FIG. 23 depicts a graph illustrating each of Compound E and Compound A as single agents showed week antitumor activity, and combination treatment showed synergistic antitumor effect in a TP53 wt breast cancer MCF-7 xenograft model.
Figure 24:
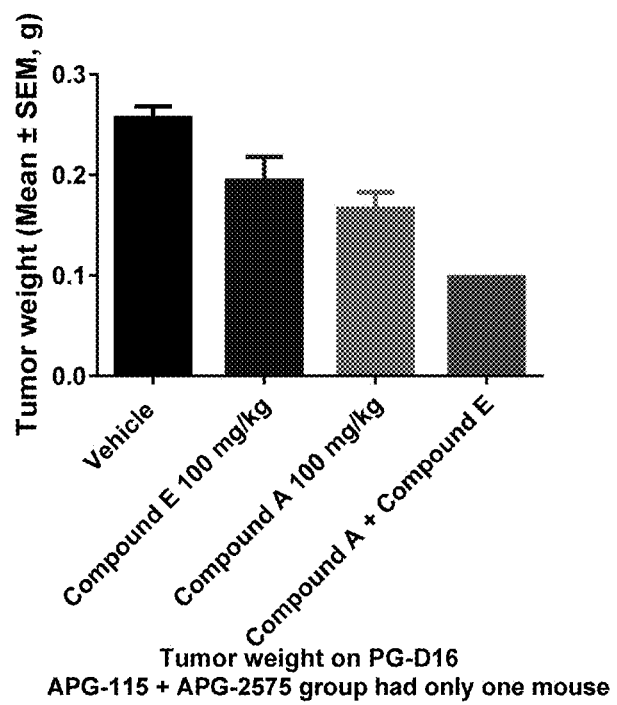
FIG. 24 depicts a graph illustrating combination treatment results lowest tumor weight as compared to each of Compound E and Compound A as single agents in a TP53 wt breast cancer MCF-7 xenograft model.

As shown in FIG. 23, single agent showed week antitumor activity. Combination treatment showed synergistic antitumor effect As shown in FIG. 24, combination treatment results lowest tumor weight.

As shown in Table 14, combination treatment results a T/C (%) value of 34.50, the synergy score was 1.76.
*P<0.05, **P<0.01 vs. vehicle group; Ratio>1, Synergistic; Ratio=1, Additive; Ratio<1, Antagonistic.
Conclusion:
Compound A plus Compound E can achieve synergetic antitumor effect in MCF7 breast cancer xenograft.

Example 19: Synergistic Antitumor Activity of Compound E Plus Compound A in ER+ Tamoxifen Resistant MCF-7 Breast Cancer Xenograft

TABLE 15

| Group | RTV @ D 25 | T/C (%) @ D 25 | Synergy ratio @ D 25 |
|---|---|---|---|
| Vehicle | 5.79 ± 0.87 | — | — |
| Compound A | 5.75 ± 1.37 | 99.37 | — |

TABLE 15-continued

| Group | RTV @ D 25 | T/C (%) @ D 25 | Synergy ratio @ D 25 |
|---|---|---|---|
| Compound E | 5.19 ± 1.11 | 89.66 | — |
| Compound A + Compound E | 2.90 ± 0.31 | 50.10 | 1.78 |

Synergy: Ratio > 1, synergistic; Ratio = 1, additive; Ratio < 1, antagonistic.

Figure 25:
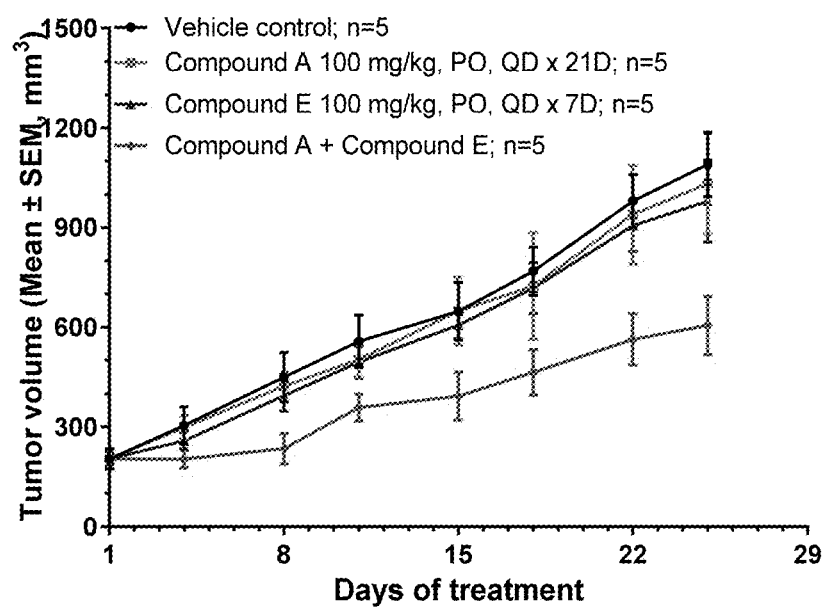
FIG. 25 depicts a graph illustrating each of Compound E and Compound A as single agents showed no antitumor activity, and combination treatment showed synergistic antitumor effect in ER+ Tamoxifen Resistant MCF-7 breast cancer xenograft.

As FIG. 25 shows, single agent showed no antitumor activity. Combination treatment showed synergistic antitumor effect. As shown in Table 15A, combination treatment results in a T/C (%) value of 50.10, the synergy score was 1.78.

Ratio>1, Synergistic; Ratio=1, Additive; Ratio<1, Antagonistic.

Conclusion:

Compound A plus Compound E can achieve synergetic antitumor effect in ER+ tamoxifen resistant MCF7 breast cancer xenograft.

Example 20: Combination Treatment with Compound A and Compound E in s.c. CD20-Resistant DLBCL PDX LD2-6026-200614 (BCL-xL High, BCL2 p.A43T)

TABLE 16

| Group | T/C (%) @ D 10 | Synergy @ D 10 | mRECIST |
|---|---|---|---|
| Vehicle | | | |
| Compound E | 66 | | |
| Compound A | 39 | | |
| R-ICE | 18 | | 3/5 PR |
| Compound B + R-ICE | 14 | 0.86 | 3/5 PR, 1/5 SD |
| Compound A + R-ICE | 1 | 10.8 | 5/5 CR |

PDX models: LIDe Bioteh, Rituximab-resistant DLBCL R-Ice Model:

Rituximab 5 mg/kg IV, QW×21D (morning)

Ifosfamide 50 mg/kg IV, QW×21D (afternoon)

Carboplatin 30 mg/kg IP, QW×21D

Etoposide 10 mg/kg IP, QW×21D

Figure 26:
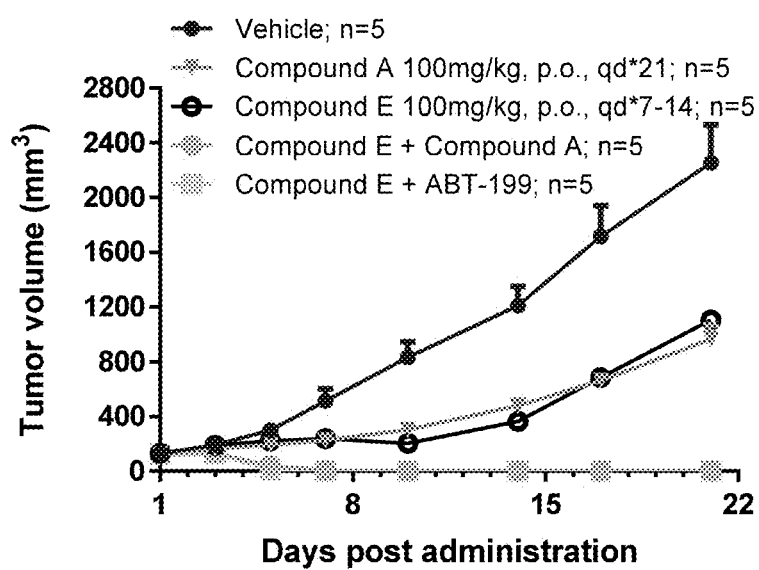
FIG. 26 depicts a graph illustrating each of Compound E and Compound A as single agents showed good antitumor activity in a Rituximab-resistant DLBCL PDX model, and combination treatment showed synergistic antitumor effect in CD20-resistant DLBCL PDX.

Results:

As FIG. 26 shows, single agents showed good antitumor activity. Combination treatment showed strong synergistic antitumor effect, As indicated in Table 16, combination treatment results T/C (%) value of 0 on D10, the synergy score was infinitive, indicating very strong synergy. 100% CR was observed, ORR 100%.

Ratio>1, Synergistic; Ratio=1, Additive; Ratio<1, Antagonistic.

Conclusion:

Compound A plus Compound E can achieve synergetic antitumor effect in CD20-resistant DLBCL PDX, with an ORR of 100% compared to 0% in single agents groups.

Example 21: Combination Treatment with Compound A and R-ICE in s.c. CD20-Resistant DLBCL PDX LD2-6026-200614 (BCL-xL High, BCL-2 p.A43T)

TABLE 17

| Group | T/C (%) @ D 10 | Synergy @ D 10 | mRECIST |
|---|---|---|---|
| Vehicle | | | |
| Compound A | 39 | | |
| R-ICE | 18 | | 3/5 PR |
| Compound A + R-ICE | 1 | 10.8 | 5/5 CR |

PDX models: LIDe Bioteh, Rituximab-resistant DLBCLR-ICE

Rituximab 5 mg/kg IV, QW×21D (morning)

Ifosfamide 50 mg/kg IV, QW×21D (afternoon)

Carboplatin 30 mg/kg IP, QW×21D

Etoposide 10 mg/kg IP, QW×21D

Figure 27:
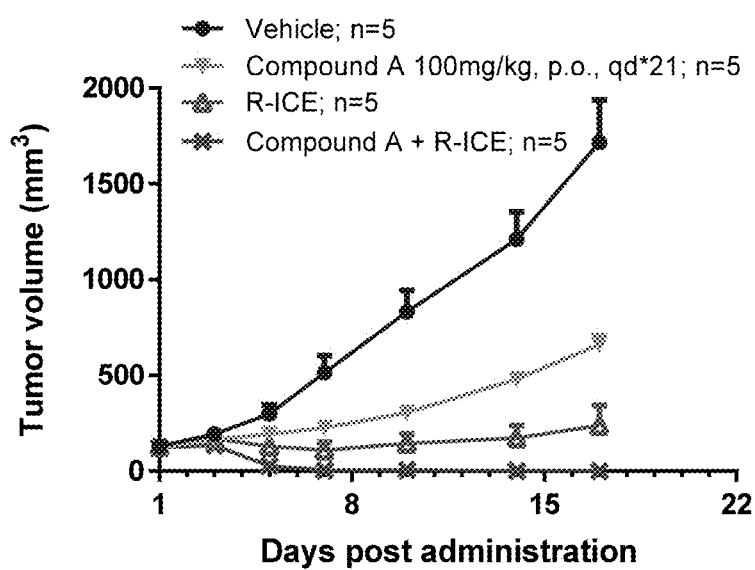
FIG. 27 depicts a graph illustrating each of Compound A and ICE-R as single agents showed no antitumor activity, and combination treatment showed synergistic antitumor effect in s.c. CD20-resistant DLBCL PDX.
Figure 28A:
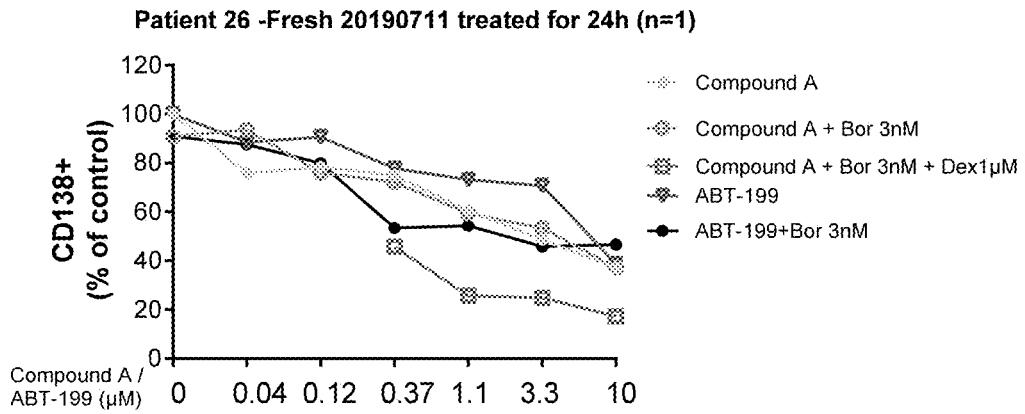
FIG. 28A, FIG. 28B, FIG. 28C, FIG. 28D, FIG. 28E, FIG. 28F, FIG. 28G, FIG. 28H, FIG. 28I, and FIG. 28J depict graphs illustrating Compound A plus bortezomib+/−dexamethasone demonstrated enhanced cell viability inhibition in primary multiple myeloma cells.
Figure 28B:
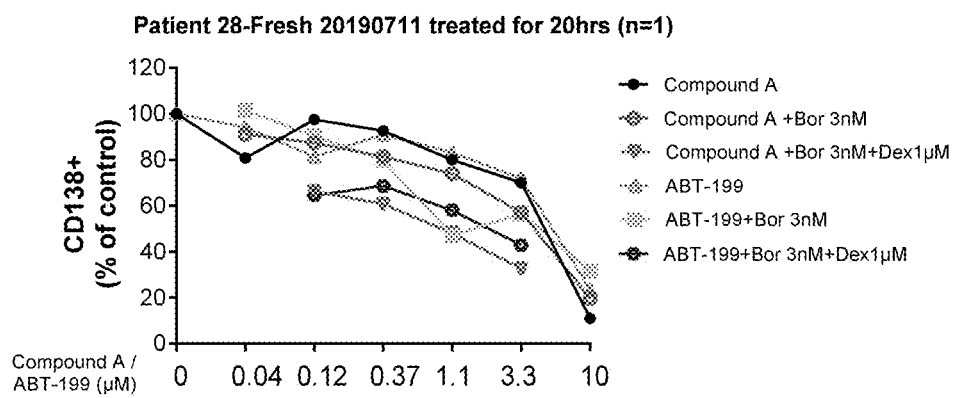
Figure 28C:
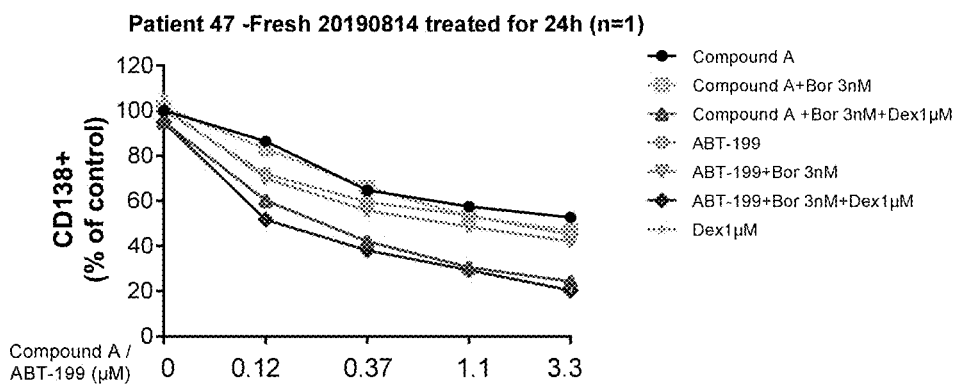
Figure 28D:
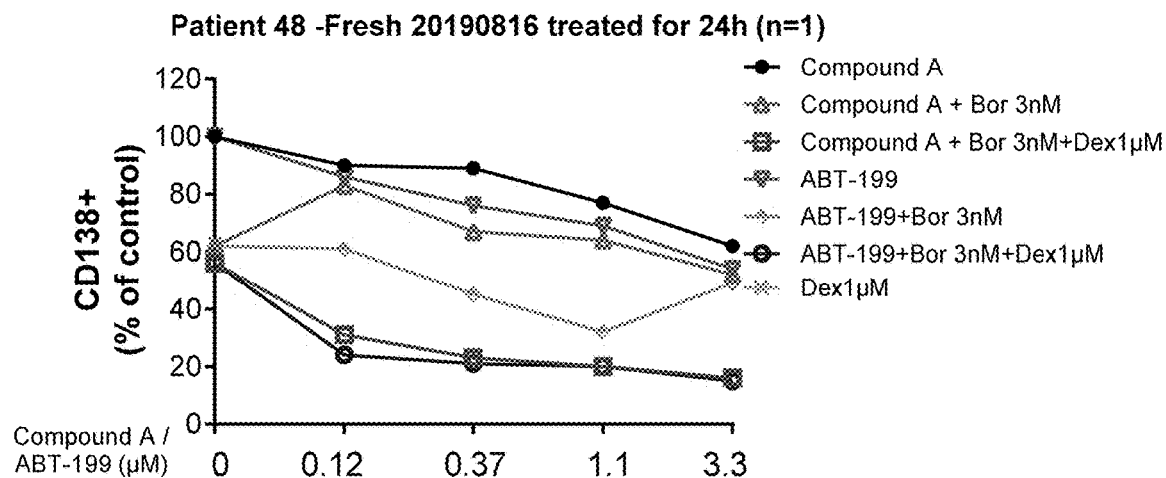
Figure 28E:
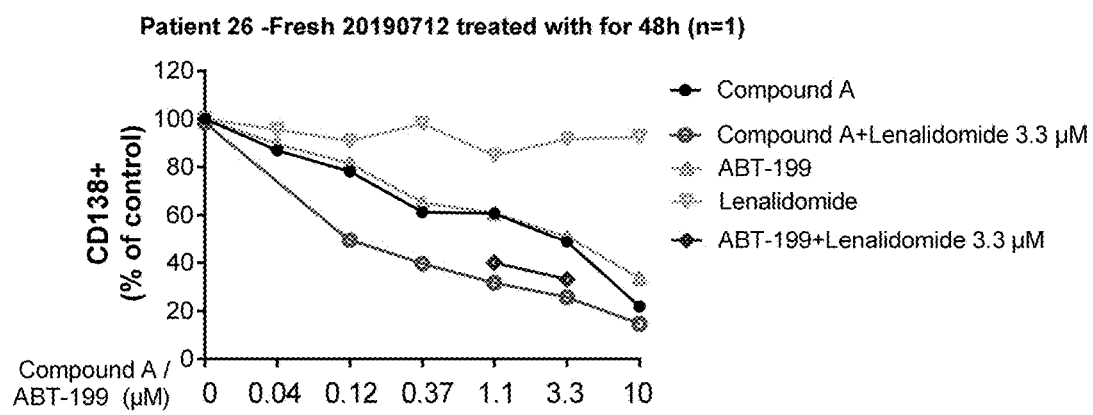
Figure 28F:
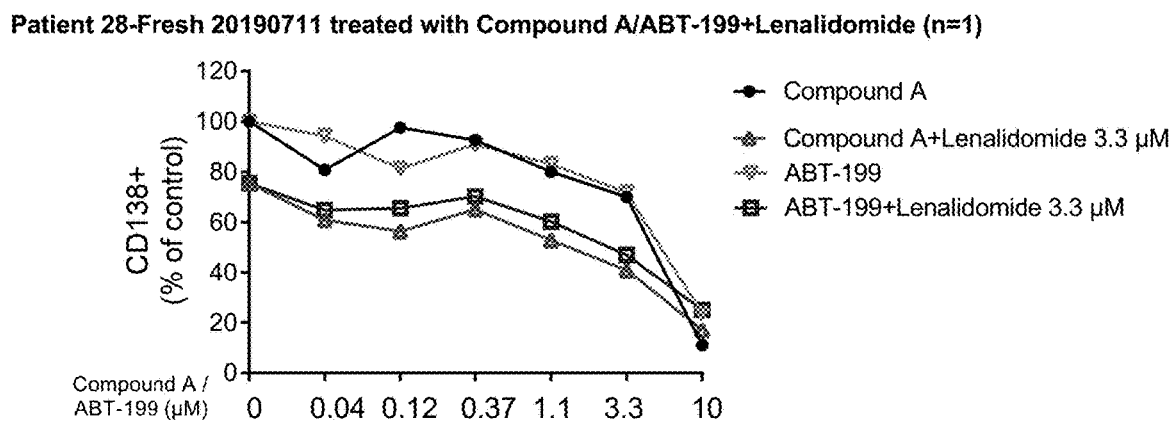
Figure 28G:
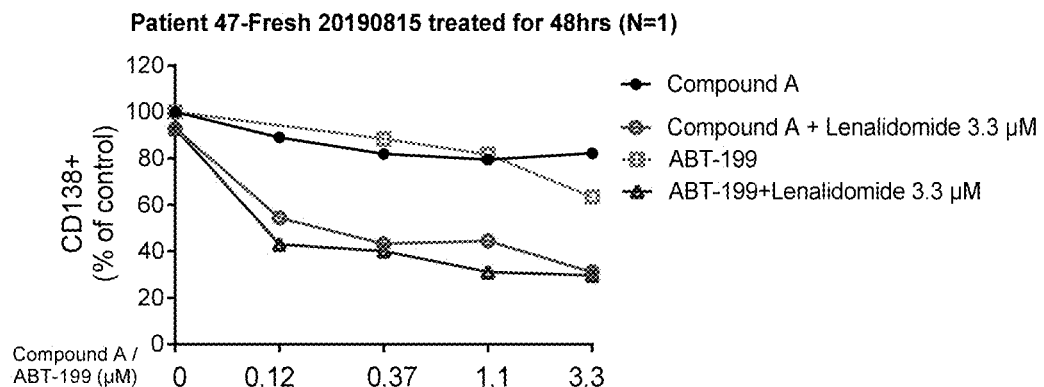
Figure 28H:
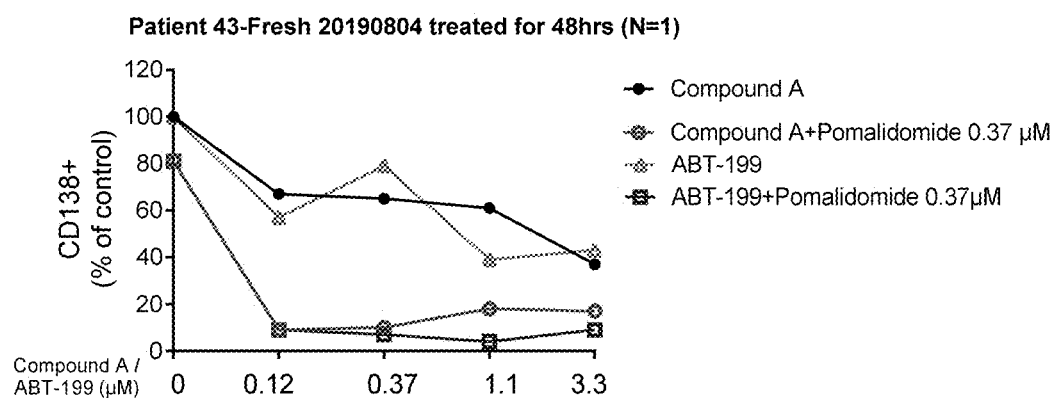
Figure 28I:
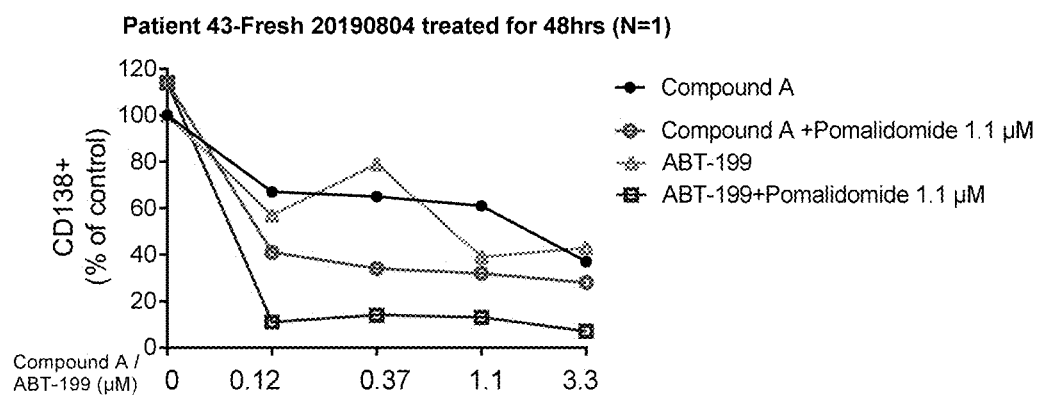
Figure 28J:
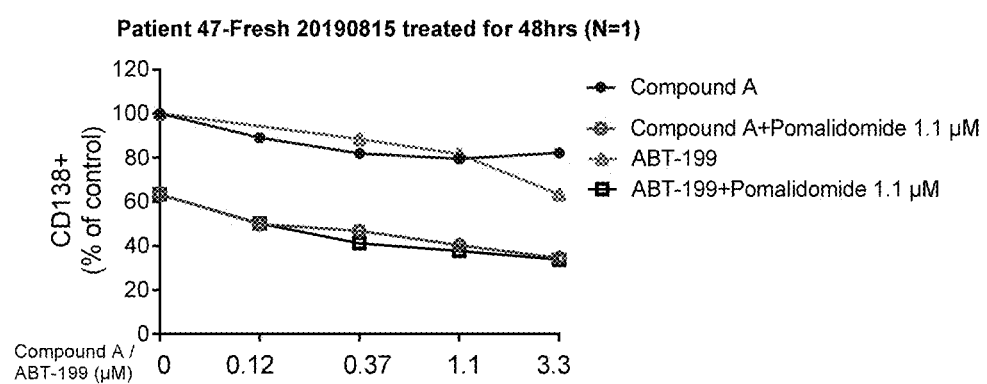

Results:

As FIG. 27 shows, single agents showed no antitumor activity. Combination treatment showed synergistic antitumor effect, As indicated in Table 17, combination treatment results T/C (%) value of 1 on D10, the synergy score was 10.8, indicating very strong synergy. 100% CR was observed, ORR 100%.

Ratio>1, Synergistic; Ratio=1, Additive; Ratio<1, Antagonistic.

Conclusion:

Compound A plus R-ICE can achieve synergetic antitumor effect in CD20-resistant DLBCL PDX, with an ORR of 100% compared to 60% in the R-ICE group.

Example 22: MM Sample CL-MM-001 Shows Enhanced Cell Killing with Combination of Compound A+Bortezomib+Dexamethasone Methods used include cell viability CTG assay.

Compound A plus bortezomib+/−dexamethasone demonstrated enhanced cell viability inhibition in primary multiple myeloma cells.

Figure 29:
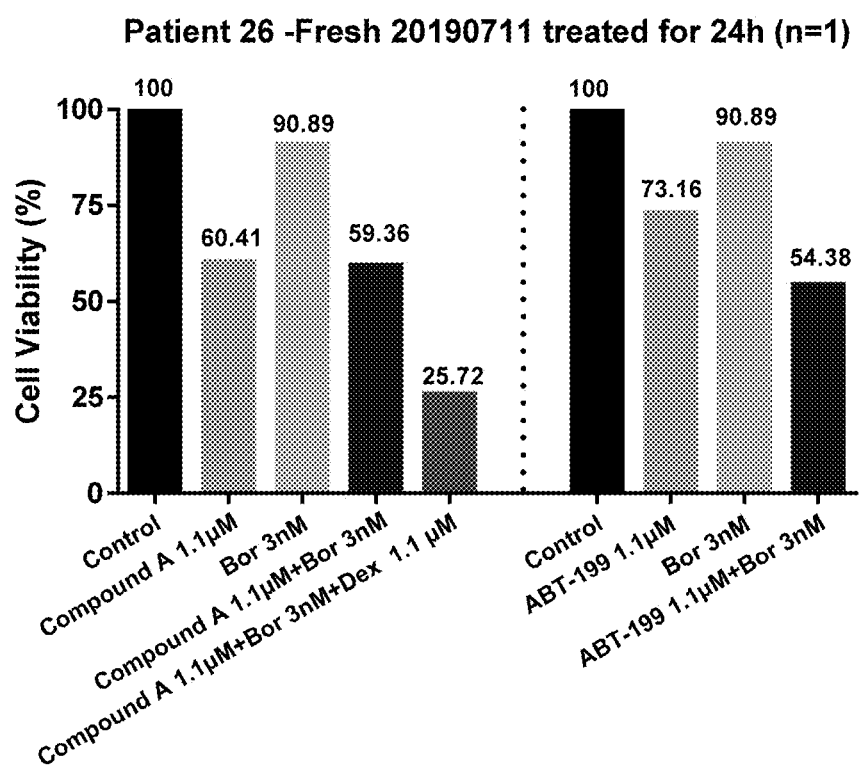
FIG. 29 depicts a graph illustrating quantified cell viability after treatment with indicated drugs/concentration, and triple therapy showed significant decrease of viable cells in primary multiple myeloma cells.

Dose response curve is shown in FIG. 28. FIG. 29 Bar chart quantified cell viability after treatment with indicated drugs/concentration. Triple therapy showed significant decrease of viable cells.

Example 23: MM Sample CL-MM-003 Shows Enhanced Cell Killing with Combination of Compound A/ABT-199+Lenalidomide/+Dexamethasone for 48 Hrs Methods used include cell viability CTG assay.

Figure 30:
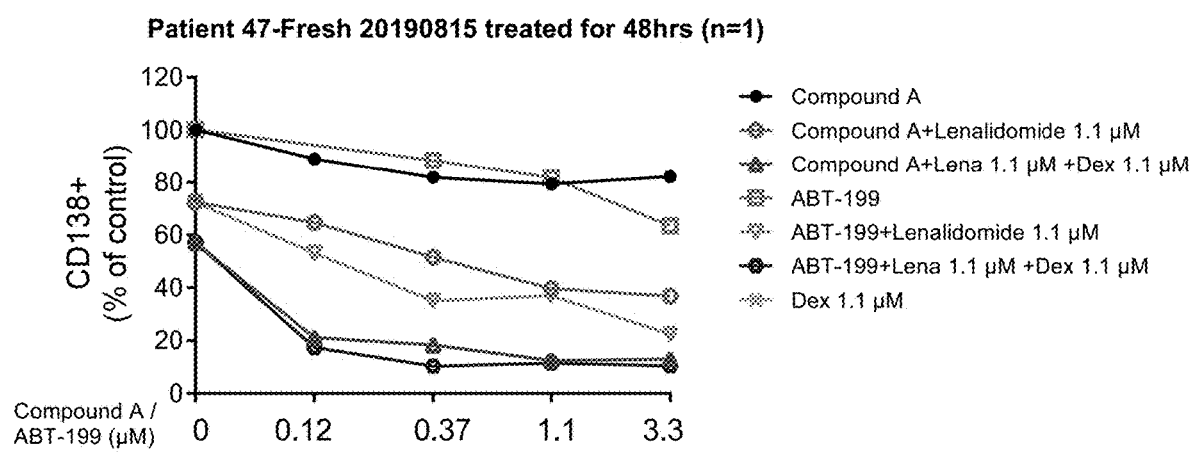
FIG. 30 depicts a graph illustrating Compound A plus lenalidomide+/−dexamethasone demonstrated enhanced cell viability inhibition in primary multiple myeloma cells.
Figure 31:
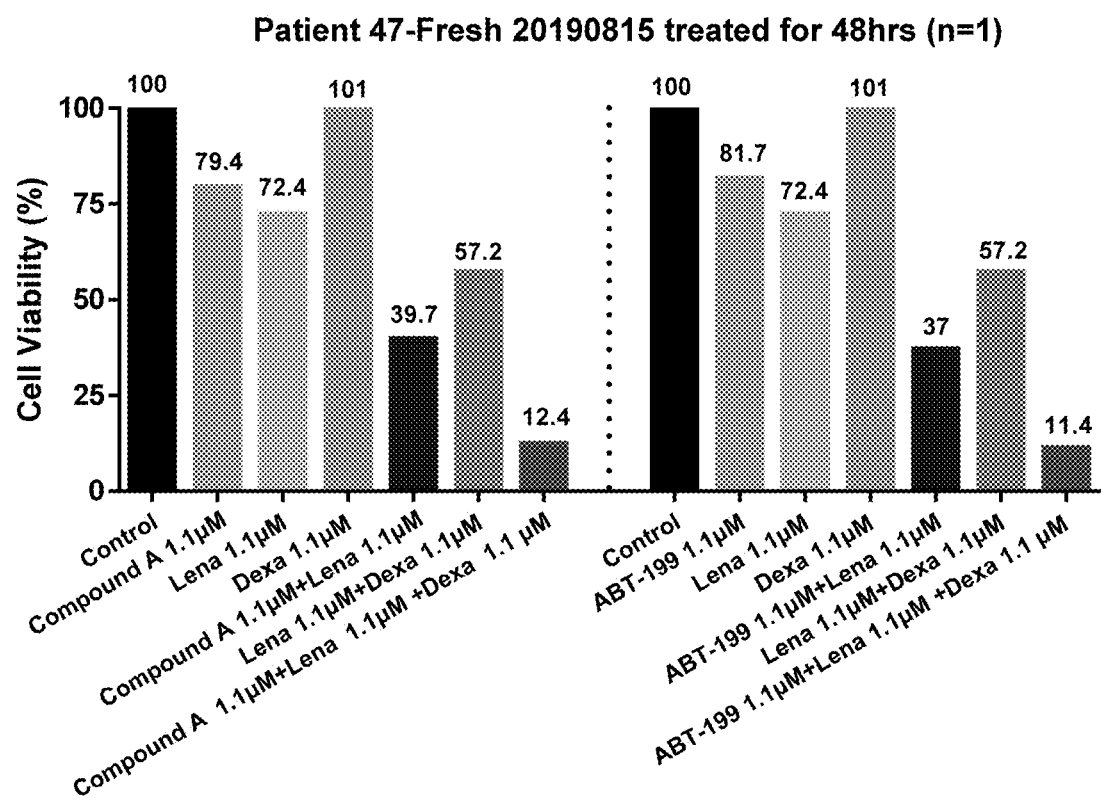
FIG. 31 depicts a graph shows quantified cell viability after treatment with indicated drugs/concentration in primary multiple myeloma cells.

Compound A plus lenalidomide+/−dexamethasone demonstrated enhanced cell viability inhibition in primary multiple myeloma cells. Dose response curve is shown in FIG. 30. Bar chart in FIG. 31 quantified cell viability after treatment with indicated drugs/concentration.

Compound A+lenalidomide inhibit cell viability compared to lenalidomide single agent. (39.7 VS 72.4). Triple therapy showed significant decrease of viable cells compared to lenalidomide+dexamethasone (12.4 VS 57.2)

Example 24: MM Sample CL-MM-003 Shows Enhanced Cell Killing with Combination of Compound A/ABT-199+Pomalidomide+Dexamethasone for 48 Hrs Methods used include cell viability CTG assay.

Figure 32:
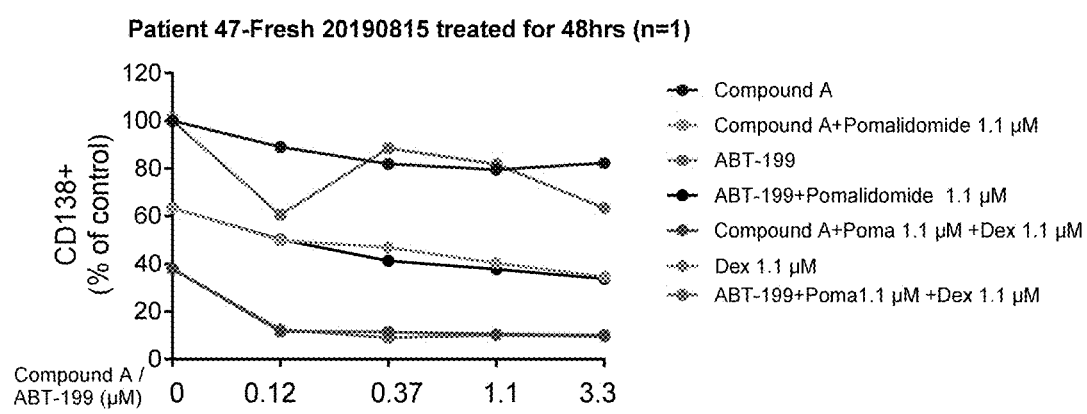
FIG. 32 depicts a graph illustrating Compound A plus pomalodomide+/−dexamethasone demonstrated enhanced cell viability inhibition in primary multiple myeloma cells.
Figure 33:
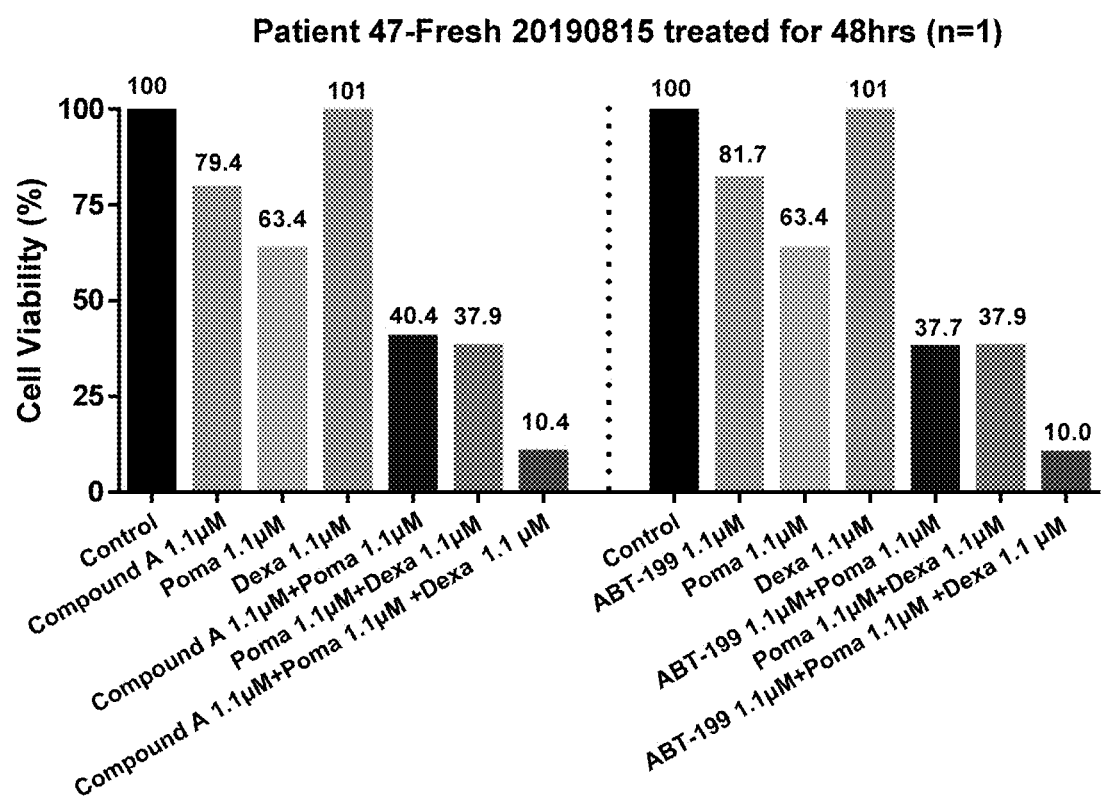
FIG. 33 depicts a graph shows quantified cell viability after treatment with indicated drugs/concentration in primary multiple myeloma cells.

Compound A plus pomalodomide+/−dexamethasone demonstrated enhanced cell viability inhibition in primary multiple myeloma cells. Dose response curve is shown in FIG. 32. Bar chart in FIG. 33 quantified cell viability after treatment with indicated drugs/concentration. Compound A+pomalodomide inhibit cell viability compared to pomalodomide single agent. (40.4 VS 63.4). Triple therapy (red bar) showed significant decrease of viable cells compared to pomalodomide+dexamethasone (10.4 VS 37.9)

Example 25: Compound B and Compound C: Synergy

Methods used include cell viability WST assay.

Combination treatment results lower number of live cells, with a lower value of IC50 compared to single agent. CI value<0.9, indicating synergistic effect.

Figure 34:
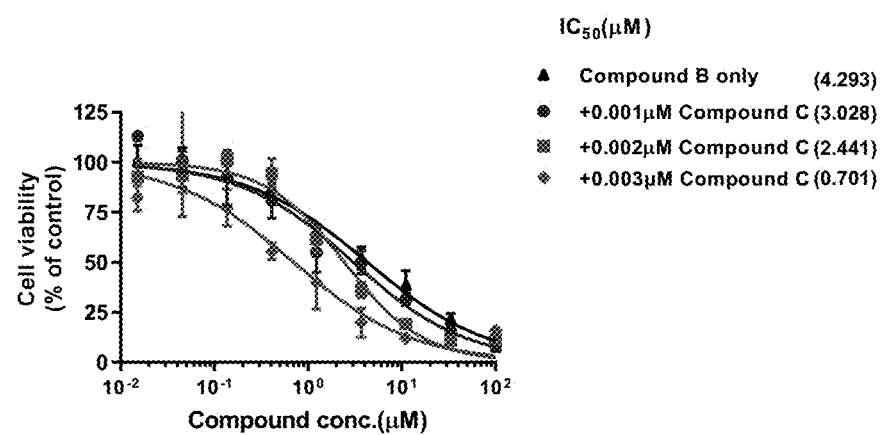
FIG. 34 depicts a graph illustrating combination treatment results lower number of live cells, with a lower value of $IC_{50}$ compared to single agent, and Compound B plus Compound C enhanced cell viability inhibition in MV-4-11 cells after 72 h combination treatment.
Figure 35:
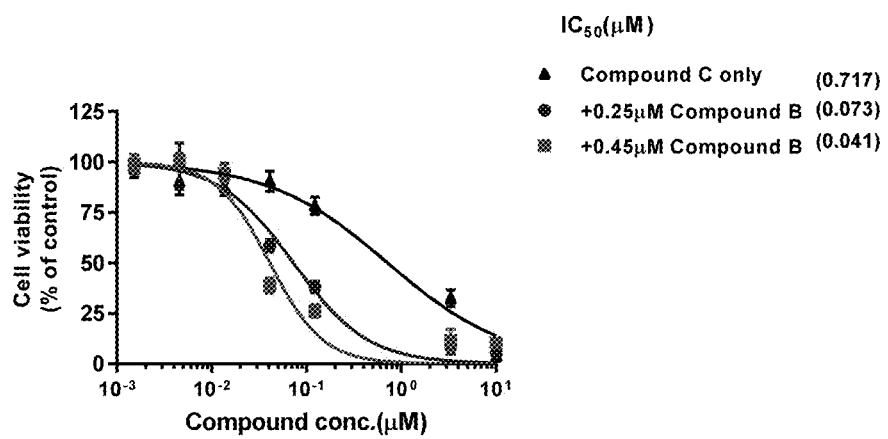
FIG. 35 depicts a graph illustrating combination treatment results lower number of live cells, with a lower value of $IC_{50}$ compared to single agent, and Compound B plus Compound C enhanced cell viability inhibition in ML-2 cells after 72 h combination treatment.
Figure 36:
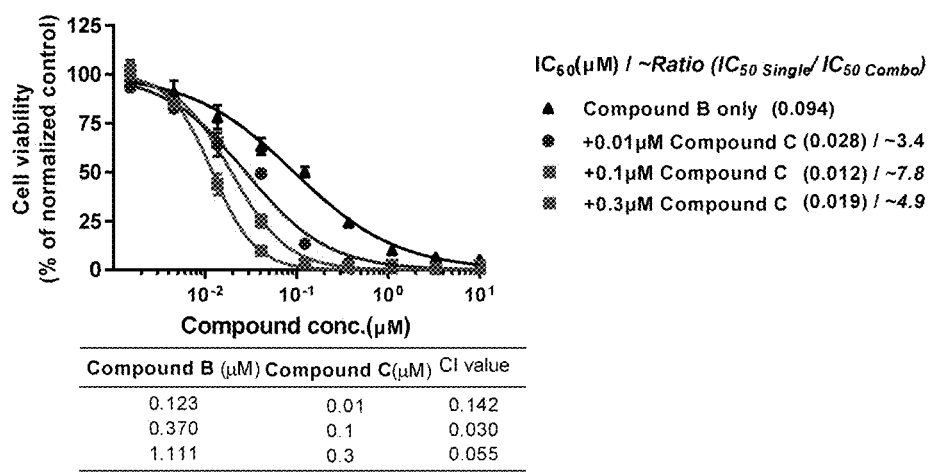
FIG. 36 depicts a graph illustrating combination treatment results lower number of live cells, with a lower value of $IC_{50}$ compared to single agent, and Compound B plus Compound C enhanced cell viability inhibition in MOLT-4 cells after 72 h combination treatment.

Compound B plus Compound C enhanced cell viability inhibition in MV-4-11 cells (FIG. 34), ML-2 (FIG. 35) cells and MOLT-4 (FIG. 36) cells after 72 h combination treatment.

Example 26: Compound B and Compound C Synergy

Methods used include cell viability WST assay.

Figure 37:
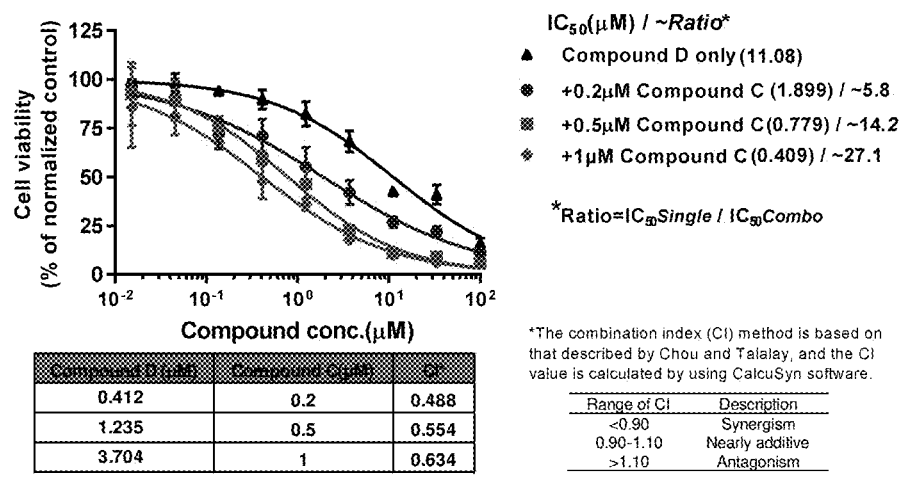
FIG. 37 depicts a graph illustrating combination treatment results lower number of live cells, with a lower value of $IC_{50}$ compared to single agent, and Compound D plus Compound C enhanced cell viability inhibition in NCI-H1993 cells (lung adenocarcinoma) after 72 h combination treatment
Figure 38:
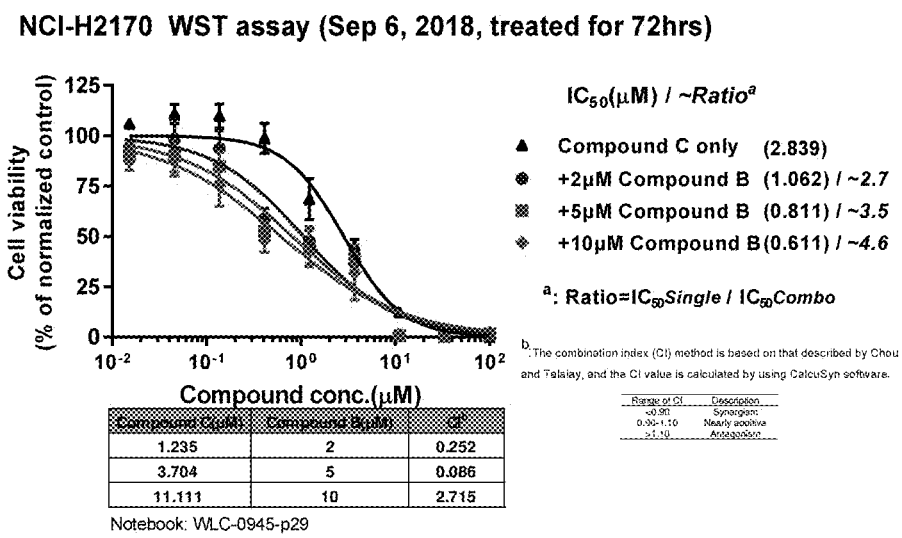
FIG. 38 depicts a graph illustrating combination treatment results lower number of live cells, with a lower value of $IC_{50}$ compared to single agent, and Compound B plus Compound C enhanced cell viability inhibition in NCI-H2170 cells (lung squamous) after 72 h combination treatment.

Combination treatment results lower number of live cells, with a lower value of IC50 compared to single agent. CI value<0.9, indicating synergistic effect. Compound B plus Compound C enhanced cell viability inhibition in NCI-H1993 cells (lung adenocarcinoma, FIG. 37), NCI-H2170 cells (lung squamous, FIG. 38) and after 72 h combination treatment.

Example 27: Combination Treatment with Compound B and Palbociclib (CDK4/6i) in ER+ MCF-7 Subcutaneous Model of Breast Cancer

TABLE 18

| Treatment | RTV@ D 22 | T/C(%)@D 22 | Synergy @D 22 | RTV@D 36 | T/C(%)@D 36 | Synergy @D 36 | mRECIST | Response @ D 36 |
|---|---|---|---|---|---|---|---|---|
| Vehicle control | 3.6 ± 0.6 | — | — | 6.5 ± 1.3 | — | — | 1/6 SD, 5/6 PD | 6/6 PD |
| Compound B | 2.8 ± 0.5 | 78.8 | — | 7.1 ± 1.5 | 109.0 | — | 3/6 SD, 3/6 PD | 1/6 SD, 5/6 PD |
| Palbociclib | 1.4 ± 0.4 | 39.3 | — | 2.9 ± 0.8 | 44.2 | — | 1/6 PR, 4/6 SD, 1/6 PD | 2/6 SD, 4/6 PD |
| Compound B + Palbociclib | 1.0 ± 0.2 | 27.5 | 1.13 | 1.9 ± 0.4*# | 29.4 | 1.64 | 4/6, PR, 2/6 SD | 1/6 PR, 3/6 SD, 2/6 PD |

Figure 39:
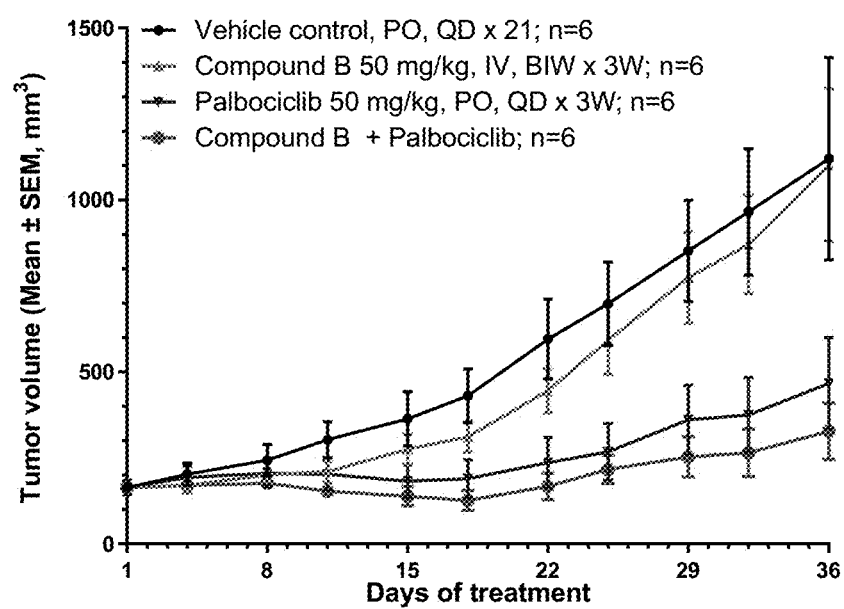
FIG. 39 depicts a graph illustrating palbociclib single agent showed moderate antitumor activity in ER+ MCF-7 subcutaneous model of breast cancer, and Compound B plus Palbociclib achieved a significantly synergetic antitumor effect.

*p < 0.05 vs. vehicle control group;
p < 0.05 vs. Compound B group;
Ratio > 1, Synergistic;
Ratio = 1, Additive;
Ratio < 1, Antagonistic As shown in the tumor volume curves, palbociclib single agent showed moderate antitumor activity (FIG. 39). T/C % value for palbociclib or Compound B single agents on D36 is 39.3 and 78.8 respectively (Table 18). Compound B plus Palbociclib achieved a significantly synergetic antitumor effect, with a T/C (%) value of 29.4, achieved 4/6 CR, ORR=66.7%, the synergy score was 1.64, indicating strong synergistic effects.

*P<0.05 vs. vehicle control group; *P<0.05 vs. Compound B group (Table 18).

Conclusion:

Combination treatment with Compound B and Palbociclib achieved a significantly synergetic antitumor effect in s.c. ER+ MCF-7 breast cancer xenograft. with improved ORR from 0 to 16.7%.

Example 28: Combination Treatment with
Compound B and Tamoxifen in ER+ MCF-7
Subcutaneous Model of Breast Cancer Shows
Synergy

TABLE 19

| Treatment | RTV@ D 22 | T/C(%)@ 22 | Synergy @D 22 | RTV@D 36 | T/C(%)@D 36 | Synergy @D 36 | mRECIST | Response rate @D 36 |
|---|---|---|---|---|---|---|---|---|
| Vehicle control | 3.6 ± 0.6 | — | — | 6.5 ± 1.3 | — | — | 1/6 SD, 5/6 PD | 6/6 PD |
| Compound B 50 mg/kg | 2.8 ± 0.5 | 78.8 | — | 7.1 ± 1.5 | 109.0 | — | 3/6 SD, 3/6 PD | 1/6 SD, 5/6 PD |
| Tamoxifen 3 or 1 mg/kg | 0.7 ± 0.3* | 20.4 | — | 1.4 ± 0.8* | 22.0 | — | 4/6 PR, 2/6 SD | 4/6 PR, 2/6 PD |
| Compound B + Tamoxifen | 0.4 ± 0.2*# | 11.9 | 1.35 | 0.7 ± 0.4**## | 10.1 | 2.37 | 3/6 CR, 1/6 PR, 2/6 SD | 3/6 CR, 1/6 PR, 1/6 SD, 1/6 PD |

Figure 40:
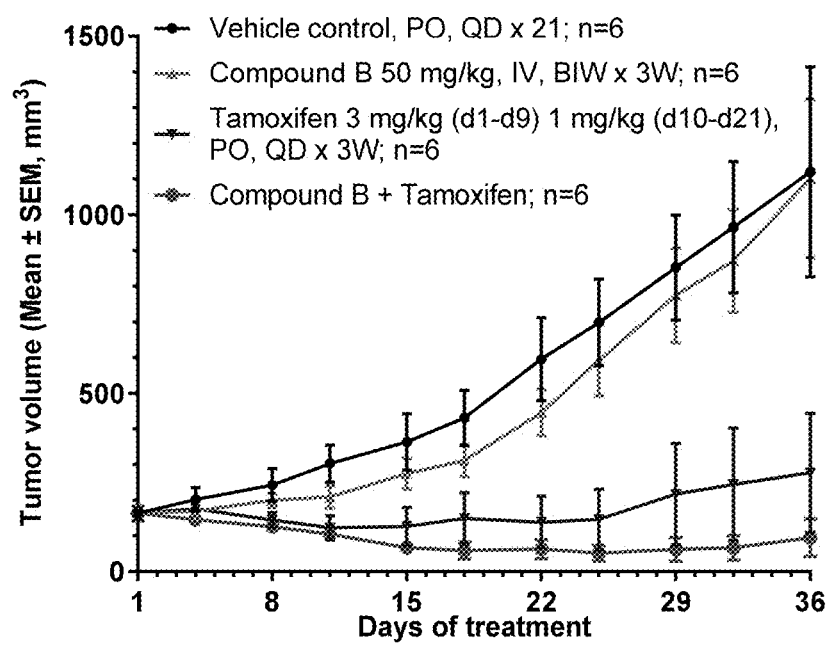
FIG. 40 depicts a graph illustrating tamoxifen and Compound B as single agents showed moderate antitumor activity, and combination treatment significantly enhance tumor repression in ER+ MCF-7 subcutaneous model of breast cancer.
Figure 41:
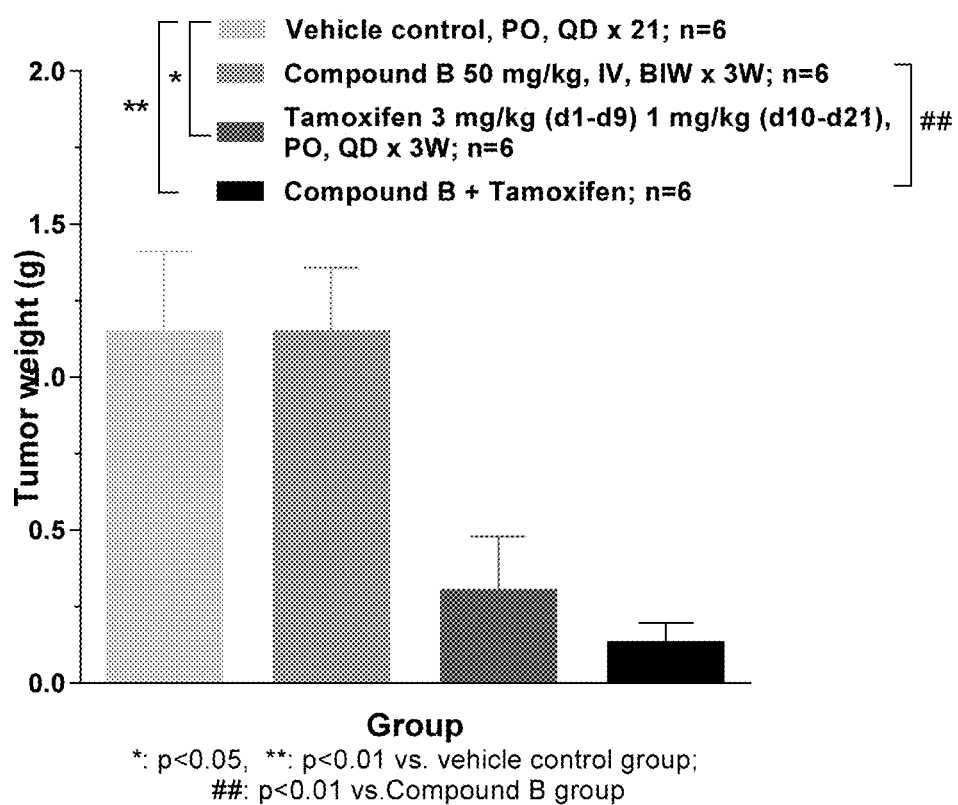
FIG. 41 depicts a graph illustrating tamoxifen and Compound B in combination treatment achieved lowest tumor weight at the end of treatment in ER+ MCF-7 subcutaneous model of breast cancer.

*p < 0.05 vs. vehicle control group,
**p < 0.01 vs. vehicle control group;
p < 0.05 vs. Compound B group,
p < 0.01 vs. Compound B group;
Ratio > 1, Synergistic;
Ratio = 1, Additive;
Ratio < 1, Antagonistic As shown in FIG. 40, single agents showed moderate antitumor activity. Combination treatment significantly enhance tumor repression. As shown in FIG. 41, combination treatment achieved lowest tumor weight at the end of treatment. As shown in Table 19, T/C (%) value of the combination group was 10.1 on Day 36. compared to 109 or 22 from single agents groups. Animals from combination group achieved 3/6 CR, 1/6 PR, ORR=66.7%.
*p<0.05 vs. vehicle control group, **p<0.01 vs. vehicle control group; #p<0.05 vs. Compound B group, ##p<0.01 vs. Compound B group.
Conclusion:
Combination of Compound B and tamoxifen achieved synergistic antitumor effect in s.c. ER+ MCF-7 breast cancer xenograft, achieved ORR 66.7%, same as tamoxifen group but with more CR.

Figure 42:
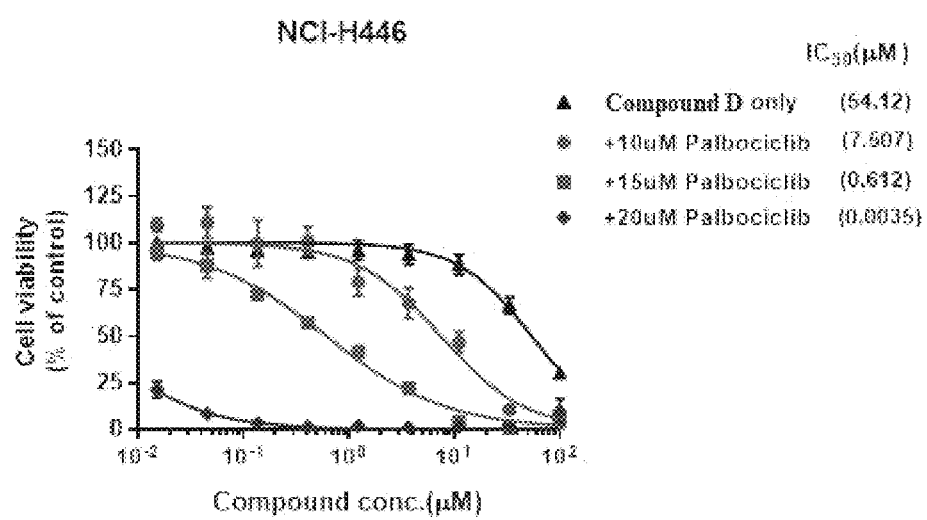
FIG. 42 illustrates enhanced cell viability inhibition in NCI-H446 cells after 72 h combination treatment and Compound D plus palbociclib enhanced cell viability inhibition SCLC cell lines NCI-H446 cells after 72 h combination treatment.

Example 29: In Vitro Anti-Proliferative Activity of
Combination Treatment with Compound
B/Compound D and Palbociclib Methods used include cell viability WST assay.
Combination treatment results lower number of live cells. CI value<0.9, indicating synergistic effect achieved. Compound B plus CDK4/6 inhibitor(palbociclib) enhanced cell viability inhibition in NCI-H69 cells after 72 h combination treatment. Compound D plus CDK4/6 inhibitor(palbociclib) enhanced cell viability inhibition in SCLC cell lines NCI-H446 cells after 72 h combination treatment (FIG. 42).

Figure 43:
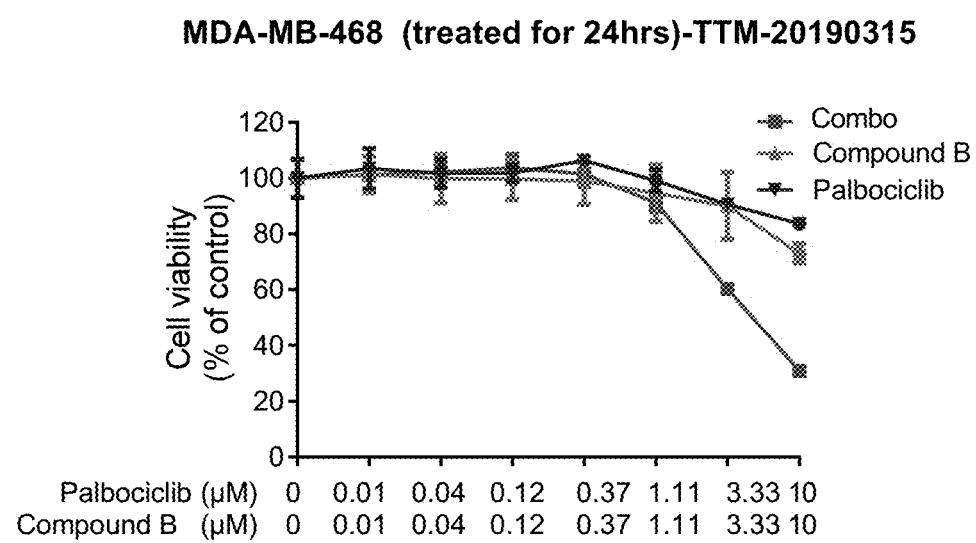
FIG. 43 depicts a graph illustrating Compound B and CDK4/6 inhibitor (palbociclib) in combination treatment results lower number of live cells, and Compound B plus CDK4/6 inhibitor(palbociclib) enhanced cell viability inhibition in oci-am MDA-MB-468 cells (FIG. 43) after 24 h combination treatment.
Figure 44:
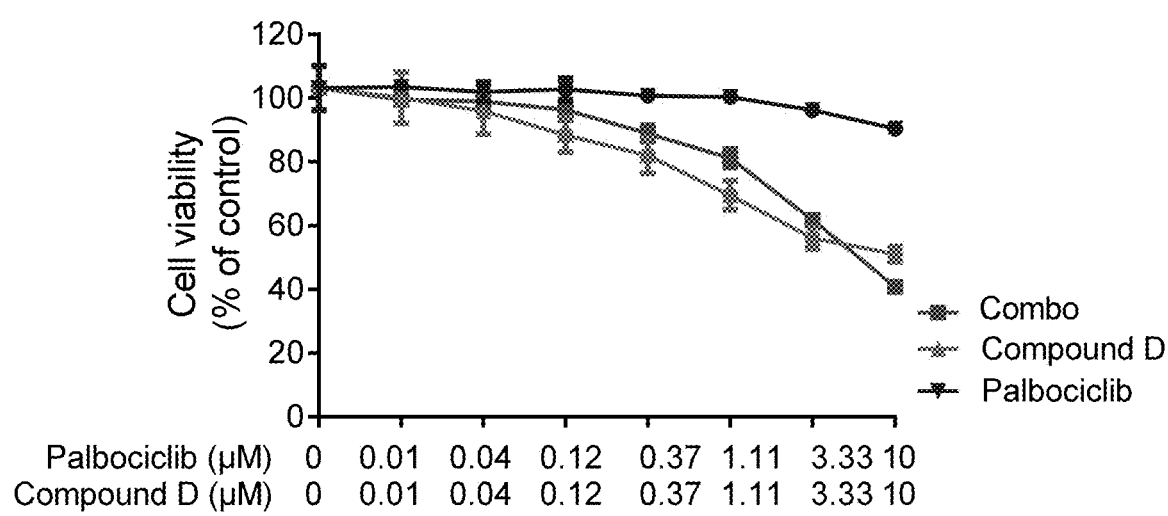
FIG. 44 depicts a graph illustrating Compound D and CDK4/6 inhibitor (palbociclib) in combination treatment results lower number of live cells, and Compound D plus CDK4/6 inhibitor(palbociclib) enhanced cell viability inhibition in 2LMP cells after 24 h combination treatment.

Example 30: In Vitro Anti-Proliferative Activity of
Combination Treatment with Compound D and
Palbociclib Methods used include cell viability CTG assay.
Combination treatment results lower number of live cells. Compound D plus CDK4/6 inhibitor(palbociclib) enhanced cell viability inhibition in TNBC MDA-MB-468 cells (FIG. 43) and 2LMP cells (FIG. 44) after 24 h combination treatment.

Figure 45:
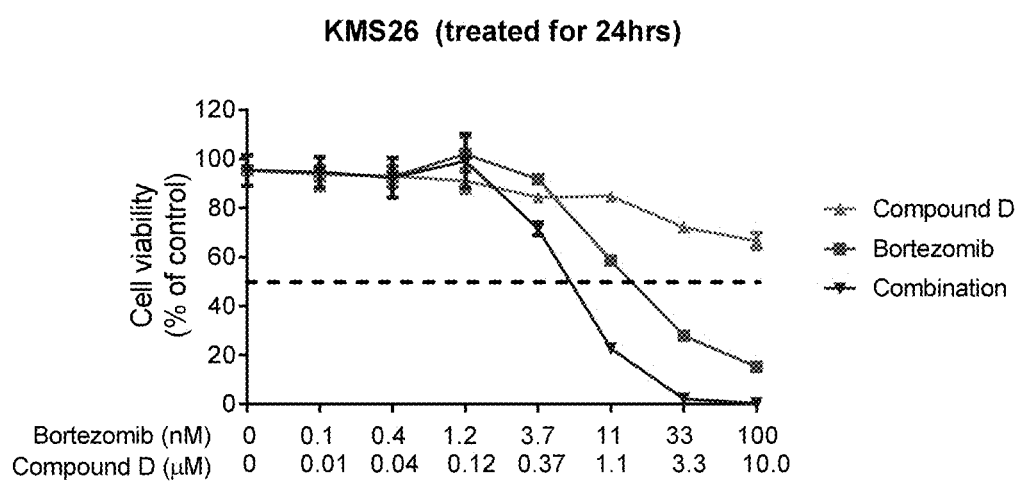
FIG. 45 depicts a graph illustrating combination treatment showed lower cell viability compared to single agents, and Compound D plus bortezomib enhanced cell viability inhibition in KMS26 cells after 24 h combination treatment.
Figure 46:
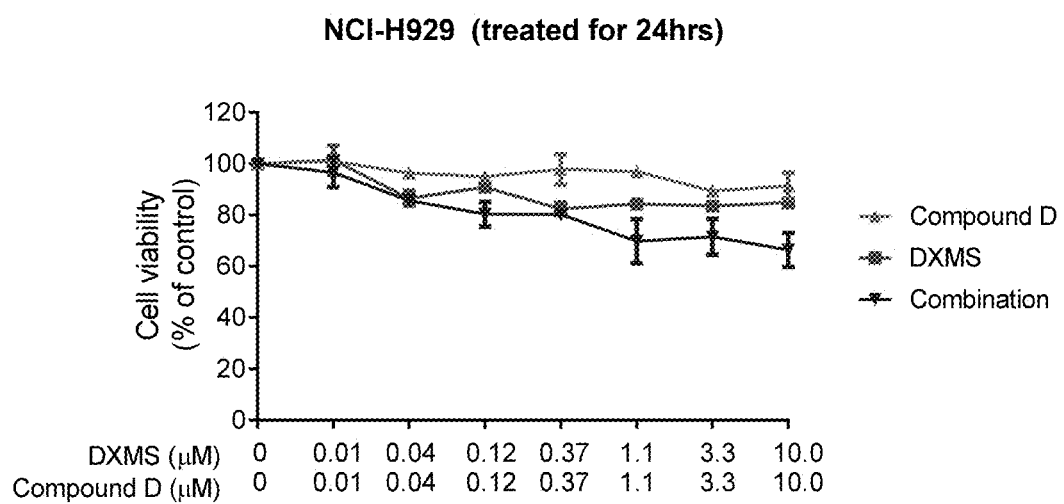
FIG. 46 depicts a graph illustrating depicts a graph illustrating combination treatment showed lower cell viability compared to single agents, and Compound D plus DXMS enhanced cell viability inhibition in NCI-H929 after 24 h combination treatment.

Example 31: In Vitro Anti-Proliferative Activity of
Combination Treatment with Compound D and
Bortezomib/DXMS: Synergy Methods used include cell viability CTG assay.
Combination treatment showed lower cell viability compared to single agents. Compound D plus bortezomib enhanced cell viability inhibition in KMS26 cells (FIG. 45) after 24 h combination treatment. Compound D plus DXMS enhanced cell viability inhibition in NCI-H929 (FIG. 46) after 24 h combination treatment.

Example 32: Combination Treatment with
Compound E and Compound A/Compound B in
Subcutaneous Z138 MCL: Study Design

TABLE 20

| Treatment | RTV @ D 21 | T/C(%) @ D 21 | Synergy ratio @ D 21 | mRECIST | Response @ D 21 |
|---|---|---|---|---|---|
| Vehicle control | 15.15 ± 2.03 | — | — | 6/6 PD | 6/6 PD |
| Compound E 100 mpk | 0.82 ± 0.45** | 5.43 | — | 6/6 PR | 4/6 PR, 1/6 SD, 1/6 PD |

TABLE 20-continued

| Treatment | RTV @ D 21 | T/C(%) @ D 21 | Synergy ratio @ D 21 | mRECIST | Response @ D 21 |
|---|---|---|---|---|---|
| Compound B | 6.14 ± 0.89 | 40.54 | — | 6/6 PD | 6/6 PD |
| Compound B + Compound E 100 mpk | 0.14 ± 0.05**$ | 0.96 | 2.30 | 2/6 CR, 4/6 PR | 2/6 CR, 4/6 PR |

*P < 0.05, vs. vehicle control;
***P < 0.001, vs. vehicle control;
$P < 0.01, vs. Compound B 65 mg/kg group;
Synergy: Ratio > 1, synergistic; Ratio = 1, additive; Ratio < 1, antagonistic.

Figure 47:
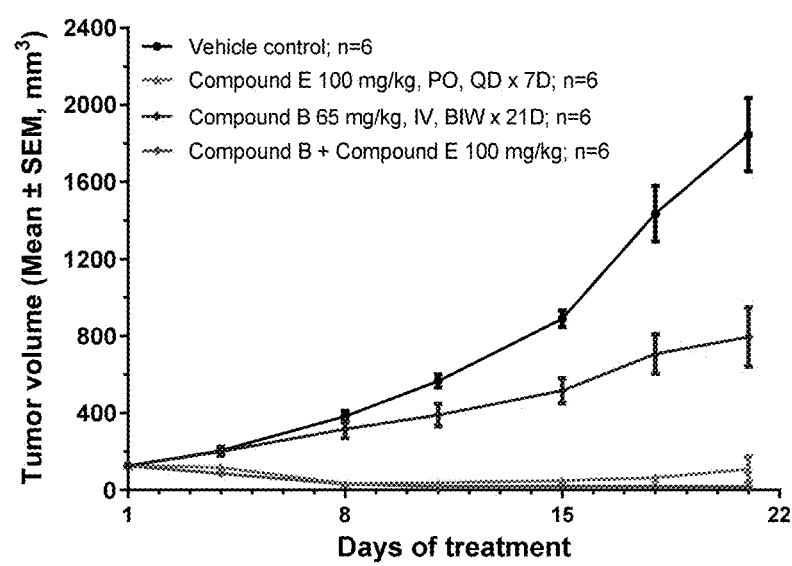
FIG. 47 depicts a graph illustrating Compound B as single agent showed moderate antitumor activity, and combination treatment of Compound E plus Compound B showed significantly antitumor effect in in subcutaneous Z138 MCL xenograft.

As shown in FIG. 47, Compound B single agent showed moderate antitumor activity. Combination treatment of Compound E plus Compound B showed significantly antitumor effect. As shown in Table 20, combination treatment results T/C (%) value of 0.96; the synergy score was 2.3, indicating strong synergistic effects. Animals from combination group achieved 2/6CR, 4/6 PR, ORR=100%.

*P<0.05, vs. vehicle control; ***P<0.001, vs. vehicle control; $P<0.05, vs. Compound B 65 mg/kg group; Synergy: Ratio>1, synergistic; Ratio=1, additive; Ratio<1, antagonistic.

Conclusion:

Compound B plus Compound E can achieve synergetic antitumor effect in MCL Z138 xenograft, achieved 100% ORR, compared to 66.7% in the Compound E single group.

Example 33: Combination Treatment with Compound B and Compound E in Subcutaneous RS4;11 TP53$^{wt}$ ALL (Staged) Shows Synergy

TABLE 21

| Treatment | RTV@D 21 | T/C(%)@D 21 | Synergy ratio |
|---|---|---|---|
| Compound B Vehicle + Compound E Vehicle | 11.5 ± 1.0 | — | |
| Compound B 100 mg/kg | 6.4 ± 0.7** | 56 | |
| Compound E 50 mg/kg | 11.1 ± 0.9 | 97 | |
| Compound B 100 mg/kg + Compound E | 4.3 ± 0.6***#+++ | 38 | 1.44 (+) |

Figure 48:
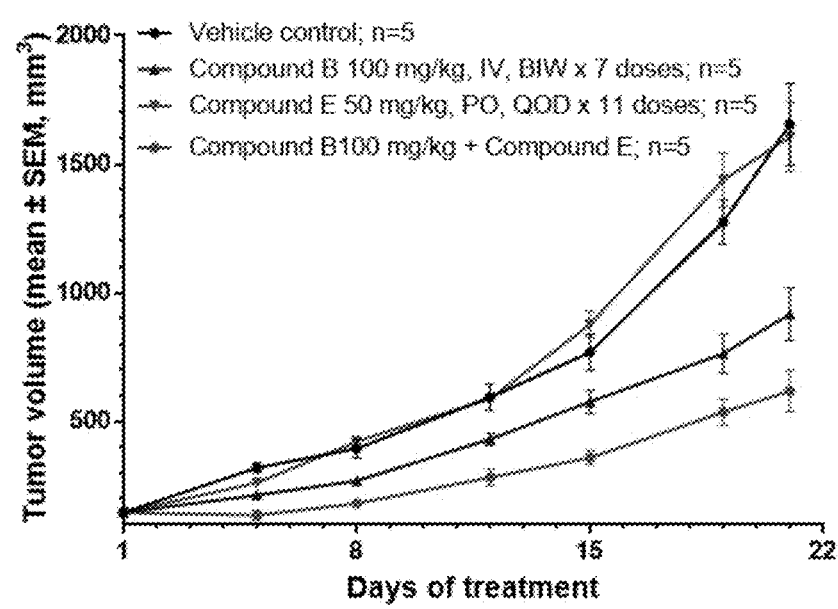
FIG. 48 depicts a graph illustrating each of Compound E at 50 mg/kg and Compound B 100 at mg/kg as single agents showed moderate antitumor activity, and combination treatment of Compound E plus Compound B showed enhanced antitumor effect subcutaneous RS4;11 TP53$^{wt}$ ALL xenograft.

**p < 0.01,
***p < 0.001 vs. vehicle control group;
p < 0.05 vs. Compound B group;
+++p < 0.001 vs. Compound E group;
Synergy:
Ratio > 1, Synergistic;
Ratio = 1, Additive;
Ratio < 1, Antagonistic As shown in FIG. 48, Compound E 50 mg/kg and Compound B 100 mg/kg single agent showed moderate antitumor activity. Combination treatment of Compound E plus Compound B showed enhanced antitumor effect. As shown in Table 21, combination treatment achieves a T/C (%) value of 38, the synergy score was 1.14, indicating synergistic effects.

**P<0.01, vs. vehicle control; #P<0.05, vs. Compound A group; Synergy: Ratio>1, synergistic; Ratio=1, additive; Ratio<1, antagonistic.

Conclusion:

Compound B plus Compound E can achieve synergetic antitumor effect in RS4;11 ALL xenograft.

Example 34: In Vitro Antiproliferative Activity of Combination Treatment with Compound D and Compound E Methods used include cell viability CTG assay.

Figure 49:
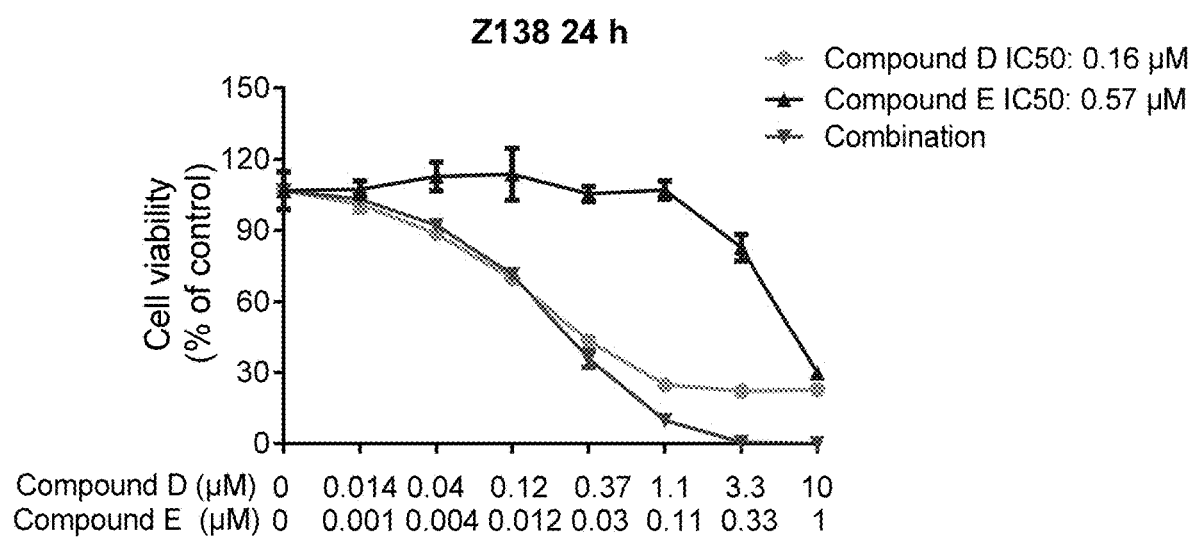
FIG. 49 depicts a graph illustrating Compound D and Compound E in combination treatment showed lower cell viability compared to single agents, and Compound D plus Compound E enhanced cell viability inhibition in Z138 cells after 24 h combination treatment.

Combination treatment showed lower cell viability compared to single agents (FIG. 49). Compound D plus Compound E enhanced cell viability inhibition in Z138 cells after 24 h combination treatment.

Example 35: In Vitro Anti-Proliferative Activity of Combination Treatment with Compound B/Compound D and Compound E Methods used include cell viability WST assay.

Figure 50:
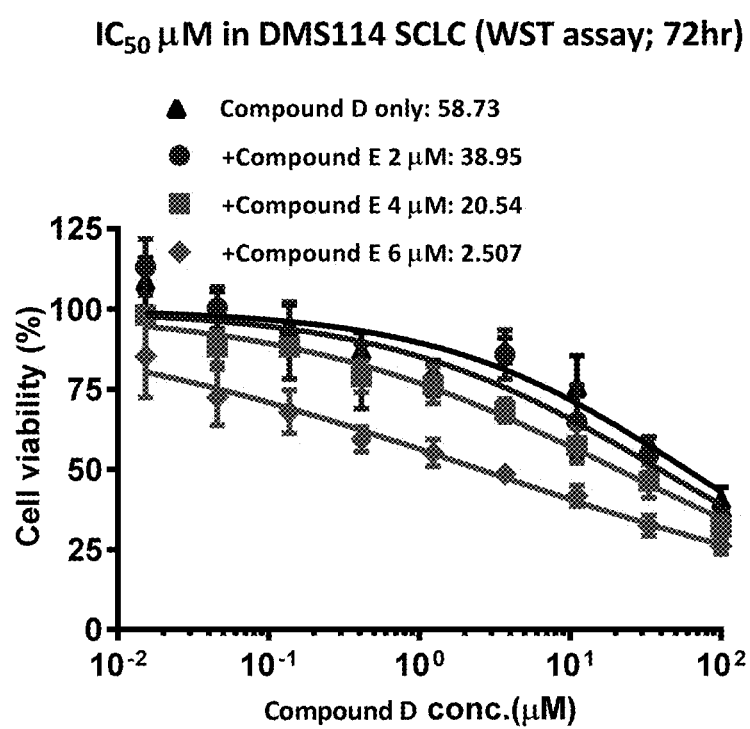
FIG. 50 depicts a graph illustrating Compound D and Compound E in combination treatment results lower number of live cells, a decrease of $IC_{50}$ recorded in combination group, suggesting synergistic effect, and Compound D plus Compound E enhanced cell viability inhibition in DMS114 cells after 72 h combination treatment.
Figure 51:
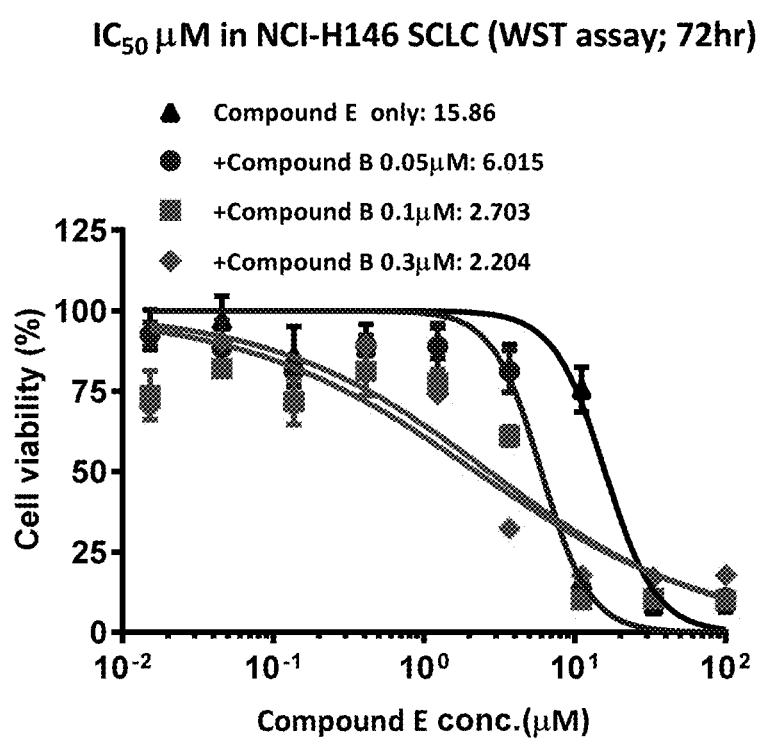
FIG. 51 depicts a graph illustrating Compound B and Compound E in combination treatment results lower number of live cells, a decrease of $IC_{50}$ recorded in combination group, suggesting synergistic effect, and Compound B plus Compound E enhanced cell viability inhibition in NCI-H146 after 72 h combination treatment.

Combination treatment results lower number of live cells. A decrease of IC50 was recorded in the combination group, suggesting synergistic effect. Compound D plus Compound E enhanced cell viability inhibition in DMS114 cells (FIG. 50) and NCI-H146 (FIG. 51) after 72 h combination treatment.

Figure 52A:
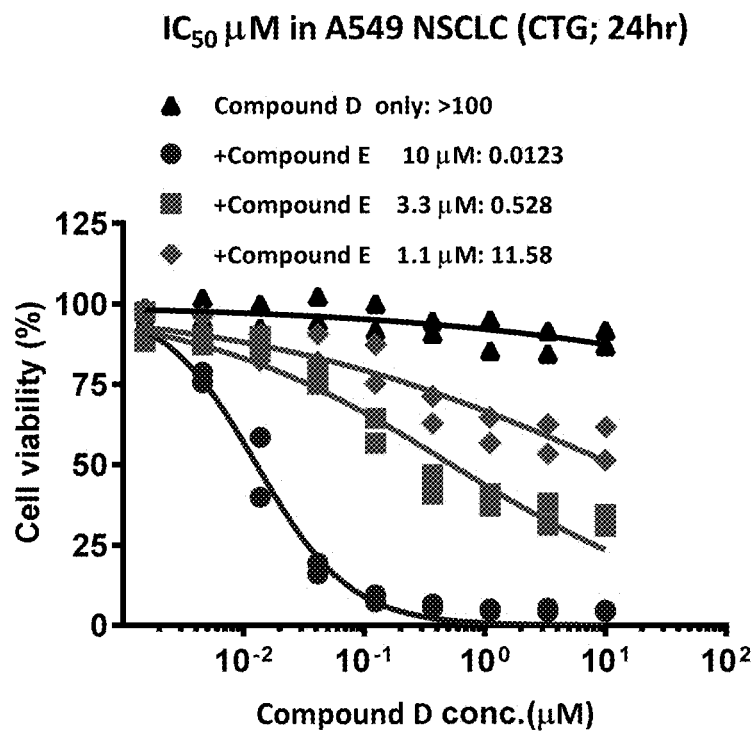
FIG. 52A, FIG. 52B, FIG. 52C, and FIG. 52D depict graphs illustrating Compound D and Compound E in combination treatment results lower number of live cells, a decrease of $IC_{50}$ recorded in combination group, suggesting synergistic effect, and Compound D plus Compound E enhanced cell viability inhibition in A549, NCL-H1975, NCL-H1650, KMS-26, after 24 h combination treatment.
Figure 52B:
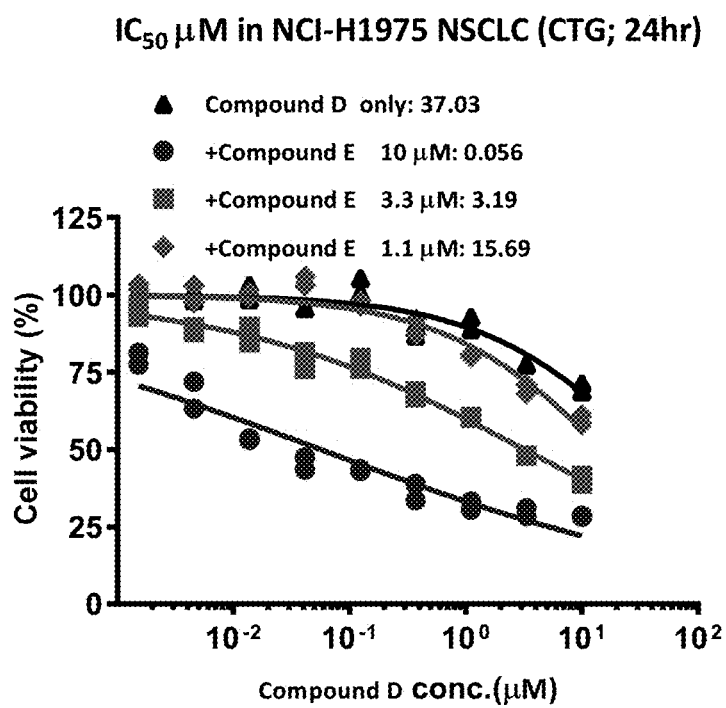
Figure 52C:
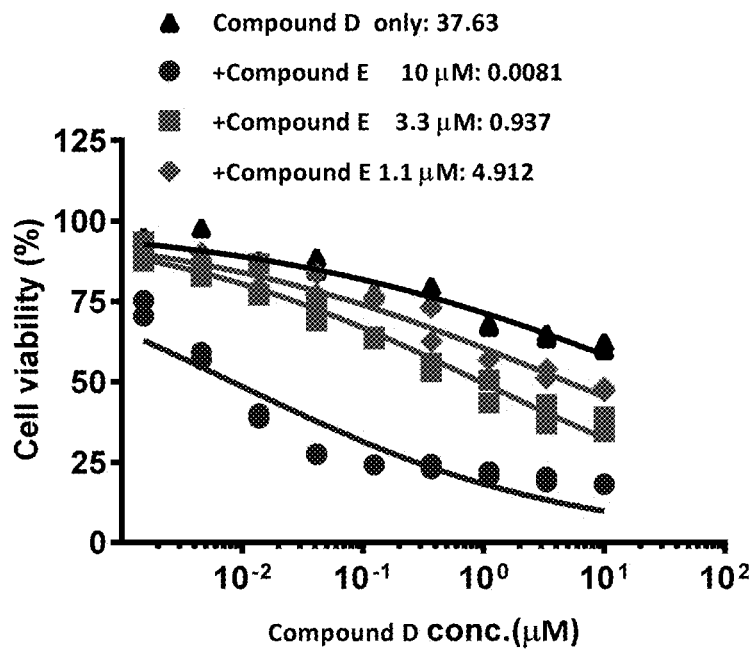
Figure 52D:
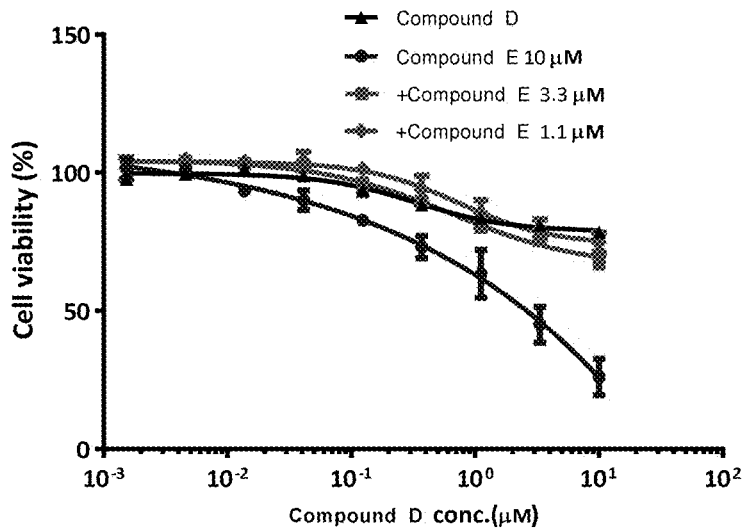

Example 36: In Vitro Anti-Proliferative Activity of Combination Treatment with Compound D and Compound E Methods used include cell viability WST assay Combination treatment results lower number of live cells. A decrease of IC50 was recorded in the combination group, suggesting synergistic effect. Compound D plus Compound E enhanced cell viability inhibition in A549 cells (FIG. 52A), NCI-H1975 cells (FIG. 52B), NCI-H1650 cells (FIG. 52C), and KMS-26 MM cells (FIG. 52D), all after 24 h combination treatment.

Example 37: Combination Treatment of Compound E with Compound D in RS4;11 and RS4;11-R$^{ABT-199}$ for 72 h to Overcome ABT-199 Resistance Methods used include cell viability CTG assay Combination treatment results lower number of live cells. CI<0.9 indicating synergistic antiproliferative effect. Compound D plus Compound E enhanced cell viability inhibition in RS4;11 cells and RS4;11-R$^{ABT-199}$ cells after 72 h combination treatment (FIG. 53).

Figure 53:
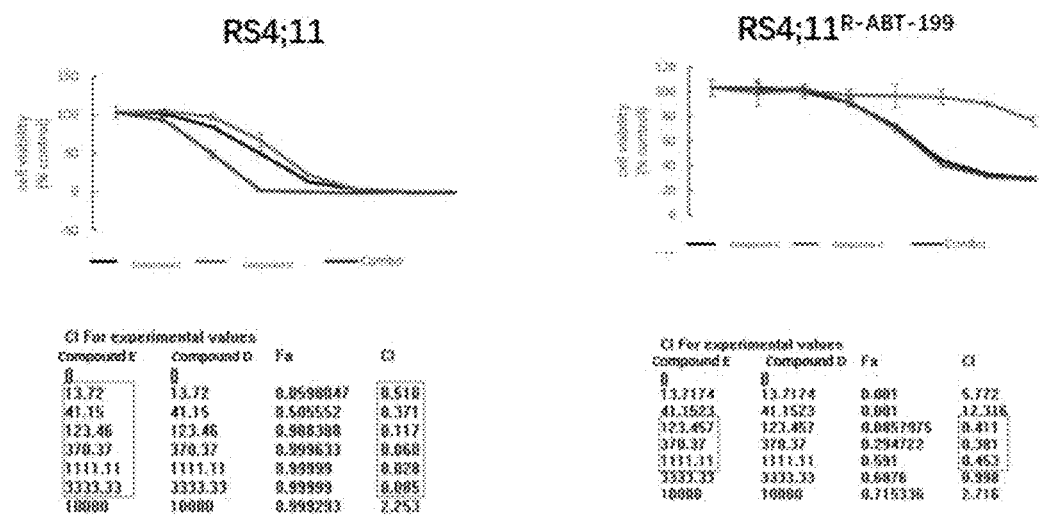
FIG. 53 depicts two graphs illustrating Compound D plus Compound E enhanced cell viability inhibition in RS4;11 cells and RS4;11-R$^{ABT-199}$ cells after 72 h combination treatment.

Tables in FIG. 53 record CI values of the combination, boxed numbers are <0.9, indicating synergistic effect at the respective concentrations.

The combination may overcome ABT-199 resistance.

Figure 55A:
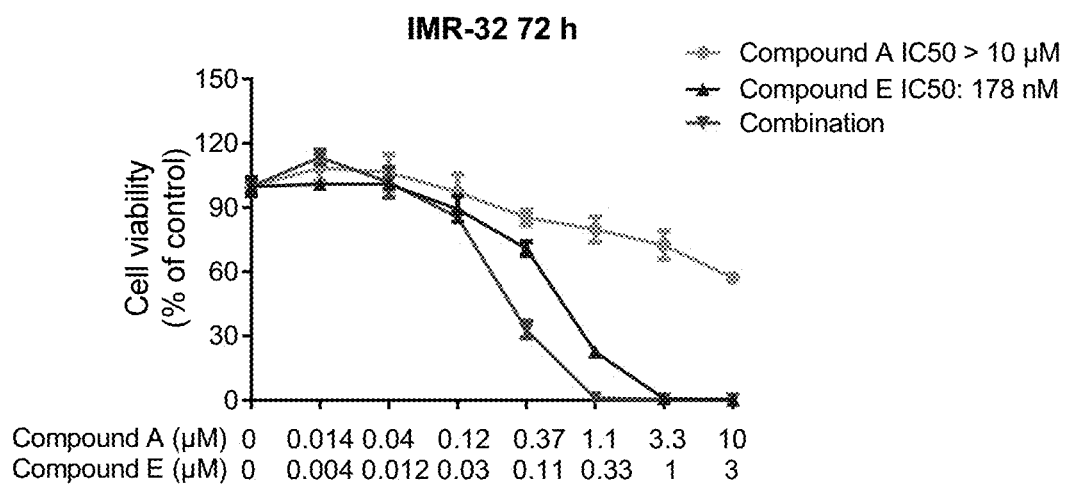
FIG. 55A depicts a graph illustrating Compound E synergizes with Compound A to induce cell growth inhibition in IMR-32.
Figure 55B:
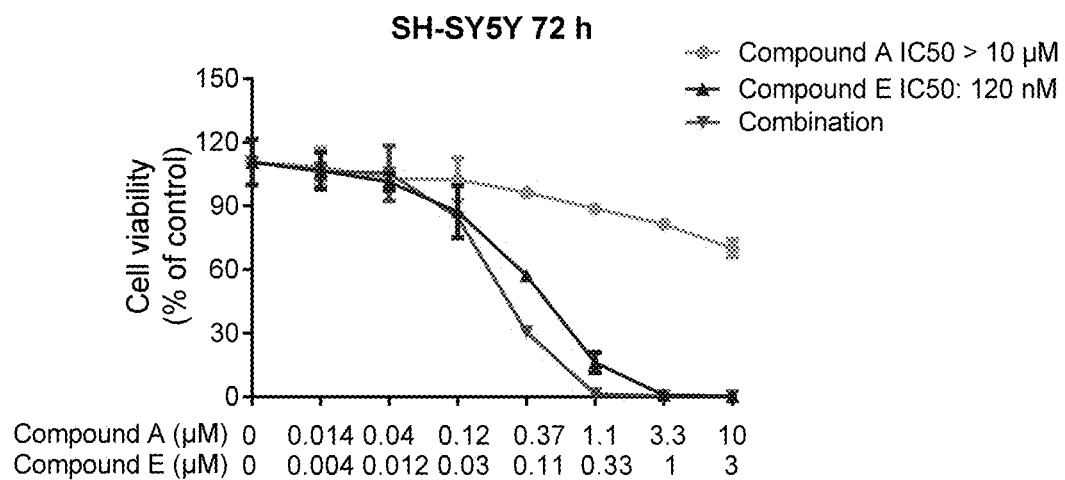
FIG. 55B illustrates Compound E synergizes with Compound A to induce cell growth inhibition in SH-SY5Y (neuroblastoma).

Example 38: Compound E Synergizes with Compound A to Induce Cell Growth Inhibition in IMR-32 (Neuroblastoma) and SH-SY5Y As shown in FIGS. 55A and 55B, combination treatment lowers number of live cells. Compound A plus Compound E enhanced cell viability inhibition in IMR-32 cells (FIG. 55A) and SH-SY5Y cells (FIG. 55B) after 72 h combination treatment.

Figure 56:
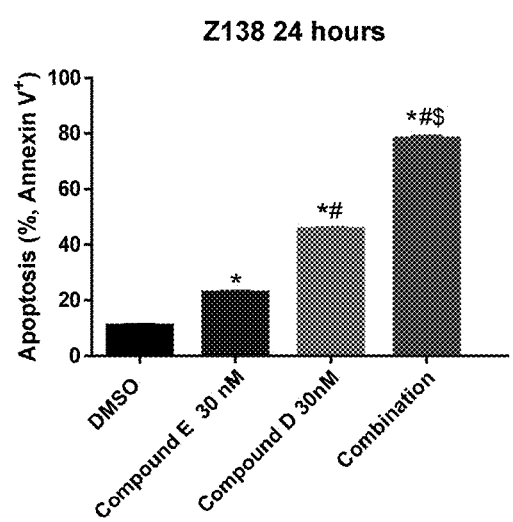
FIG. 56 depicts a graph illustrating In vitro cell apoptosis induction of combination treatment with Compound D and Compound E in Z138 cells.

Example 39: In Vitro Apoptogenic Activity of Combination Treatment with Compound D and Compound E Compound D plus Compound E enhanced cell viability inhibition (FIG. 56A) and apoptosis (FIG. 56B) in Z138 cells after 72 h combination treatment.

Example 40: Compound E Synergizes with Compound D to Induce Cell Growth Inhibition in IMR-32 and SH-SY5Y (Neuroblastoma)

Figure 57A:
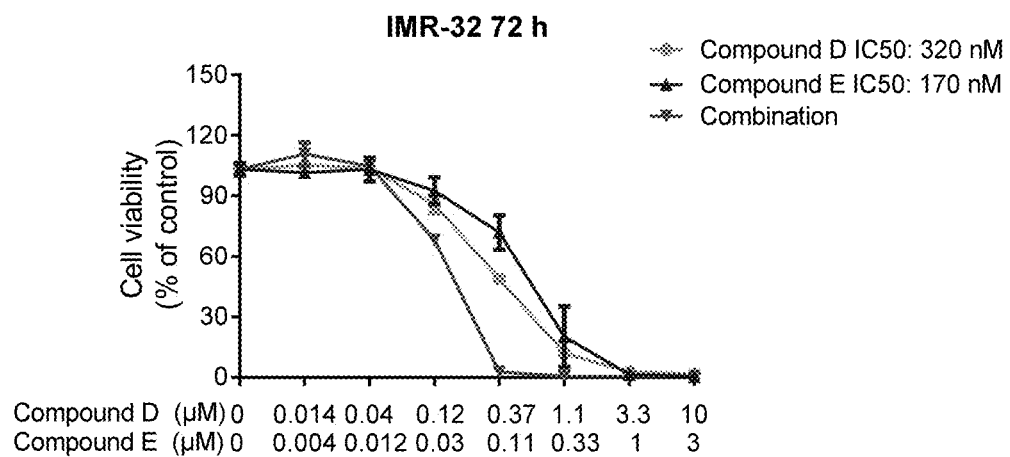
FIG. 57A depicts a graph illustrating Compound E synergizes with Compound D to induce cell growth inhibition in IMR-32.
Figure 57B:
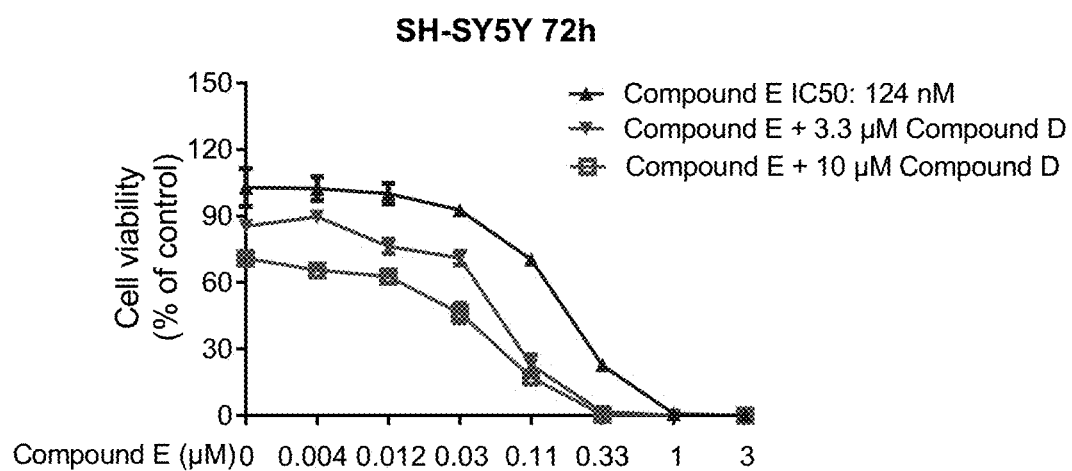
FIG. 57B illustrates Compound E synergizes with Compound D to induce cell growth inhibition in SH-SY5Y (neuroblastoma).

Compound D plus Compound E enhanced cell viability inhibition in IMR-32 cells (FIG. 57A) after 72 h combination treatment. Compound D plus Compound E enhanced cell viability inhibition in SH-SY5Y cells (FIG. 57B) after 72 h combination treatment.

Example 41: Combination Treatment with Compound A in s.c. CD20-Resistant DLBCL PDX LD2-6026-200614 (BCL-xL High, BCL2 p.A43T)

TABLE 22

| Group | T/C (%) @ D 21 | Synergy @ D 21 | mRECIST |
|---|---|---|---|
| Vehicle | | | |
| Compound B | 70 | | |
| R-ICE | 14 | | 3/5 PR |
| Compound B + R-ICE | 9 | 1.12 | 3/5 PR, 1/5 SD |

PDX models: LIDe Bioteh, Rituximab-resistant DLBCL R-ICE

Rituximab 5 mg/kg IV, QW×21D (morning)

Ifosfamide 50 mg/kg IV, QW×21D (afternoon)

Carboplatin 30 mg/kg IP, QW×21D

Etoposide 10 mg/kg IP, QW×21D

Figure 54:
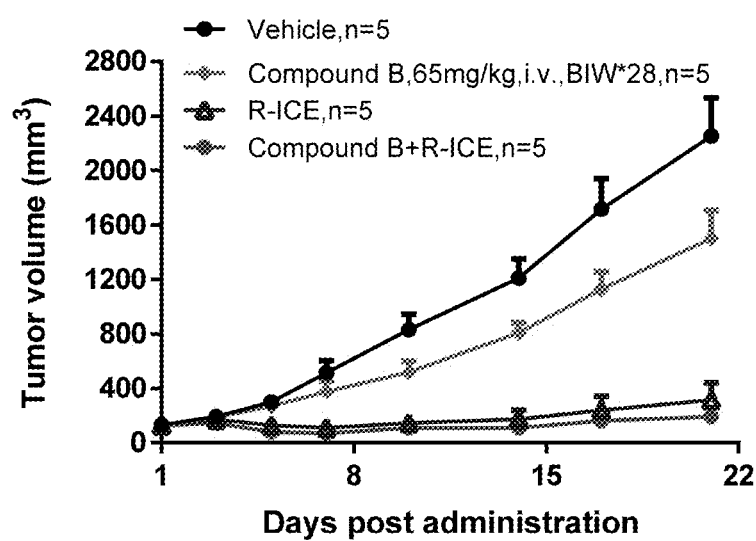
FIG. 54 depicts a graph illustrating each of R-ICE and compound B as single agents showed no antitumor activity, and combination treatment enhance tumor repression s.c. CD20-resistant DLBCL PDX.

Results:

As FIG. 54 shows, single agents showed no antitumor activity. Combination treatment enhanced tumor repression. As indicated in Table 22, T/C (%) value of the combination group was 9 on Day 21, compared to 70 or 14 from single agents groups. Animals from combination group achieved 3/5 PR, ORR=60%.

Conclusion:

Compound B plus R-ICE can enhance tumor repression in CD20-resistant DLBCL PDX, with an ORR of 60%.

Example 42: Combination Treatment with Compound A and Compound E in Systemic TP53$^{wt}$ MOLM-13 AML Model MOLM-13 cells labeled with GFP was provided by WUXI.

Results:

TABLE 23

| Treatment | Median survival days | P-value vs. vehicle |
|---|---|---|
| Vehicle control | 19 | |
| Compound A | 24 | 0.0052 |
| Compound E | 34.5 | <0.0001 |
| Combination | 64 | <0.0001 |

Figure 58:
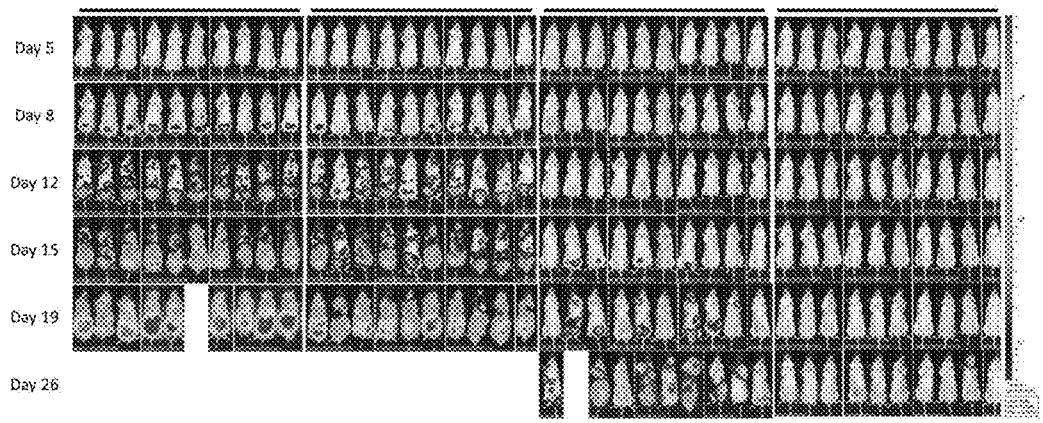
FIG. 58 illustrates vehicle and compound A, Compound E and Combination of Compound A and E antitumor activity in the systematic MOLM-13 AML model.
Figure 59:
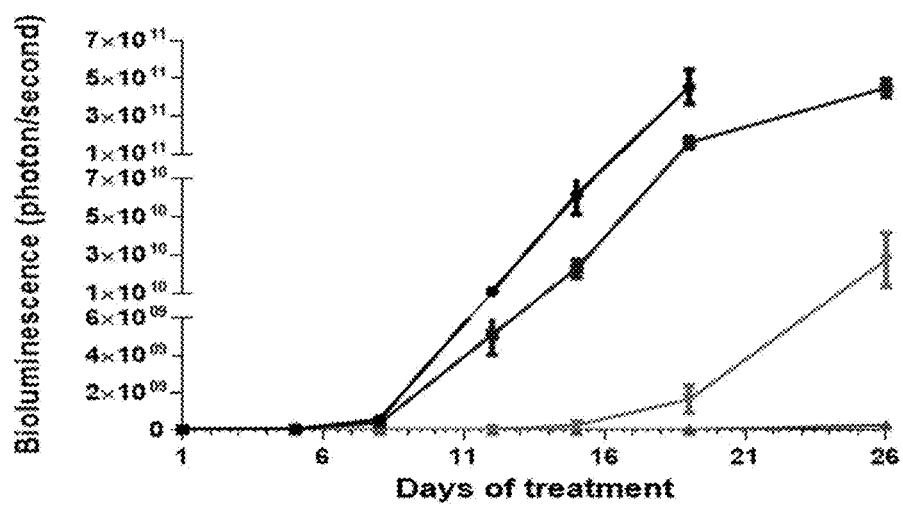
FIG. 59 illustrates intensity of the GFP fluorescent (tumor burden) in the systematic MOLM-13 AML model.

As shown on the FIG. 58, vehicle and compound A showed no antitumor activity in the systematic MOLM-13 AML models. GFP fluorescent can be detected from D8 onwards. Compound E showed enhanced antitumor activity as the GFP fluorescence can be detected from D15 onwards. Combination of Compound A and E achieved significantly enhanced antitumor activity, as the GFP fluorescence only be seen in 1/10 animals on D26. Intensity of the GFP fluorescent (tumor burden) was quantified as the FIG. 59.

Figure 60:
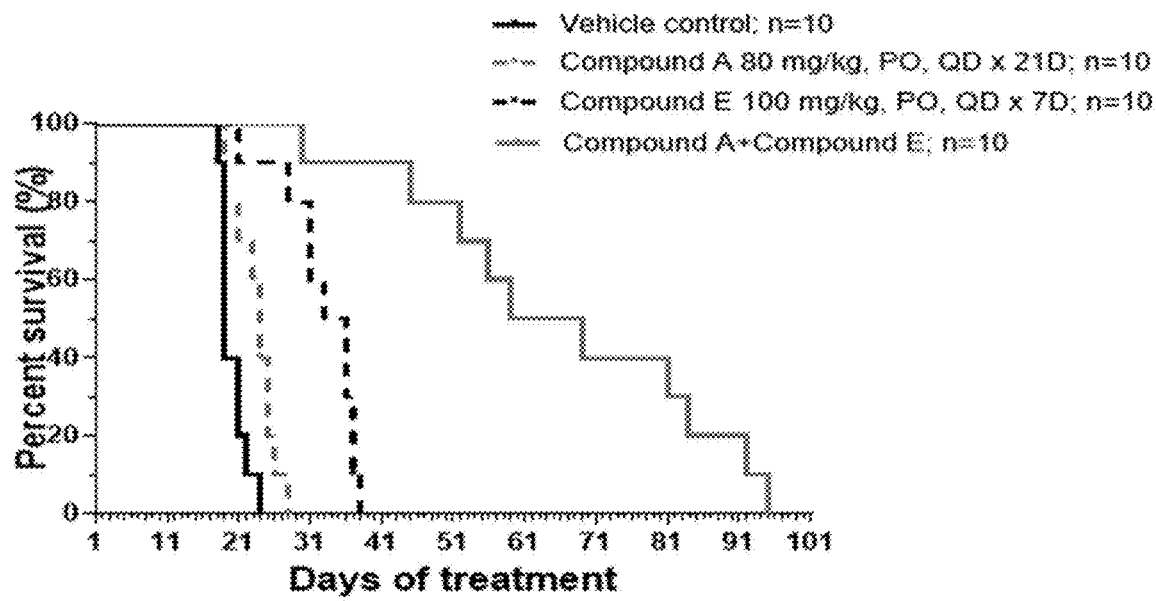
FIG. 60 illustrates combination treatment with Compound A+ E achieved longest survival days.

As the FIG. 60 showed, combination treatment with Compound A+ E achieved longest survival days (64 days) compared to vehicle (19 days), compound A (24 days) and Compound E (34.5 days). Statistical significance was shown as in the table 23.

Conclusion:

Combination of Compound A and Compound E significant extend survival days in MOLM-13 AML xenograft (64 days VS 19 days of vehicle group).

Example 43: Combination Treatment with Compound A and Compound E in Subcutaneous p53$^{wt}$ MV-4-11AML Model Results:

TABLE 24

| Treatment | RTV@ D 22 | T/C(%)@D 22 | Synergy @ D 22 | mRECIST |
|---|---|---|---|---|
| Vehicles | 13.7 ± 2.2 | — | — | |
| Compound A 100 mg/kg | 7.5 ± 0.9 | 55.1 | — | |
| Compound E 100 mg/kg | 9.2 ± 2.3 | 67.1 | — | |
| Compound A + E | 1.2 ± 1.0***$ | 9.1 | 4.06 | 5/6 CR, 1/6 SD |

Figure 61:
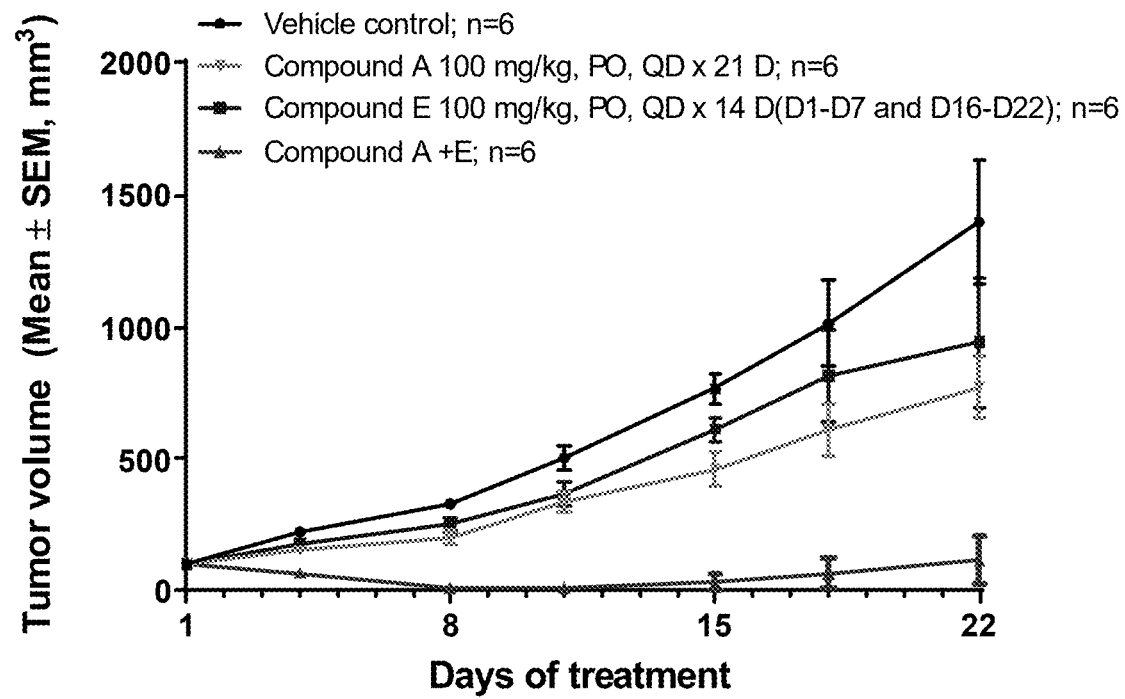
FIG. 61 illustrates antitumor activity of compound A, Compound E and Combination of Compound A and E in subcutaneous MV-4-11 AML xenograft model.

\**: $p < 0.01$ vs. vehicle control group,
\***$p < 0.001$ vs. vehicle control group;
: $p < 0.001$ vs. Compound A group;
$$$: $p < 0.001$ vs. Compound E group;
Ratio > 1, Synergistic;
Ratio = 1, Additive;
Ratio < 1, Antagonistic As the FIG. 61 and Table 24 showed, single agent showed moderate antitumor activity. combination treatment significantly enhance tumor repression, with a T/C (%) value of 9.11 on D22, the synergy score was 4.06, indicating strong synergistic effects. Animals from combination group achieved 5/6CR, 1/6 SD, ORR=83%*: $p<0.05$ vs. vehicle control group Conclusion:

Combination of compound A and E achieved superior antitumor activity, with a ORR of 83.3% compared to 0% in single agent groups.

Example 44: Compound A+Palbociclib in MCF-7 Xenograft

Figure 62:
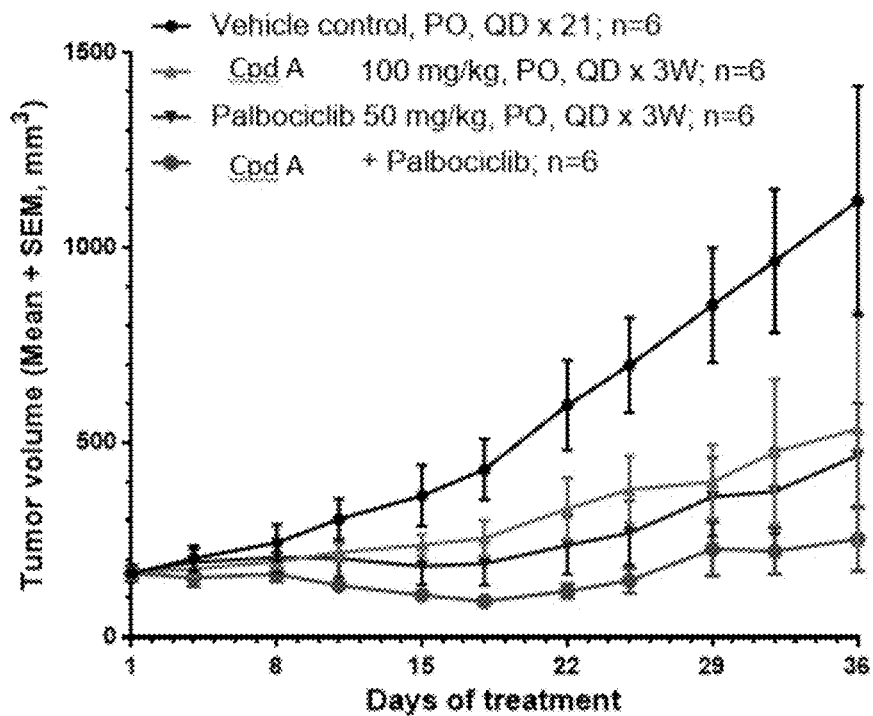
FIG. 62A depicts a graph which illustrates treatment of MCF-7 Xenograft with compound A and palbociclib single agents showed moderate antitumor activity, and combination treatment significantly enhanced tumor repression.
FIG. 62B illustrates treatment of MCF-7 Xenograft with compound A and palbociclib and shows the effect of combination treatment on tumor weight.

Therefore, in this experiment, a MCF-7 xenograft tumor model was established to evaluate the anti-tumor effect of Compound in combination with CDK4/6 inhibitor Palbociclib (Yishiming (Beijing) Pharm-Chemicals Tech. Co., Ltd). The dosing regimen was as follows:
Compound A: 100 mg/kg, once per day, for a total of 3 weeks,
Palbociclib: 50 mg/kg, orally, once per day, for a total of 3 weeks, The dosing regimen of each drug in the dosing regimen for the combination is the same as the dosing regimen for the single drug.
Results:

As shown in FIG. 62A, single agents showed moderate antitumor activity. Combination treatment significantly enhance tumor repression.

Figure 62B:
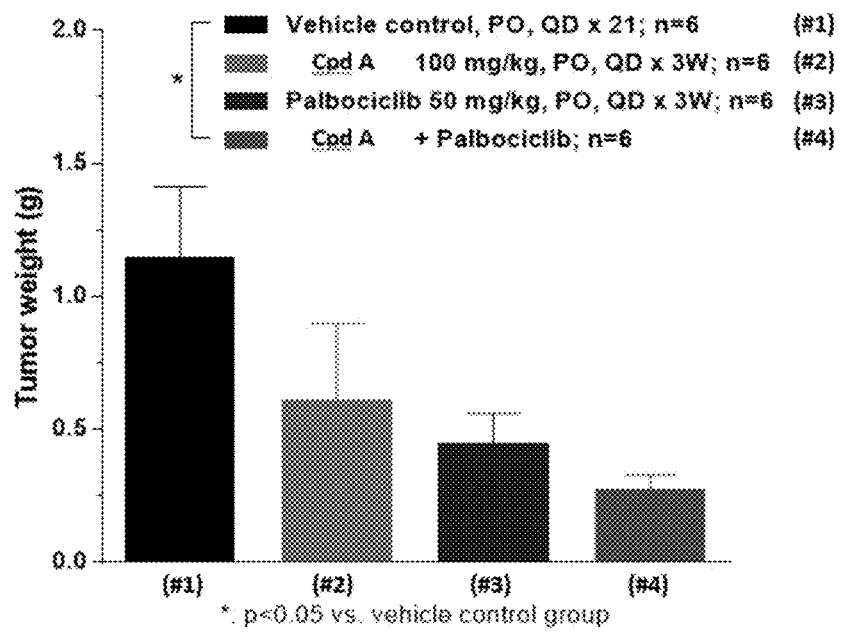

As shown in FIG. 62B, combination treatment achieved lowest tumor weight at the end of treatment.

As shown in table 25, T/C (%) value of the combination group was 22.7 on Day 22. compared to 56.2 or 39.3 from single agents groups. Animals from combination group achieved 4/6 PR, ORR=66.7%

TABLE 25

| Treatment | RTV@D 22/ @D 36 | T/C(%)@D 22/ @D 36 | Synergy@D 22/ @D 36 | mRECIST | Response @D 36 |
|---|---|---|---|---|---|
| Vehicle control | 3.6 ± 0.6/ 6.5 ± 1.3 | —/— | —/— | 1/6 SD, 5/6 PD | 6/6 PD |
| Compound A 100 mg/kg | 2.0 ± 0.4/ 3.3 ± 1.8 | 56.2/50.2 | —/— | 3/6 SD, 3/6 PD | 1/6 SD, 5/6 PD |
| Palbociclib 50 mg/kg | 1.4 ± 0.4/ 2.9 ± 0.8 | 39.3/44.2 | —/— | 1/6 PR, 4/6 SD, 1/6 PD | 2/6 SD, 4/6 PD |
| Compound A + Palbociclib | 0.8 ± 0.2*/ 1.9 ± 0.7* | 22.7/28.5 | 0.98/0.78 | 4/6 PR, 2/6 SD | 1/6 PR, 3/6 SD, 2/6 PD |

*p < 0.05 vs. vehicle control group;
Ratio > 1, Synergistic;
Ratio = 1, Additive;
Ratio < 1, Antagonistic Conclusion:

Combination of compound A and Palbociclib achieved synergistic antitumor effect in s.c. ER+ MCF-7 breast cancer xenograft, achieved ORR 66.7% compared to 0 in other groups.

Figure 63A:
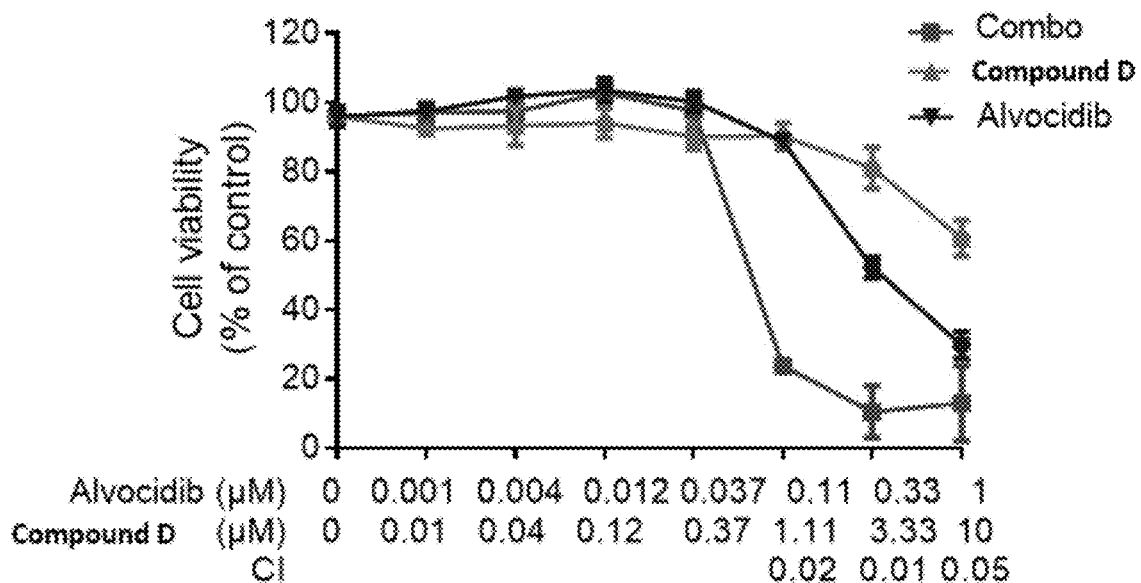
FIG. 63A depicts a graph which illustrates treatment of MDA-MB-468 cells with compound D and alvocidib and effect on cell viability.
Figure 63B:
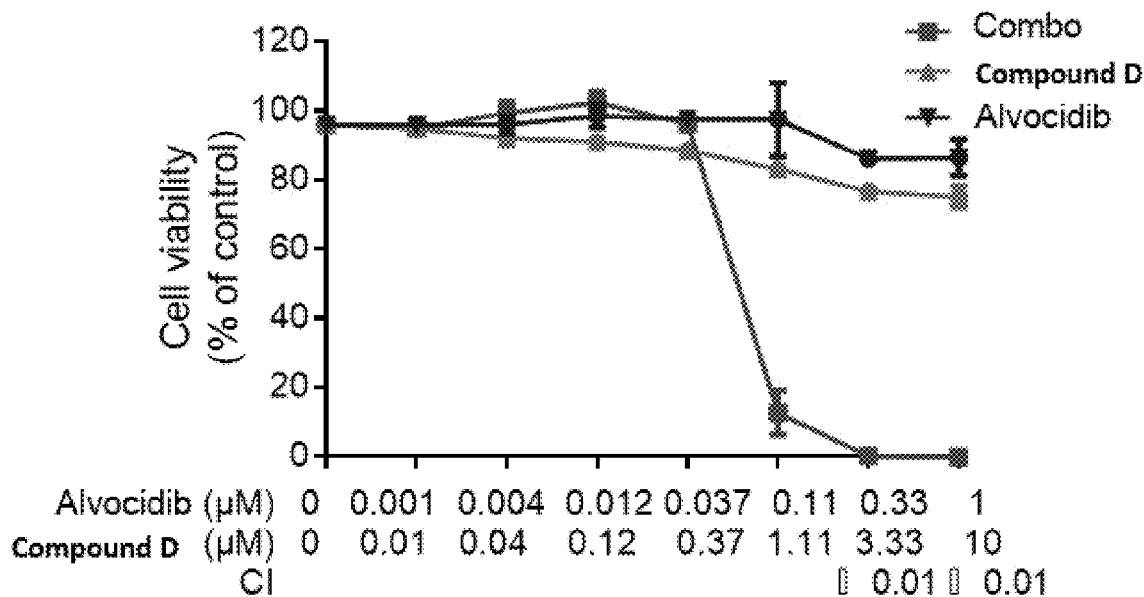
FIG. 63B depicts a graph which illustrates treatment of 2LMP cells with compound D and alvocidib and effect on cell viability.

Example 45: In Vitro Antiproliferative Activity of Combination Treatment with Compound D and Alvocidib in TNBC: Synergy Methods: Cell viability CTG assay.
Results and Conclusion:

Combination treatments result lower number of live cells.
Compound D and Alvocidib showed a synergistic antiproliferative activity in MDA-MB-468 and 2LMP cells after 24 h combination treatment, CI<0.9. See FIGS. 63A and 63B.

MDA-MB-468 cell source: cobioer; Culture: DMEM medium+10% FBS+1% P/S.

2LMP cell source: BLUEFBIO; Culture: RPMI 1640 medium with 300 mg/L (2 mM) L-glutamine adjusted to contain 2.0 g/L sodium bicarbonate, 90%; fetal bovine serum, 10%; P/S 1%.

Figure 64A:
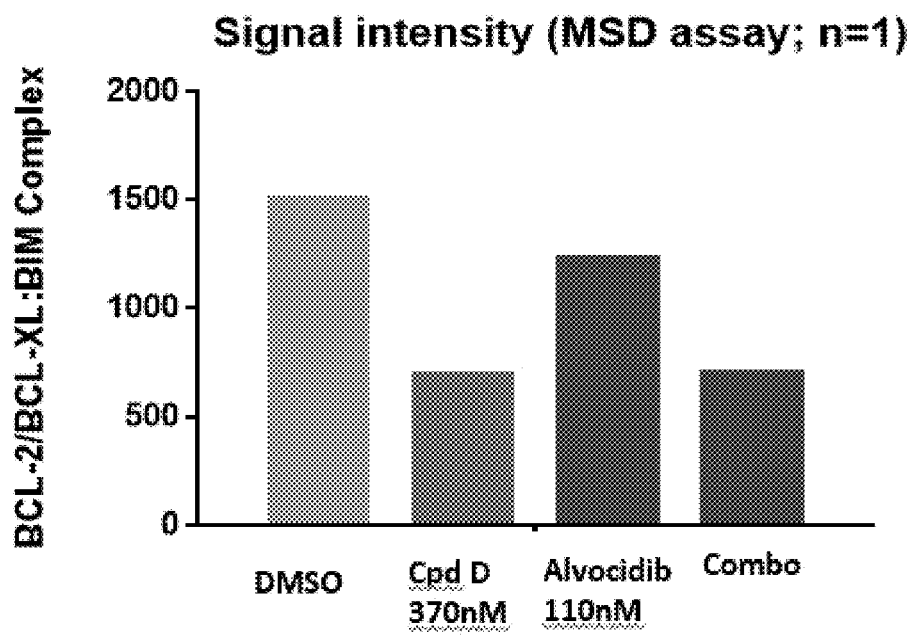
FIG. 64A illustrates the effect of compound D and alvocidib on BCL-2/BCL-XL:BIM complex.
Figure 64B:
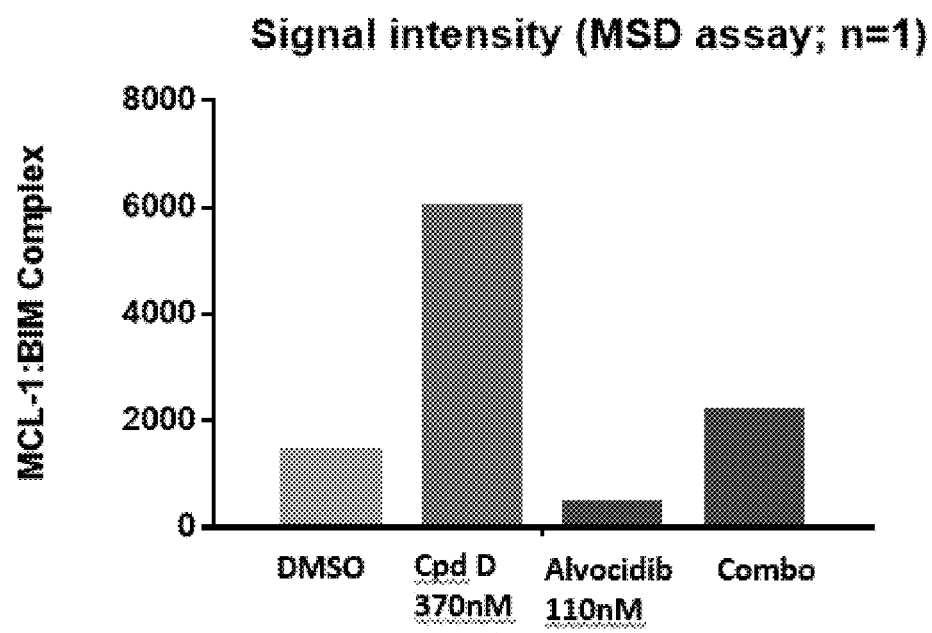
FIG. 64B illustrates the effect of compound D and alvocidib on MCL-1:BIM complex.
Figure 65A:
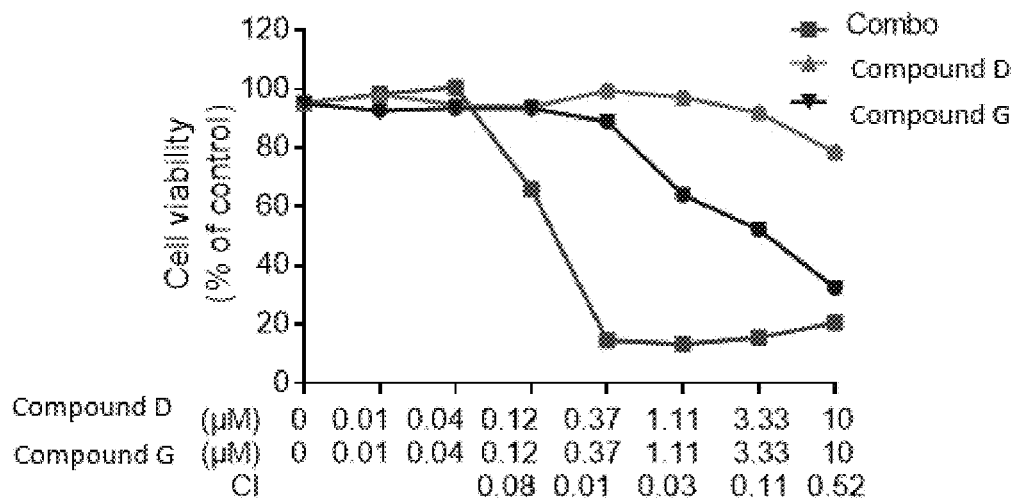
FIG. 65A depicts a graph which illustrates treatment of MDA-MB-468 cells with compound D and compound G and effect on cell viability.
Figure 65B:
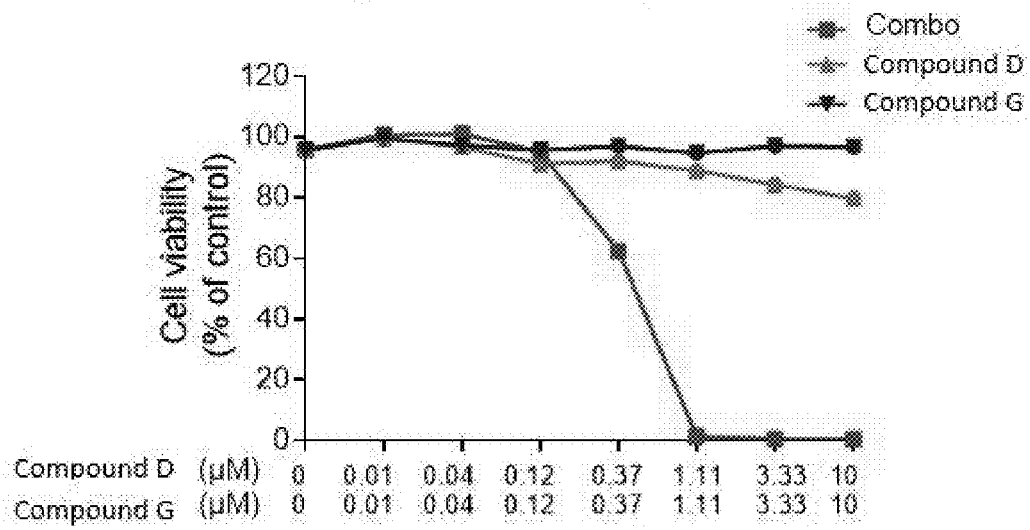
FIG. 65B depicts a graph which illustrates treatment of 2LMP cells with compound D and compound G and effect on cell viability.
Figure 65C:
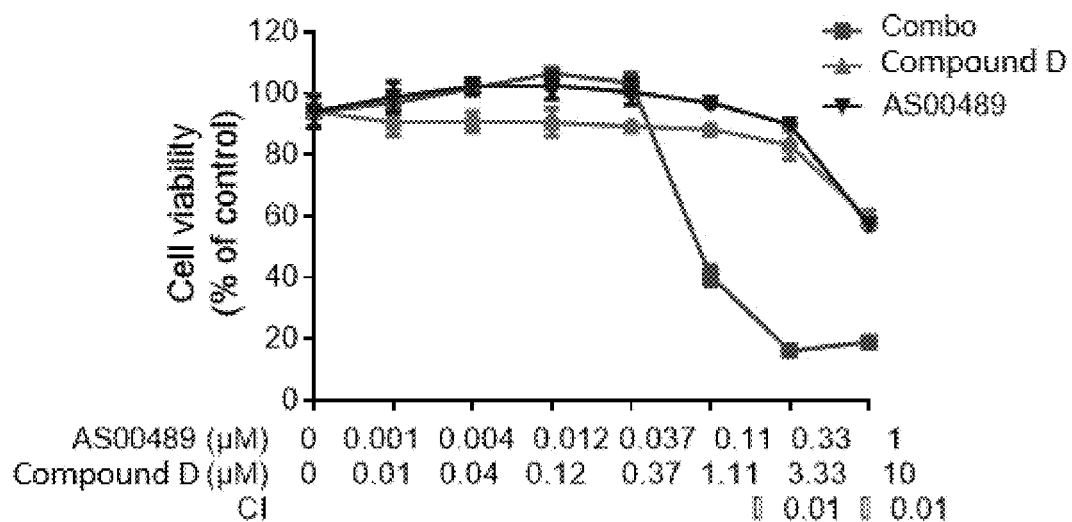
FIG. 65C depicts a graph which illustrates treatment of MDA-MB-468 cells with compound D and AS00489 and effect on cell viability.
Figure 65D:
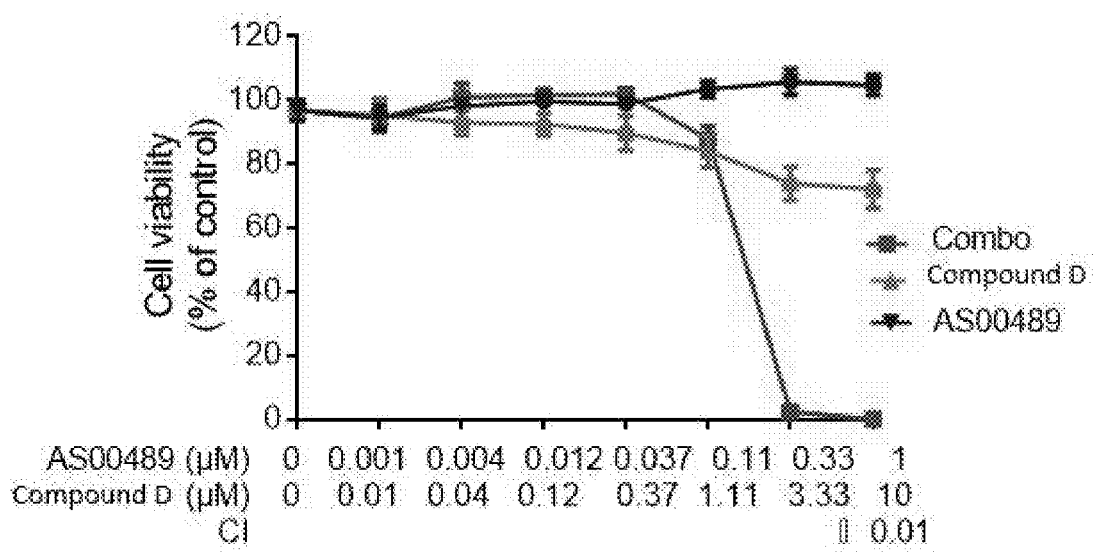
FIG. 65D depicts a graph which illustrates treatment of 2LMP cells with compound D and AS00489 and effect on cell viability.

Complex changes of combination treatment with compound D and Alvocidib in 2LMP cells
Methods: MSD-ELISA assay
Results and Conclusion:

Compound D treatment significantly disrupts BCL-2/BCL-XL:BIM complex, simultaneously increased MCL-1:BIM complex can be decreased by Alvocidib. See FIGS. 64A and 64B.

2LMP cell source: BLUEFBIO
Culture: RPMI 1640 medium with 300 mg/L (2 mM) L-glutamine adjusted to contain 2.0 g/L sodium bicarbonate; fetal bovine serum, 10%; P/S 1%.

In Vitro Antiproliferative Activity of Combination Treatment with Compound D and MCL-1 Inhibitors in TNBC: Synergy
Methods: Cell viability CTG assay
Results and Conclusion:
Combination treatments result lower number of live cells.

Compound D and MCL-1 inhibitors (COMPOUND G or AZD5991 (selleck)) showed a synergistic antiproliferative activity in MDA-MB-468 and 2LMP cells after 24 h combination treatment, CI<0.9. See FIGS. 65A, 65B, 65C, and 65D.

MDA-MB-468 cell source: cobioer; Culture: DMEM medium+10% FBS+1% P/S.

2LMP cell source: BLUEFBIO; Culture: RPMI 1640 medium with 300 mg/L (2 mM) L-glutamine adjusted to contain 2.0 g/L sodium bicarbonate, 90%; fetal bovine serum, 10%; P/S 1%.

Figure 66:
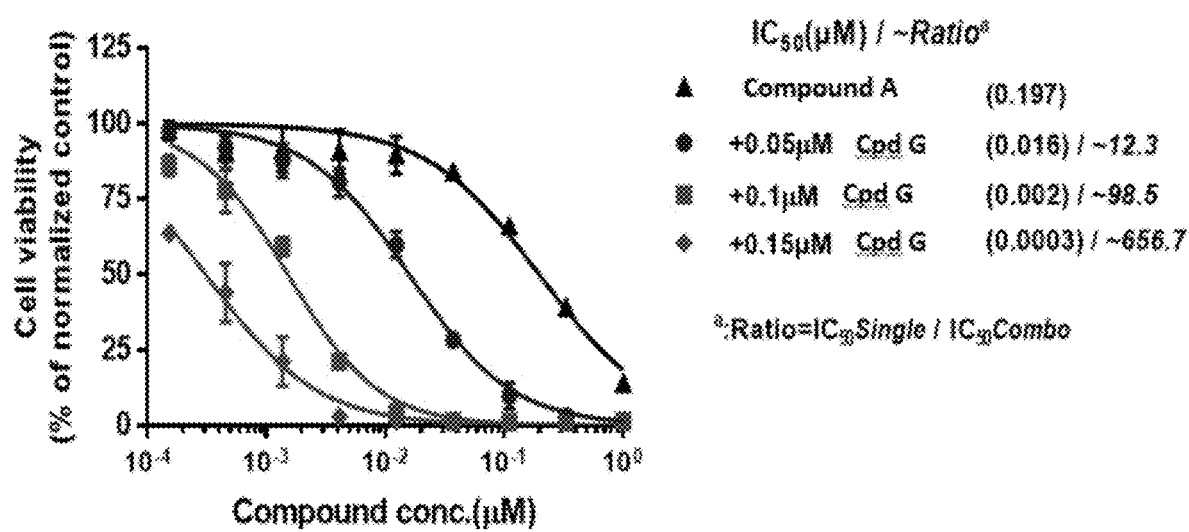
FIG. 66 depicts a graph which illustrates treatment of SU-DHL-4 cells with compound A and compound G and effect on cell viability.

Example 46: In Vitro Antiproliferative Activity of Combination Treatment with Compound A and MCL-1 Inhibitors Compound G in SU-DHL-4 Cells: Synergy Methods: Cell viability WST assay
Results and Conclusion:

Combination treatments result lower number of live cells.
Compound A and MCL-1 inhibitors (compound G) showed a synergistic antiproliferative activity in SU-DHL-4 cells after 72 h combination treatment, CI<0.9. See FIG. 66 and table 26.

TABLE 26

| Compound A Conc (μM) | Compound G Conc (μM) | CI* |
|---|---|---|
| 0.0014 | 0.05 | 0.437 |
| 0.0041 | 0.1 | 0.285 |
| 0.0123 | 0.15 | 0.162 |

*Combination Index (CI):
CI < 0.90 = synergism;
CI from 0.90-1.10 = nearly additive;
CI > 1.10 = antagonism Cell source: cobioer
Culture: RPMI 1640 medium+10% FBS+1% P/S Example 47: Combination Treatment with Compound G and Compound A in Subcutaneous DLBCL SU-DHL-4 Xenografts Therefore, in this experiment, a subcutaneous DLBCL SU-DHL-4 xenograft model was established to evaluate the anti-tumor effect of Compound G in combination with Compound A. The dosing regimen was as follows:
Compound G: 12.5 mg/kg, orally, once per week, for a total of 3 weeks,
Compound A: 50 mg/kg, orally, once a day, for a total of 21 days,
The dosing regimen of each drug in the dosing regimen for the combination is the same as the dosing regimen for the single drug.

Figure 67:
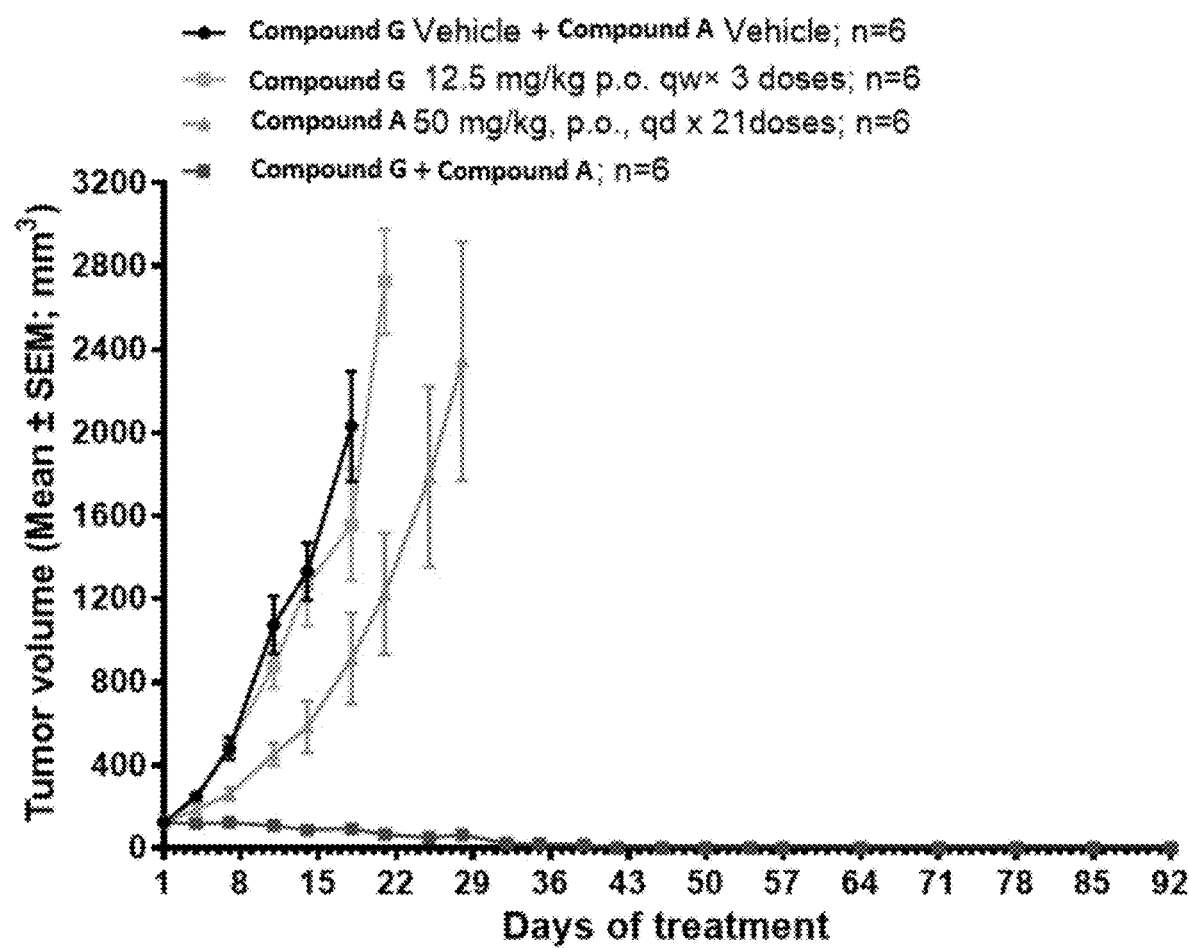
FIG. 67 depicts a graph which illustrates treatment of SU-DHL-4 cells with compound A and compound G and effect on tumor volume.

Results: As shown in FIG. 67, compound G and compound A individually showed no antitumor activity in this model. Combination treatment significantly enhanced tumor repression.

Conclusion:
Compound G and compound A achieved synergistic antitumor effect in s.c. DLBCL SU-DHL-4 xenograft mice model.

Example 48: Combination Treatment with Compound B and Compound A/Anlotinib in SCLC PDX Model LU5220

Therefore, in this experiment, a SCLC PDX model LU5220 model was established to evaluate the anti-tumor effect of compound B in combination with Compound A/Anlotinib(selleck). The dosing regimen was as follows:
Compound B: 50 mg/kg, IV, BIW, for a total of 4 weeks,
Compound A 100 mg/kg, orally, QD, for a total of 4 weeks,
Anlotinib 2 mg/kg, orally, QD, for a total of 4 weeks,
The dosing regimen of each drug in the dosing regimen for the combination is the same as the dosing regimen for the single drug.

Figure 68:
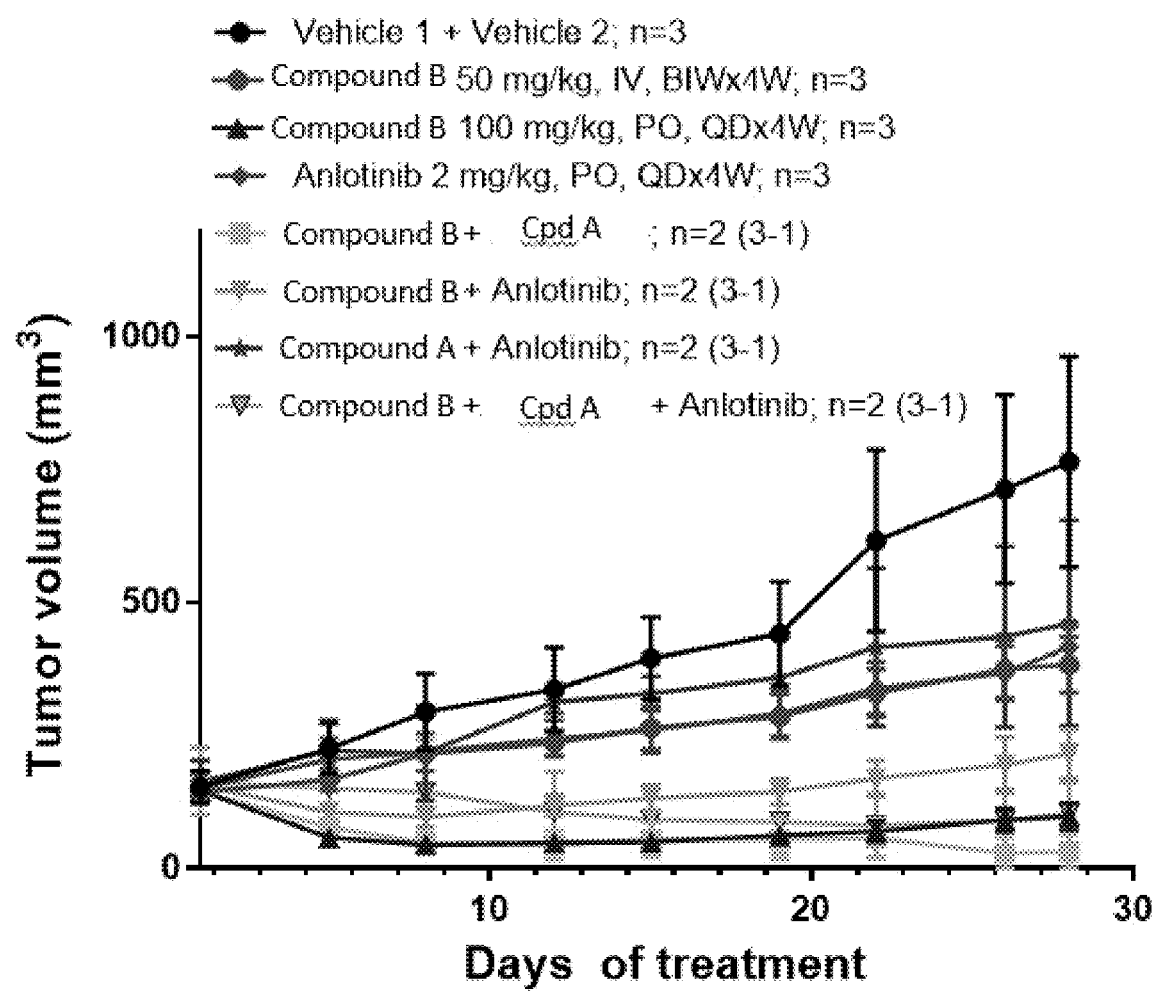
FIG. 68 depicts a graph which illustrates treatment of LU5220 patient-derived xenografts with compound A, compound B, and anlotinib and effect on tumor volume.

Results:
As shown in FIG. 68, compound B and anlotinib showed moderate antitumor activity, compound A showed potent antitumor activity. Combination treatment with compound B and anlotinib or compound A significantly enhance tumor repression. One animal from the compound A+compound B+anlotinib arm was dead on day 7. One animal from the compound A+anlotinib arm was euthanized on day 9. One animal from the compound A+compound B arm was euthanized on day 22. One animal from the compound b+anlotinib arm was dead on day 25.

As shown in table 27, T/C (%) value of compound A was 13.87, the combination treatment with compound B and anlotinib or compound A was 29.61 (compared to 54.8 or 57.93 from single agents groups) or 5.94 (compared to 54.8 or 13.87 from single agents groups) on Day 28. Animals from combination group of compound B and anlotinib achieved ½ PR, ORR=50%. Animals from combination group of compound B and compound A achieved ½ CR, ORR=100%

TABLE 27

| Treatment | RTV @ D 28 | T/C(%) @ D 28 | Synergy ratio @ D 28 | mRECIST | Response @D 28 | DCR (%) | ORR (%) |
|---|---|---|---|---|---|---|---|
| Vehicle control | 4.88 ± 0.31 | — | — | 3/3 PD | 3/3 PD | 0 | 0 |
| Cpd B | 2.67 ± 0.31 | 54.80 | — | 3/3 PD | 3/3 PD | 0 | 0 |
| Cpd A | 0.68 ± 0.18 | 13.87 | — | 3/3 PR | 1/3 PR, 2/3 SD | 100 | 100 |
| Anlotinib | 2.82 ± 0.24 | 57.93 | — | 3/3 PD | 3/3 PD | 0 | 0 |
| Cpd A + Cpd B | 0.29 ± 0.29 | 5.94 | 1.3 | 1/2 CR (D 19), 1/2 PR, | 1/2 CR, 1/2 SD | 100 | 100 |
| Cpd B + Anlotinib | 1.44 ± 0.44 | 29.61 | 1.1 | 1/2 PR, 1/2 SD | 1/2 SD, 1/2 PD | 100 | 50 |
| Cpd A + Anlotinib | 2.70 ± 1.57 | 55.44 | | 1/2 SD, 1/2 PD | 1/2 SD, 1/2 PD | 50 | 50 |
| Cpd A + Cpd B + Anlotinib | 0.56 ± 0.00 | 11.54 | | 2/2 PR | 2/2 SD | 100 | 100 |

Synergy: Ratio > 1, synergistic; Ratio = 1, additive; Ratio < 1, antagonistic. DCR: Disease control rate, DCR is calculated with the proportion of animals demonstrating CR, PR, or SD based on mRECIST; ORR: Overall response rate, ORR is calculated with the proportion of animals demonstrating CR or PR based on mRECIST.

Conclusion:
Compound A showed potent antitumor activity, combination of compound B and anlotinib or compound A achieved synergistic antitumor effect in s.c. SCLC PDX LU5220 xenograft mice model.

Example 49: Combination Treatment with Compound B and Compound A/Anlotinib in SCLC PDX Model LU5220

Compound B: 50 mg/kg, IV, BIW, for a total of 4 weeks,
Compound A 100 mg/kg, orally, QD, for a total of 4 weeks,
Anlotinib 2 mg/kg, orally, QD, for a total of 4 weeks,
The dosing regimen of each drug in the dosing regimen for the combination is the same as the dosing regimen for the single drug.

Figure 69A:
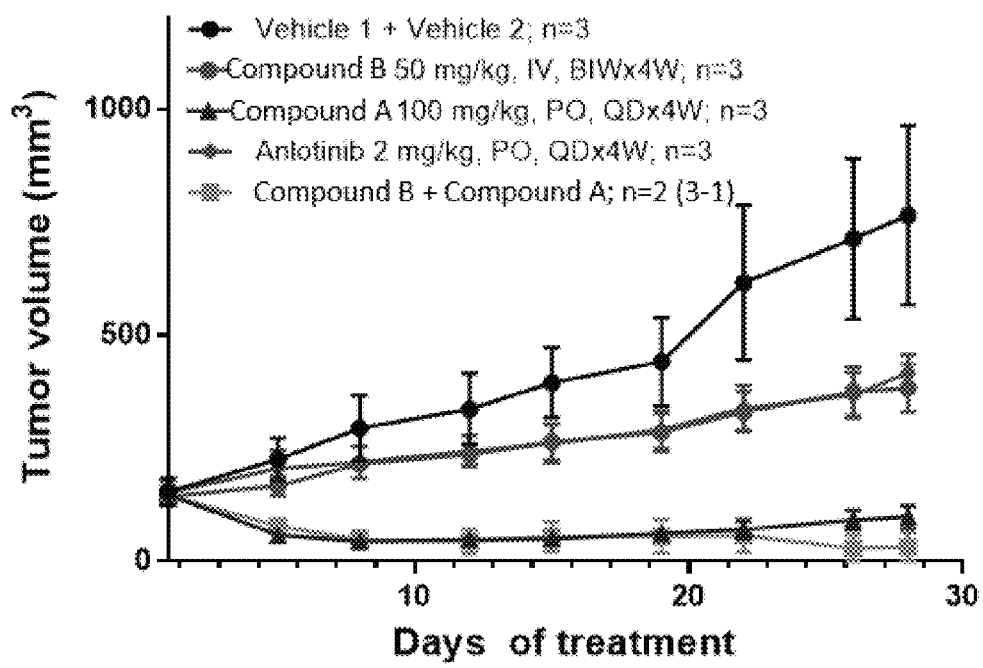
FIG. 69A depicts a graph which illustrates treatment of LU5220 patient-derived xenografts with compound A, compound B, and anlotinib and effect on tumor volume.

Results:
As shown in FIG. 69A, compound B and anlotinib showed moderate antitumor activity, compound A showed potent antitumor activity. Combination treatment with compound B and compound A significantly enhance tumor repression. One animal from the Compound A+Compound B arm was euthanized on day 22.

Figure 69B:
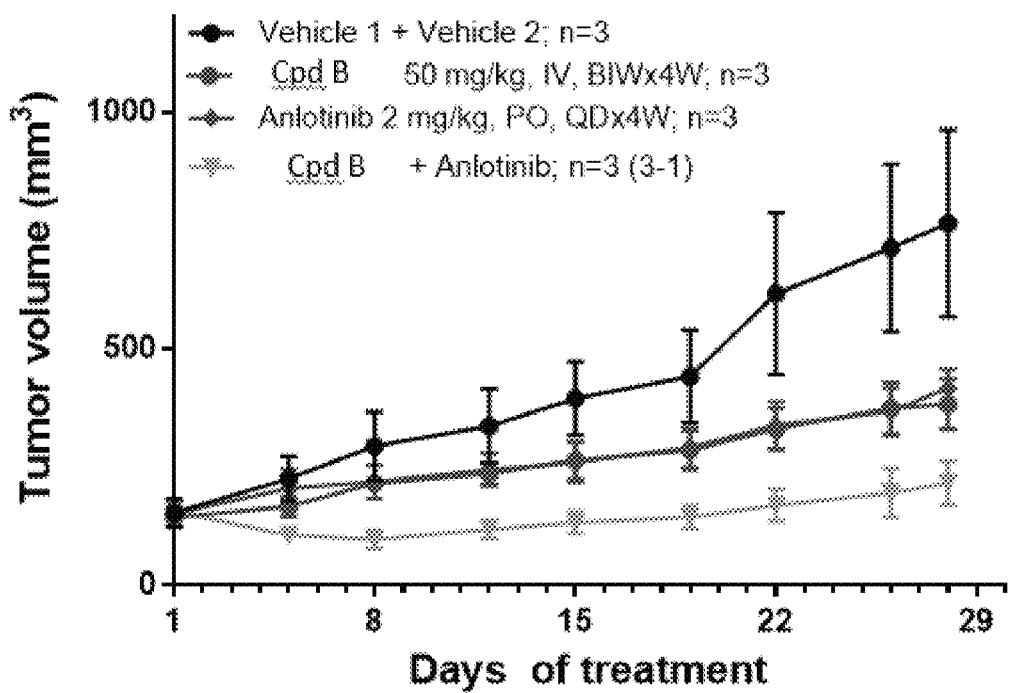
FIG. 69B depicts a graph which illustrates treatment of LU5220 patient-derived xenografts with compound B and anlotinib and effect on tumor volume.

As shown in FIG. 69B, compound B and anlotinib showed moderate antitumor activity. Combination treatment with compound B and anlotinib significantly enhance tumor repression. One animal from the compound B+anlotinib arm was dead on day 25.

Figure 69C:
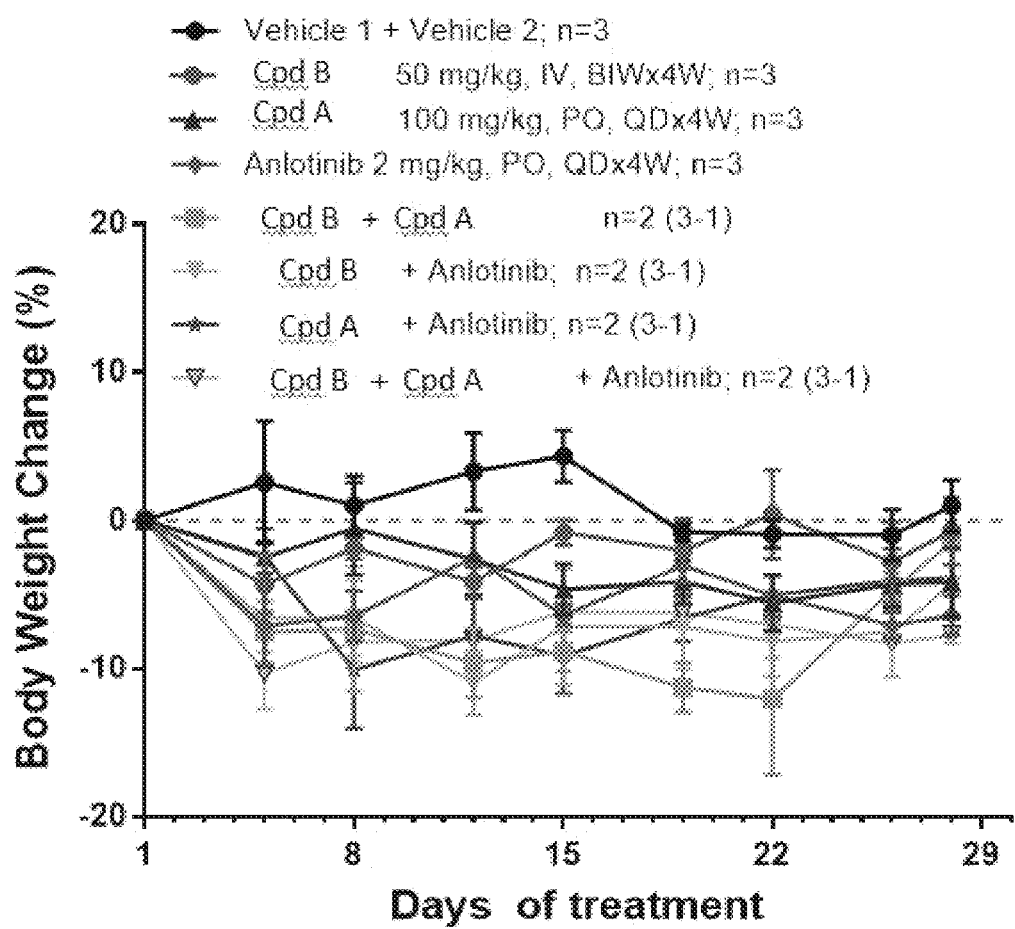
FIG. 69C depicts a graph which illustrates treatment of LU5220 patient-derived xenografts with compound A, compound B, and anlotinib and effect on body weight.

As shown in FIG. 69C, the body weight of all groups have a slight loss, but within a tolerable range. One animal from the compound B+compound A+anlotinib arm was dead on day 7. One animal from the compound A+anlotinib arm was euthanized on day 9. One animal from the compound B+compound A arm was euthanized on day 22. One animal from the compound B+anlotinib arm was dead on day 25.

Conclusion:
Compound A showed potent antitumor activity, combination of compound B and anlotinib or compound A achieved synergistic antitumor effect in s.c. SCLC PDX LU5220 xenograft mice model.

Example 50: Combination Treatment with Compound B and Compound A/Anlotinib in SCLC PDX Model LU5220

Figure 70A:
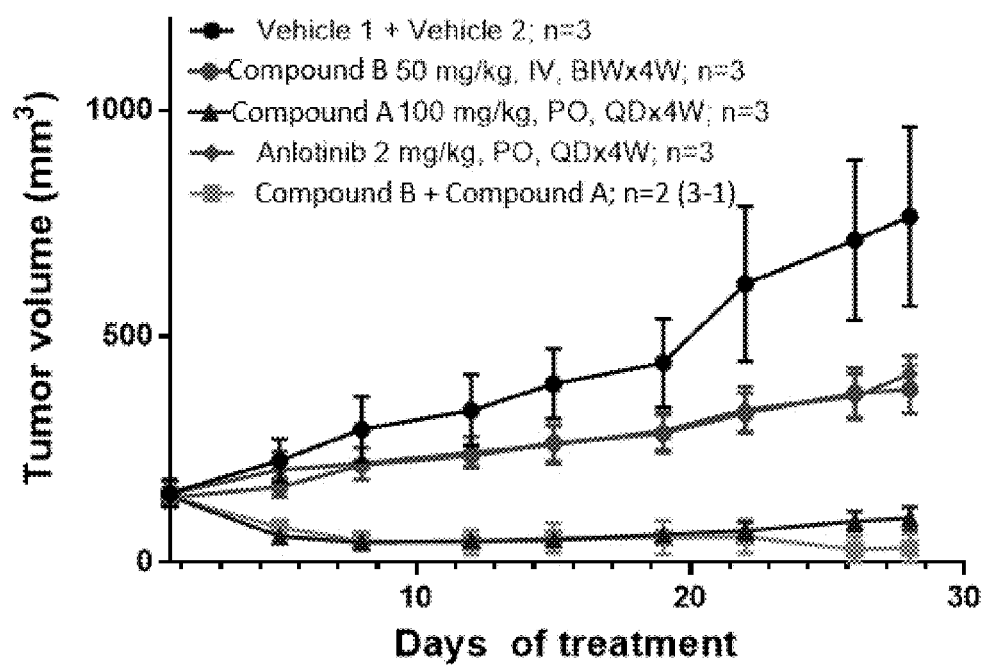
FIG. 70A depicts a graph which illustrates treatment of LU5220 patient-derived xenografts with compound A, compound B, and anlotinib and effect on tumor volume.
Figure 70B:
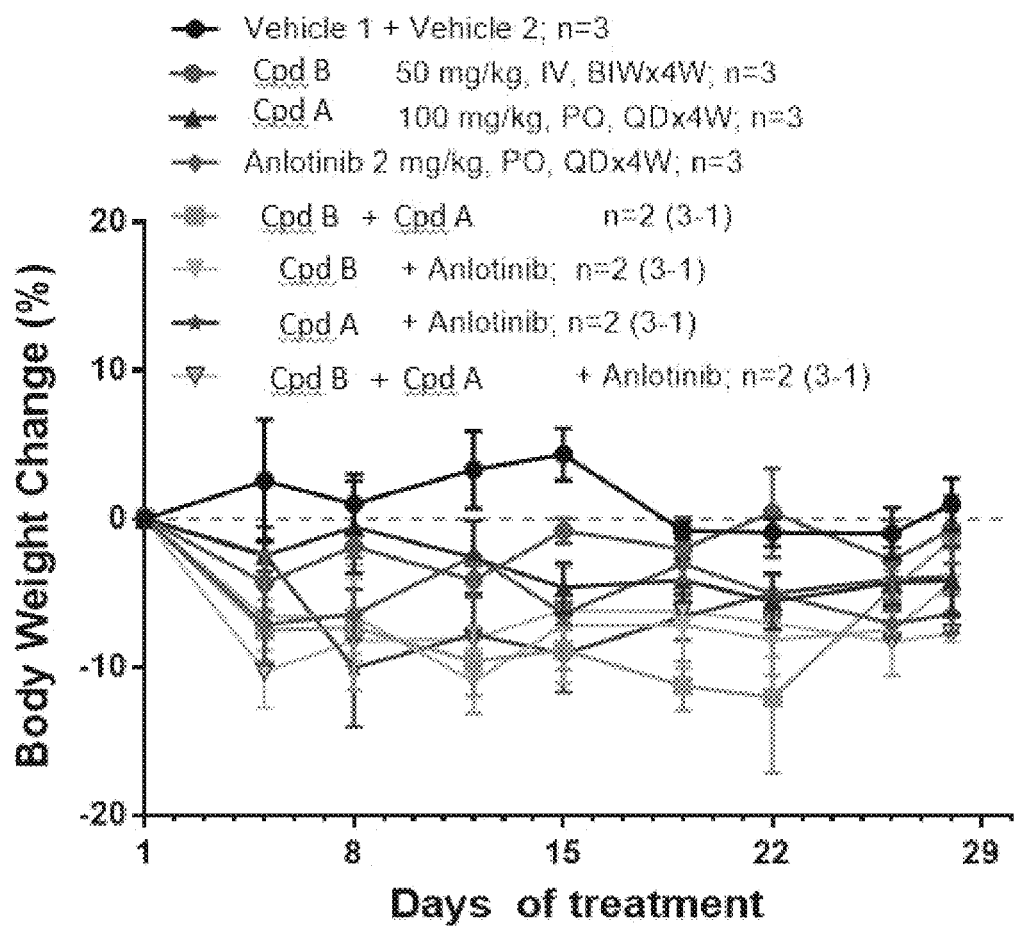
FIG. 70B depicts a graph which illustrates treatment of LU5220 patient-derived with compound B and anlotinib and effect on tumor volume.
Figure 71A:
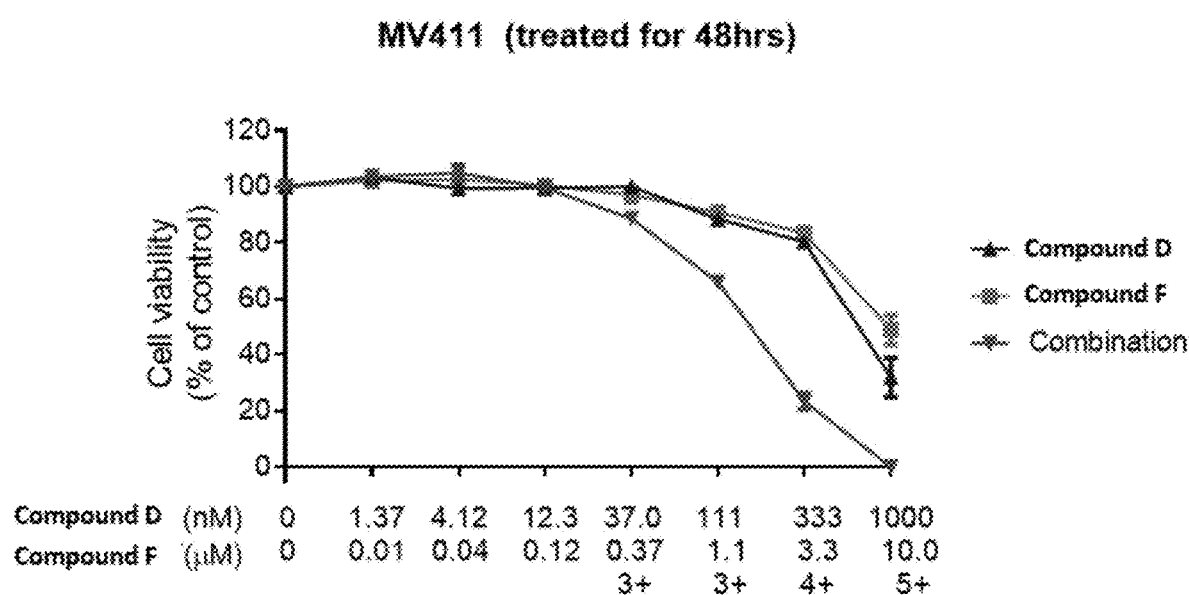
FIG. 71A depicts a graph which illustrates treatment of MV-4-11 cells with compound D and compound F and effect on cell viability.
Figure 71B:
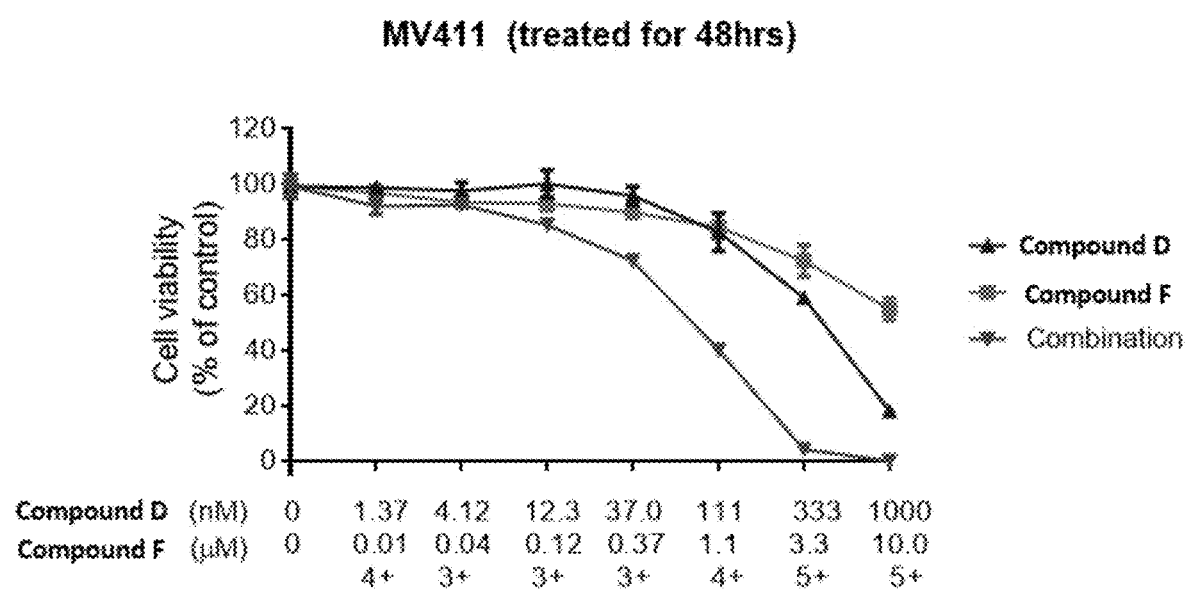
FIG. 71B depicts a graph which illustrates treatment of MV-4-11 cells with compound D and compound F and effect on cell viability.
Figure 72A:
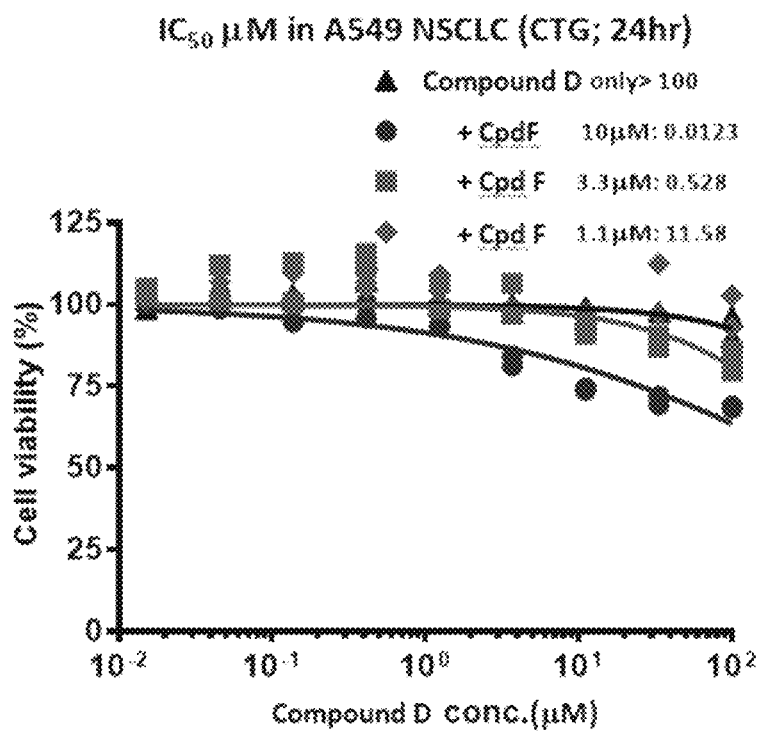
FIG. 72A depicts a graph which illustrates treatment of A549 cells with compound D and compound F and effect on cell viability.
Figure 72B:
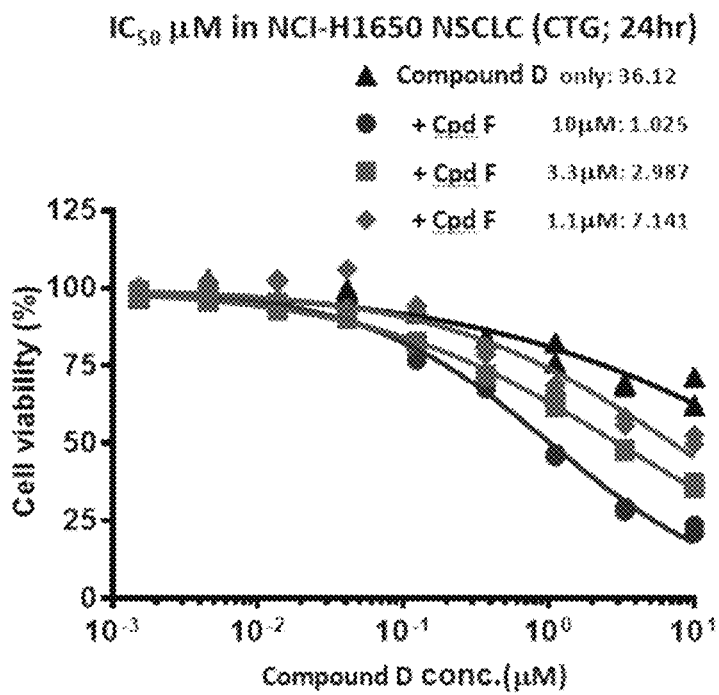
FIG. 72B depicts a graph which illustrates treatment of NCI-H1650 cells with compound D and compound F and effect on cell viability.
Figure 72C:
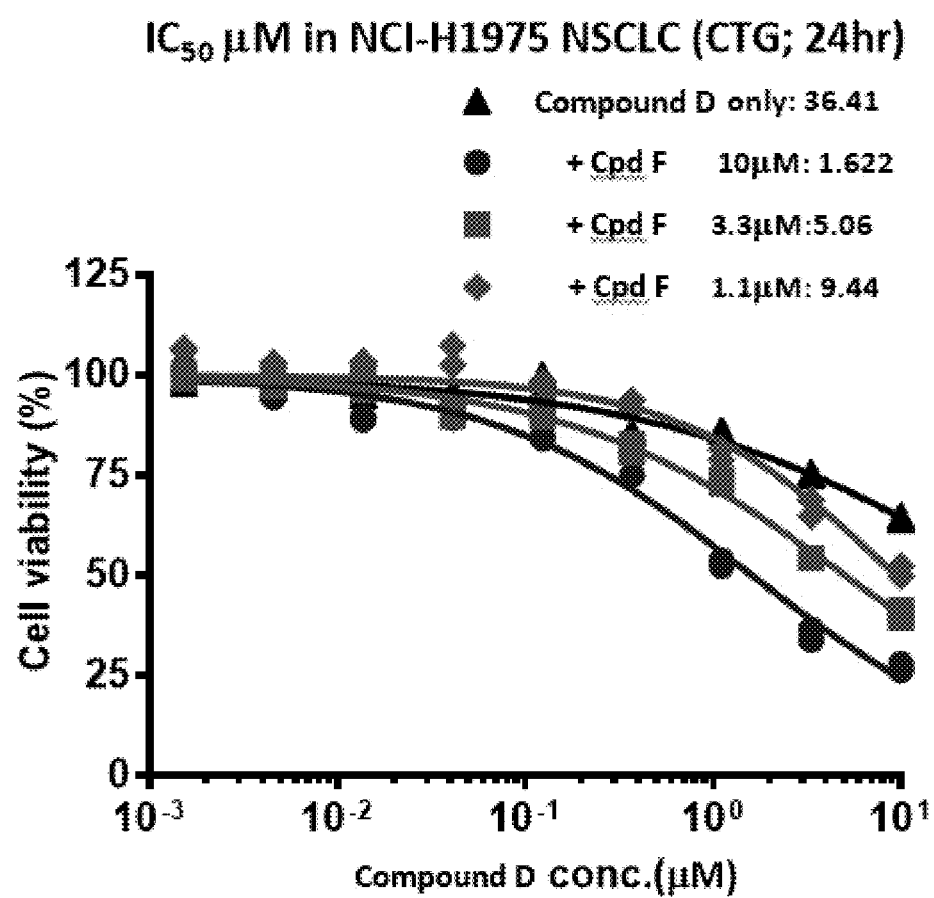
FIG. 72C depicts a graph which illustrates treatment of NCI-H1975 cells with compound D and compound F and effect on cell viability.

Therefore, in this experiment, a SCLC PDX model LU5220 model was established to evaluate the anti-tumor effect of compound B in combination with compound A/Anlotinib. The dosing regimen was as follows:
Compound B: 50 mg/kg, IV, BIW, for a total of 4 weeks,
Compound A 100 mg/kg, orally, QD, for a total of 4 weeks,
Anlotinib 2 mg/kg, orally, QD, for a total of 4 weeks,
The dosing regimen of each drug in the dosing regimen for the combination is the same as the dosing regimen for the single drug. See FIGS. 70A and 70B, which are equivalent to FIGS. 69A and 69C Example 51: In Vitro Antiproliferative Activity of Combination Treatment with Compound D and Compound F in MV-4-11 Cells: Synergy Methods: Cell viability CTG assay
Results and Conclusion:
Combination treatments result lower number of live cells.
Compound D and compound F showed a synergistic antiproliferative activity in MV-4-11 cells after 48 h combination treatment, CI<0.9. See FIGS. 71A and 71B.
Cell source: cobioer
Culture: IMDM medium+20% FBS+1% P/S Example 52: In Vitro Anti-Proliferative Activity of Combination Treatment with Compound D and Compound F in NSCLC Cells: Synergy Methods: Cell viability CTG assay
Results and Conclusion: Combination treatments result lower number of live cells. See FIGS. 72A, 72B, and 72C.
Compound D and compound F showed a synergistic antiproliferative activity in A549, NCI-H1650, NCI-H1975 cells after 24 h combination treatment.
A549 cell source: cobioer; Culture: RPMI 1640 medium with 300 mg/L (2 mM) L-glutamine adjusted to contain 2.0 g/L sodium bicarbonate, 90%; fetal bovine serum, 10%; 1P/S.
NCI-H1650 cell source: ATCC; Culture: RPMI 1640 medium with 300 mg/L (2 mM) L-glutamine adjusted to contain 2.0 g/L sodium bicarbonate, 90%; fetal bovine serum, 10%; 1P/S.
NCI-H1975 cell source: ATCC; Culture: RPMI 1640 medium with 300 mg/L (2 mM) L-glutamine adjusted to contain 1.5 g/L sodium bicarbonate, 4.5 g/L glucose, 10 mM HEPES, and 1.0 mM sodium pyruvate; fetal bovine serum, 10%; P/S 1%.

Figure 73A:
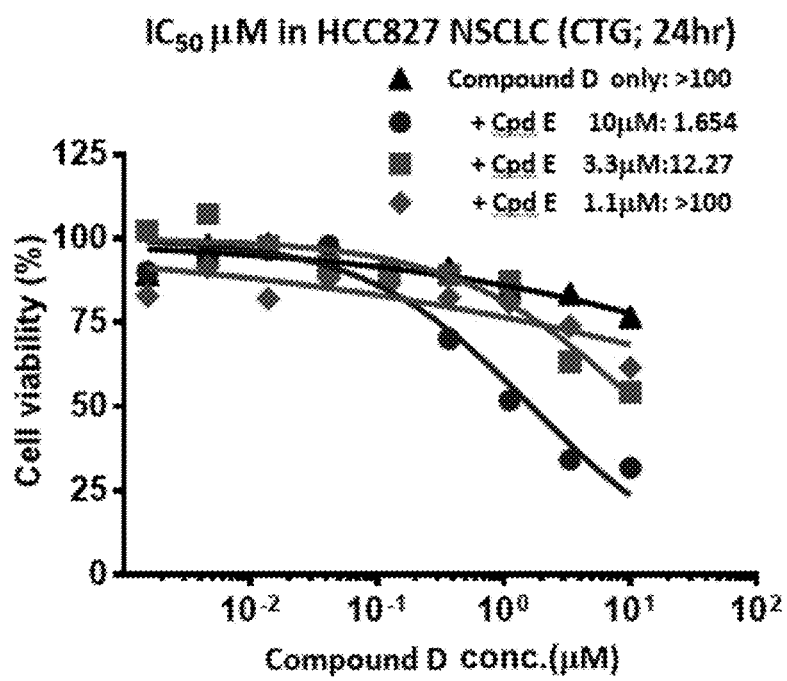
FIG. 73A depicts a graph which illustrates treatment of HCC827 cells with compound D and compound E and effect on cell viability.
Figure 73B:
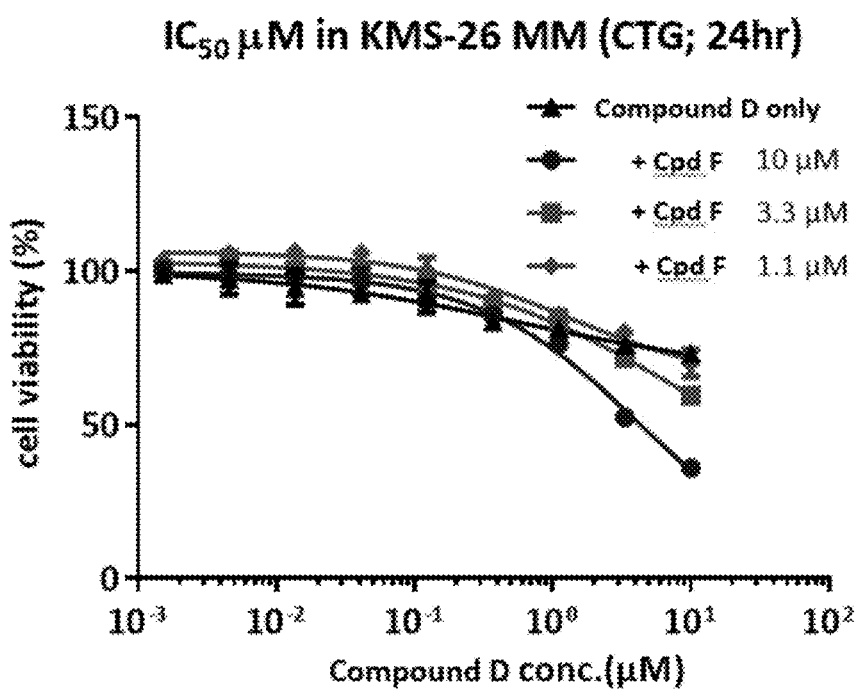
FIG. 73B depicts a graph which illustrates treatment of KMS-26 cells with compound D and compound F and effect on cell viability.

Example 53: In Vitro Anti-Proliferative Activity of Combination Treatment with Compound D and Compound F in MM Cells: Synergy Methods: Cell viability CTG assay
Results and Conclusion:
Combination treatments result lower number of live cells.
Compound D and compound E showed a synergistic antiproliferative activity in HCC827 cells after 24 h combination treatment. See FIG. 73A.
Compound D and compound F showed a synergistic antiproliferative activity in KMS-26 cells after 24 h combination treatment. See FIG. 73B.
Cell source: SHUNRAN BIOLOGY
Culture: RPMI 1640 medium with 300 mg/L (2 mM) L-glutamine adjusted to contain 2.0 g/L sodium bicarbonate, 90%; fetal bovine serum, 10%; 1P/S.

Figure 74A:
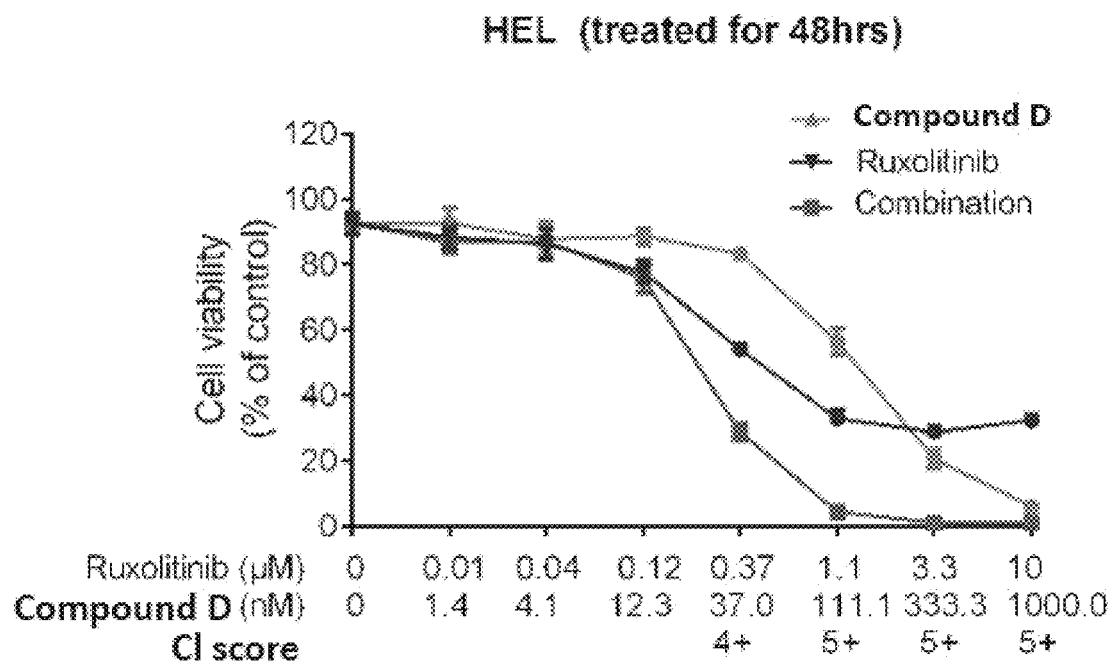
FIG. 74A depicts a graph which illustrates treatment of HEL cells with compound D and ruxolitinib and effect on cell viability.
Figure 74B:
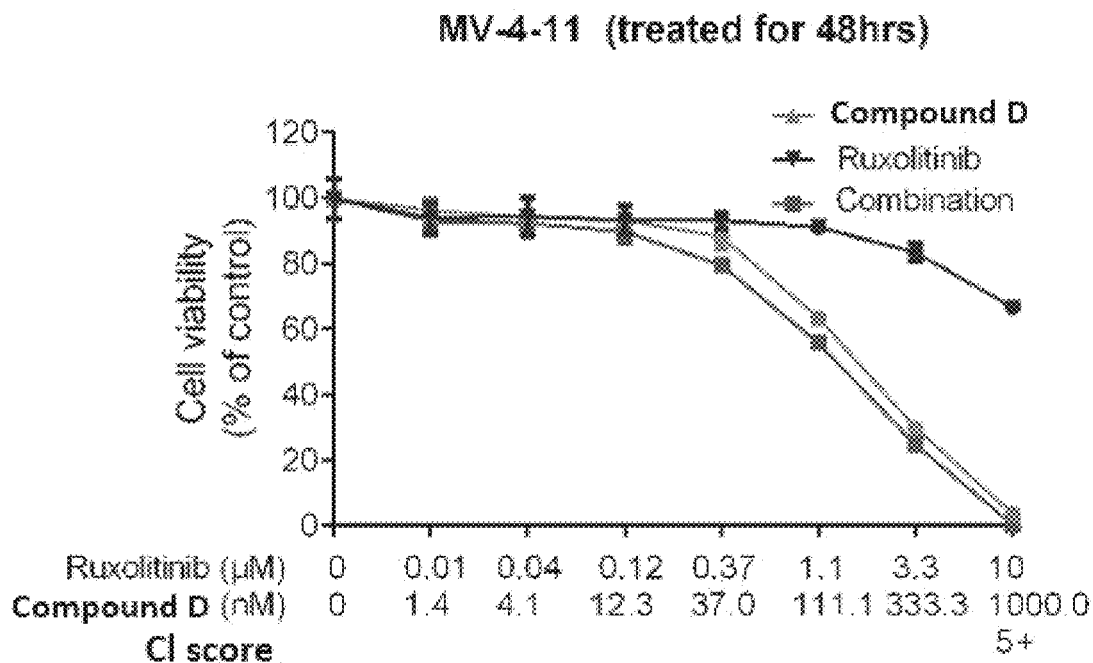
FIG. 74B depicts a graph which illustrates treatment of MV-4-11 cells with compound D and ruxolitinib and effect on levels of caspase 3/7.
Figure 75A:
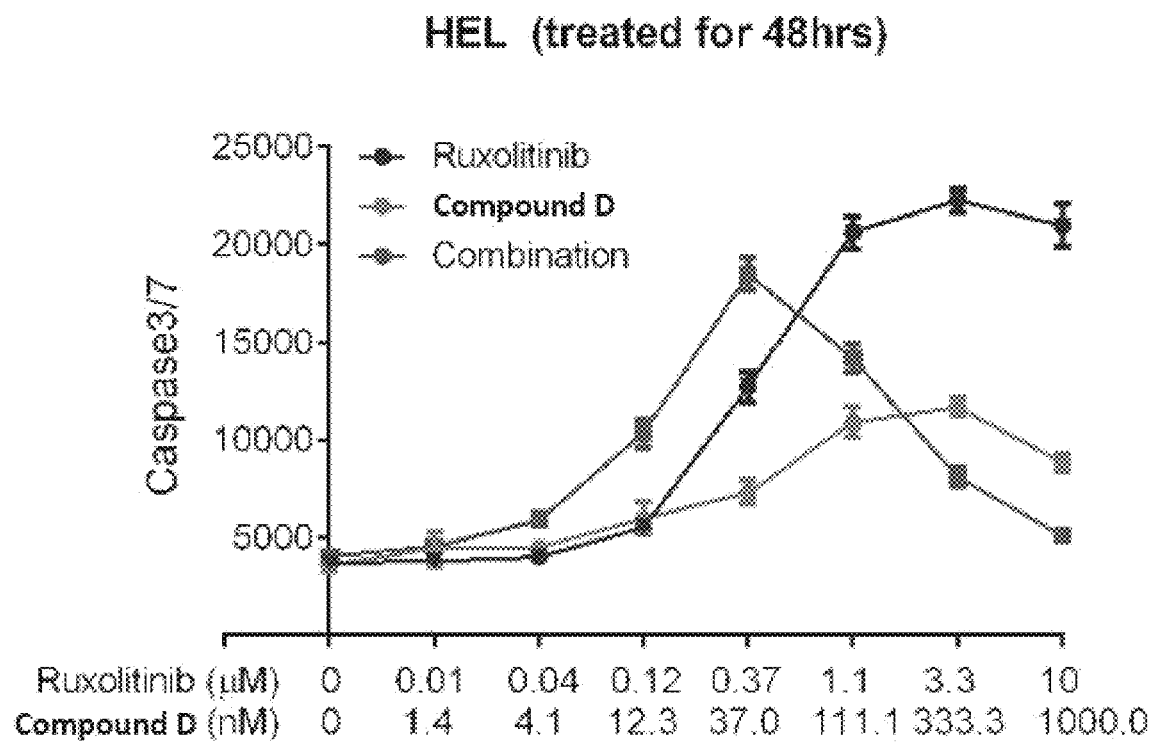
FIG. 75A depicts a graph which illustrates treatment of HEL cells with compound D and ruxolitinib and effect on cell viability.
Figure 75B:
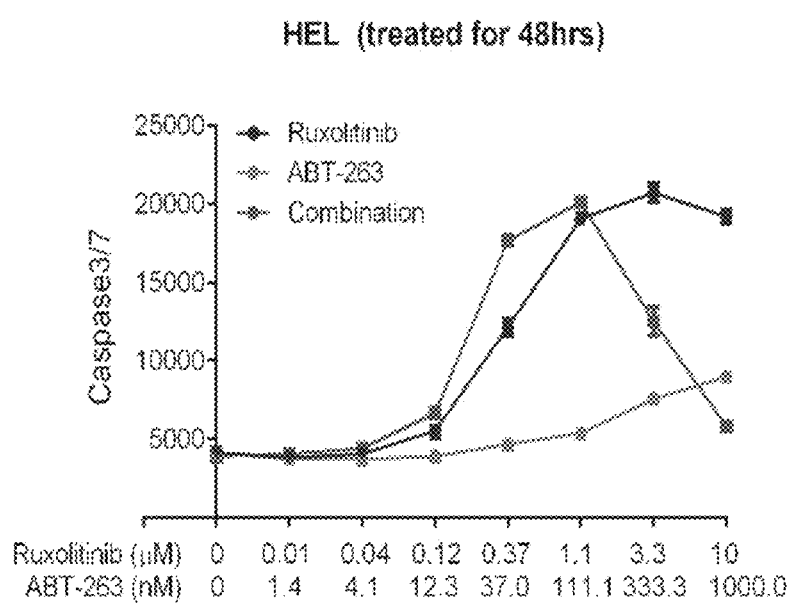
FIG. 75B depicts a graph which illustrates treatment of HEL cells with ABT-263 and ruxolitinib and effect on levels of caspase 3/7.
Figure 75C:
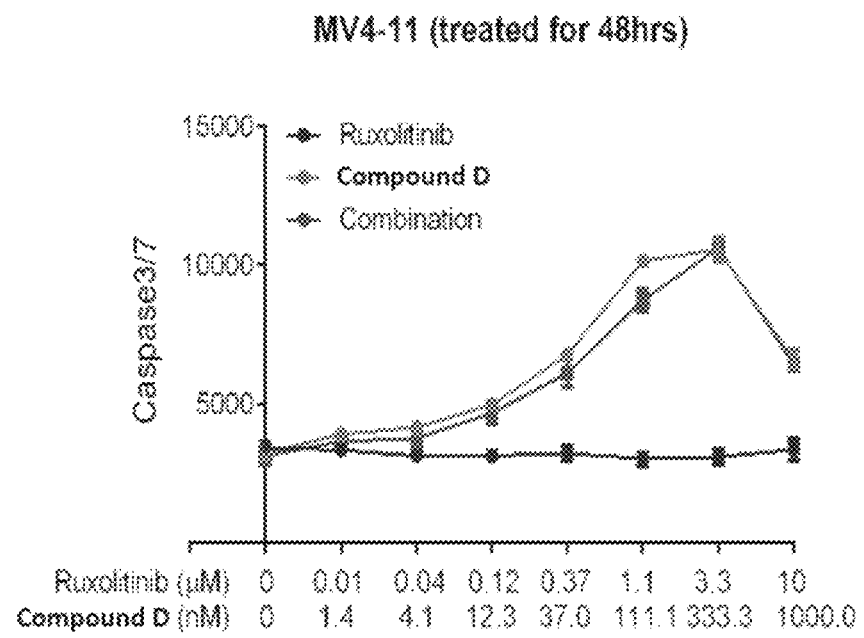
FIG. 75C depicts a graph which illustrates treatment of MV-4-11 cells with compound D and ruxolitinib and effect on cell viability.
Figure 75D:
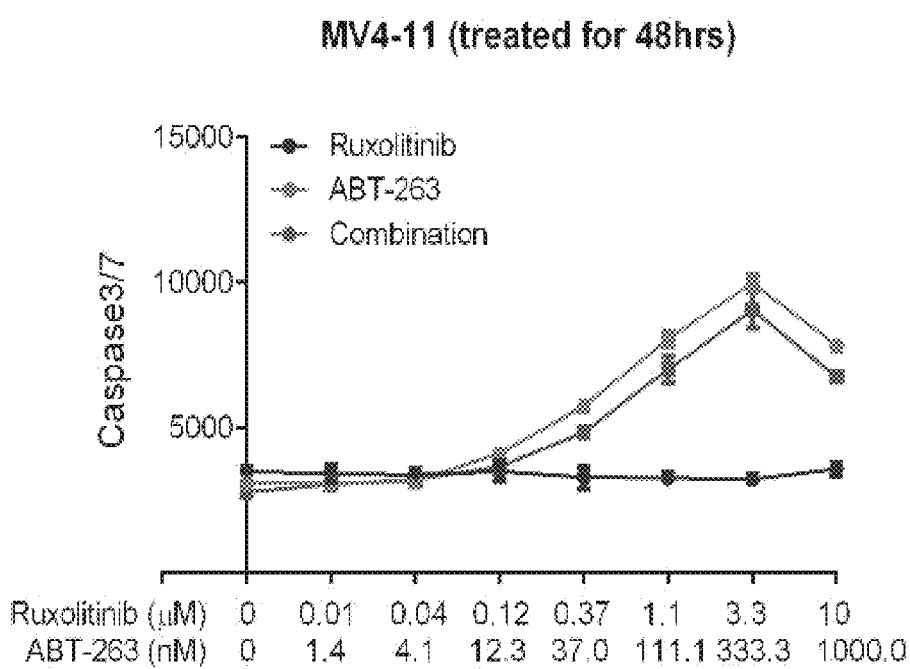
FIG. 75D depicts a graph which illustrates treatment of MV-4-11 cells with ABT-263 and ruxolitinib and effect on levels of caspase 3/7.

Example 54: Ruxolitinib Combination with Compound D had Synergistic Anti-Proliferative Effect in the JAK2V617F Positive HEL Ruxolitinib (Selleck)
Methods: Cell viability CTG assay
Results and Conclusion:
Combination treatments result lower number of live HEL cells, but no in MV-4-11 cells.
Compound D and Ruxolitinib showed a synergistic antiproliferative activity in HEL cells after 48 h combination treatment, CI<0.9.
See FIG. 74A and FIG. 74B. HEL has JAK 2 V617F mutation, MV-4-11 is wild type JAK2.
HEL cell source: cobioer; Culture: MEM medium+10% FBS+1% P/S+1% NEAA+1 mM NaP.
MV-4-11 cell source: cobioer; Culture: IMDM medium+20% FBS+1% P/S.

Example 55: Ruxolitinib Combination with Compound D had Higher Activated Caspase 3/7 in HEL Methods: Caspase-Glo® 3/7 Assay
Results and Conclusion:
Combination treatments result higher caspase 3/7 activation in HEL cells compared to single agents treatment, but no in MV-4-11 cells.
Compound D and Ruxolitinib showed a synergistic activation of caspase 3/7 in HEL cells after 48 h combination treatment, but not in MV-4-11 cells.
See FIGS. 75A, 75B, 75C and 75D. HEL has JAK 2 V617F mutation, MV-4-11 is wild type JAK2.
HEL cell source: cobioer; Culture: MEM medium+10% FBS+1% P/S+1% NEAA+1 mM NaP.
MV-4-11 cell source: cobioer; Culture: IMDM medium+20% FBS+1% P/S.

Example 56: Combination Treatment with Compound B and AZD9291 (EGFRi) in Subcutaneous NSCLC NCI-H1975 Xenografts Therefore, in this experiment, a subcutaneous NSCLC NCI-H1975 xenografts model was established to evaluate the anti-tumor effect of compound B in combination with AZD9291 (selleck) The dosing regimen was as follows:

Compound B: 65 mg/kg, IV, BIW, from D1-D5, for a total of 5 days,
Compound AZD9291: 15 mg/kg, orally, QD, from D1-D5, for a total of 5 days,
Compound AZD9291: 25 mg/kg, orally, QD, from D1-D5, for a total of 5 days,
  The dosing regimen of each drug in the dosing regimen for the combination is the same as the dosing regimen for the single drug.

Figure 76A:
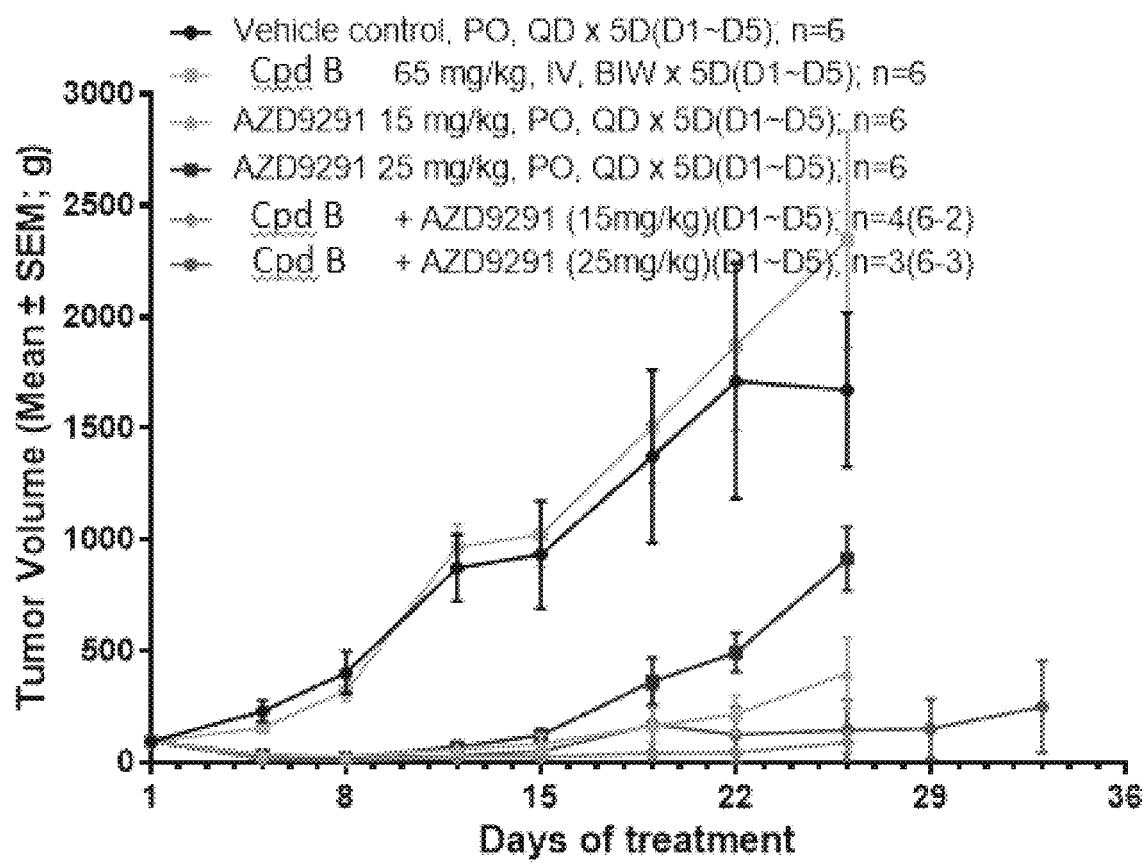
FIG. 76A depicts a graph which illustrates treatment of NCI-H1975 cells with compound B and AZD9291 and effect on tumor volume.

Results:
As shown in FIG. 76A, AZD9291 (15 mg/kg) showed potent antitumor activity. Combination treatment with compound B and AZD9291 significantly enhance tumor repression.

Figure 76B:
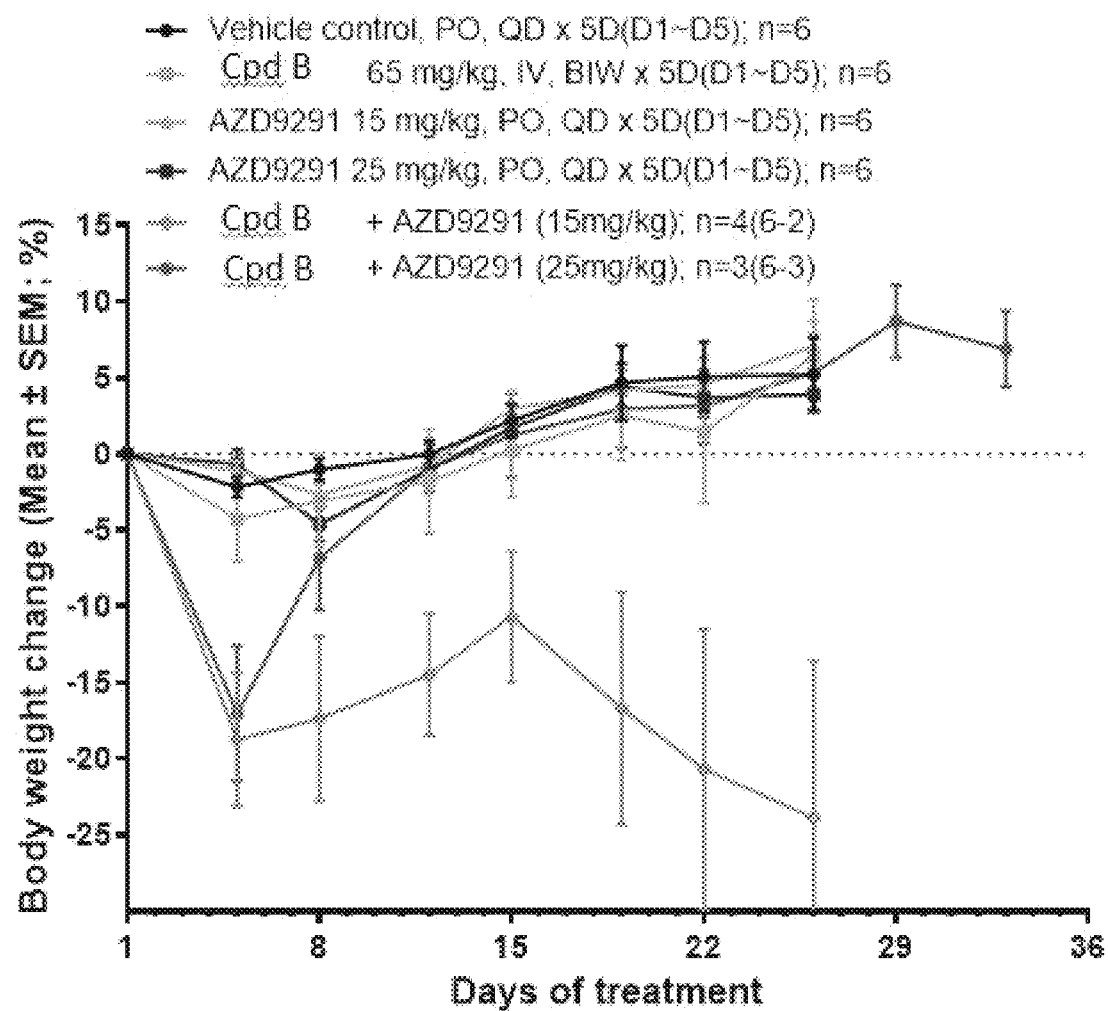
FIG. 76B depicts a graph which illustrates treatment of NCI-H1975 cells with compound B and AZD9291 and effect on body weight.

As shown in FIG. 76B, combination treatment with compound B and AZD9291 (15 mg/kg) group has a server weight loss in the end.

As shown in table 27B, T/C (%) value of the combination treatment with compound B and AZD9291 (15 mg/kg) group was 5.0 on Day 26. compared to 138 or 24 from single agents groups. The synergy ratio of this group is 4.8. Animals from this group achieved 1/5 CR, 4/5 PR, ORR=100%.

T/C (%) value of the combination treatment with compound B and AZD9291 (25 mg/kg) group was 11 on Day 26. compared to 138 or 52 from single agents groups. The synergy ratio of this group is 2.98. Animals from this group achieved 1/3 CR, 1/3 PR, 1/3 SD, ORR=66.7%.

TABLE 27B

| Group | RTV @ D 26 | T/C (%) @ D 26 | Synergy ratio @ D 21 | mRESCIT | Response @ D 26 |
|---|---|---|---|---|---|
| Vehicle | 18.8 ± 4.9 | — | — | 6/6 PD | 6/6 PD |
| Cpd B | 26.0 ± 6.1 | 138.0 | — | 6/6 PD | 6/6 PD |
| AZD9291 15 mg/kg | 4.5 ± 1.8 | 24.0 | — | 1/6 CR, 2/6 PR, 2/6 SD, 1/6 PD | 1/6 CR, 1/6 SD, 4/6 PD |
| AZD9291 25 mg/kg | 9.7 ± 1.5 | 52.0 | — | 1/6 PR, 5/6 SD | 6/6 PD |
| Cpd B + AZD9291 15 mg/kg | 0.9 ± 0.5 | 5.0 | 4.8 | 1/5 CR, 4/5 PR | 1/5 CR, 2/5 PR, 2/5 SD |
| Cpd B + AZD9291 25 mg/kg | 2.1 ± 2.0 | 11.0 | 2.98 | 1/3 CR, 1/3 PR, 1/3 SD | 2/3 CR, 1/3 PD |

Conclusion:
Combination of compound B and AZD9291 achieved synergistic antitumor effect in s.c. NCI-H1975 NSCLC xenograft.

Example 57: Lide: Combination Treatment with Compound B and AZD9291 in T790M/19 Del/C797S NSCLC PDX Model LUPF104: Synergy Therefore, in this experiment, a T790M/19 del/C797S NSCLC PDX model LUPF104 was established to evaluate the anti-tumor effect of compound B in combination with AZD9291 The dosing regimen was as follows:

Compound B: 50 mg/kg, IV, BIW, for a total of 5 weeks,
Compound AZD9291: 5 mg/kg, P.O., QD, for a total of 33 days,
  The dosing regimen of each drug in the dosing regimen for the combination is the same as the dosing regimen for the single drug.

Figure 77A:
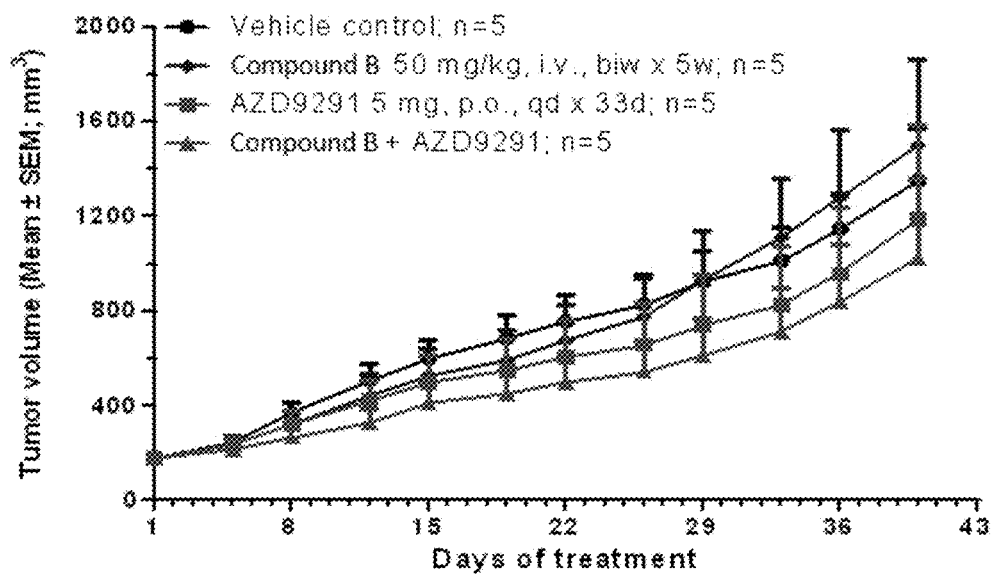
FIG. 77A depicts a graph which illustrates treatment of LUPF104 xenografts with compound B and AZD9291 and effect on tumor volume.

Results:
As shown in FIG. 77A, single agents showed no antitumor activity. Combination treatment with compound B and AZD9291 significantly enhance tumor repression.

Figure 77B:
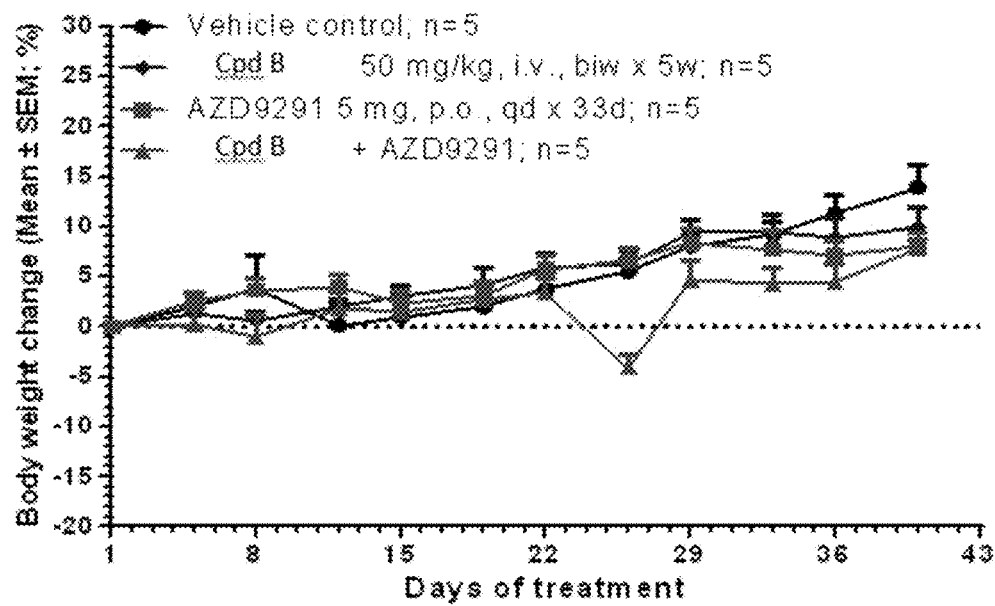
FIG. 77B depicts a graph which illustrates treatment of LUPF104 xenografts with compound B and AZD9291 and effect on body weight.

As shown in FIG. 77B, treatments have no effect on the weight of mice.

As shown in table 28, TIC (%) value of the combination treatment with compound B and AZD9291 group was 73.5 on Day 40. compared to 105.8 or 83 from single agents groups. The synergy ratio of this group is 1.20.

TABLE 28

| Treatment | RTV @ D 33 (Mean ± SEM) | T/C (%) @ D 33 | Synergy Score @ D 33 | RTV @ D 36 (Mean ± SEM) | T/C (%) @ D 36 | Synergy Score @ D 36 | RTV @ D 40 (Mean ± SEM) | T/C (%) @ D 40 | Synergy Score @ D 40 |
|---|---|---|---|---|---|---|---|---|---|
| Vehicle Control | 5.6 ± 0.6 | — | — | 6.4 ± 0.7 | — | — | 7.4 ± 0.9 | — | — |
| Cpd B 50 mg/kg | 5.9 ± 1.2 | 105.0 | — | 6.7 ± 1.4 | 105.8 | — | 7.9 ± 1.7 | 105.8 | — |
| AZD9291 5 mg/kg | 4.3 ± 0.9 | 77.3 | — | 5.0 ± 1.0 | 79.0 | — | 6.2 ± 1.5 | 83.0 | — |
| Cpd B + AZD9291 | 3.8 ± 0.9 | 68.1 | 1.19 | 4.5 ± 1.2 | 70.6 | 1.19 | 5.5 ± 1.6 | 73.5 | 1.20 |

Ratio > 1, Synergistic;
Ratio = 1, Additive;
Ratio < 1, Antagonistic

Conclusion: Combination of compound B and AZD9291 achieved synergistic antitumor effect in s.c. AZD9291-resistant NSCLC LUPF104 PDX xenograft.

Example 58: Combination Treatment with Compound B and AZD9291 in s.c. AZD9291-Resistant NSCLC LD1-0025-200713 PDX (L858R, BRAF Mut)

Therefore, in this experiment, a s.c. AZD9291-resistant NSCLC LD1-0025-200713 PDX (L858R, BRAF Mut) model was established to evaluate the anti-tumor effect of compound B in combination with AZD9291 (selleck) The dosing regimen was as follows:
Compound B: 65 mg/kg, IV, BIW, for a total of 25 days,
Compound B: 50 mg/kg, IV, BIW, for a total of 25 days,
Compound AZD9291: 10 mg/kg, orally, QD, for a total of 25 days,
Compound AZD9291: 25 mg/kg, orally, QD, for a total of 25 days, The dosing regimen of each drug in the dosing regimen for the combination is the same as the dosing regimen for the single drug.

Figure 78A:
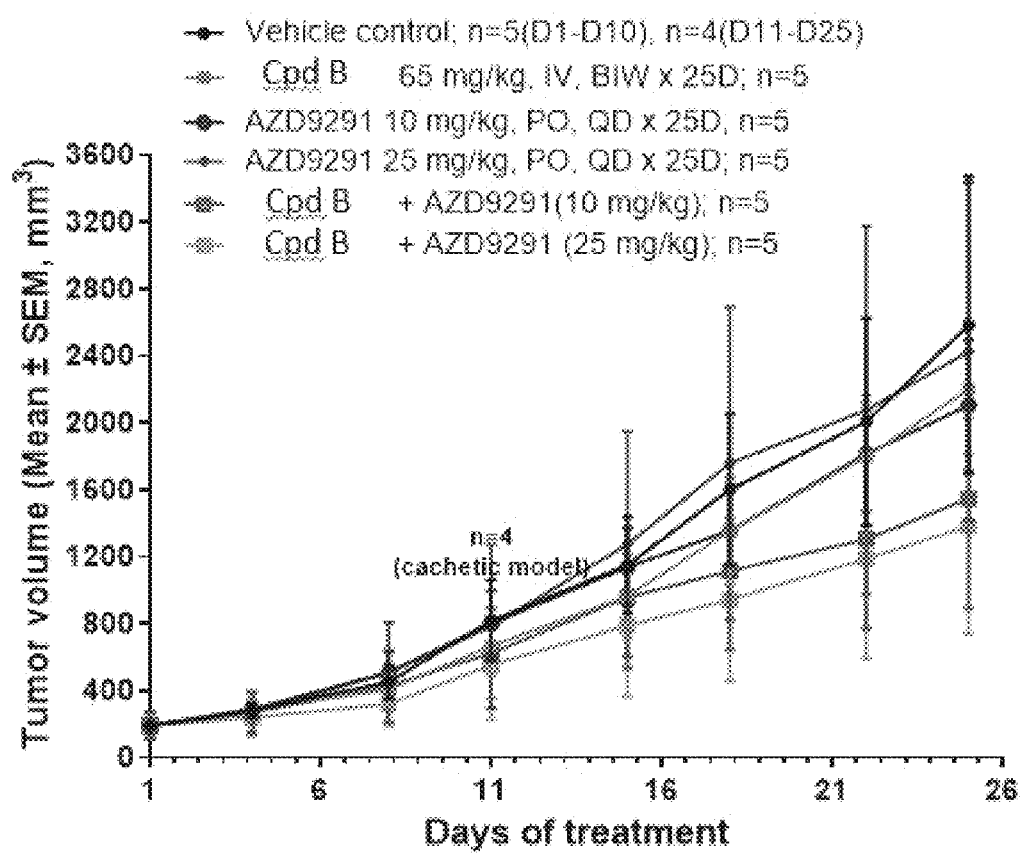
FIG. 78A depicts a graph which illustrates treatment of AZD9291 resistant NSCLC cells with compound B and AZD9291 and effect on tumor volume.

Results:

As shown in FIG. 78A, single agents showed no antitumor activity. Combination treatment with compound B and AZD9291 significantly enhance tumor repression.

Figure 78B:
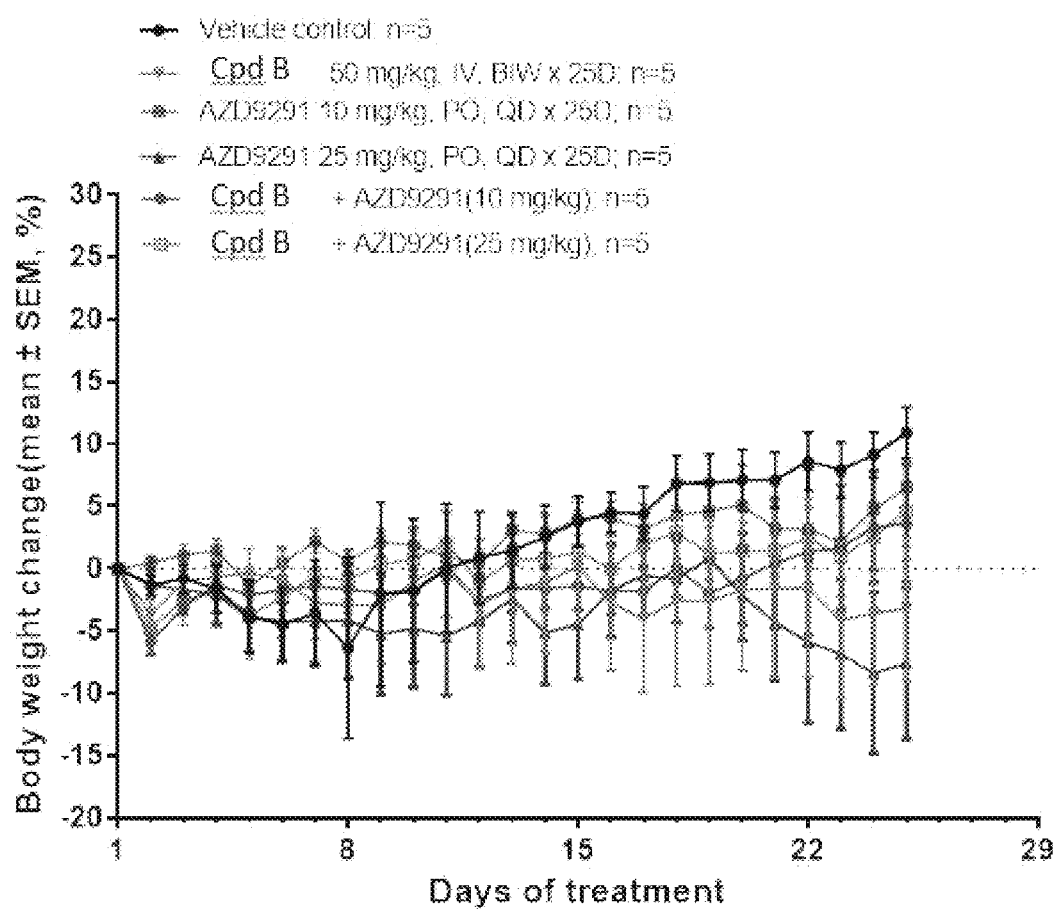
FIG. 78B depicts a graph which illustrates treatment of AZD9291 resistant NSCLC cells with compound B and AZD9291 and effect on body weight change.

As shown in FIG. 78B, AZD9291 (25 mg/kg) group has a slight weight loss in the end.

As shown in table 29, T/C (%) value of the combination treatment with compound B and AZD9291 (10 mg/kg) group was 55.71 on Day 25. compared to 83.30 or 76.45 from single agents groups. The synergy ratio of this group is 1.14. T/C (%) value of the combination treatment with compound B and AZD9291 (25 mg/kg) group was 54.64 on Day 25. compared to 83.30 or 89.72 from single agents groups. The synergy ratio of this group is 1.37.

TABLE 29

| Group | RTV @ D 25 | T/C (%) @ D 25 | Synergy ratio @ D 25 | mRECIST |
|---|---|---|---|---|
| Vehicle | 14.69 ± 5.76 | | | 5/5 PD |
| Cpd B | 12.24 ± 2.54 | 83.30 | | 5/5 PD |
| AZD9291(10 mg/kg) | 11.23 ± 1.32 | 76.45 | | 5/5 PD |
| AZD9291(25 mg/kg) | 13.21 ± 1.26 | 89.92 | | 5/5 PD |
| Cpd B + AZD9291(10 mg/kg) | 8.18 ± 0.88 | 55.71 | 1.14 | 5/5 PD |
| Cpd B + AZD9291(25 mg/kg) | 8.02 ± 2.12 | 54.64 | 1.37 | 5/5 PD |

Synergy: Ratio > 1, synergistic; Ratio = 1, additive; Ratio < 1, antagonistic.

Conclusion:

Combination of compound B and AZD9291 achieved synergistic antitumor effect in s.c. AZD9291-resistant NSCLC LD 1-0025-200713 PDX xenograft.

Example 59: Efficacy of Compound A Plus HMA in SKM-1 Model of Myelodysplastic Syndromes (MDS)

Therefore, in this experiment, a SKM-1 model of myelodysplastic syndromes (MDS) was established to evaluate the anti-tumor effect of compound A in combination with Azacitidine or Decitabine (selleck) The dosing regimen was as follows:

Compound A: 30 mg/kg, PO, QD, for a total of 22 days,
Azacitidine: 1 mg/kg, IV, QD, for a total of 7 days,
Decitabine: 0.3 mg/kg IV, QD, for a total of 7 days, The dosing regimen of each drug in the dosing regimen for the combination is the same as the dosing regimen for the single drug.

Figure 79A:
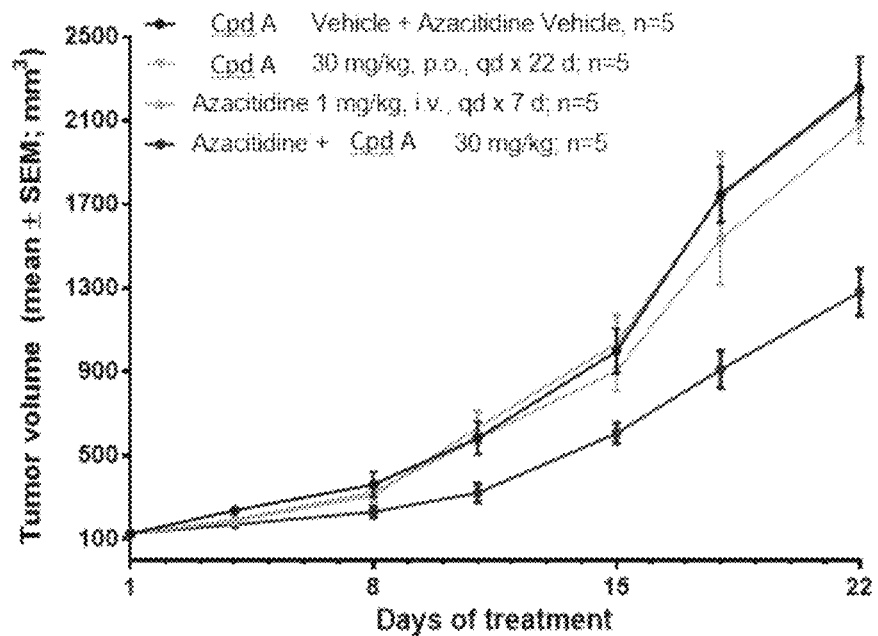
FIG. 79A depicts a graph which illustrates treatment of SKM-1 xenografts with compound A and azacitidine and effect on tumor volume.
Figure 79B:
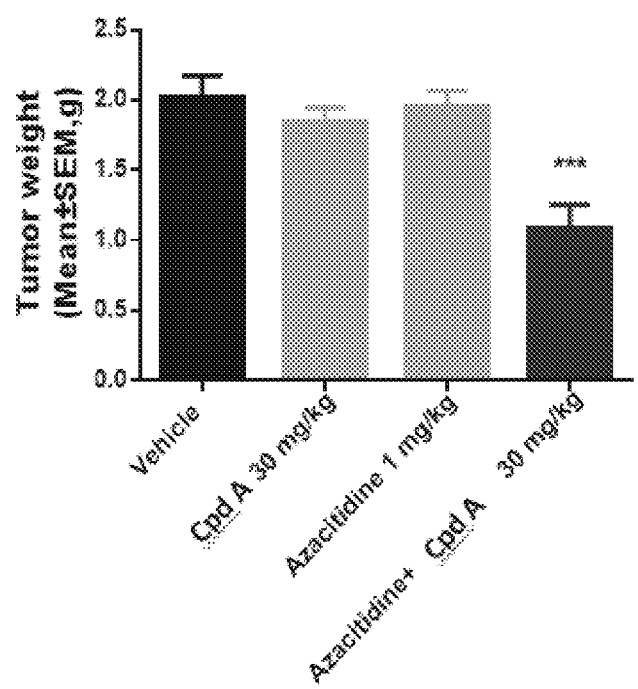
FIG. 79B depicts a graph which illustrates treatment of SKM-1 xenografts with compound A and azacitidine, and effect on tumor weight.

Results:

As shown in FIGS. 79A and 79B, single agents showed no antitumor activity. Combination treatment with compound A and Azacitidine significantly enhance tumor repression and lowest tumor weight at the end of treatment.

Figure 79C:
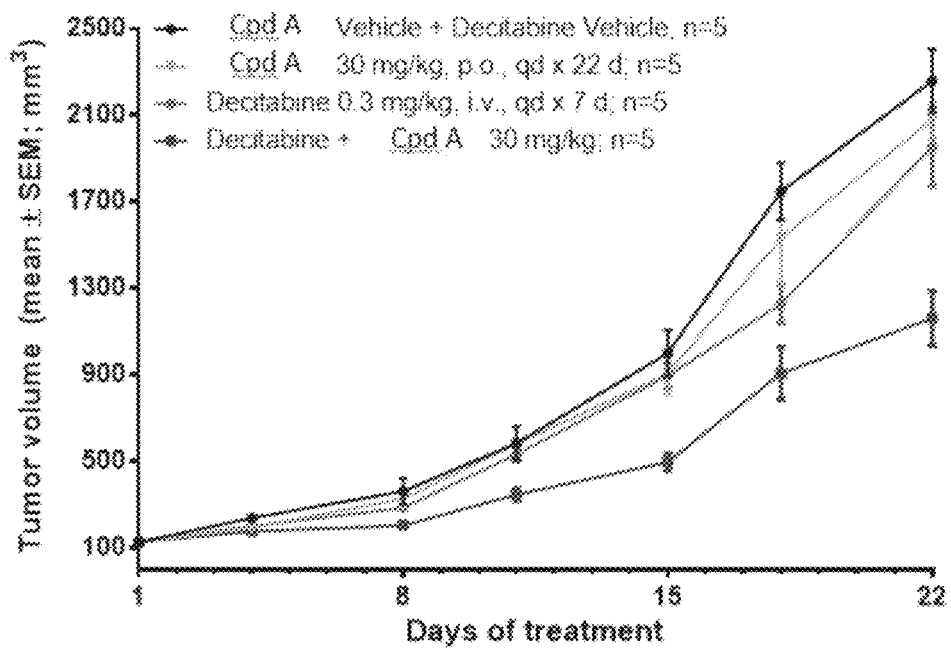
FIG. 79C depicts a graph which illustrates treatment of SKM-1 xenografts with compound A and decitabine and effect on tumor volume.
Figure 79D:
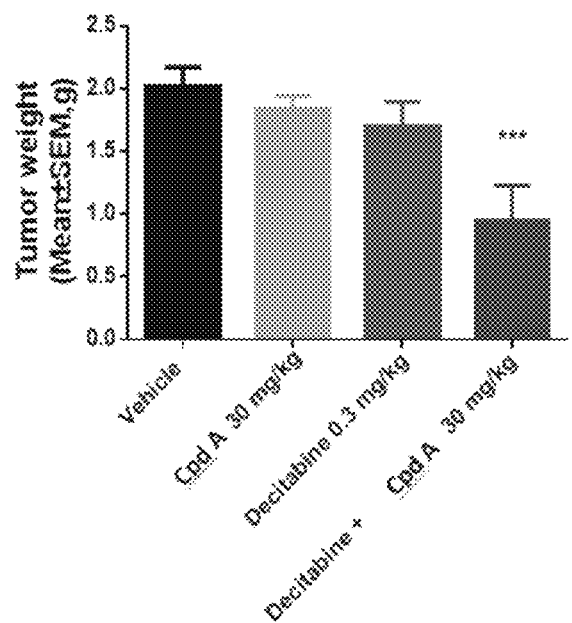
FIG. 79D depicts a graph which illustrates treatment of SKM-1 xenografts with compound A and decitabine, and effect on tumor weight.

As shown in FIGS. 79C and 79D, single agents showed no antitumor activity. Combination treatment with compound A and Decitabine significantly enhance tumor repression and lowest tumor weight at the end of treatment.

As shown in table 30, T/C (%) value of the combination treatment with compound A and Azacitidine group was 57.4 on Day 22. compared to 92.0 or 99.3 from single agents groups. The synergy ratio of this group is 1.59. : $p<0.01$ vs. vehicle control group; ##: $p<0.01$ vs. compound A 30 mg/kg group. T/C (%) value of the combination treatment with compound A and Decitabine group was 51.5 on Day 22. compared to 92.0 or 87.8 from single agents groups. The synergy ratio of this group is 1.57., *: $p<0.001$ vs. vehicle control group; ##: $p<0.01$ vs. compound A 30 mg/kg group.

Figure 79E:
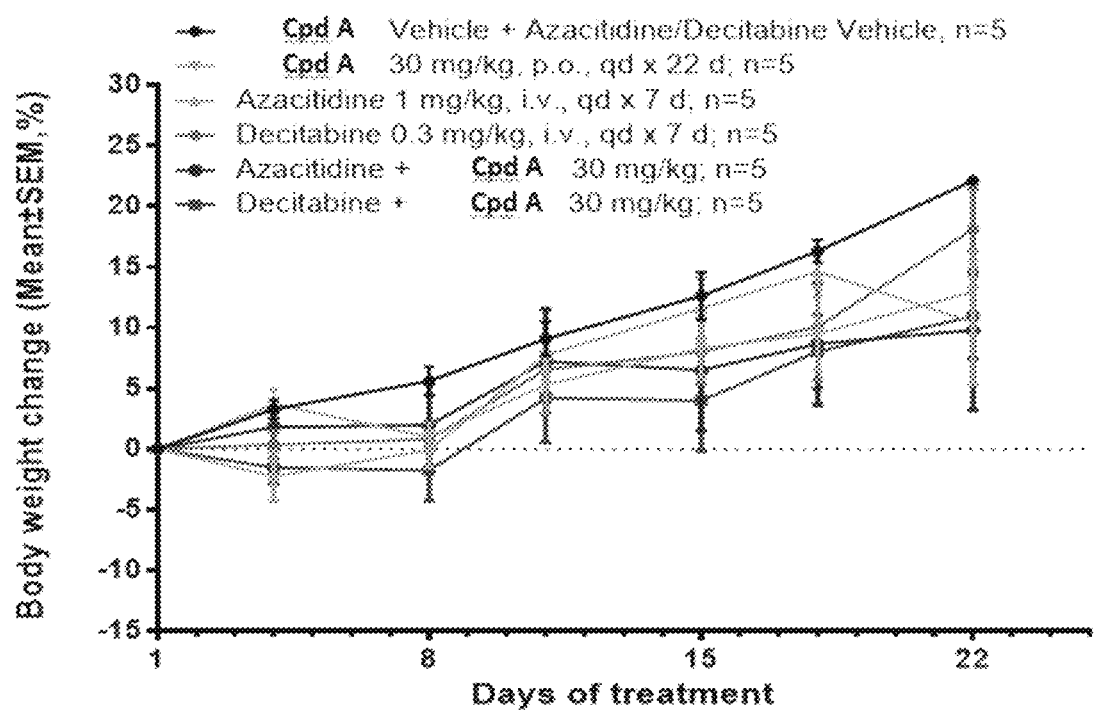
FIG. 79E depicts a graph which illustrates treatment of SKM-1 xenografts with compound A, azacitidine, and decitabine, and effect on body weight.

As shown in FIG. 79E, treatments have no effect on the weight of mice.

TABLE 30

| Treatment | RTV@ PG-D 22 | T/C(%)@PG-D 22 | Synergy @ PG-D 22 |
|---|---|---|---|
| Cpd A Vehicle + Azacitidine/ Decitabine Vehicle | 17.9 ± 1.4 | — | — |
| Cpd A 30 mg/kg | 16.4 ± 0.8 | 92.0 | — |
| Azacitidine 1 mg/kg | 17.7 ± 0.8 | 99.3 | — |
| Decitabine 0.3 mg/kg | 15.7 ± 2.0 | 87.8 | — |
| Azacitidine + Cpd A 30 mg/kg | 10.2 ± 1.1 | 57.4**## | 1.59 |
| Decitabine + Cpd A 30 mg/kg | 9.2 ± 1.0 | 51.5***## | 1.57 |

*: $p < 0.05$,
**: $p < 0.01$,
***: $p < 0.001$ vs. vehicle control group;
: $p < 0.05$,
: $p < 0.01$,
: $p < 0.001$ vs. COMPOUND A 30 mg/kg group;
&: $p < 0.05$ vs. COMPOUND A 100 mg/kg group;
Ratio > 1, Synergistic;
Ratio = 1, Additive;
Ratio < 1, Antagonistic Conclusion:

Combination of compound A and Decitabine or Azacitidine achieved synergistic antitumor effect in s.c. SKM-1 MDS xenograft.

Example 60: Combination Treatment with Compound A and HMA in s.c. MV-4-11 AML Model HMA (hypomethylating agents): azacitidine (Aza) or decitabine (Dec)

Therefore, in this experiment, a s.c. MV-4-11 AML model was established to evaluate the anti-tumor effect of compound A in combination with Azacitidine (selleck) The dosing regimen was as follows:

Compound A: 50 mg/kg, PO, QD, from day 2-day 21 for a total of 20 days,
Azacitidine: 2 mg/kg, IV, QD, for a total of 7 days,
Decitabine: 1 mg/kg IV, QD, for a total of 7 days, The dosing regimen of each drug in the dosing regimen for the combination is the same as the dosing regimen for the single drug.

Figure 80A:
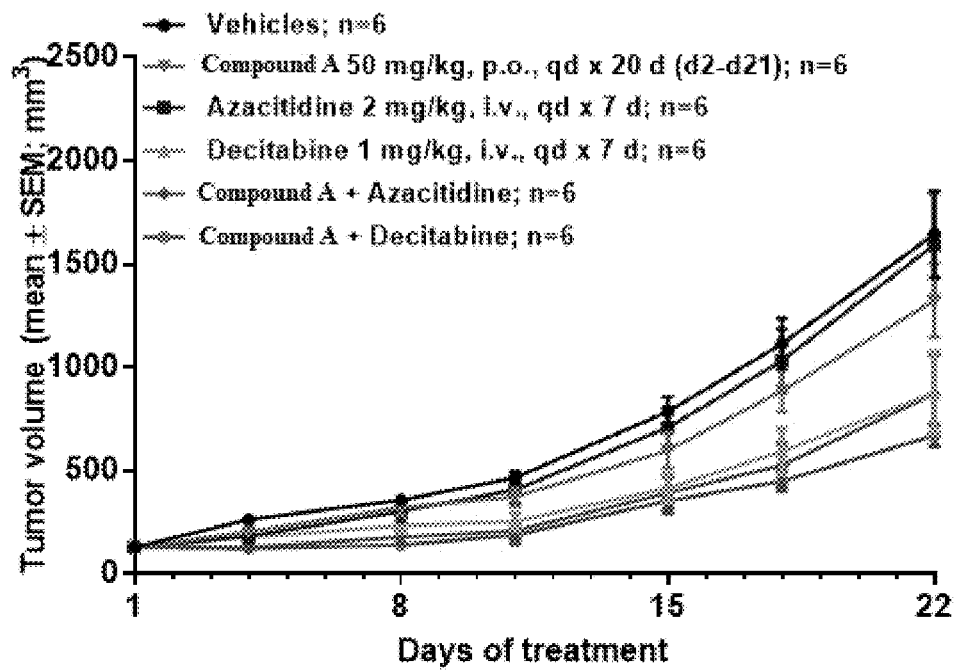
FIG. 80A depicts a graph which illustrates treatment of MV-4-11 xenografts with compound A, azacitidine, and decitabine, and effect on tumor volume.

Results:

As shown in FIG. 80A, Decitabine showed moderate antitumor activity. Combination treatment with compound A and Azacitidine significantly enhance tumor repression. Combination treatment with compound A and Decitabine significantly enhance tumor repression.

Figure 80B:
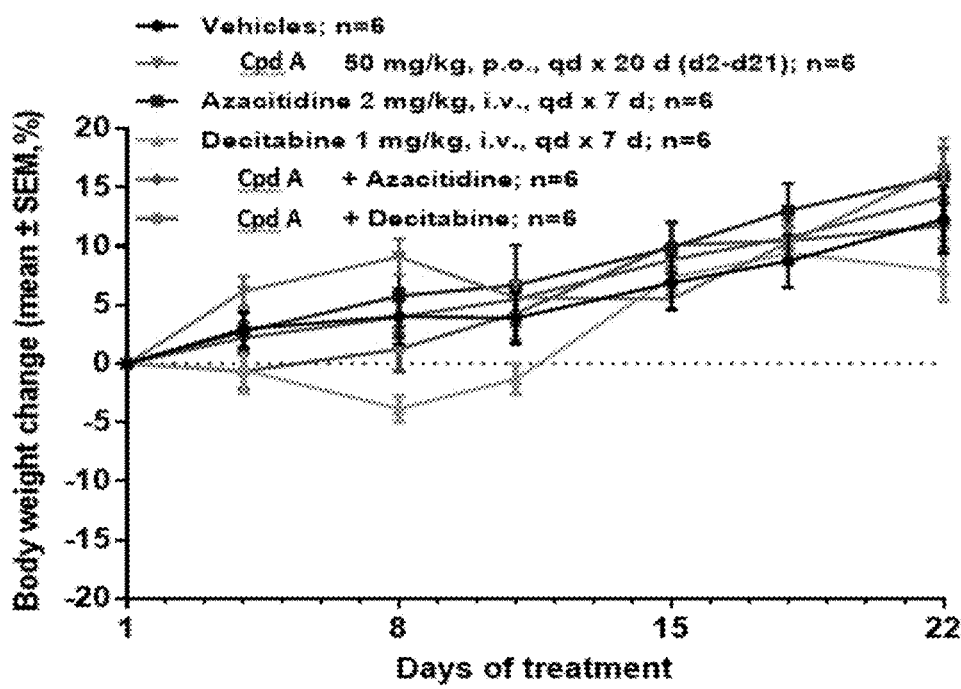
FIG. 80B depicts a graph which illustrates treatment of MV-4-11 xenografts with compound A, azacitidine, and decitabine, and effect on body weight.

As shown in FIG. 80B, Decitabine group has a slight weight loss at first, but gradually recovered. Other treatments have no effect on the weight of mice.

As shown in table 31, T/C (%) value of the combination treatment with compound A and Azacitidine group was 50.4 on Day 22. compared to 77.6 or 93.0 from single agents groups. The synergy ratio of this group is 4.13. :$p<0.01$ vs vehicles, &:$p<0.01$ vs Azacitabine group. T/C (%) value of the combination treatment with COMPOUND A and Decitabine group was 40.5 on Day 19. compared to 77.6 or 52.7 from single agents groups. The synergy ratio of this group is 1.01. *:$p<0.001$ vs vehicles.

TABLE 31

| Treatment | RTV@ D 22 | T/C(%)@D 22 | Synergy @ D 22 |
|---|---|---|---|
| Vehicles | 12.9 ± 1.9 | — | — |
| Cpd A 50 mg/kg | 10.0 ± 0.8 | 77.6 | — |
| Azacitidine 2 mg/kg | 12.0 ± 1.1 | 93.0 | — |
| Decitabine 1 mg/kg | 6.8 ± 1.3** | 52.7 | — |

TABLE 31-continued

| Treatment | RTV@ D 22 | T/C(%)@D 22 | Synergy @ D 22 |
|---|---|---|---|
| Cpd A + Azacitidine | 6.5 ± 1.0**& | 50.4 | 4.13 |
| Cpd A + Decitabine | 5.2 ± 0.4*** | 40.5 | 1.01 |

**p < 0.01 vs vehicles,
***p < 0.001 vs vehicles;
: p < 0.01 vs COMPOUND A group,
: p < 0.001 vs COMPOUND A group;
&&: p < 0.01 vs Azacitabine group;
Ratio > 1, Synergistic;
Ratio = 1, Additive;
Ratio < 1, Antagonistic Conclusion:

Combination of compound A and Decitabine or Azacitidine achieved synergistic antitumor effect in s.c. MV-4-11 AML xenograft.

Example 61: Combination Treatment with Compound A and Cytarabine (Ara-C) in s.c. MV-4-11 AML Model Therefore, in this experiment, a s.c. MV-4-11 AML model was established to evaluate the anti-tumor effect of compound A in combination with Cytarabine (selleck) The dosing regimen was as follows:

Compound A: 50 mg/kg, PO, QD, for a total of 19 days,
Compound A: 100 mg/kg, PO, QD, for a total of 19 days,
Ara-C: 5 mg/kg, I.P., QD, for a total of 10 days,
Ara-C: 10 mg/kg, I.P., QD, for a total of 10 days,
Ara-C: 50 mg/kg, I.P., QD, 5 days on 2 days off, for a total of 19 days,
Azacitidine: 2 mg/kg, IV, QD, for a total of 7 days,
Decitabine: 1 mg/kg IV, QD, for a total of 7 days, The dosing regimen of each drug in the dosing regimen for the combination is the same as the dosing regimen for the single drug.

Figure 81A:
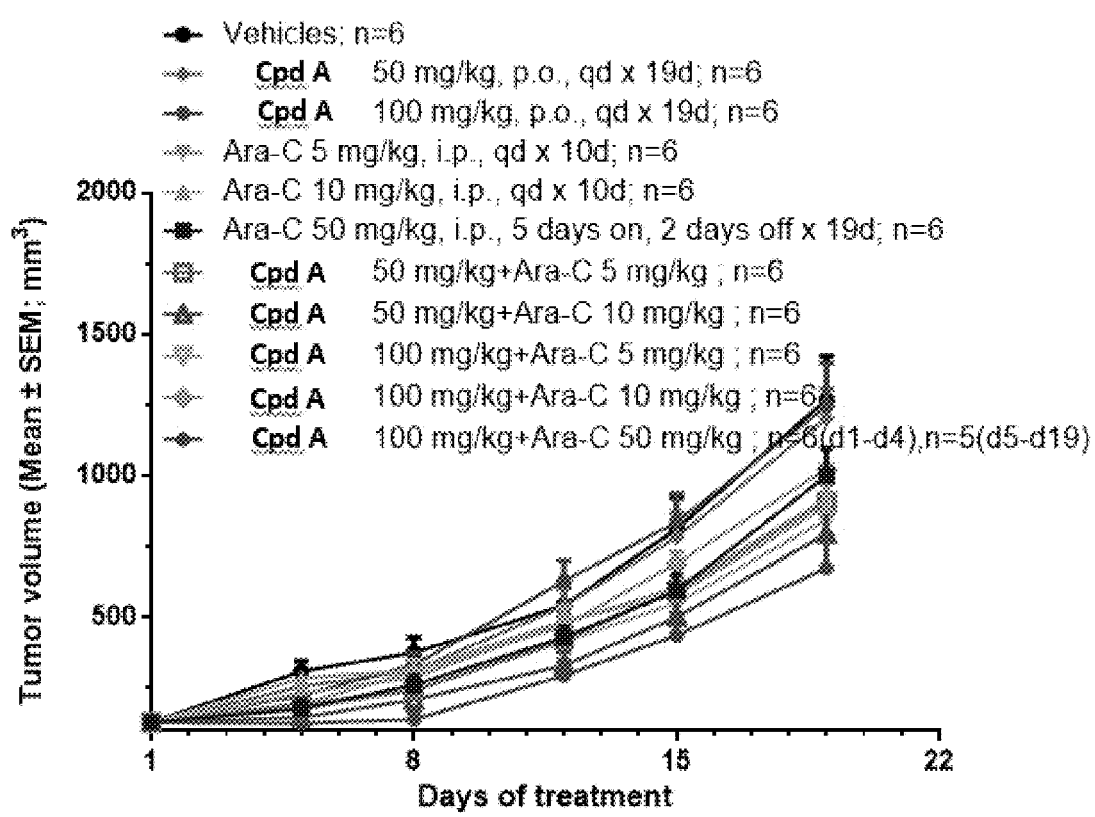
FIG. 81A depicts a graph which illustrates treatment of MV-4-11 xenografts with compound A and cytarabine, and effect on tumor volume.

Results:

As shown in FIG. 81A, single agents showed no to moderate antitumor activity. Combination treatment with compound A 50 mg/kg and Ara-C 10 mg/kg significantly enhance tumor repression. Combination treatment with compound A 100 mg/kg and Ara-C 5 mg/kg or Ara-C 50 mg/kg significantly enhance tumor repression.

Figure 81B:
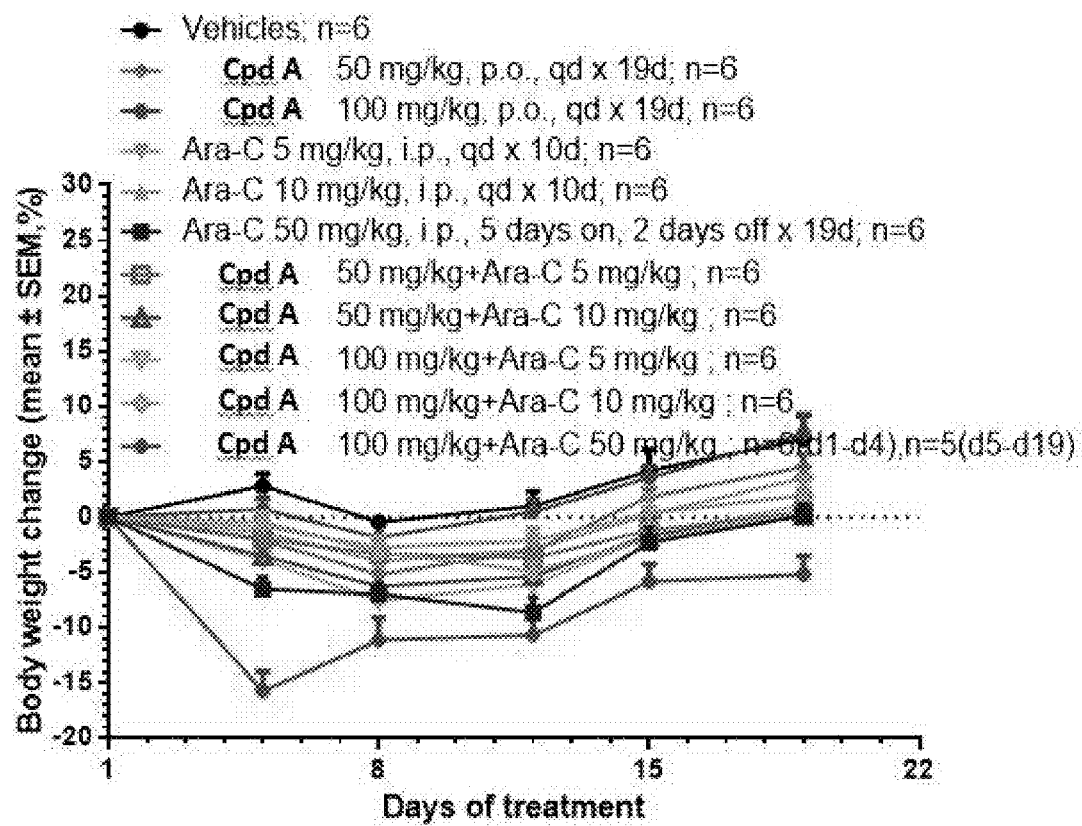
FIG. 81B depicts a graph which illustrates treatment of MV-4-11 xenografts with compound A and cytarabine, and effect on body weight.

As shown in FIG. 81B, combination group of compound A 100 mg/kg and Ara-C 50 mg/kg has a weight loss at first, but gradually recovered.

As shown in the table, T/C (%) value of the combination treatment with compound A 50 mg/kg and Ara-C 10 mg/kg group was 62.7 on Day 19. compared to 96.1 or 72.4 from single agents groups. The synergy ratio of this group is 1.11. T/C (%) value of the combination treatment with compound A 100 mg/kg and Ara-C 5 mg/kg group was 68.4 on Day 19. compared to 98.8 or 73.4 from single agents groups. The synergy ratio of this group is 1.06. T/C (%) value of the combination treatment with compound A 100 mg/kg and Ara-C 50 mg/kg group was 53.8 on Day 19. compared to 98.8 or 79.5 from single agents groups. The synergy ratio of this group is 1.46.

TABLE 32

| Treatment | RTV@ D 19 | T/C(%)@D 19 | Synergy @ D 19 |
|---|---|---|---|
| Vehicles | 9.8 ± 0.9 | — | — |
| Cpd A 50 mg/kg | 9.4 ± 0.8 | 96.1 | — |
| Cpd A 100 mg/kg | 9.7 ± 0.9 | 98.8 | — |
| Ara-c 5 mg/kg | 7.2 ± 0.9 | 73.4 | — |
| Ara-c 10 mg/kg | 7.1 ± 0.6 | 72.4 | — |
| Ara-c 50 mg/kg | 7.8 ± 0.6 | 79.5 | — |
| Cpd A 50 mg/kg + Ara-C 5 mg/kg | 7.1 ± 0.5 | 72.4 | 0.97 |
| Cpd A 50 mg/kg + Ara-C 10 mg/kg | 6.1 ± 0.3* | 62.7 | 1.11 |
| Cpd A 100 mg/kg + Ara-C 5 mg/kg | 6.7 ± 0.9* | 68.4 | 1.06 |
| Cpd A 100 mg/kg + Ara-C 10 mg/kg | 8.2 ± 1.0 | 84.2 | 0.85 |
| Cpd A 100 mg/kg + Ara-C 50 mg/kg | 5.3 ± 0.5** | 53.8 | 1.46 |

Conclusion:

Combination of compound A and Ara-C achieved synergistic antitumor effect in s.c. MV-4-11 AML xenograft.

Example 62: Compound A Synergizes with Cytarabine (Ara-C) to Induce MV-4-11 Cell Apoptosis (2 Independent Expts)

Methods: Apoptosis detection assay
Results and Conclusion:

Combination treatments result higher proportion of Annexin V positive cells compared to single agents treatment.

Figure 82:
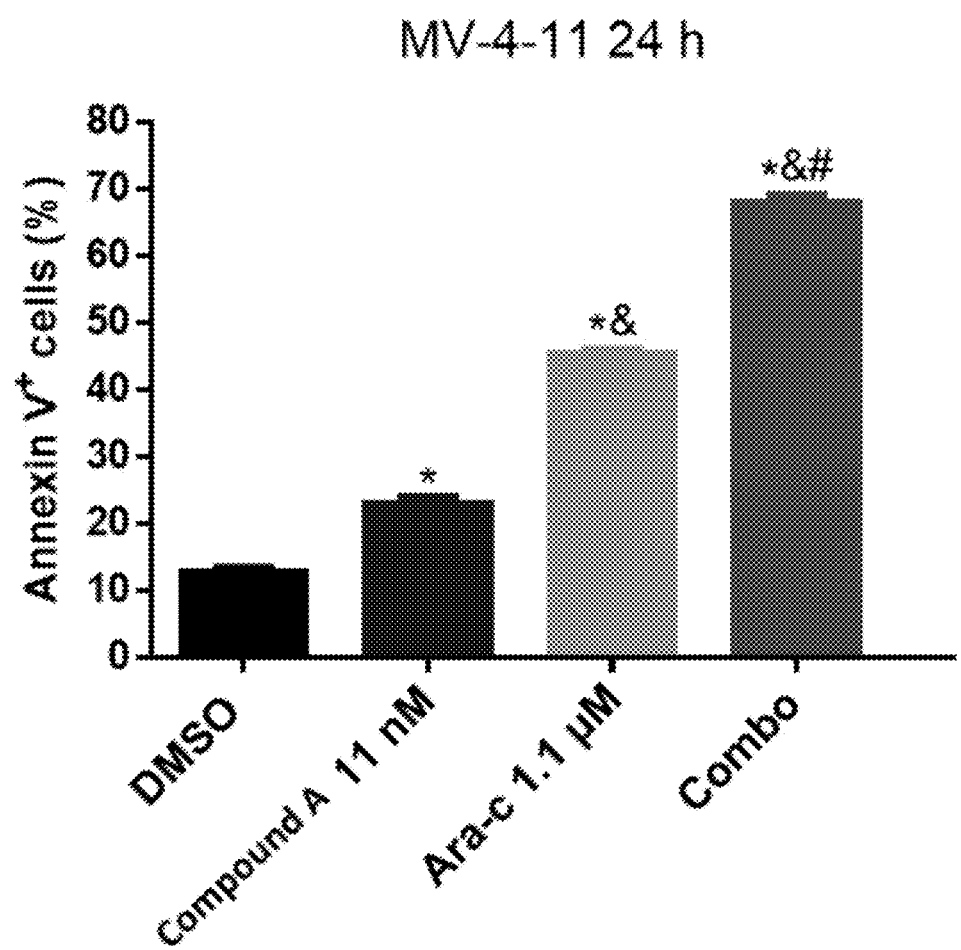
FIG. 82 depicts a graph which illustrates treatment of MV-4-11 xenografts with compound A and cytarabine, and effect on level of Annexin positive cells.

Compound A and cytarabine showed an enhanced induction of apoptosis after 24 h combination treatment in MV-4-11 cells. See FIG. 82.
cell source: cobioer;
Culture: IMDM medium+20% FBS+1% P/S.

Example 63: Compound A Synergizes with Cytarabine (Ara-C) to Induce OCI-AML3 Cell Apoptosis (2 Independent Exps)

Figure 83:
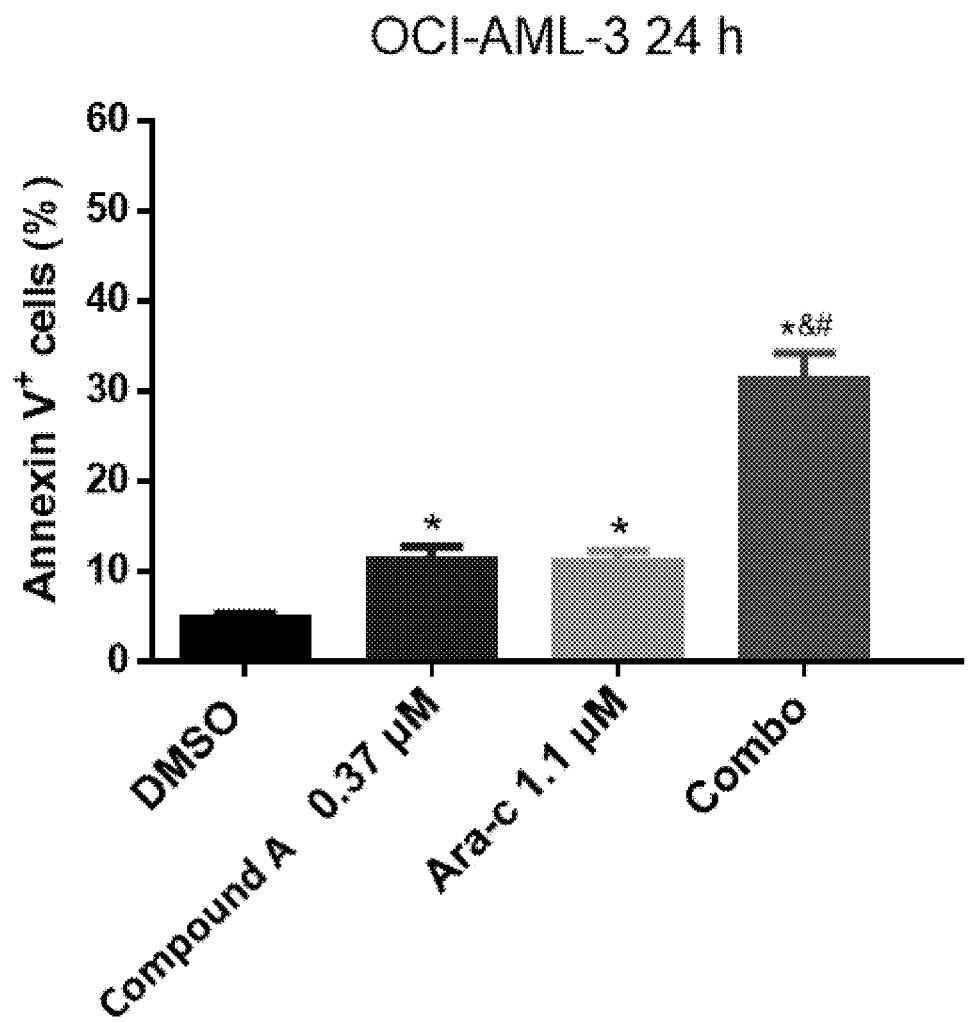
FIG. 83 depicts a graph which illustrates treatment of OCI-AML3 cells with compound A and cytarabine, and effect on level of Annexin positive cells.

Methods: Apoptosis detection assay
Results and Conclusion:

Combination treatments result higher proportion of Annexin V positive cells compared to single agents treatment. See FIG. 83.

Compound A and cytarabine showed an enhanced induction of apoptosis after 24 h combination treatment in OCI-AML3 cells.
cell source: cobioer;
Culture: RPMI 1640 medium 90%; fetal bovine serum, 10%; P/S 1%.

Example 64: Compound Synergizes with Azacitidine to Induce U937 Cell Apoptosis (Exp 1-24 h)

Figure 84:
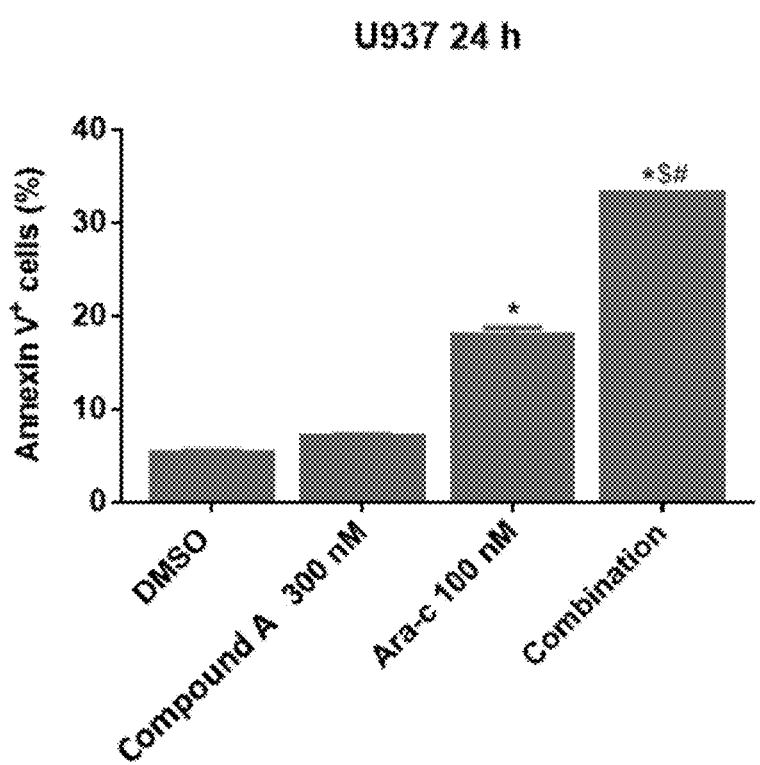
FIG. 84 depicts a graph which illustrates treatment of U937 cells with compound A and cytarabine, and effect on level of Annexin positive cells.

Methods: Apoptosis detection assay
Results and Conclusion:

Combination treatments result higher proportion of Annexin V positive cells compared to single agents treatment. See FIG. 84.

Compound A and Azacitidine showed an enhanced induction of apoptosis after 24 h combination treatment in U937 cells.

cell source: ATCC;
Culture: RPMI 1640 medium with 300 mg/L (2 mM) L-glutamine adjusted to contain 2.0 g/L sodium bicarbonate; fetal bovine serum, 10% (gibco); P/S 1%.

Example 65: Compound A Synergizes with Decitabine to Induce SKM-1 Cell Apoptosis (Exp 1-48 h)

Figure 85A:
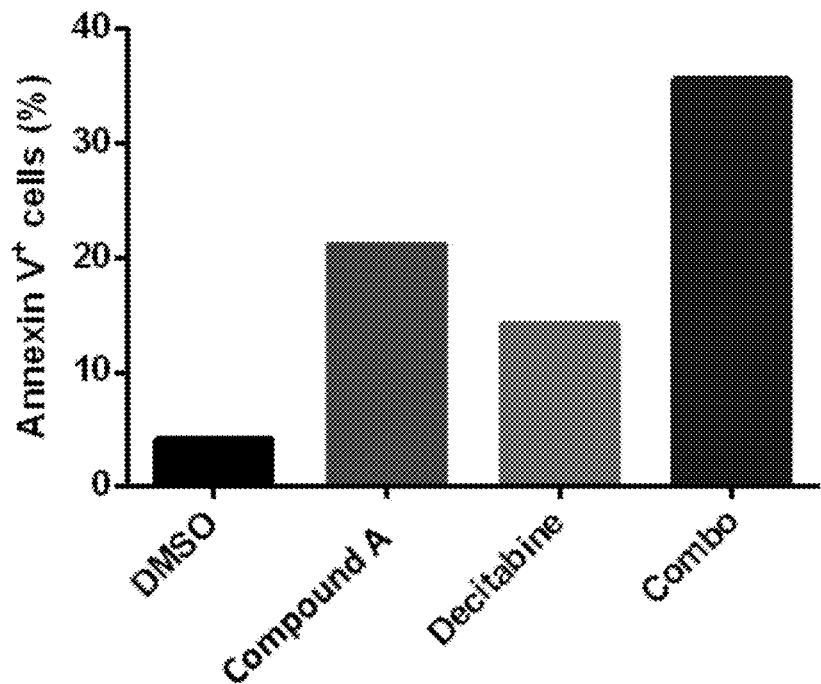
FIG. 85A depicts a graph which illustrates treatment of SKM-1 cells with compound A and decitabine, and effect on level of Annexin positive cells after 48 h.
Figure 85B:
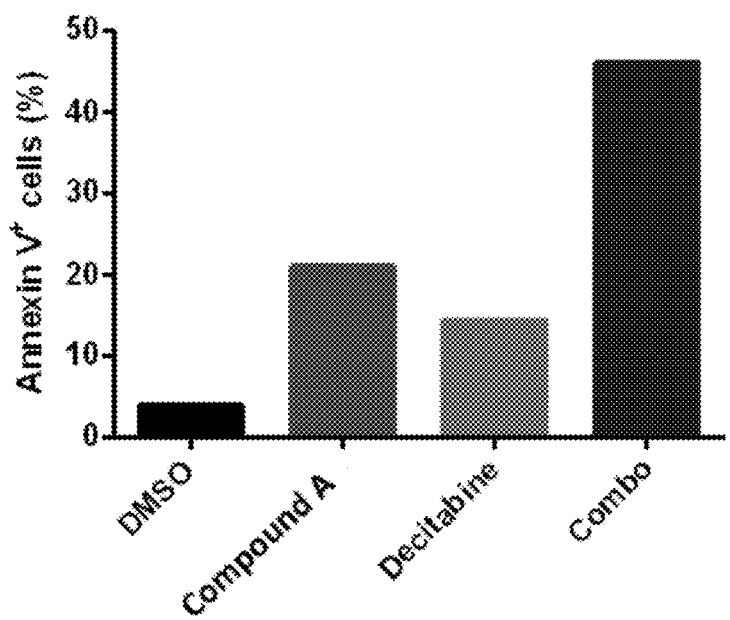
FIG. 85B depicts a graph which illustrates treatment of SKM-1 cells with compound A and decitabine, and effect on level of Annexin positive cells after 48 h.

Methods: Apoptosis detection assay
Results and Conclusion:
Combination treatments result higher proportion of Annexin V positive cells compared to single agents treatment. See FIGS. 85A and 85B.
Compound A (3 µM in FIG. 85A and FIG. 85B) and Decitabine (1 µM in FIG. 85A, 3 µM in FIG. 85B) showed an enhanced induction of apoptosis after 48 h combination treatment in SKM-1 cells.
cell source: JCBR;
Culture: RPMI1640+20% Gibco FBS+P/S 1%.

Example 66: Compound A Synergizes with Decitabine to Induce SKM-1 Cell Apoptosis (Exp 2-24 h)

Figure 86A:
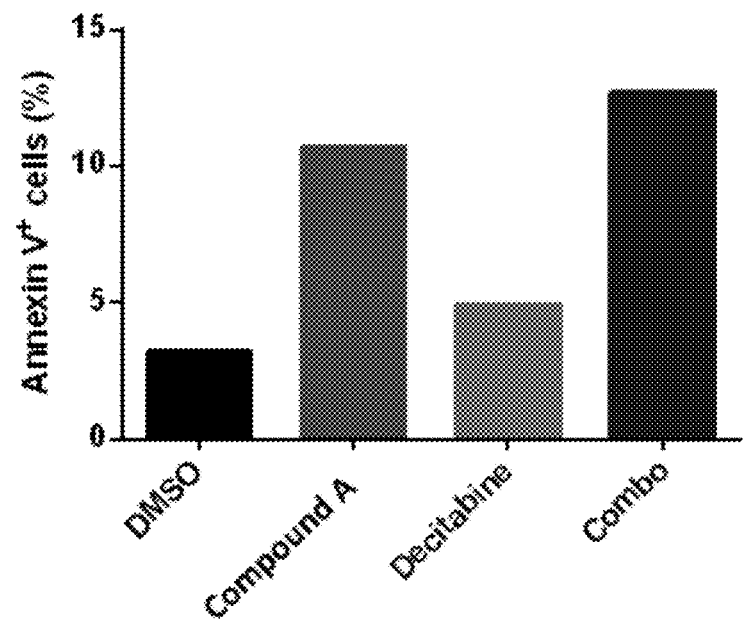
FIG. 86A depicts a graph which illustrates treatment of SKM-1 cells with compound A and decitabine, and effect on level of Annexin positive cells after 24 h.
Figure 86B:
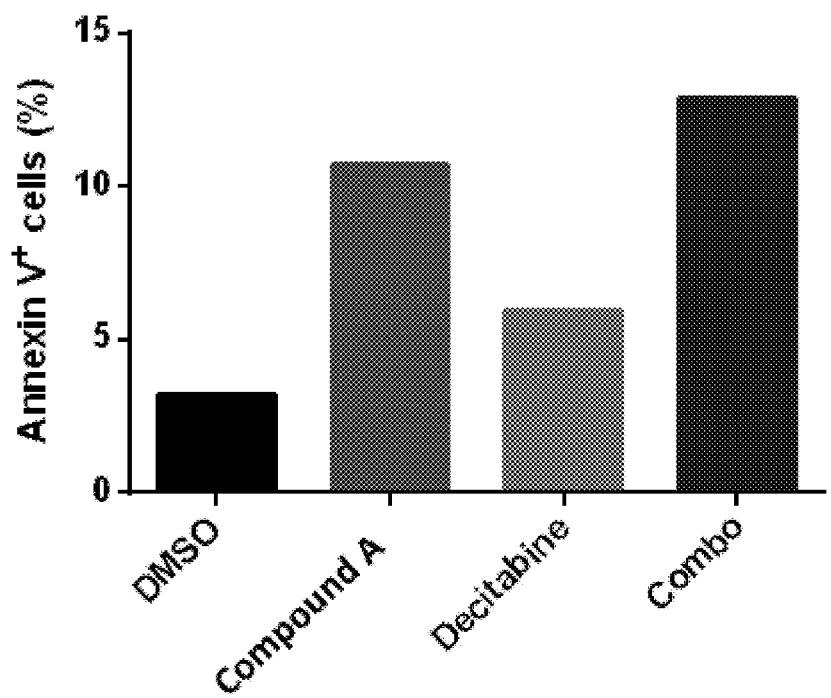
FIG. 86B depicts a graph which illustrates treatment of SKM-1 cells with compound A and decitabine, and effect on level of Annexin positive cells after 24 h.

Methods: Apoptosis detection assay
Results and Conclusion:
Combination treatments result higher proportion of Annexin V positive cells compared to single agents treatment. See FIGS. 86A and 86B.
Compound A (3 µM in FIG. 86A and FIG. 86B) and Decitabine (1 µM in FIG. 86A, 3 µM in FIG. 86B) showed an enhanced induction of apoptosis after 24 h combination treatment in SKM-1 cells.
cell source: JCBR;
Culture: RPMI1640+20% Gibco FBS+P/S 1%.

Example 67: Compound A Synergizes with Azacitidine to Induce SKM-1 Cell Apoptosis (Exp 1-48 h)

Figure 87A:
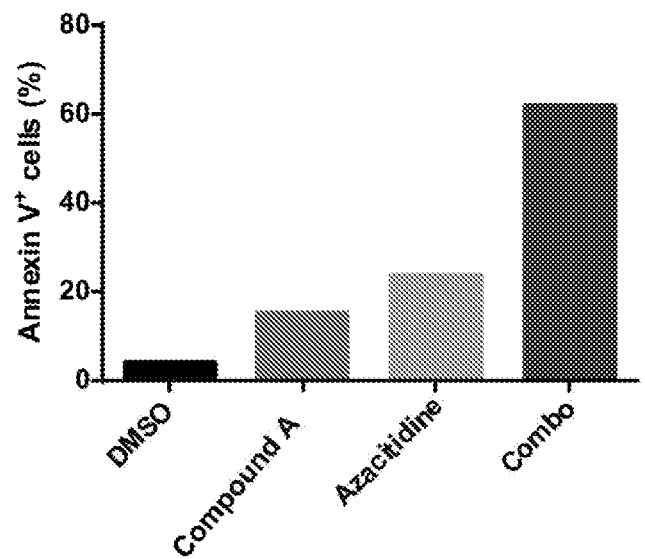
FIG. 87A depicts a graph which illustrates treatment of SKM-1 cells with compound A and azacitidine, and effect on level of Annexin positive cells after 48 h.
Figure 87B:
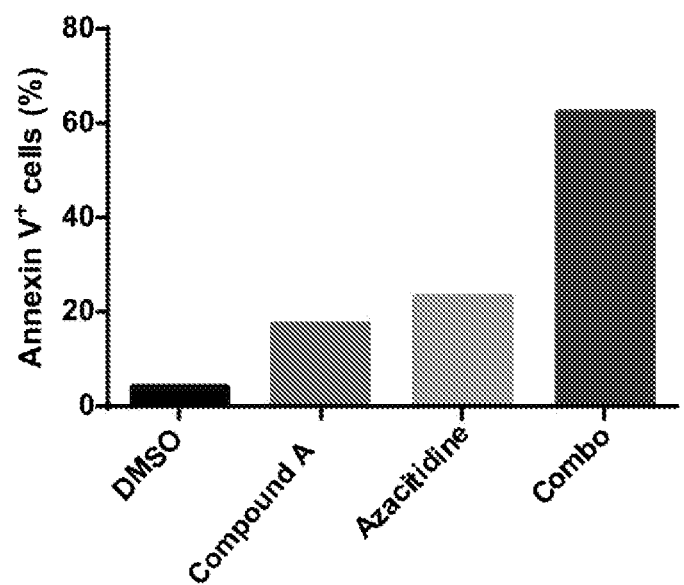
FIG. 87B depicts a graph which illustrates treatment of SKM-1 cells with compound A and azacitidine, and effect on level of Annexin positive cells after 48 h.

Methods: Apoptosis detection assay
Results and Conclusion:
Combination treatments result higher proportion of Annexin V positive cells compared to single agents treatment. See FIGS. 87A and 87B.
Compound A (1 µM in FIG. 87A, 3 µM in FIG. 87B) and Azacitidine (3 µM in FIG. 87A and FIG. 87B) showed an enhanced induction of apoptosis after 48 h combination treatment in SKM-1 cells.
cell source: JCBR;
Culture: RPMI1640+20% Gibco FBS+P/S 1%.

Example 68: Compound A Synergizes with Azacitidine to Induce SKM-1 Cell Apoptosis (Exp 2-24 h)

Figure 88A:
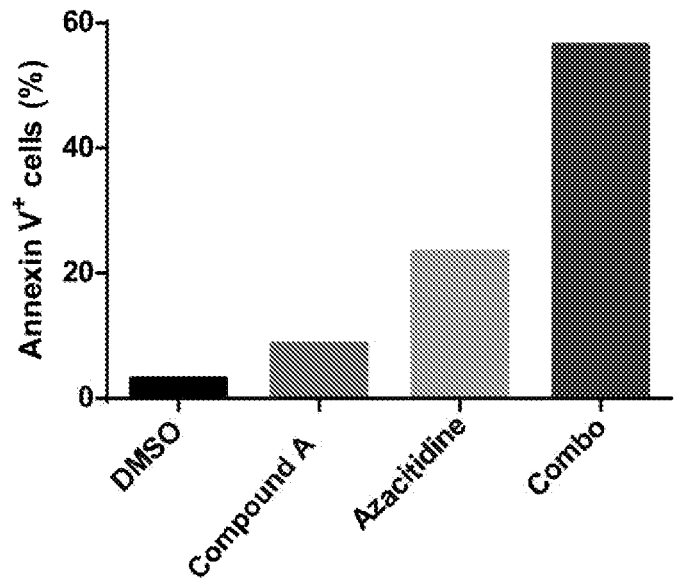
FIG. 88A depicts a graph which illustrates treatment of SKM-1 cells with compound A and azacitidine, and effect on level of Annexin positive cells after 24 h.
Figure 88B:
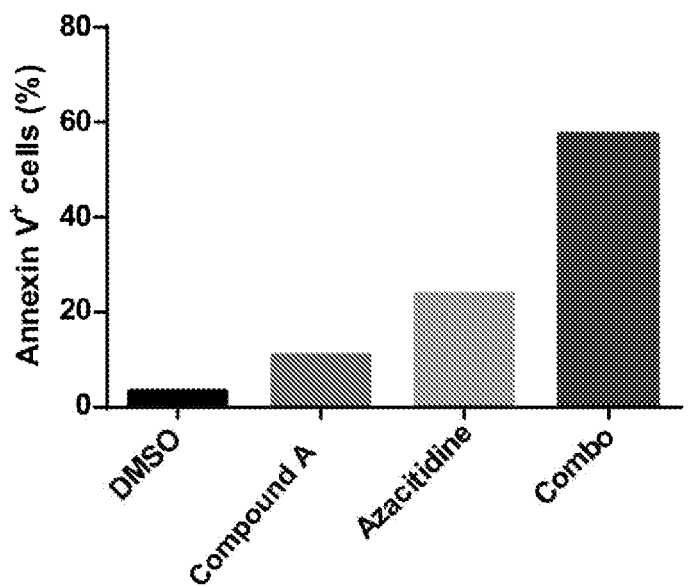

Methods: Apoptosis detection assay
Results and Conclusion:
Combination treatments result higher proportion of Annexin V positive cells compared to single agents treatment. See FIGS. 88A and 88B.
Compound A (1 µM in FIG. 88A, 3 µM in FIG. 88B) and Azacitidine (3 µM in FIG. 88A and FIG. 88B) showed an enhanced induction of apoptosis after 24 h combination treatment in SKM-1 cells.
cell source: JCBR;
Culture: RPMI1640+20% Gibco FBS+P/S 1%.

Figure 89A:
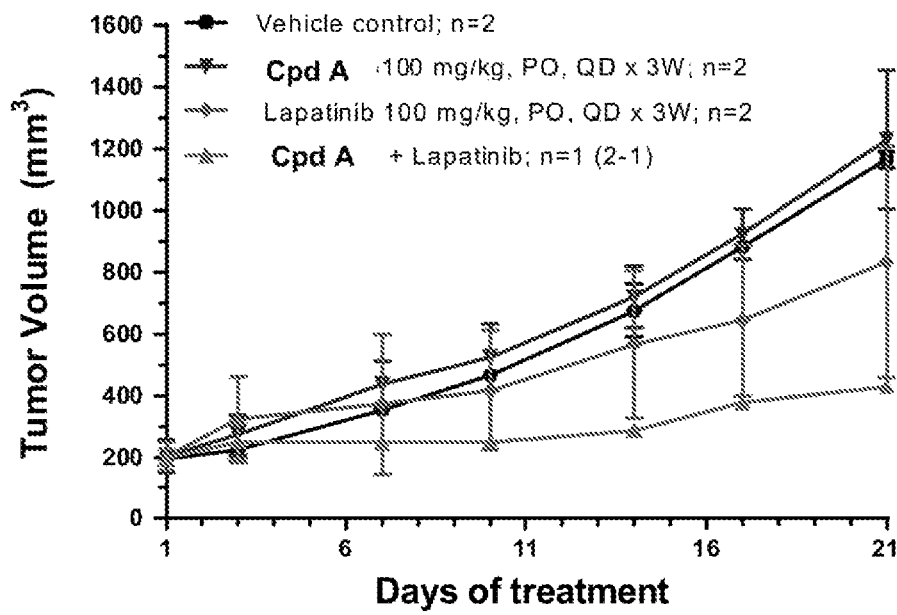
Figure 89B:
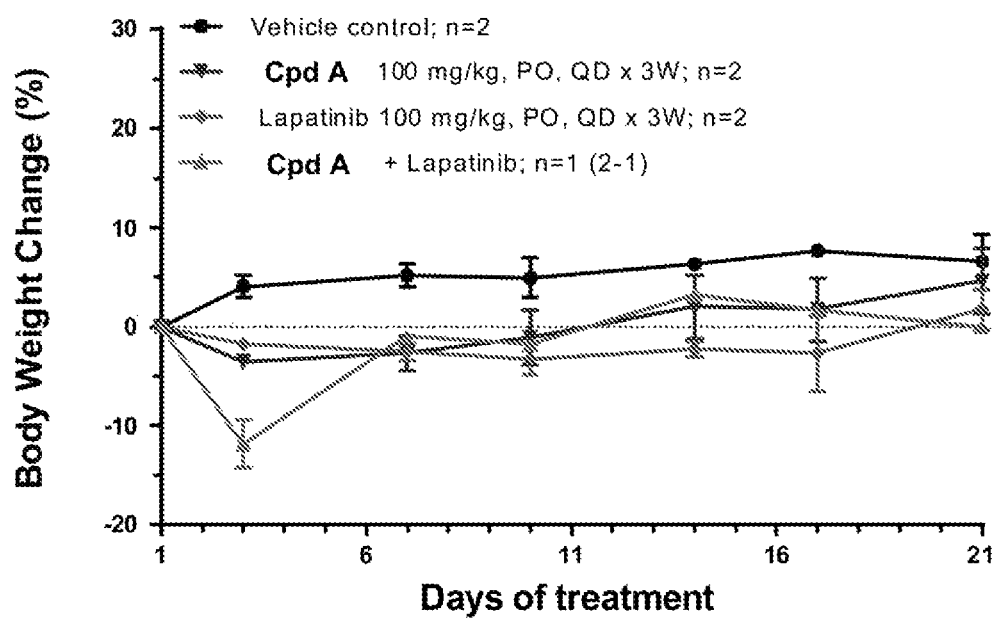

Example 69: Combination Treatment with Compound A and HER2M in Subcutaneous ST-02-0103 HER2+Gastric Cancer PDX Model Therefore, in this experiment, a subcutaneous ST-02-0103 HER2+Gastric cancer PDX model was established to evaluate the anti-tumor effect of compound A in combination with HER2 inhibitor Lapatinib (selleck) The dosing regimen was as follows:
Compound A: 100 mg/kg, PO, QD, for a total of 3 weeks,
Lapatinib: 100 mg/kg, PO, QD, for a total of 3 weeks,
The dosing regimen of each drug in the dosing regimen for the combination is the same as the dosing regimen for the single drug.
Results:
As shown in FIG. 89A, Lapatinib showed moderate antitumor activity. Combination treatment significantly enhance tumor repression.
As shown in FIG. 89B, combination group has a slight weight loss at first, but gradually recovered. The weight of other groups changed normally.
As shown in table 33, T/C (%) value of the combination group was 42.03 on Day 21. compared to 102.93 or 64.07 from single agents groups. The synergy ratio of combination group is 1.61.

TABLE 33

| Treatment | RTV @D 21 | T/C (%)@D 21 | Synergy ratio @ D 21 |
| --- | --- | --- | --- |
| Vehicle | 6.10 ± 0.15 | — | |
| Cpd A 100 mg/kg | 6.28 ± 0.58 | 102.93 | — |
| Lapatinib 100 mg/kg | 3.91 ± 1.00 | 64.07 | — |
| Cpd A + Lapatinib | 2.49 | 42.03 | 1.61 |

Synergy ratio > 1, synergistic; Synergy ratio = 1, additive; Synergy ratio < 1, antagonistic.

Conclusion:
Combination of compound A and Lapatinib achieved synergistic antitumor effect in s.c. ST-02-0103 HER2+Gastric cancer PDX xenograft.

Figure 90A:
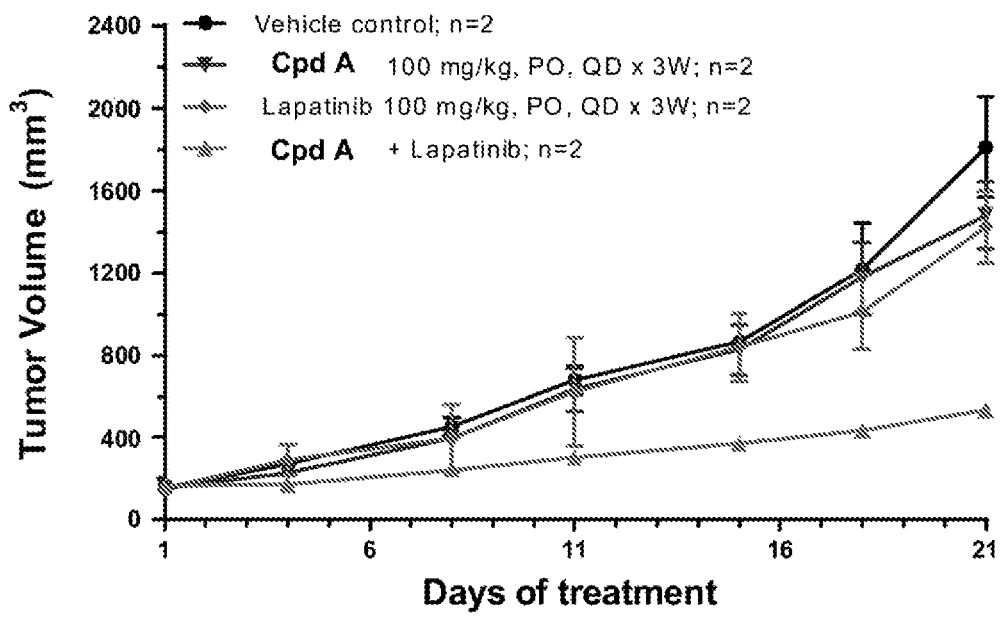
Figure 90B:
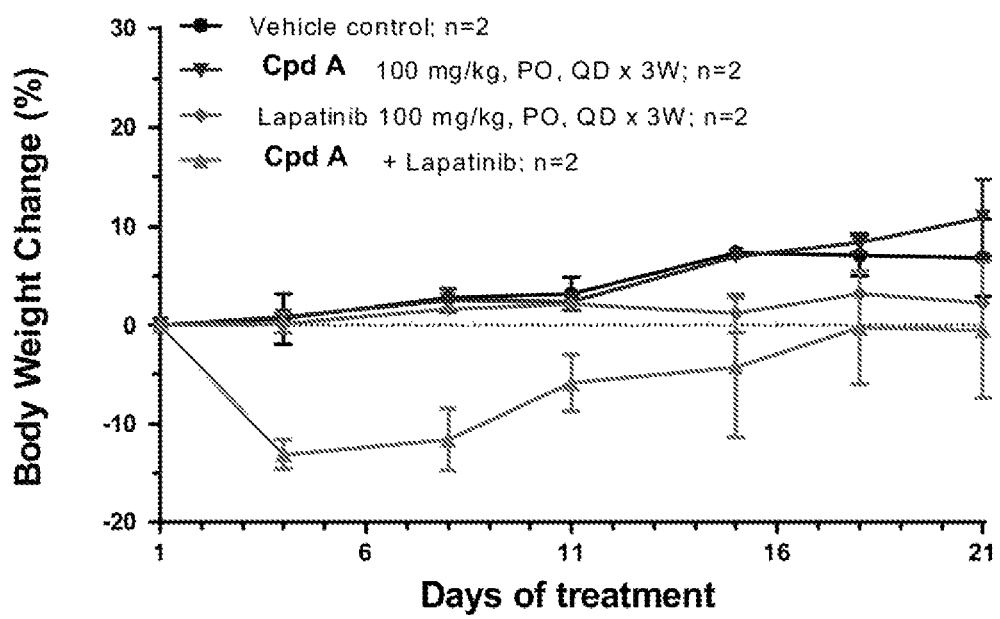

Example 70: Combination Treatment with Compound A and HER2i in Subcutaneous ST-02-0077 HER2+Gastric Cancer PDX Model Therefore, in this experiment, a subcutaneous ST-02-0077 HER2+Gastric cancer PDX model was established to evaluate the anti-tumor effect of compound A in combination with HER2 inhibitor Lapatinib (selleck) The dosing regimen was as follows:
Compound A: 100 mg/kg, PO, QD, for a total of 3 weeks,
Lapatinib: 100 mg/kg, PO, QD, for a total of 3 weeks,
The dosing regimen of each drug in the dosing regimen for the combination is the same as the dosing regimen for the single drug.
Results:
As shown in FIG. 90A, single agents showed no antitumor activity. Combination treatment significantly enhance tumor repression.
As shown in FIG. 90B, combination group has a slight weight loss at first, but gradually recovered. The weight of other groups changed normally.
As shown in table 34, T/C (%) value of the combination group was 28.42 on Day 21. compared to 83.48 or 80.03 from single agents groups. The synergy ratio of combination group is 2.35.

TABLE 34

| Treatment | RTV @D 21 | T/C (%)@D 21 | Synergy ratio @ D 21 |
|---|---|---|---|
| Vehicle | 11.61 ± 0.87 | — | — |
| Cpd A 100 mg/kg | 9.70 ± 0.21 | 83.48 | — |
| Lapatinib 100 mg/kg | 9.29 ± 0.53 | 80.03 | — |
| Cpd A + Lapatinib | 3.30 ± 0.17 | 28.42 | 2.35 |

Conclusion:

Combination of compound A and Lapatinib achieved synergistic antitumor effect in s.c. ST-02-0077 HER2+Gastric cancer PDX xenograft.

Example 71: Triple Combination of Compound A, Alpelisib and Fulvestrant in SC TP53$^{wt}$ PIK3CA$^{mut}$ (p. E545K) MCF-7 Breast Cancer Xenograft Model Therefore, in this experiment, a SC TP53$^{wt}$ PIK3CA$^{mut}$ (p. E545K) MCF-7 breast cancer xenograft model was established to evaluate the anti-tumor effect of compound A in combination with Alpelisib and Fulvestrant (selleck) The dosing regimen was as follows:
Compound A: 100 mg/kg
Alpelisib: 25 mg/kg,
Fulvestrant: 20 mg/kg.

Figure 91A:
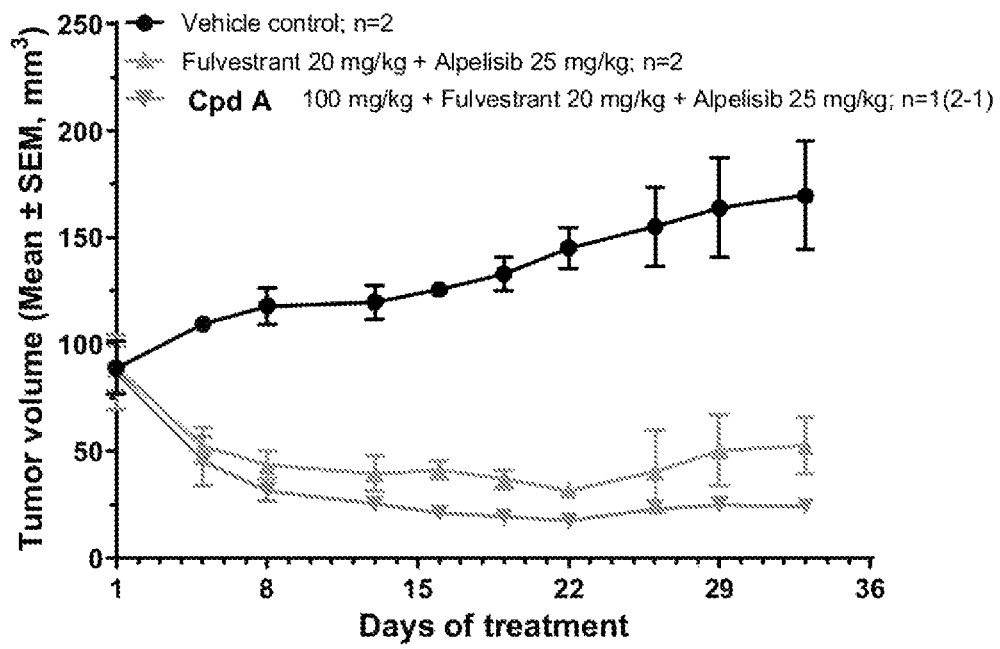

The dosing regimen of each drug in the dosing regimen for the combination is the same as the dosing regimen for the single drug.
Results:

As shown in FIG. 91A, doublet combination treatment with fulvestrant and Alpelisib showed moderate antitumor activity. Triple combination treatment with compound A plus fulvestrant and Alpelisib significantly enhance tumor repression.

Figure 91B:
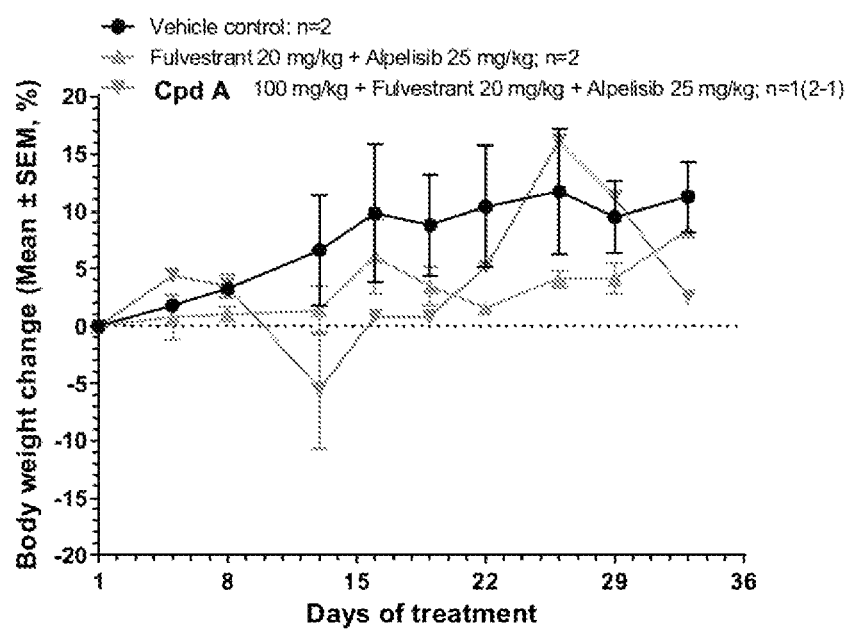

As shown in FIG. 91B, combination treatment achieved lowest tumor weight at the end of treatment.

As shown in table 35, Animals from triple combination group achieved 2/2 PR, ORR=100%
*P<0.05 vs. vehicle control group

TABLE 35

| Treatment | RTV @ D 33 | T/C (%) @ D 33 | mRECIST | Response @ D 33 | DCR (%) | ORR (%) |
|---|---|---|---|---|---|---|
| Vehicle | 1.98 ± 0.56 | — | 1/2 PD, 1/2 SD | 2/2 PD | 50 | 0 |
| Fulvestrant + Alpelisib | 0.62 ± 0.23 | 31.19 | 2/2 PR | 1/2 PR, 1/2 SD | 100 | 50 |
| Cpd A + Fulvestrant + Alpelisib | — | — | 2/2 PR | 2/2 PR | 100 | 100 |

DCR: Disease control rate, DCR is calculated with the proportion of animals demonstrating CR, PR, or SD based on mRECIST;
ORR: Overall response rate, ORR is calculated with the proportion of animals demonstrating CR or PR based on mRECIST.

Combination of compound A and fulvestrant and Alpelisib achieved synergistic antitumor effect in s.c. ER+ MCF-7 breast cancer xenograft, achieved ORR 100% compared to 50% in doublet combination treatment group of fulvestrant and alpelisib.

Figure 92A:
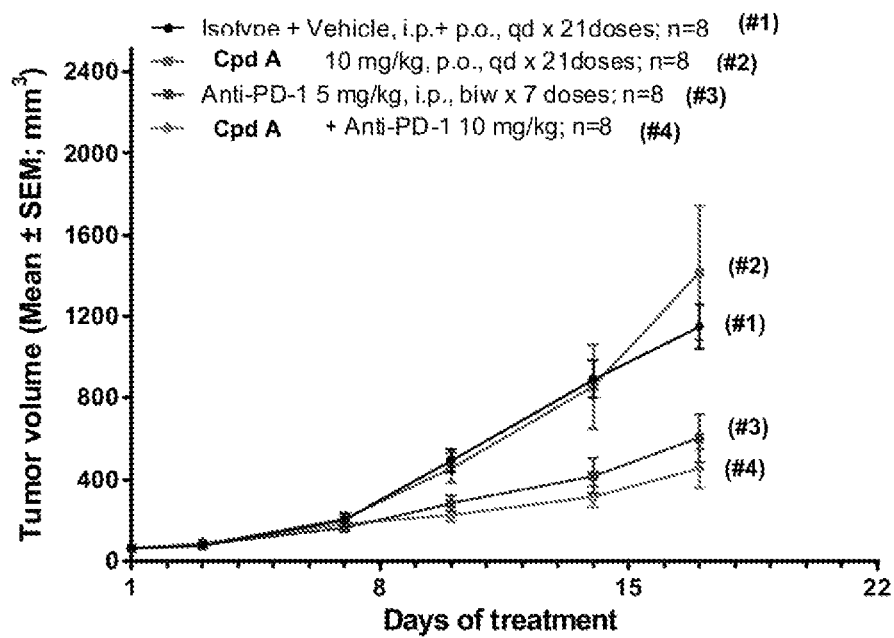

Example 72: Efficacy of Combination Therapy of Compound A and Anti-PD-1 Antibody in s.c. Syngeneic Colon MC38 Tumor Model Therefore, in this experiment, a s.c. syngeneic colon MC38 tumor model was established to evaluate the anti-tumor effect of compound A in combination with anti-PD-1 antibody (selleck) The dosing regimen was as follows:
Compound A: 100 mg/kg, PO, QD, for a total of 21 doses,
Anti-PD-1: 5 mg/kg, I.P., BIW, for a total of 7 doses, The dosing regimen of each drug in the dosing regimen for the combination is the same as the dosing regimen for the single drug.
Results:

As shown in FIG. 92A combination treatment with compound A and anti-PD-1 did not antagonize anti-PD-1 antibody response, and exerted enhanced tumor repression.

Figure 92B:
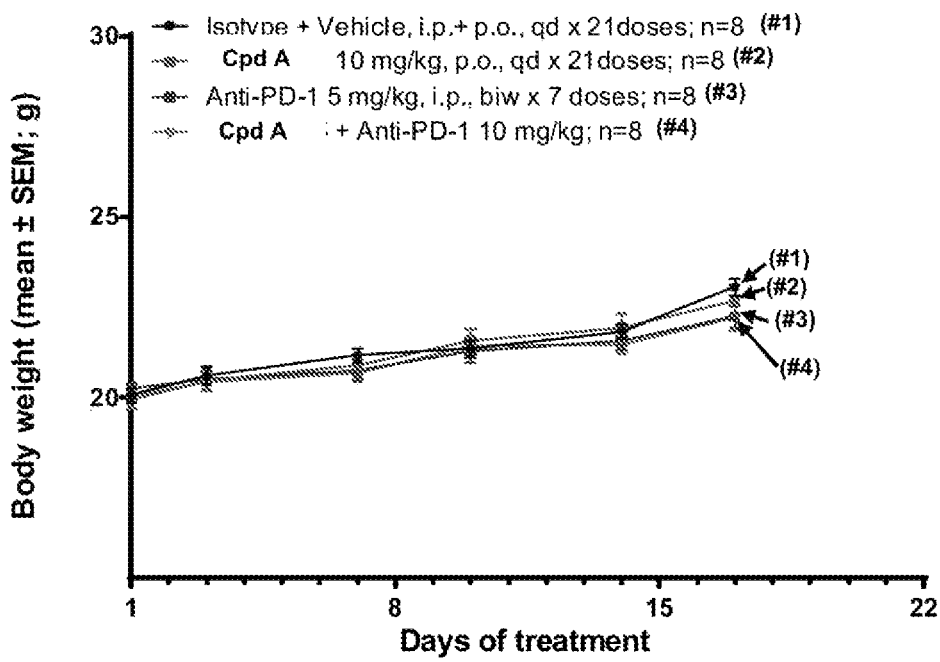

As shown in FIG. 92B, combination treatment did not lead to tumor weight loss during all treatments.

As shown in table 36, the synergy ratio of compound A and anti-PD-1 was 1.5, indicating synergistic antitumor effect between the two drugs.
*P<0.05, **P<0.01 vs. vehicle control group

TABLE 36

| Treatment | RTV@PG-D 17 | T/C(%)@PG-D 17 | Synergy @ PG-D 17 |
|---|---|---|---|
| Vehicles | 18.7 ± 1.8 | — | — |
| Cpd A, 10 mg/kg | 22.3 ± 4.6 # | 119 | — |
| Anti-PD-1, 5 mg/kg | 9.8 ± 1.9* | 52 | — |
| Anti-PD-1 + Cpd A, 10 mg/kg | 7.6 ± 1.6** | 41 | 1.5 |

*p < 0.05;
**p < 0.01 vs. vehicle control group;
: p < 0.05;
: p < 0.01, COMPOUND A group vs. Anti-PD-1 + COMPOUND A group;
Ratio > 1, Synergistic;
Ratio = 1, Additive;
Ratio < 1, Antagonistic Conclusion:

Combination of compound A and anti-PD-1 did not antagonize anti-PD-1 antibody response, and even achieved synergistic antitumor effect in MC38 syngeneic colon cancer model. Compound A dose not impair responses to anti-PD-1 in vivo, and therefore can be considered for use in combination with immunotherapy targets.

Figure 93A:
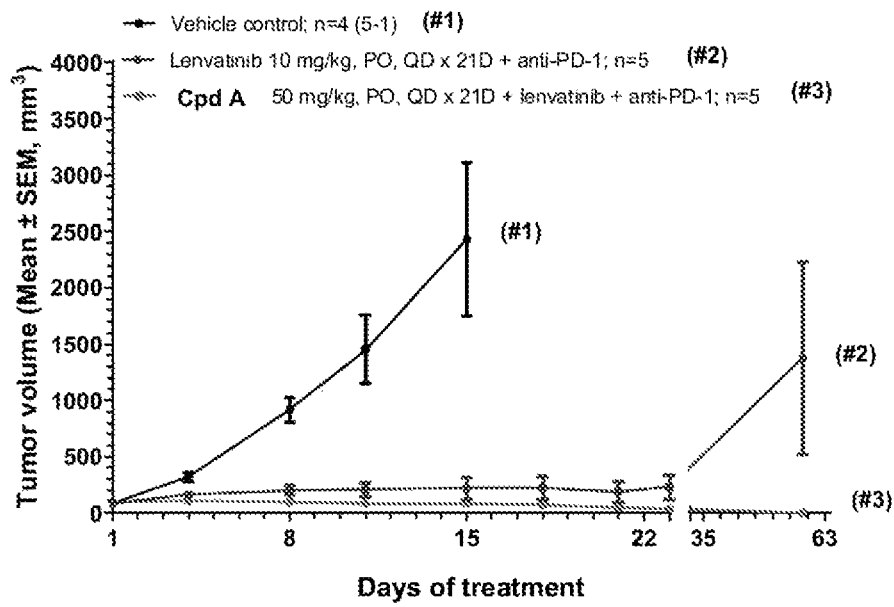

Example 73: Triple Combination of Compound A, Anti-PD-1 and Lenvatinib in Subcutaneous MH-22A Syngeneic Liver Cancer Model Therefore, in this experiment, a subcutaneous MH-22A syngeneic liver cancer model was established to evaluate the anti-tumor effect of compound A in combination with anti-PD-1 antibody and lenvatinib (selleck) The dosing regimen was as follows:
Compound A: 50 mg/kg, PO, QD, for a total of 21 days,
Lenvatinib: 10 mg/kg, PO, QD, for a total of 21 days,
Anti-PD-1: 5 mg/kg, I.P., BIW, for a total of 7 days, The dosing regimen of each drug in the dosing regimen for the combination is the same as the dosing regimen for the single drug.
Results:

As shown in FIG. 93A, triple combination treatment with compound A, anti-PD-1 and lenvatinib exerted enhanced tumor repression, compared to double combination treatment with lenvatinib and anti-PD-1.

Figure 93B:
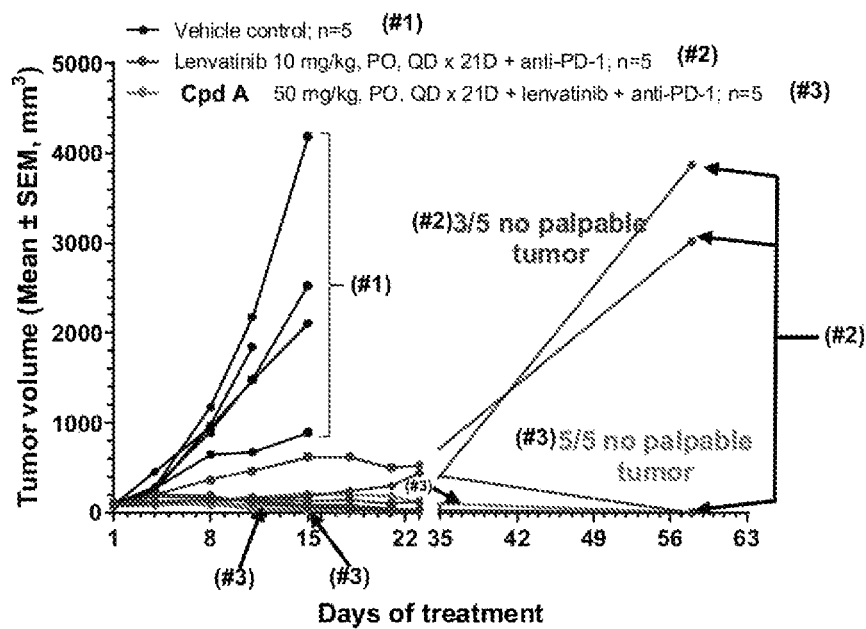

As shown in FIG. 93B and table 37, there were 5/5 mice with no palpable tumors in the triple combination treatment group, compared to 3/5 mice with no palpable tumors in the double combination treatment group.

Figure 93C:
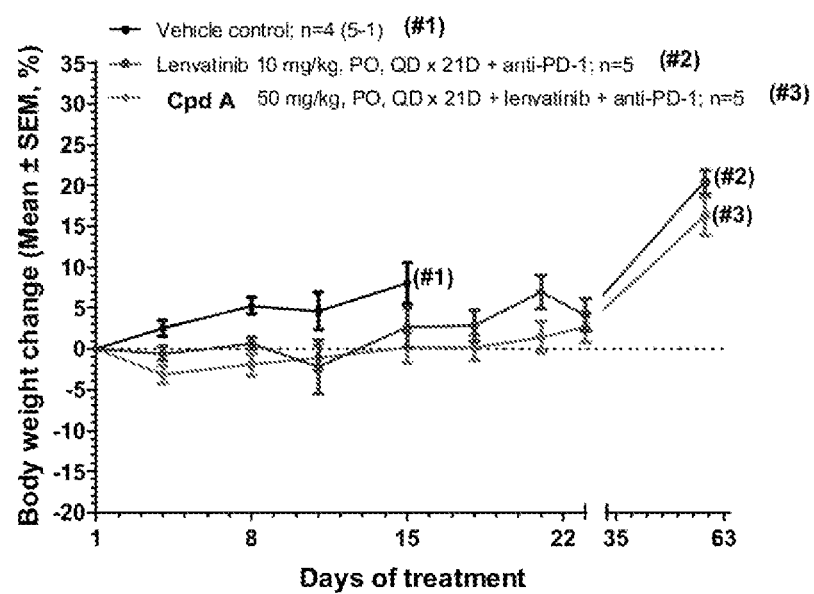

As shown in FIG. 93C, combination treatment did not lead to tumor weight loss during all treatments.

TABLE 37

| Treatment | RTV @ D 23 | RTV @ D 58 | Best Response | Comment |
|---|---|---|---|---|
| Vehicles | — | — | 5/5 PD | — |
| Lenvatinib + anti-PD-1 | 2.60 ± 1.20 | 17.29 ± 10.87 | 2/5 SD, 3/5 PD | 3/5 no palpable tumors, 2/5 >2000 mm$^3$ |
| Cpd A + lenvatinib + anti-PD-1 | 0.50 ± 0.25 | 0.00 ± 0.00 | 2/5 CR, 1/5 PR, 1/5 SD, 1/5 PD | 5/5 no palpable tumors |

Conclusion:
Combination of compound A, anti-PD-1 and lenvatinib achieved enhanced antitumor effect in MH-22A syngeneic liver cancer model.

Example 74: Compound A+Lenvatinib: Synergy in Subcutaneous MH-22A Syngeneic Liver Cancer Model Therefore, in this experiment, a subcutaneous MH-22A syngeneic liver cancer model was established to evaluate the anti-tumor effect of compound A in combination with lenvatinib (selleck) The dosing regimen was as follows:
Compound A: 50 mg/kg, PO, QD, for a total of 21 days,
Lenvatinib: 10 mg/kg, PO, QD, for a total of 21 days,
The dosing regimen of each drug in the dosing regimen for the combination is the same as the dosing regimen for the single drug.
Results:
As shown in FIG. 94A, combination treatment with compound A and lenvatinib exerted enhanced tumor repression, compared to either single agent treatments.
As shown in the individual tumor growth curves FIGS. 94B-94E, combination treatment significantly delayed tumor growth.
As shown in table 38, TIC (%) value of the combination group was 12.07 on Day 15. compared to 103.74 or 39.29 from single agents groups. The synergy ratio was 3.38.

TABLE 38

| Treatment | RTV @ D 15 | T/C (%) @ D 15 | Synergy ratio @ D 15 | mRECIST |
|---|---|---|---|---|
| Vehicles | 32.93 ± 6.82 | — | — | 9/9 PD |
| Cpd A | 34.16 ± 6.22 | 103.74 | — | 9/9 PD |
| Lenvatinib | 12.94 ± 2.02 | 39.29 | — | 10/10 PD |
| Cpd A + Lenvatinib | 3.97 ± 0.71*† | 12.07 | 3.38 | 9/9 PD |

*p < 0.05, vs. vehicle control;
†p < 0.05, vs. COMPOUND A group;
Synergy: Ratio > 1, synergistic; Ratio = 1, additive; Ratio < 1, antagonistic.

Conclusion:
Combination of compound A and lenvatinib achieved enhanced antitumor effect in MH-22A syngeneic liver cancer model.

Example 75: Compound+Anti-PD-1+Lenvatinib: Synergy in Subcutaneous MH-22A Syngeneic Liver Cancer Model Therefore, in this experiment, a subcutaneous MH-22A syngeneic liver cancer model was established to evaluate the anti-tumor effect of compound A in combination with anti-PD-1 antibody and lenvatinib (selleck) The dosing regimen was as follows:

Compound A: 50 mg/kg, PO, QD, for a total of 21 days,
Lenvatinib: 10 mg/kg, PO, QD, for a total of 21 days,
Anti-PD-1: 5 mg/kg, I.P., BIW, for a total of 21 days,
The dosing regimen of each drug in the dosing regimen for the combination is the same as the dosing regimen for the single drug.
Results:
Double combination treatment with compound A and lenvatinib, lenvatinib and anti-PD-1, as well as triple combination treatment with compound A, anti-PD-1 and lenvatinib exerted enhanced tumor repression, compared to either single agent treatments.
As shown in the individual tumor growth curves FIGS. 95A-95D, and table 39, combination treatment with lenvatinib and anti-PD-1 achieved DCR of 78% and ORR of 56%. Triple combination treatment with compound A, lenvatinib and anti-PD-1 achieved DCR of 90% and ORR of 80%.

TABLE 39

| Treatment | mRECIST | Response @ D 76 | DCR (%) | ORR (%) |
|---|---|---|---|---|
| Anti-PD-1 | 2/10 CR, 1/10 PR, 1/10 SD, 6/10 PD | 2/10 CR, 1/10 PR, 1/10 SD, 6/10 PD | 40 | 30 |
| Cpd A + anti-PD-1 | 1/10 SD, 9/10 PD | 1/10 SD, 9/10 PD | 10 | 0 |
| Lenvatinib + anti-PD-1 | 5/9 CR, 2/9 SD, 2/9 PD | 5/9 CR, 2/9 SD, 2/9 PD | 78 | 56 |
| Cpd A + lenvatinib + anti-PD-1 | 7/10 CR, , 1/10 PR, 2/10 PD | 7/10 CR, , 1/10 PR, 2/10 PD | 90 | 80 |

DCR: CR, PR, or SD based on mRECIST;
ORR: CR or PR based on mRECIST.

Conclusion:
Combination of compound A, anti-PD-1 and lenvatinib achieved enhanced antitumor effect in MH-22A syngeneic liver cancer model.

Example 76: Compound A+Anti-PD-1+Lenvatinib: TIL Analysis in MH-22A Syngeneic Tumors The dosing regimen was as follows:
Compound A: 50 mg/kg, PO, QD, for a total of 5 days,
Lenvatinib: 10 mg/kg, PO, QD, for a total of 5 days,
Anti-PD-1: 5 mg/kg, I.P., BIW, for a total of 5 days,
The dosing regimen of each drug in the dosing regimen for the combination is the same as the dosing regimen for the single drug.

Results:

As shown in FIG. 96, double combination treatment with compound A and lenvatinib, as well as triple combination treatment with compound A, anti-PD-1 and lenvatinib exerted enhanced tumor repression, compared to either single agent treatments.

As shown in table 40, combination treatment with lenvatinib and anti-PD-1 achieved TIC values of 35.09 on Day 5 with synergy ratio of 1.61. Triple combination treatment with compound A, lenvatinib and anti-PD-1 achieved T/C value of 38.53% on day 5 and synergy ration of 1.41.

TABLE 40

| Treatment | RTV @ D 5 | T/C (%) @ D 5 | Synergy ratio @ D 5 |
|---|---|---|---|
| Vehicles | 4.90 ± 0.20 | — | — |
| Cpd A | 4.24 ± 0.44 | 86.62 | — |
| Anti-PD-1 | 4.01 ± 0.50 | 81.83 | — |
| Lenvatinib | 3.19 ± 0.18*** | 65.07 | — |
| Cpd A + PD-1 | 3.88 ± 0.53 | 79.20 | 0.9 |
| Lenvatinib + PD-1 | 3.08 ± 0.86 | 62.85 | 0.85 |
| Cpd A + Lenvatinib | 1.72 ± 0.20***††§§ | 35.09 | 1.61 |
| Cpd A + Lenvatinib + Anti-PD-1 | 1.89 ± 0.16***†††‡∥ | 38.53 | 1.41 |

Conclusion:

Combination of compound A plus lenvatinib, and compound A, anti-PD-1 and lenvatinib achieved enhanced antitumor effect in MH-22A syngeneic liver cancer model.

Example 77: Compound A+Anti-PD-1+Lenvatinib TIL Analysis in MH-22A: Total T Cells Tumor infiltrated lymphocytes analysis for the triple combination of compound A, anti-PD-1 and lenvatinib in subcutaneous MH-22A syngeneic liver cancer model.

Methods: tumors collected from Study no. SZ-TIL-01-2020 were dissociated into single cells. Tumor infiltrated lymphocytes were detected by staining cells with specific markers and analyzed by flow cytometry.

Results:

As shown in FIG. 97, double combination treatment with compound A and lenvatinib, as well as triple combination treatment with compound A, anti-PD-1 and lenvatinib significantly increased tumor infiltrated T cells.

Conclusion:

Combination of compound A plus lenvatinib, and compound A, anti-PD-1 and lenvatinib significantly increased tumor infiltrated T cells in MH-22A syngeneic liver cancer model, indicating theses combos could improve antitumor microenvironment.

Example 78: Compound A+Anti-PD-1+Lenvatinib TIL Analysis in MH-22A: CD8+T, CD4+T, and Treg Cells Tumor infiltrated lymphocytes analysis for the triple combination of compound A, anti-PD-1 and lenvatinib in subcutaneous MH-22A syngeneic liver cancer model Methods: tumors collected from Study no. SZ-TIL-01-2020 were dissociated into single cells. Tumor infiltrated lymphocytes were detected by staining cells with specific markers and analyzed by flow cytometry.

Results:

As shown in FIGS. 98A, 98B, and 98C, there were no significant changes in proportions of tumor infiltrated CD4+ T cell, CD8+ T cells, and Treg cells in all treatment groups. However, double combination treatment with compound A and lenvatinib, as well as triple combination treatment with compound A, anti-PD-1 and lenvatinib decreased tumor infiltrated Treg cells, compared to other treatment groups.

Conclusion:

Combination of compound A plus lenvatinib, and compound A, anti-PD-1 and lenvatinib significantly decreased tumor infiltrated Treg cells in MH-22A syngeneic liver cancer model, indicating theses combos could improve antitumor microenvironment.

Example 79: Compound A+Anti-PD-1+Lenvatinib TIL Analysis in MH-22A: NK and B Cells Methods: tumors collected from Study no. SZ-TIL-01-2020 were dissociated into single cells. Tumor infiltrated lymphocytes were detected by staining cells with specific markers and analyzed by flow cytometry.

Results:

As shown in FIGS. 99A and 99B, double combination treatment with compound A and lenvatinib significantly increased tumor infiltrated NK cells. No significant changes in proportions of tumor infiltrated B cells in all treatment groups.

Conclusion:

Combination of compound A plus lenvatinib significantly increased tumor infiltrated NK cells in MH-22A syngeneic liver cancer model, indicating theses combos could improve antitumor microenvironment.

Example 80: Compound A+Anti-PD-1+Lenvatinib TIL Analysis in MH-22A: M1 & M2 Macrophages Example: Tumor infiltrated lymphocytes analysis for the triple combination of compound A, anti-PD-1 and lenvatinib in subcutaneous MH-22A syngeneic liver cancer model Methods: tumors collected from Study no. SZ-TIL-01-2020 were dissociated into single cells. Tumor infiltrated lymphocytes were detected by staining cells with specific markers and analyzed by flow cytometry.

Results:

As shown in FIGS. 100A and 100B, no significant changes in proportions of tumor infiltrated M1 macrophages in all treatment groups. Double combination treatment with compound A and lenvatinib, as well as triple combination treatment with compound A, anti-PD-1 and lenvatinib significantly decreased tumor infiltrated M2 macrophages.

Conclusion:

Combination of compound A plus lenvatinib, and compound A, anti-PD-1 and lenvatinib significantly decreased tumor infiltrated M2 macrophages in MH-22A syngeneic liver cancer model, indicating theses combos could improve antitumor microenvironment.

Example 81: Compound A+Anti-PD-1+Lenvatinib TIL Analysis in MH-22A: PD-L1+ Tumor Cells Example: Tumor infiltrated lymphocytes analysis for the triple combination of compound A, anti-PD-1 and lenvatinib in subcutaneous MH-22A syngeneic liver cancer model Methods: tumors collected from Study no. SZ-TIL-01-2020 were dissociated into single cells. Tumor infiltrated lymphocytes were detected by staining cells with specific markers and analyzed by flow cytometry.

Results:

As shown in FIG. 101, Double combination treatment with compound A and lenvatinib, as well as triple combination treatment with compound A, anti-PD-1 and lenvatinib significantly decreased PD-L1+ tumor cells.

Conclusion:

Combination of compound A plus lenvatinib, and compound A, anti-PD-1 and lenvatinib significantly decreased PD-L1+ tumor cells in MH-22A syngeneic liver cancer model, indicating theses combos could improve antitumor microenvironment.

Example 82: Compound A+Anti-PD-(L)1+Lenvatinib: Synergy in Subcutaneous MC38 Syngeneic Colon Cancer Model-Final Therefore, in this experiment, a subcutaneous MC38 syngeneic colon cancer model was established to evaluate the anti-tumor effect of compound A in combination with anti-PD-1 antibody and lenvatinib The dosing regimen was as follows:

Compound A: 50 mg/kg, PO, QD, for a total of 21 days,

Lenvatinib: 10 mg/kg, PO, QD, for a total of 21 days,

Anti-PD-1: 5 mg/kg, I.P., BIW, for a total of 21 days,

The dosing regimen of each drug in the dosing regimen for the combination is the same as the dosing regimen for the single drug.

Results:

As shown in 102A, 102B, and 102C, double combination treatment with compound A and lenvatinib, as well as triple combination treatment with compound A, anti-PD-1 and lenvatinib and compound A, anti-PD-L1 and lenvatinib exerted enhanced tumor repression, compared to either single agent and double combination treatments.

As shown in table 41, triple combination treatment with compound A, lenvatinib and anti-PD-1 achieved T/C value of 8.04 on D22, compared to T/C value of 13.76% for the double combination treatment with lenvatinib and anti-PD-1. The synergy ratio was 1.50.

Triple combination treatment with compound A, lenvatinib and anti-PD-L1 achieved TIC value of 6.31 on D22, compared to TIC value of 2.83% for the double combination treatment with lenvatinib and anti-PD-L1. The synergy ratio was 1.79.

TABLE 41

| Treatment | RTV @ D 22 | T/C (%) @ D 22 | Synergy ratio @ D 22 | mRECIST |
|---|---|---|---|---|
| Vehicle control | 37.76 ± 3.51 | — | — | 10/10 PD |
| Cpd A | 33.18 ± 5.18 | 87.89 | — | 10/10 PD |
| anti-PD-1 | 16.13 ± 3.09** | 42.72 | — | 10/10 PD |
| anti-PD-L1 | 17.01 ± 5.18 | 45.05 | — | 10/10 PD |
| Lenvatinib | 9.29 ± 1.60*** | 24.59 | — | 10/10 PD |
| Cpd A + lenvatinib | 4.99 ± 0.72***‡ | 13.22 | 1.63 | 10/10 PD |
| Cpd A + anti-PD-1 | 16.87 ± 3.05* | 44.67 | 0.84 | 9/9 PD |
| Cpd A + anti-PD-L1 | 19.61 ± 3.48 | 51.93 | 0.76 | 10/10 PD |
| Lenvatinib + anti-PD-1 | 5.19 ± 0.66*** | 13.76 | 0.76 | 1/10 SD, 9/10 PD |
| Lenvatinib + anti-PD-L1 | 4.84 ± 0.95*** | 12.83 | 0.86 | 10/10 PD |
| Cpd A + lenvatinib + anti-PD-1 | 3.04 ± 0.65***‡‡@ | 8.04 | 1.50 | 2/10 SD, 8/10 PD |
| Cpd A + lenvatinib + anti-PD-L1 | 2.38 ± 0.80***†‡‡ | 6.31 | 1.79 | 3/10 SD, 7/10 PD |

*p < 0.05,
**p < 0.01,
***p < 0.001, vs. vehicle control group;
†p < 0.05,
††p < 0.01,
†††p < 0.001 vs. COMPOUND A group;
‡p < 0.05 vs. Anti-PD-L1 group;
§p < 0.05 vs. Lenvatinib group;
|p < 0.05 vs. COMPOUND A + anti-PD-L1 group;
¶p < 0.05,
¶¶p < 0.01 vs. COMPOUND A + Lenvatinib group;
Synergy: Ratio > 1, synergistic; Ratio = 1, additive; Ratio < 1, antagonistic.

Conclusion:

Combination of compound A, anti-PD-1/L1 and lenvatinib achieved enhanced antitumor effect in MC38 syngeneic colon cancer model.

Example 83: Compound E Plus Compound A Coordinately Induce Apoptosis in Neuroblastoma IMR-32 and SH-SY5Y Cells Method used was Flow cytometry, staining with Annexin V/PI. Compound E plus compound A enhanced apoptosis induction in IMR-32 and SH-SY5Y cells after 72 hours combination treatment Combination treatments of compound E+compound A results in more apoptotic cells in IMR-32 cells. Similar combination effect was also observed when compound E combined with compound A in SH-SY5Y cells. See FIGS. 103A and 103B.

Conclusion:

Compound E plus compound A enhanced apoptosis induction in IMR-32 and SH-SY5Y cells after 72 hours combination treatment.

Example 84: Compound E Plus Compound A Coordinately Induce Caspase-Glo 3/7 Upregulation in Neuroblastoma IMR-32 and SH-SY5Y Cells Method used was Caspase 3n detection, assessed by the Caspase-Glo® 3n Assay kit (Promega, cat #G8092). Compound E plus compound A enhanced apoptotic marker caspase 3/7 induction in IMR-32 and SH-SY5Y cells after 24 hours combination treatment. See FIGS. 104A and 104B.

Conclusion:

Compound E plus compound A enhanced apoptosis marker caspase 3/7 induction in IMR-32 and SH-SY5Y cells after 24 hours combination treatment.

Example 85: Synergy of Compound E Plus Compound A in TP53 wt, ALKmut, MYCNamp PDX Neuroblastoma Model LD1-0030-361609

Therefore, in this experiment, a TP53 wt, ALKmut, MYCNamp PDX neuroblastoma model LD1-0030-361609 was established to evaluate the anti-tumor effect of compound A in combination with compound E. The dosing regimen was as follows:

Compound E: 100 mg/kg, PO, QD, D1-D7, D22-D28,
Compound A: 100 mg/kg, PO, QD, for a total of 528 days
Anti-PD-1: 5 mg/kg, I.P., BIW, for a total of 21 days, The dosing regimen of each drug in the dosing regimen for the combination is the same as the dosing regimen for the single drug.

As shown in FIGS. 105A and 105B, single agents showed weak antitumor activity. Combination treatment significantly enhanced tumor repression.

As shown in table 42, TIC (%) value of the combination group was 15.7 on Day 29, compared to 98.42 or 109.00 from single agent groups. Animals from the combination group achieved 2/5 CR, 1/5 PR, ORR=60%.

TABLE 42

| Treatment | RTV @ D 29 | T/C(%) @ D 29 | Synergy ratio @ D 29 | mRECIST |
|---|---|---|---|---|
| Vehicle control | 11.60 ± 1.99 | — | — | 5/5 PD |
| Cpd E 100 mg/kg | 11.41 ± 2.06 | 98.42 | — | 5/5 PD |
| Cpd A 100 mg/kg | 12.63 ± 1.09 | 109.00 | — | 5/5 PD |
| Cpd E + Cpd A | 1.82 ± 0.73**†‡‡ | 15.70 | 6.83 | 2/5 CR, 1/5 PR, 2/5 SD |

Synergy:

Ratio > 1, synergistic;

Ratio = 1, additive;

Ratio < 1, antagonistic

**p<0.01, vs. vehicle group; †p<0.05 VS compound E; ‡‡p<0.01 vs. compound A group;

Conclusion:

Combination of compound E and compound A achieved synergistic antitumor effect in s.c. LD1-0030-361609 neuroblastoma PDX xenograft, achieved ORR 60% compared to 0% in either single agent treatment groups.

Example 86: Synergy of Compound E Plus Compound A in TP53 wt MYCN Non-Amplified CDX Neuroblastoma Model SH-SY5Y Therefore, in this experiment, a TP53 wt MYCN non-amplified CDX neuroblastoma model SH-SY5Y was established to evaluate the anti-tumor effect of compound A in combination with compound E. The dosing regimen was as follows:

Compound E: 50 mg/kg, PO, QD, 7 doses,
Compound A: 100 mg/kg, PO, QD, for a total of 15 doses, The dosing regimen of each drug in the dosing regimen for the combination is the same as the dosing regimen for the single drug.

As shown in FIGS. 106A and 106B, single agent of compound A showed limited antitumor activity, with a T/C value of 83.05% on D15. compound E exerted significant antitumor activity, with a T/C value of 38.73% on D15. Combination treatment significantly enhanced tumor repression.

As shown in the table, T/C (%) value of the combination group was 6.61 on Day 15. Animals from the combination group achieved 1/6 CR, 2/6 PR, ORR=50%.

TABLE 43

| Treatment | RTV @ D 15 | T/C (%) @ D 15 | Synergy ratio @ D 15 | mRECIST @ D 15 | mRECIST @ D 15 |
|---|---|---|---|---|---|
| Vehicle control | 13.44 ± 2.32 | — | — | 6/6 PD | 6/6 PD |
| Cpd A 100 mg/kg | 11.16 ± 1.18 | 83.05 | — | 6/6 PD | 6/6 PD |
| Cpd E 50 mg/kg | 5.20 ± 0.98 | 38.73 | — | 6/6 PD | 6/6 PD |
| Cpd A + Cpd E | 0.89 ± 0.25**†† | 6.61 | 4.87 | 1/6 CR, 2/6 PR, 3/6 SD | 1/6 CR, 4/6 SD, 1/6 PD |

**p < 0.01, vs. vehicle control group;
††p < 0.01, vs. COMPOUND A 100 mg/kg group;
Synergy: Ratio > 1, synergistic; Ratio = 1, additive; Ratio < 1, antagonistic.

**p<0.01, vs. vehicle group; †p<0.05 VS compound E; ‡‡p<0.01 vs. compound A group;

Conclusion:

Combination of compound E and compound A achieved synergistic antitumor effect in s.c. SH-SY5Y neuroblastoma CDX xenograft, achieved ORR 50% compared to 0% in other groups.

Example 87: Compound E Synergizes with Compound A to Inhibit Cell Viability of TP53 wt AML Cell Lines Compound E plus compound A enhanced cell viability inhibition in MOLM-13 AML cells Method used was the cell viability CTG assay. As shown in FIG. 107, compound E plus compound A enhanced cell viability inhibition in MOLM-13 AML cells after 24 h combination treatment.

Example 88: Combination of Compound E and Compound A Induce More Cell Apoptosis in MOLM-13 Cells In Vitro Method used was Flow cytometry, staining with Annexin V/PI. Compound E plus compound A enhanced apoptosis induction in MOLM-13 cells after 24 hours combination treatment. See FIG. 108. (***p<0.001).

Conclusion:

Compound E plus compound A enhanced apoptosis induction in MOLM-13 cells after 24 hours combination treatment.

Example 89: Combination of Compound E and Compound A Induce More Cell Apoptosis in OCI-AML-3 Cells In Vitro Method used was Flow cytometry, staining with Annexin V/PI. Compound E plus compound A enhanced apoptosis induction in OCI-AML-3 cells after 24 hours combination treatment. See FIG. 109 (***p<0.001).

Conclusion:

Compound E plus compound A enhanced apoptosis induction in OCI-AML-3 cells after 24 hours combination treatment.

Example 90: Combination of Compound E and Compound A Coordinately Induce Cell Apoptosis in MV-4-11 Cells In Vitro Method used was Flow cytometry, staining with Annexin V/PI. Compound E plus compound A enhanced apoptosis induction in MV-4-11 cells after 24 hours combination treatment. See FIG. 110. (***p<0.001)

Conclusion:

Compound E plus compound A enhanced apoptosis induction in MV-4-11 cells after 24 hours combination treatment.

Example 91: Combination Treatment with Compound A and Compound E in Systemic TP53$^{wt}$ MOLM-13 AML Model Results: As shown in the FIG. 111, single agents of compound A (50 mg/kg), compound E (50 mg/kg), and azacitidine (2 mg/kg) showed moderate antitumor activity. Combination treatments (compound A+compound E+azacitidine, compound A+compound E, compound E+azacitidine, compound A+azacitidine) significantly enhance tumor repression.

TABLE 44

| | Vehicle | Compound A | Compound E | Azacitidine | Compound A + azacitidine | Compound E + azacitidine | Compound A + Compound E | Compound A + Compound E + azacitidine |
|---|---|---|---|---|---|---|---|---|
| Median survival time (day) | 19.9 | 20.7 | 28.0 | 27.0 | 30.5 | 33.3 | 46.7 | 45.5 |
| Increase in life span (ILS, %) | — | 4.0 | 40.7 | 35.7 | 53.1 | 67.5 | 134.7 | 128.6 |

TABLE 44-continued

| | Vehicle | Compound A | Compound E | Azacitidine | Compound A + azacitidine | Compound E + azacitidine | Compound A + Compound E | Compound A + Compound E + azacitidine |
|---|---|---|---|---|---|---|---|---|
| p value vs. vehicle control | | | | | <0.05 | <0.01 | <0.001 | <0.001 |

The p value is significant after Bonferroni correction;
ILS = (median survival time in treated group-median survival time in vehicle control group)/median survival time in vehicle control group; ILS >25% indicates biologically significant.

As shown in the table 44, combination treatment with Compound A+azacitidine, Compound E+azacitidine, Compound A+Compound E, and triple combo of Compound A+Compound E+azacitidine significantly prolonged mice survival, with ILS of 53.1%, 67.5%, 134.7%, and 128.6%, respectively.

Conclusion:

Combination of Compound A+Compound E achieved synergistic antitumor effect MOLM-13 AML xenograft, which is as potent as triple combo of Compound A+Compound E+azacitidine, but superior to doublet combo of Compound E plus azacitidine and Compound A plus azacitidine.

Example 92: Combination Treatment with Compound A Plus Compound E in Systemic TP53 wt MOLM-13 AML Model Results:

As shown in the FIG. 112, single agent of Compound A (80 mg/kg, QDX120D) showed moderate antitumor activity. Single agent of Compound E (100 mg/kg, QD (D1-7/28d cycles) exerted significant antitumor activity. Combination treatment (Compound A+Compound E) significantly enhance tumor repression.

TABLE 45

| Treatment | Median survival days | Increase in life-span | P-value vs. vehicle |
|---|---|---|---|
| Vehicle | 21 | — | — |
| Compound A | 26 | 24% | >0.05 |
| Compound E | 41 | 95% | <0.0001 |
| Combination | 67 | 220% | <0.0001 |

As shown in the Table 45, combination treatment with Compound A+Compound E significantly prolonged mice survival, with ILS of 220%, compared to 24% for Compound A single agent treatment and 95% for Compound E single agent treatment. Importantly, combination treatment with Compound A and Compound E achieved 30% cure rate.

Conclusion:

Combination of Compound A and Compound E achieved synergistic antitumor effect MOLM-13 AML xenograft.

Example 93: Cell Death Increased in the Combination of Compound A and Compound E Method: MM Primary cells were obtained through bone marrow aspiration from newly diagnosed or relapsed MM patients. Red blood cells were removed by Cell Lysis Solution and the isolated mononuclear cells were washed twice with PBS. The isolated and verified mononuclear cells were used for plating. Before plating, single cell suspensions were prepared, and subjected to surface marker CD138 antibody staining for verification of MM indication. Briefly, Primary samples were treated with compound A for 24 hours and compound E for 48 hours. MM, patient #111, 113 primary myeloma cells were subjected for flow cytometry analysis. MM population was gated out using CD138$^+$. the loss of CD138 indicates cell death.

Conclusion: After primary cells were treated with compound A for 24 hours and compound E for 48 hours. CD138*cells were decreased by flow cytometry analysis (an indicator of cell death). compound A as a single drug has an IC$_{50}$ of 1-3 μM, showing significant cell killing effects. In addition, with two representative patient samples, the combination of compound A with compound E greatly increased cell death, decreasing IC$_{50}$ values from 1-3 μM (compound A single agent) to 0.12 μM. In summary, cell death increased in the combination of compound A and compound E.

Example 94 Combination Treatment with Compound B and Compound A/Anlotinib in SCLC PDX Model LU5220

Results:

As shown in the FIG. 113, compound A single agent showed antitumor activity, compound B single agent showed minor antitumor activity. compound B plus compound A or Anlotinib combination treatment achieved a synergistic antitumor effect.

As shown, T/C (%) value of compound B and compound A combination treatment was 5.94% on Day 28 compared to 54.80% or 13.87% from single agents treatments, the synergy score was 1.3, indicating synergistic effects. T/C (%) value of compound B and Anlotinib combination treatment was 29.61% on Day 28 compared to 54.80% or 57.93% from single agents treatments, the synergy score was 1.1, indicating synergistic effects.

Conclusion:

Combination of compound B plus compound A or Anlotinib achieved synergistic antitumor effect in s.c. LU5220 SCLC PDX model.

Example 95 Combination Treatment with Compound B and Compound A/Anlotinib/Lurbinectedin in SCLC PDX Model LU5183

Results:

As shown in the FIG. 114, COMPOUND B and COMPOUND A single agents showed minor antitumor activity, Anlotinib single agent showed antitumor activity. COMPOUND B plus COMPOUND A or Anlotinib and COMPOUND A plus Anlotinib combination treatment achieved an enhanced antitumor effect.

As shown, T/C (%) value of COMPOUND B and COMPOUND A combination group was 49.06% on Day 22 compared to 62.79% or 65.48% from single agents groups. T/C (%) value of COMPOUND B and Anlotinib combination group was 41.05% on Day 26 compared to 67.86% or 45.34% from single agents groups. T/C (%) value of COMPOUND A and Anlotinib combination group was 43.11% on Day 26 compared to 70.22% or 45.34% from single agents groups.

Conclusion:

Combination of COMPOUND B plus COMPOUND A or Anlotinib and COMPOUND A plus Anlotinib achieved enhanced antitumor effect in s.c. LU5183 SCLC PDX model.

Example 96 Combination Treatment with Compound B and Compound A/Anlotinib/Lurbinectedin in SCLC PDX Model LU5264

Results:

As shown in the FIG. 115, compound A single agent showed antitumor activity, compound B and Anlotinib single agents showed minor antitumor activity. compound B plus compound A or Anlotinib combination treatment achieved a synergistic antitumor effect. compound A plus Anlotinib combination treatment achieved an enhanced antitumor effect.

As shown, T/C (%) value of compound B and compound A combination group was 8.91% on Day 22 compared to 72.78% or 32.09% from single agents groups, the synergy score was 2.62, indicating synergistic effects. T/C (%) value of compound B and Anlotinib combination group was 37.81% on Day 22 compared to 72.78% or 72.78% from single agents groups, the synergy score was 1.40, indicating synergistic effects. T/C (%) value of compound A and Anlotinib combination group was 26.19% on Day 22 compared to 32.09% or 72.78% from single agents groups.

Conclusion:

Combination of compound B plus compound A or Anlotinib achieved synergistic antitumor effect in s.c. LU5264 SCLC PDX model.

Combination of compound A plus Anlotinib achieved enhanced antitumor effect in s.c. LU5264 SCLC PDX model.

EQUIVALENTS

Those skilled in the art will recognize, or be able to ascertain, using no more than routine experimentation, numerous equivalents to the specific embodiments described specifically herein. Such equivalents are intended to be encompassed in the scope of the following claims.

What is claimed is:

1. A combination comprising:
a) Compound A:

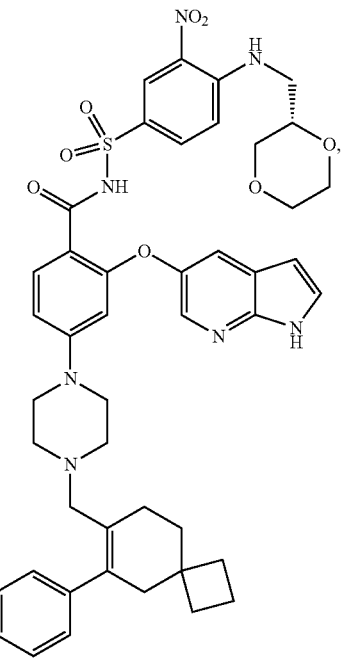

(Compound A: (S)—N-((4-(((1,4-dioxan-2-yl)methyl)amino)-3-nitrophenyl)sulfonyl)-2-((1H-pyrrolo[2,3-b]pyridin-5-yl)oxy)-4-(4-((6-(4-chlorophenyl)spiro[3.5]non-6-en-7-yl)methyl)piperazin-1l-yl)benzamide)

or a pharmaceutically acceptable salt thereof, in an amount of about 200 mg, about 400 mg, or about 600 mg; and b) Compound C: 7

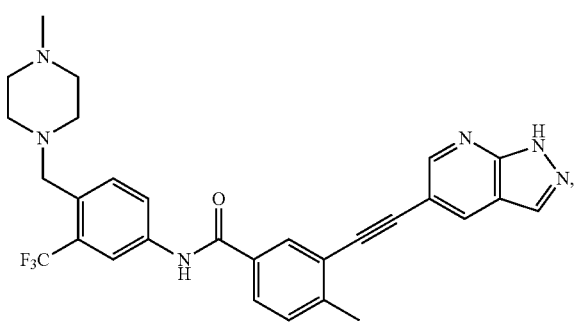 [SMILES: Cc1ccc(C(=O)Nc2ccc(CN3CCN(C)CC3)c(C(F)(F)F)c2)cc1C#Cc1cnc2[nH]ncc2c1]

or a pharmaceutically acceptable salt thereof in an amount of about 40 mg.

2. The combination of claim 1, further comprising dexamethasone.

3. The combination of claim 1, comprising Compound A or the pharmaceutically acceptable salt thereof in an amount 200 mg.

4. The combination of claim 1, comprising Compound A or the pharmaceutically acceptable salt thereof in an amount of 400 mg.

5. The combination of claim 1, comprising Compound A or the pharmaceutically acceptable salt thereof in an amount of 600 mg.

6. A pharmaceutical composition comprising the combination of claim 1, and one or more pharmaceutically acceptable excipients.

\* \* \* \* \*